April 6, 1954          A. E. JOEL, JR                    2,674,312
                         SORTING DEVICE
Filed July 12, 1950                              58 Sheets-Sheet 2

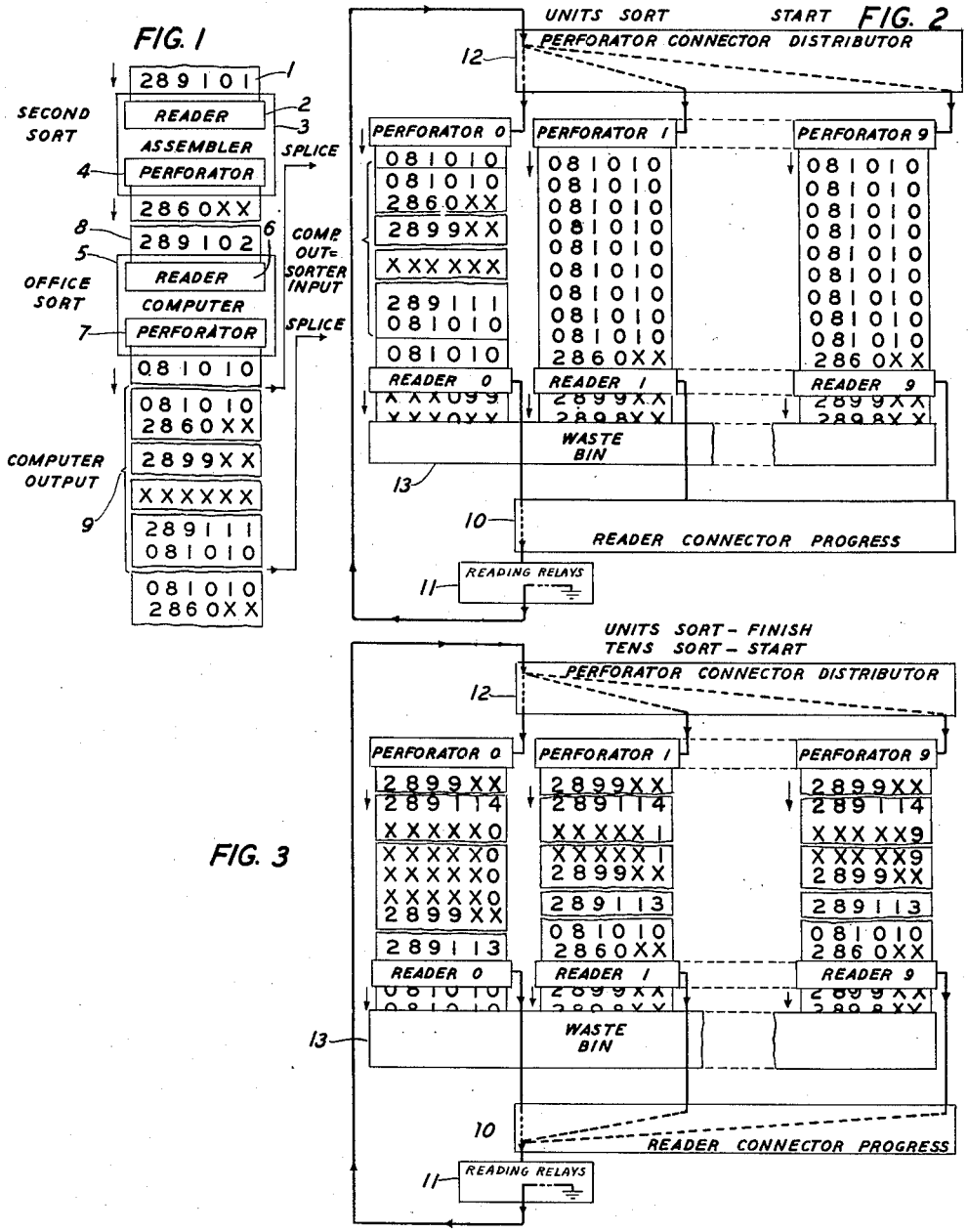

INVENTOR
A. E. JOEL, JR.
BY
ATTORNEY

April 6, 1954 A. E. JOEL, JR 2,674,312
SORTING DEVICE
Filed July 12, 1950 58 Sheets-Sheet 3

INVENTOR
A. E. JOEL, JR.
BY
ATTORNEY

April 6, 1954

A. E. JOEL, JR 2,674,312

SORTING DEVICE

Filed July 12, 1950

INVENTOR
A. E. JOEL, JR.
BY
ATTORNEY

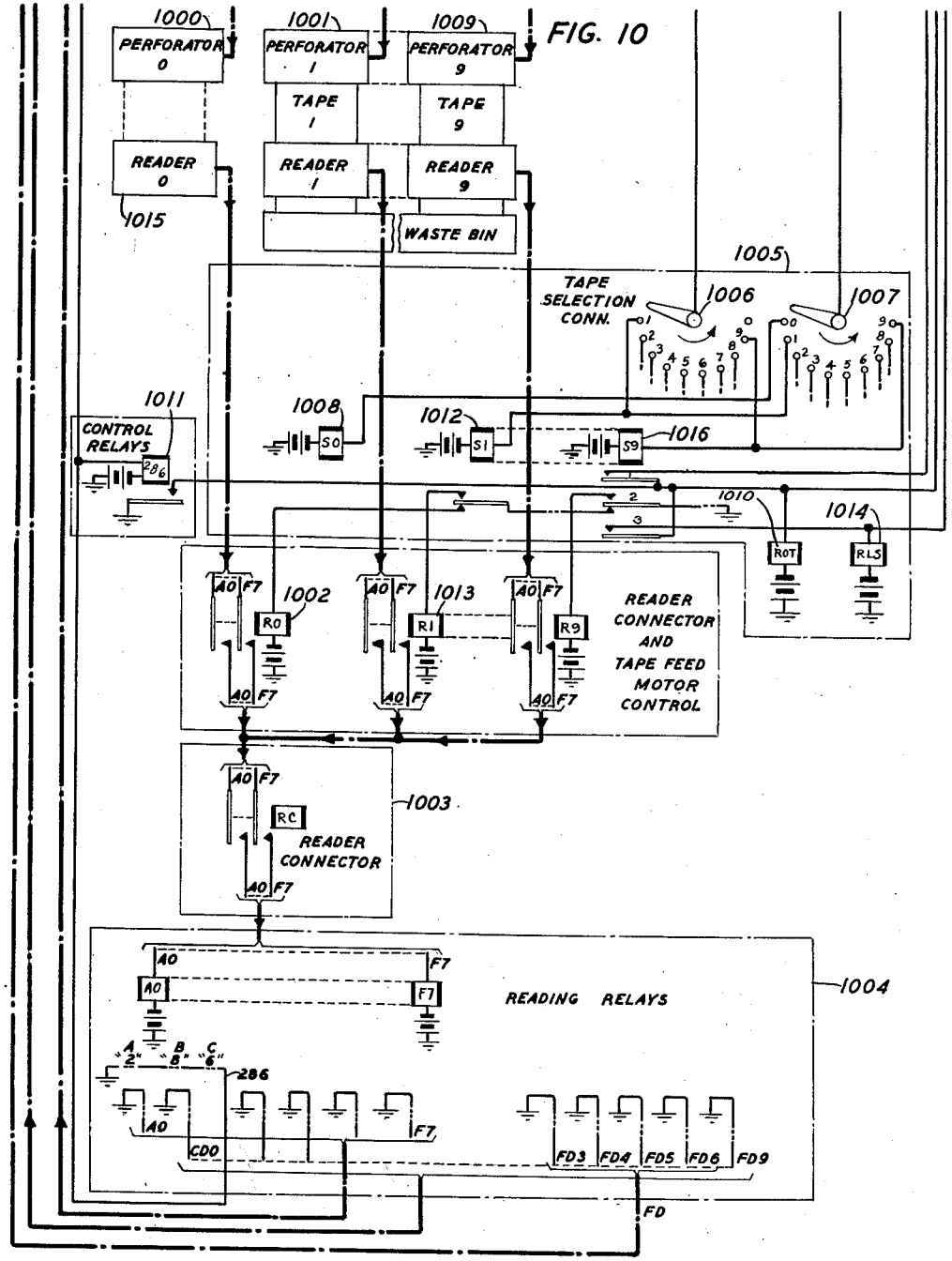

April 6, 1954

A. E. JOEL, JR 2,674,312

SORTING DEVICE

Filed July 12, 1950

| FIG. 17 ALARM AND TIMING | FIG. 18 TAPE IDENT. PERF. PROGRESS | FIG. 19 MOTOR CONTROL | FIG. 20 OFF NORMAL START | FIG. 21 READER STEP CHK. STEP CONTROL | FIG. 22 TAPE SECT. REG. | FIG. 23 SPL. PATT. TIMING PERF. MUT. LINE CONTROL | FIG. 12 READER 0 AUX. RD'R. CONN. TAPE FEED MOT. CONTR. | FIG. 13 READER 0 AUX. READER CONN. | FIG. 14 READER 1 AUX. RD'R. CONN. TAPE FEED MOT. CONTR. | FIG. 15 READER 9 AUX. READER CONN. | FIG. 16 COMPUTER CHECK LAMPS |
|---|---|---|---|---|---|---|---|---|---|---|---|
| FIG. 29 TAPE INDEX REGISTER | FIG. 30 | FIG. 31 TAPE IDENT. PERF. CONTROL | FIG. 32 SKIP SPLICE CONTROL | FIG. 33 READER LINE COUNT | FIG. 34 TAPE IDENT. SORT CONN. | FIG. 35 TAPE SELECTION CONN. | FIG. 24 READER CONN. | FIG. 25 READER CONN. | FIG. 26 MACHINE NUMBER IDENT. | FIG. 27 PART OF READER CONN. | FIG. 28 MISC. LAMPS |
| FIG. 41 TAPE IDENTITY READING PROGRESS | FIG. 42 | FIG. 43 TAPE INDEX CONN. | | FIG. 44 CONTROL RELAYS | FIG. 45 SORT CLASS CONN. | FIG. 46 TAPE END PERF. CONTROL | FIG. 36 READING RELAYS "A-B" DIGITS | FIG. 37 READING RELAYS "C-D" DIGITS | FIG. 38 READING RELAYS "E-F" DIGITS | FIG. 39 READING RELAY TRANSL. | FIG. 40 KEYS |
| | | | | FIG. 50 | FIG. 51 | FIG. 52 | FIG. 47 WINDOW SPLICE PERF. CONTROL | FIG. 48 PERF. SORT CONN. | FIG. 49 PERF. MAG. CHK. "A-B" DIGIT | | |
| | | | | FIG. 56 SET UP SWITCHES | FIG. 57 SET UP SWITCHES | FIG. 58 ENTRY SPREAD CONTROL | FIG. 53 WINDOW SPLICE PERF. CONTROL | FIG. 54 PERFOR. REG. | FIG. 55 PERF. MAG. CHK. "C-D" DIGIT | | |
| | | | | | | | FIG. 59 | FIG. 60 ENTRY SPREAD PROGRESS | FIG. 61 PERF. MAG. CHK. "E-F" DIG. PERF. CONN. | | |
| | | | | | | | | | FIG. 62 PERF. ADV. CHK. HOLD CHK. PERFOR. | FIG. 63 TAPE CUTTER | |

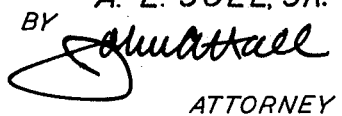

INVENTOR
A. E. JOEL, JR.
BY
ATTORNEY

April 6, 1954     A. E. JOEL, JR     2,674,312
SORTING DEVICE

Filed July 12, 1950     58 Sheets-Sheet 7

INVENTOR
A. E. JOEL, JR.
BY
ATTORNEY

April 6, 1954     A. E. JOEL, JR     2,674,312
SORTING DEVICE

Filed July 12, 1950     58 Sheets-Sheet 8

INVENTOR
A.E.JOEL,JR.
BY
ATTORNEY

INVENTOR
A. E. JOEL, JR.
ATTORNEY

April 6, 1954     A. E. JOEL, JR     2,674,312
SORTING DEVICE
Filed July 12, 1950     58 Sheets-Sheet 15
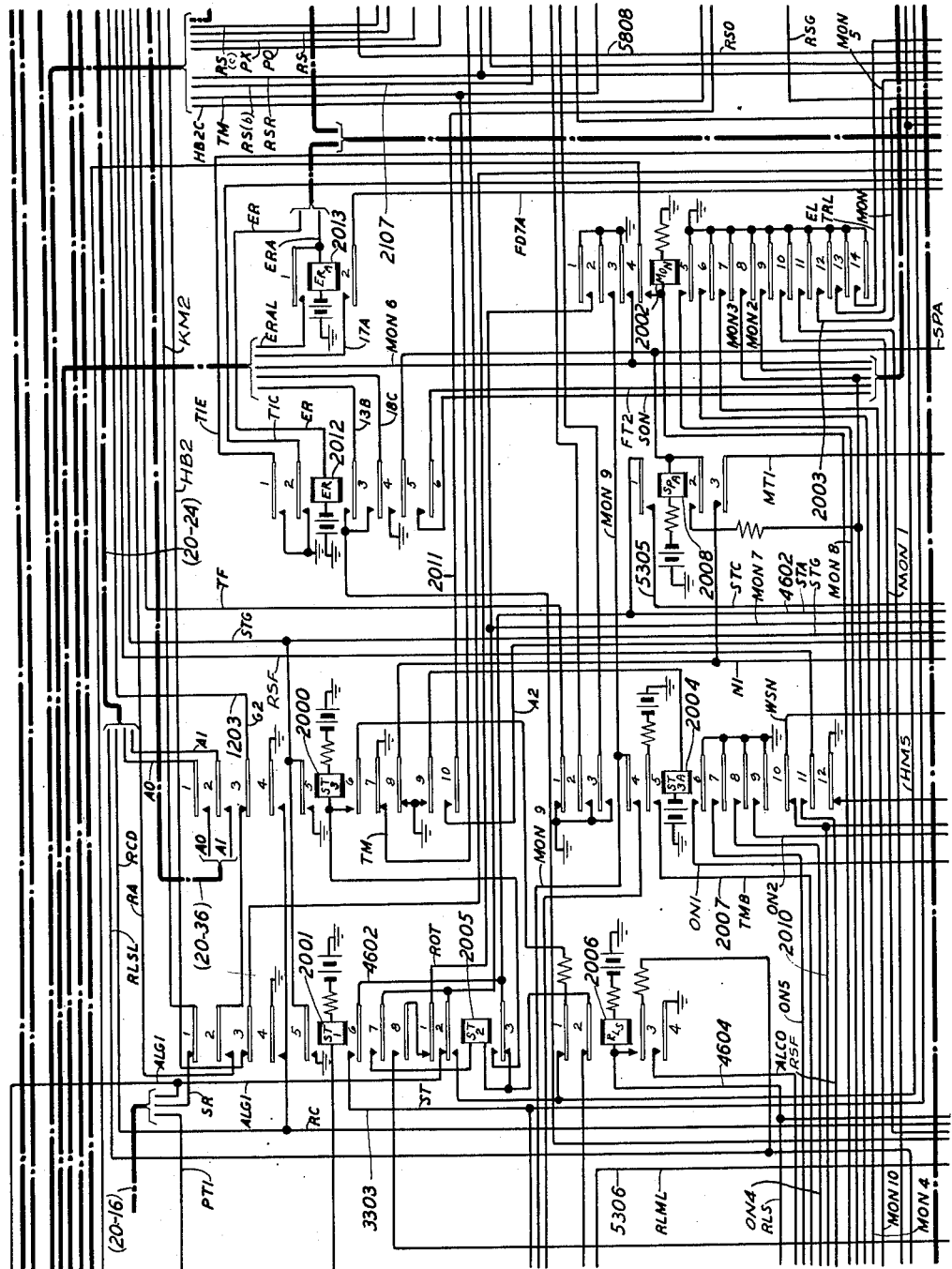
FIG. 20
INVENTOR
A. E. JOEL, JR.
BY 
ATTORNEY

INVENTOR
A. E. JOEL, JR.
BY
ATTORNEY

April 6, 1954     A. E. JOEL, JR     2,674,312
SORTING DEVICE
Filed July 12, 1950     58 Sheets-Sheet 19
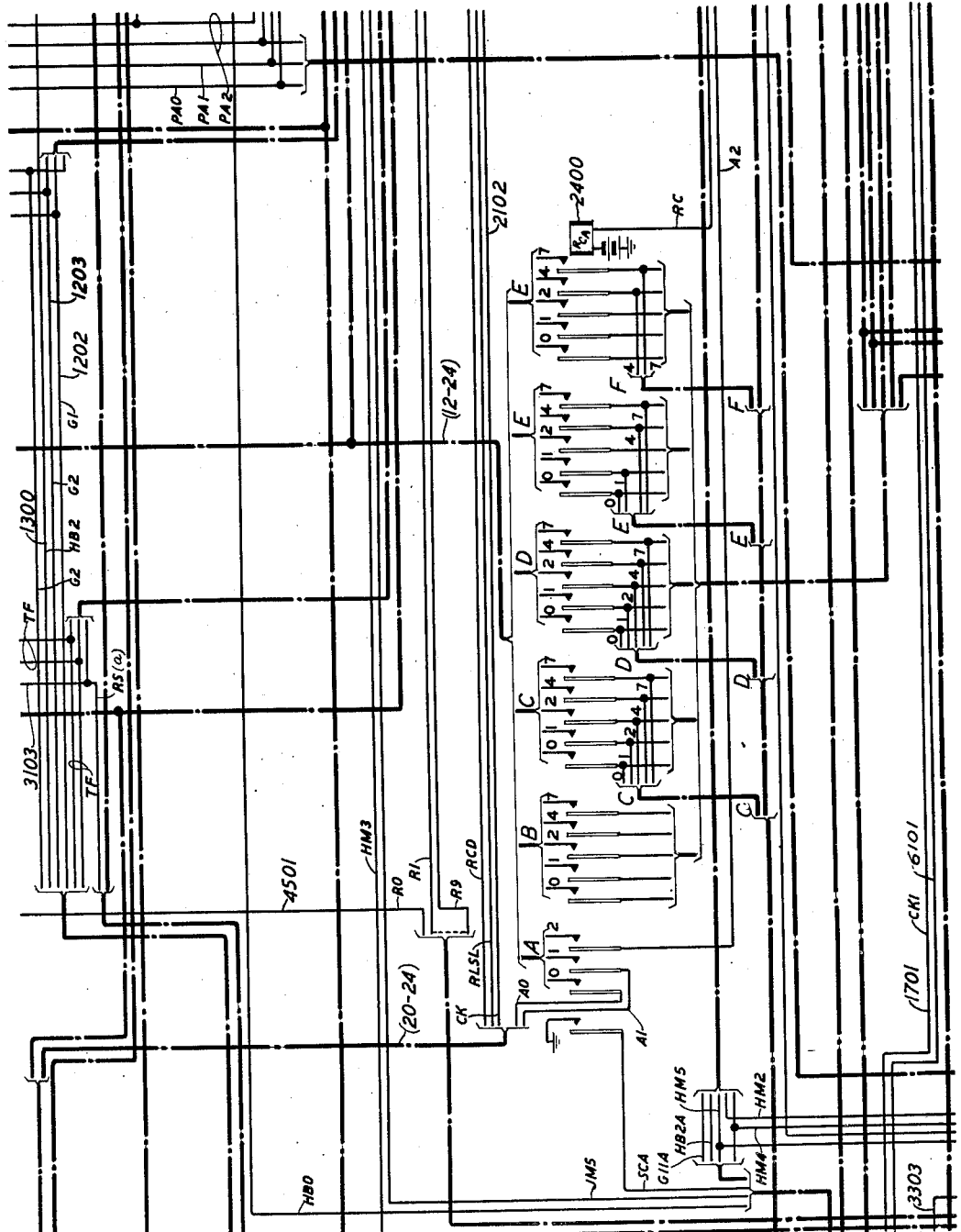
FIG. 24
INVENTOR
A. E. JOEL, JR.
BY
ATTORNEY

INVENTOR
A. E. JOEL, JR.
BY
ATTORNEY

INVENTOR
A. E. JOEL, JR.
BY
ATTORNEY

INVENTOR
A. E. JOEL, JR.
BY
ATTORNEY

April 6, 1954 — A. E. JOEL, JR — 2,674,312
SORTING DEVICE
Filed July 12, 1950 — 58 Sheets-Sheet 36
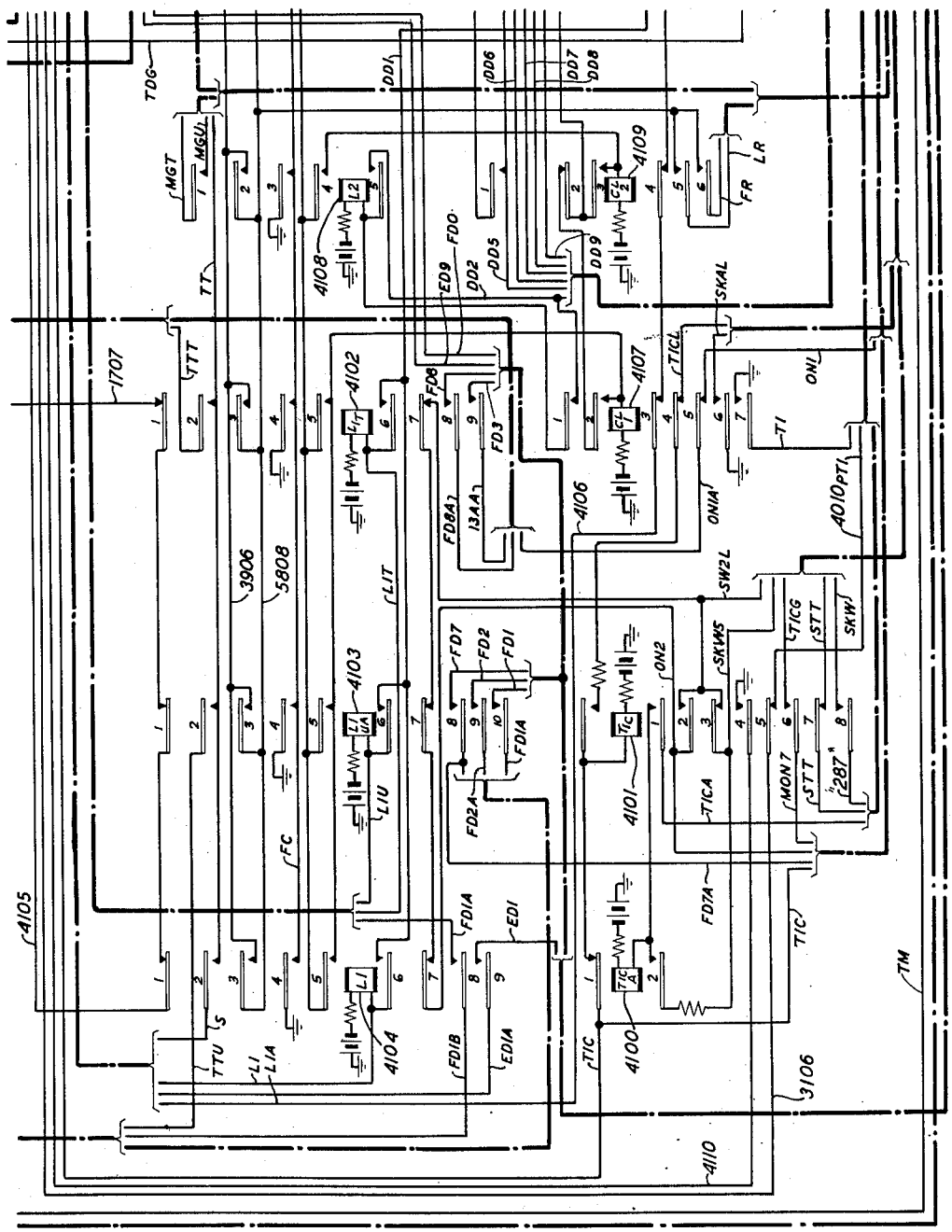
FIG.41
INVENTOR
A. E. JOEL, JR.
BY
ATTORNEY

FIG. 43

April 6, 1954 — A. E. JOEL, JR — 2,674,312
SORTING DEVICE
Filed July 12, 1950 — 58 Sheets-Sheet 49

INVENTOR
A. E. JOEL, JR.
BY
ATTORNEY

April 6, 1954 A. E. JOEL, JR 2,674,312
SORTING DEVICE
Filed July 12, 1950 58 Sheets-Sheet 51

INVENTOR
A. E. JOEL, JR.
BY
ATTORNEY

April 6, 1954

A. E. JOEL, JR 2,674,312

SORTING DEVICE

Filed July 12, 1950

INVENTOR
A. E. JOEL, JR.
BY
ATTORNEY

April 6, 1954     A. E. JOEL, JR     2,674,312
SORTING DEVICE
Filed July 12, 1950     58 Sheets-Sheet 53
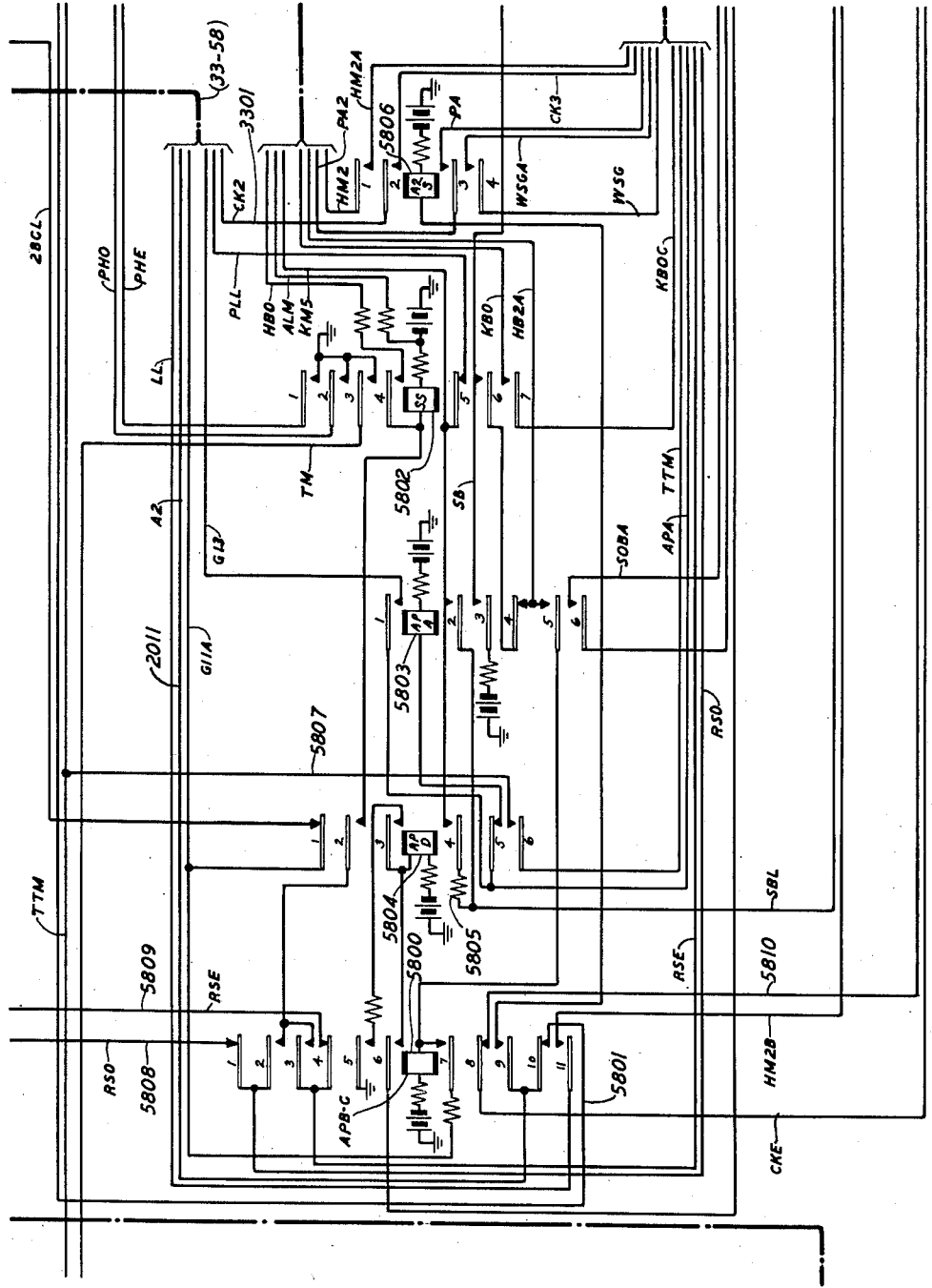
FIG. 58
INVENTOR
A. E. JOEL, JR.
BY
ATTORNEY April 6, 1954

A. E. JOEL, JR 2,674,312

SORTING DEVICE

Filed July 12, 1950

TAPE CUTTER CIRCUIT

INVENTOR
A. E. JOEL, JR.
BY
ATTORNEY

Patented Apr. 6, 1954

2,674,312

UNITED STATES PATENT OFFICE 2,674,312

SORTING DEVICE

Amos E. Joel, Jr., New York, N. Y., assignor to Bell Telephone Laboratories, Incorporated, New York, N. Y., a corporation of New York Application July 12, 1950, Serial No. 173,335

30 Claims. (Cl. 164—115)

This application relates to accounting devices and particularly to tape controlled devices in which a great plurality of items of information are recorded in code on a continuous strip, such as a paper tape, and which strips are then passed through accounting devices for various accounting operations.

In most accounting operations groups of items of information each comprising the data for a separate record or perhaps specifically for a customer charge are characterized by the need for sorting in accordance with an identification in one form or another included in each said group of items. The most common form of this is a decimal sorting of a multidigit number.

An object of the present invention is to provide a sorter into which a tape having a group of unsorted records is inserted and which, through its operation, will produce another tape of substantially the same length as the first with the records reproduced and completely sorted. In certain systems now in use sorting of such records is produced but there is much intermediate tape handling, involving the production of intermediate tapes, the splicing of a plurality of output tapes to form a new input tape and the physical transportation of the tapes from machine to machine all involving time and expense and subject to human error. This object, therefore, is one directed to economy, speed and assurity.

An object of the invention is to provide a machine which will sort items from a record containing items of information where each item includes a plurality of sorting indicia and where each index includes a plurality of denominational orders and which will sort items by successive indicia and by denominational orders for each index sort and which will, if desired, finally assemble the whole of the items of the record in completely sorted sequence by denominational orders of all sorting indicia. The sorting indicia need not necessarily be limited to numerical digits or, if comprising numerical digits, need not necessarily be limited to digits of the base 10, although the base 10 system of numerical digits may represent the preferred exemplary embodiment of the invention.

In one embodiment of the present invention a group of ten (for decimal sorting) devices is used each consisting of a recorder feeding a tape into a reader and which reader is capable of reading out the record which it finds and transmitting it selectively to the ten recorders. An important and essential element of the invention is a routine circuit for enabling the various readers in a rigid order, whereby any particular record may be read by one reader and recorded on some other recorder a number of times. Such record therefore gradually approaches and finally reaches a new position among other records in a perfectly sorted order.

In the operation of the device of the present invention, a tape to be sorted is inserted in the No. 0 reader and its trailing end is attached to the leading end of the output tape of the No. 0 recorder. The device is then set into operation, whereupon this input tape is completely read by the reader which distributes each record to the No. 0 to No. 9 recorders in accordance with a given digit of an identification found in each such record. In this manner, ten new sections of tape are produced, one by each of the ten recorders, the No. 0 recorder thus recording all records having a 0 digit in a given place (the units order) and each of the other tapes being characterized by one of the other digits in like manner.

When this original tape has been completely sorted in accordance with one digit, then the routine control may cause the No. 0 reader to then read off the items which its companion recorder has just produced and to sort them in accordance with another (the tens place) digit. Thereafter, the routine circuit enables the No. 1 reader to read off and to sort, in accordance with this same digit, the items which its companion recorder had recorded in the first sorting operation. Successively, the No. 2 to No. 9 readers are enabled so that now each of the tapes between the No. 0 recorder and its reader and the No. 9 recorder and its reader contain a record of items sorted in accordance with two (the units and tens) digits. Again, the routine circuit enables the various readers in turn. This process is carried on until all of the record items are completely sorted, whereupon a last and final operation of the routine circuit will cause the records on the No. 1 tape to be recorded in the No. 0 tape immediately following the records which the No. 0 recorder had just made. Following this the No. 2 reader will read off the last portion of its tape into the No. 0 recorder so that finally the No. 0 recorder will have a complete record duplicating that of the original tape inserted into the No. 0 reader but with the items therein completely sorted. The tapes issuing from the No. 1 to No. 9 readers, inclusive, are discarded.

The final step by which the records on the various numbered recorders are gathered together on the No. 0 recorder is a convenient manner of producing a tape in which the various records are not only sorted in accordance with the identification of each record but also are maintained in the order in which they appeared in the original tape.

In accordance with another form of the invention an extra reader not having a recorder associated therewith and an extra recorder not having a companion reader associated therewith may be employed. In this form of the invention the input tape is placed in the said extra reader and the items distributed to the ten recorders. On each different sorting step the companion ten readers are sequentially enabled and then, as a final step, the ten records finally produced are completed on the additional and heretofore unused recorder.

A feature of the invention is the method of automatically feeding back the output of one step of a sorting process to perform the next step in the process. In accordance with this feature, and as hereinabove set forth, the output of the No. 0 to No. 9 recorders, inclusive, is sequentially read into the distributing circuit and rerecorded in the various recorders in accordance with an identification in each item.

Another feature of the invention is the use of a tape identity index marking or record made in all of the records automatically recorded by each recorder at the beginning and end of each section of tape which the recorder produces. This comprises a control means whereby when, for instance, the No. 3 perforator has been enabled in the second sorting operation, its companion reader will read off the record which it made during the first sorting operation but will not read off the fragmentary record made by the Nos. 0, 1 and 2 perforators on the second sorting operation.

Another feature of the invention is the use of these tape identification codes for controlling the routine circuit in its operations, and particularly in controlling the recording of the digital place in the identification of each record for use as the sorting control.

Another feature of the invention is the automatic gathering of sorted information by an extra run through the sorting device. After the various records have been sorted in accordance with all the digits in their identification numbers, then the record is divided into ten records on the tapes produced by the 0 to 9 recorders. As the last step, the No. 1 to No. 9 recorders are again enabled in sequence and the record from each in turn is read into the No. 0 recorder so that finally a tape is produced on the 0 recorder containing all of the information on the original incoming tape but in a completely sorted form.

Another feature of the invention is a means for automatically cutting the tape between the perforator No. 0 and its companion reader just prior to the start of the last sort. Therefore, a tape issuing from this No. 0 recorder will contain the record transmitted to it on the last sorting operation plus the nine other sections transmitted to it in turn from the No. 1 to No. 9 readers, inclusive.

In the specific embodiment of the invention disclosed herein, the record body consists of a paper tape wherein the record may be made by transverse lines of perforations. However, it is applicant's intention to so disclose his invention only by way of example, since the principles explained may be applied to other media such as magnetic tape, photographic tape and other conventional means for recording, storing and reading out information.

Other features will appear hereinafter.

The drawings consist of fifty-eight sheets having sixty-three figures as follows:

Fig. 1 is a diagram having the characteristics of a flow chart to indicate how the input tape for the device of the present invention is prepared;

Figs. 2 to 7, inclusive, are diagrams also bearing the characteristics of flow charts in which:

Fig. 2 shows the condition of the tapes at the beginning of the complete operation;

Fig. 3 shows the condition of the tapes at the end of the units sort and at the start of the tens sort;

Fig. 8 is a block diagram showing how Figs. 9 and 10 may be placed to provide a schematic circuit diagram showing the basic circuit arrangement whereby several digital sorts are progressively initiated;

Fig. 9 shows the essentials of the entry spread progress circuit, the perforator register circuit, the perforate sort connector, the sort class connector and the perforator connector;

Fig. 10 shows an indication of the ten pairs of perforators and readers, the essentials of the tape selection connector, the essentials of the reader connector and tape feed motor control, the essentials of the reader connector and an indication of the reading relay;

Fig. 11 is a broken diagram showing the manner in which Figs. 12 to 63, inclusive, may be arranged to provide a complete circuit arrangement in which

Figure 14:
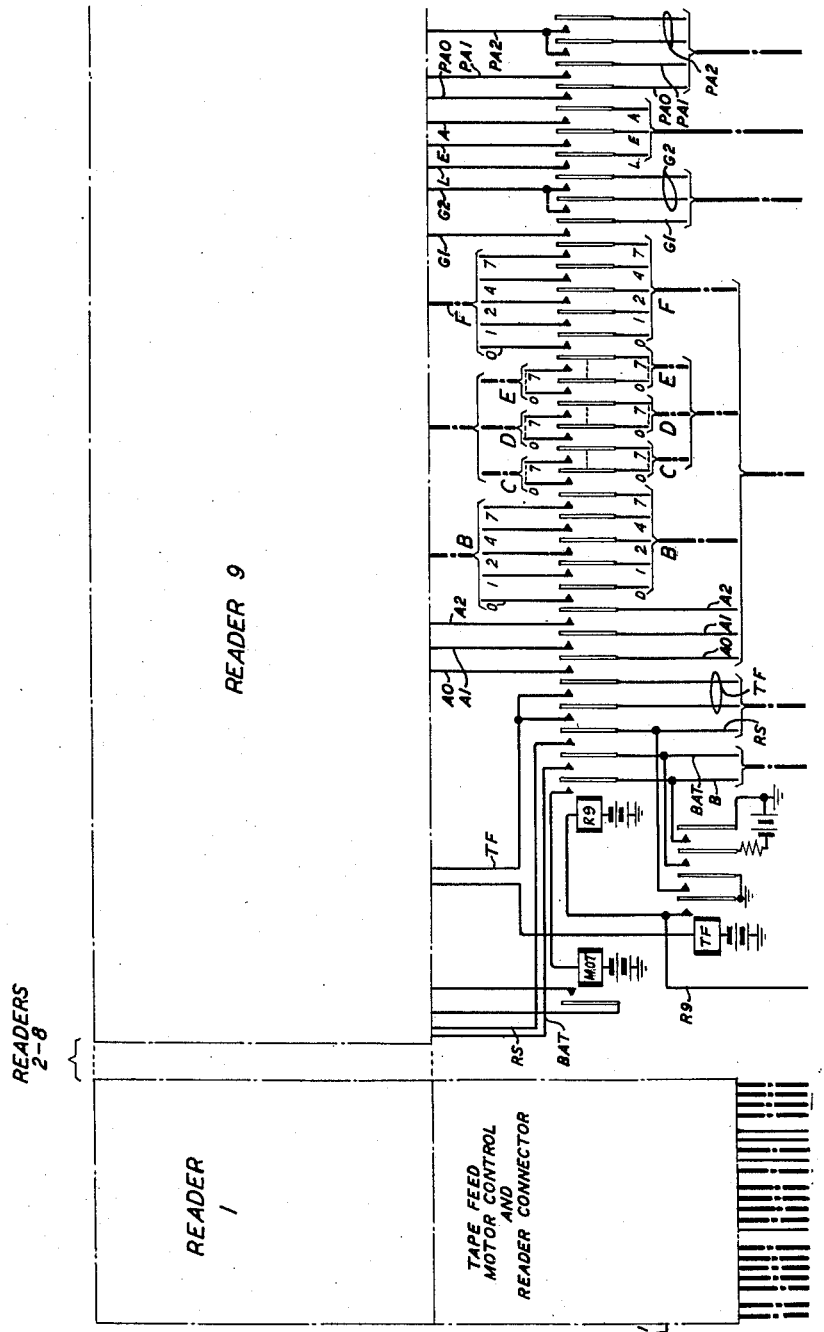
Fig. 14 shows an indication of the reader 1 and its associated tape feed motor control and reader connector and an indication of the readers and associated apparatus of readers 2 to 8, inclusive.
Figure 15:
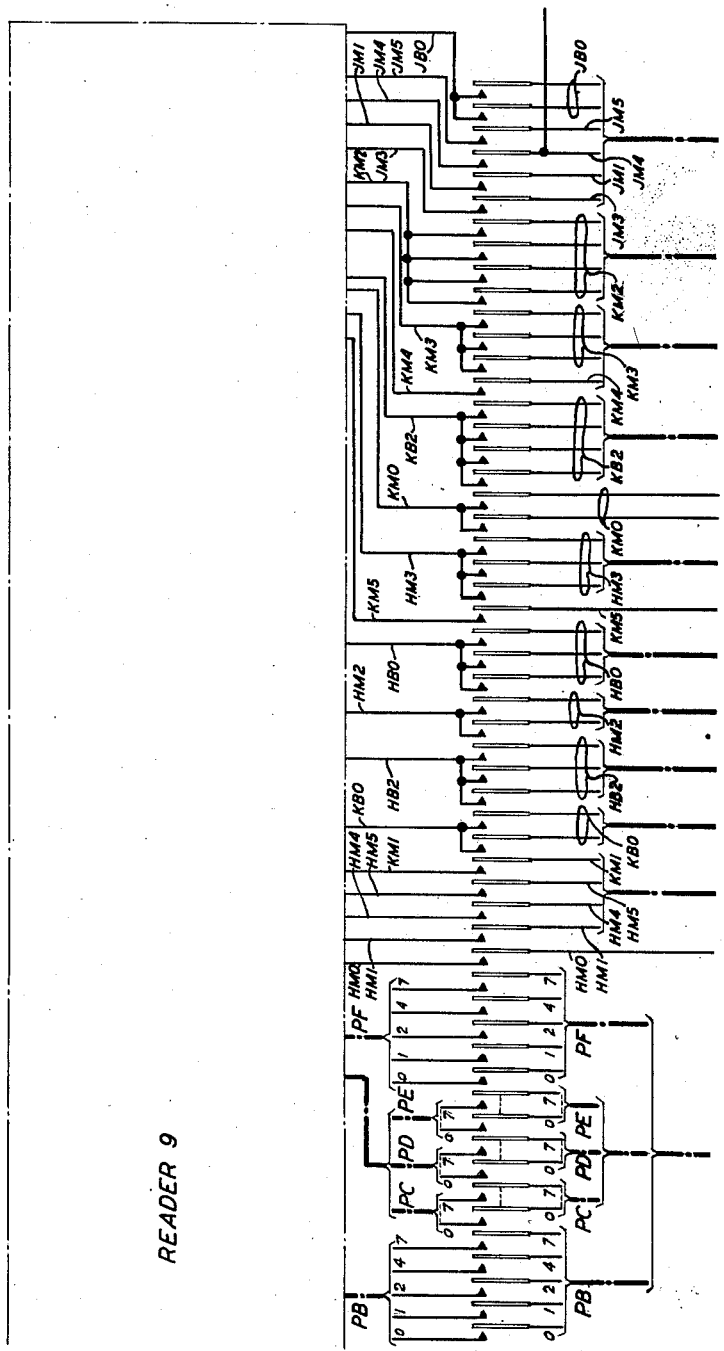
Figure 16:
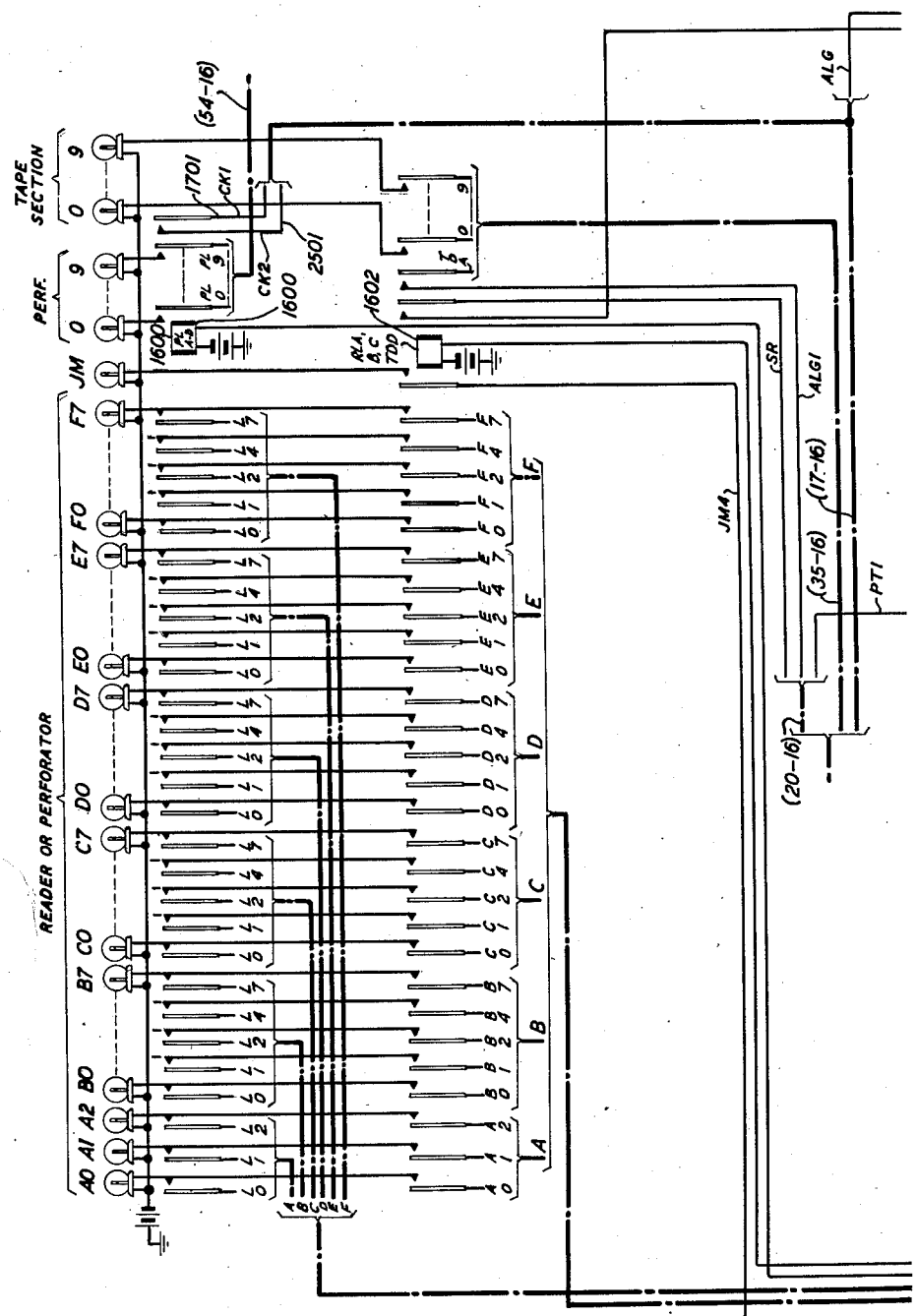
Figure 17:
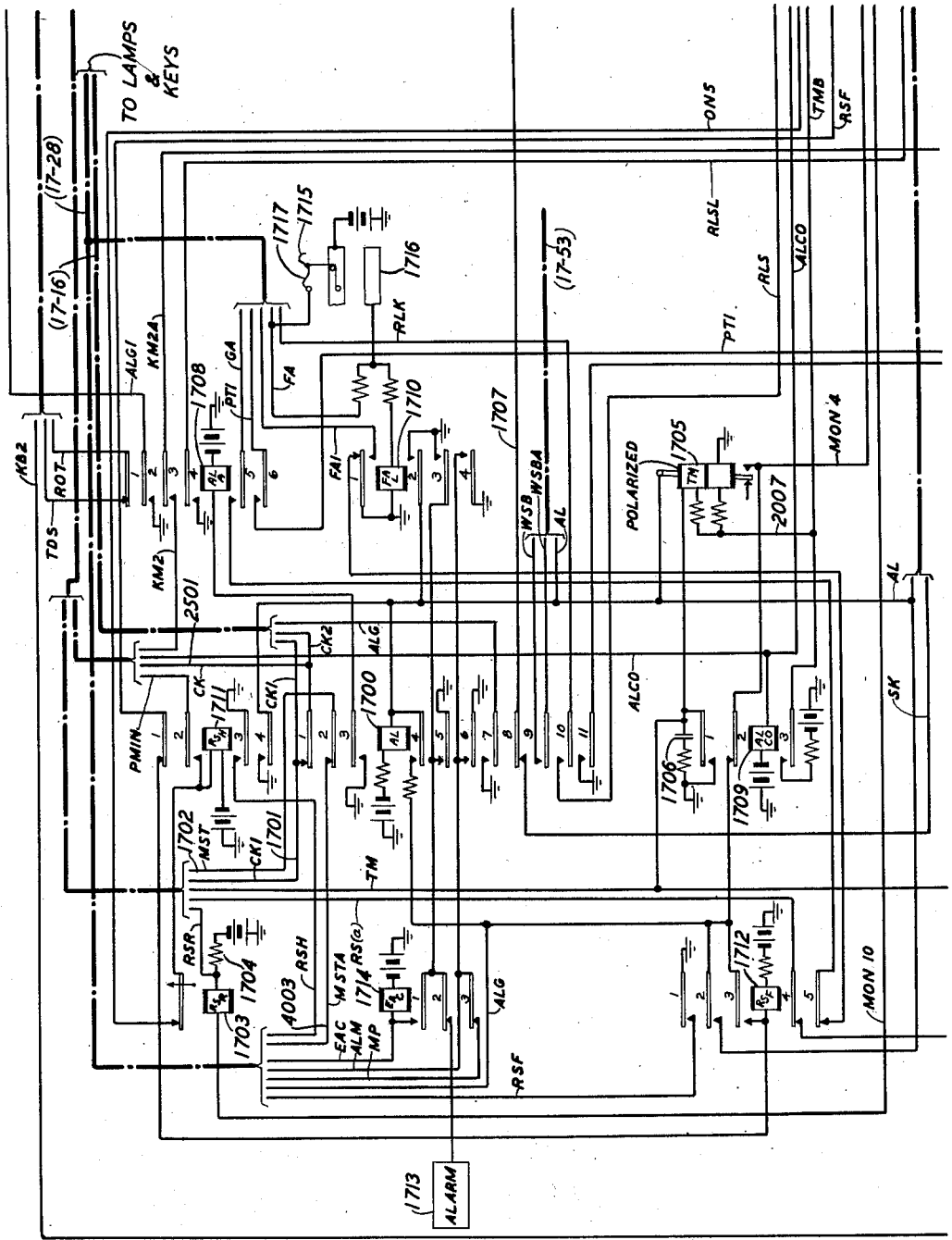
Figure 18:
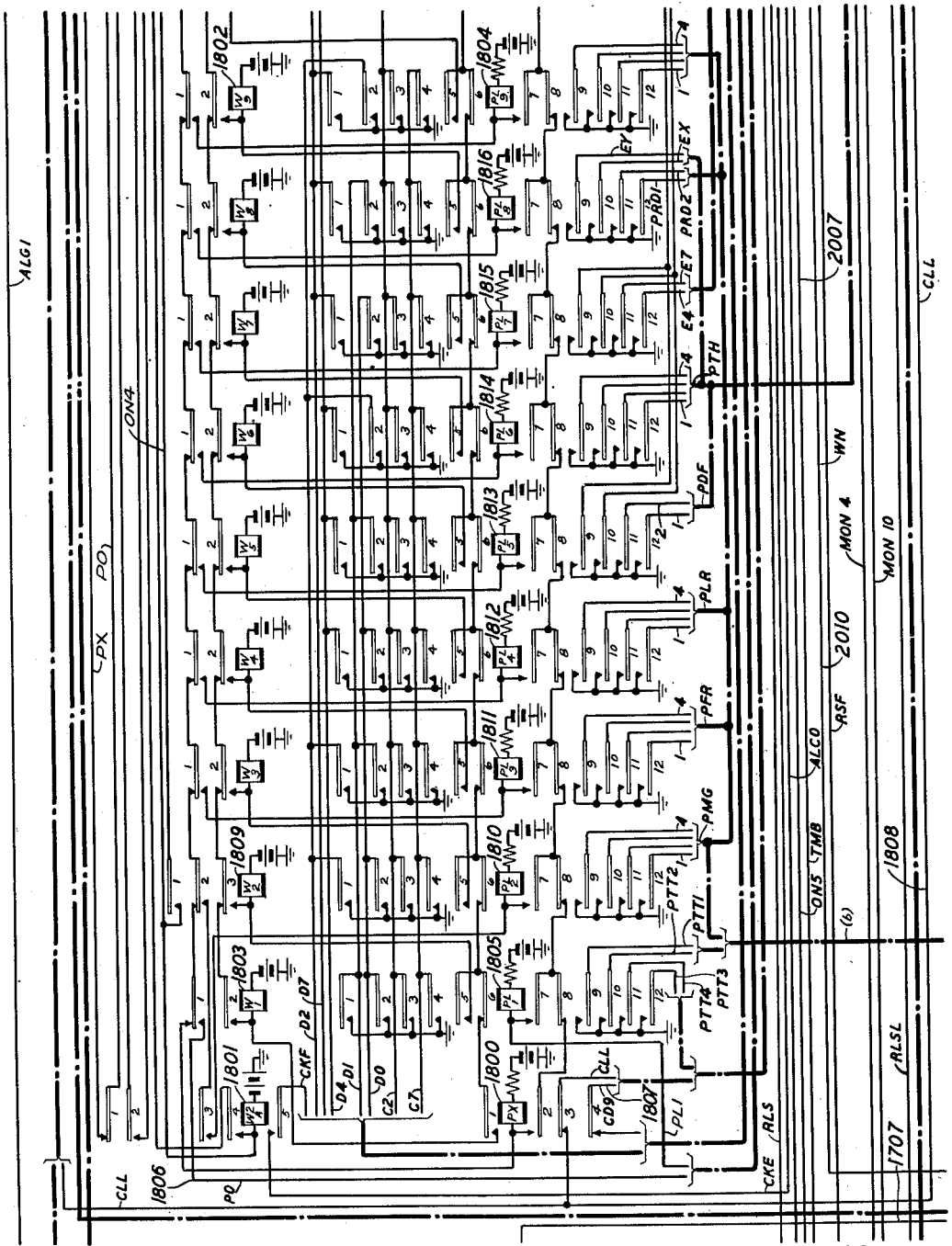
Figure 19:
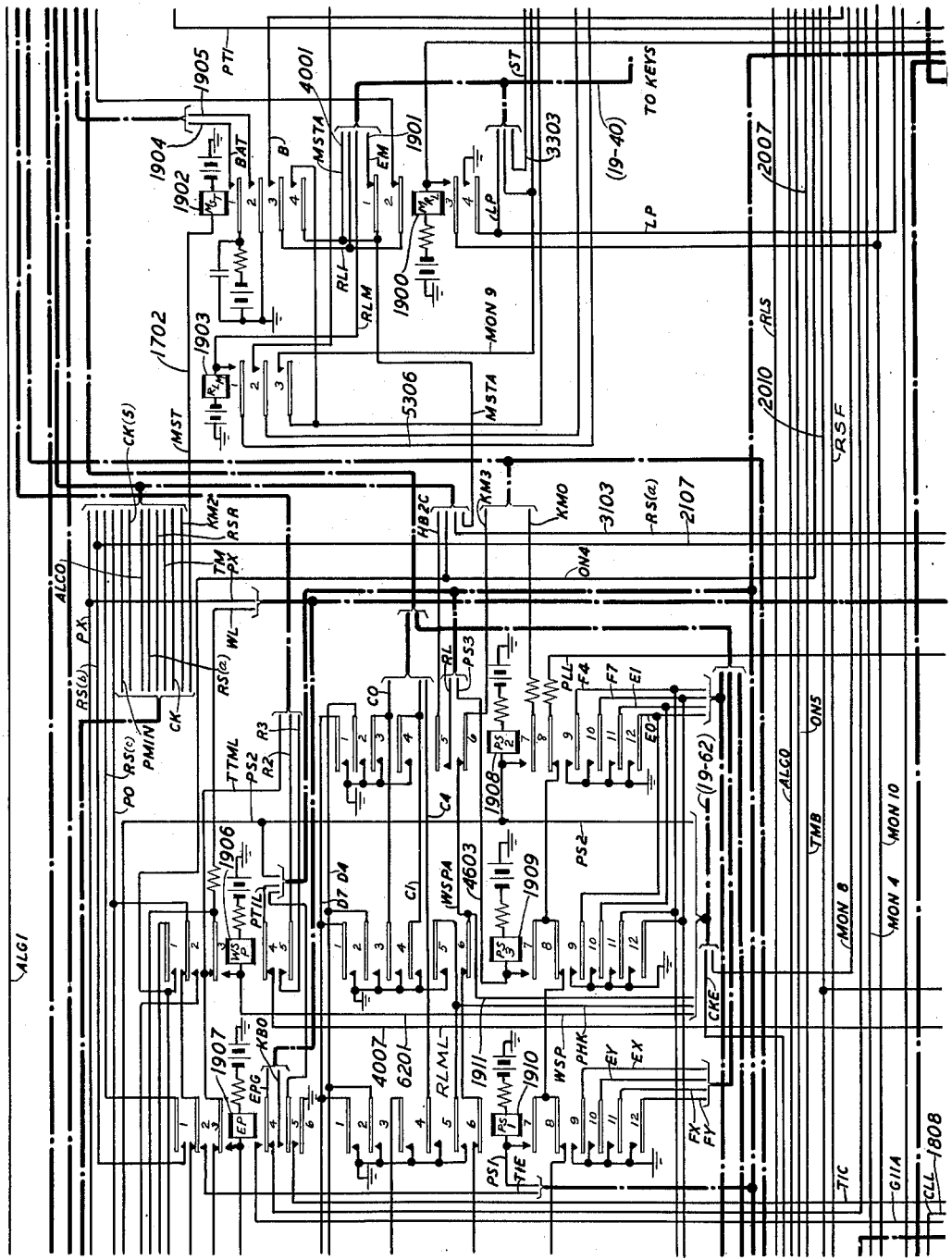
Figure 21:
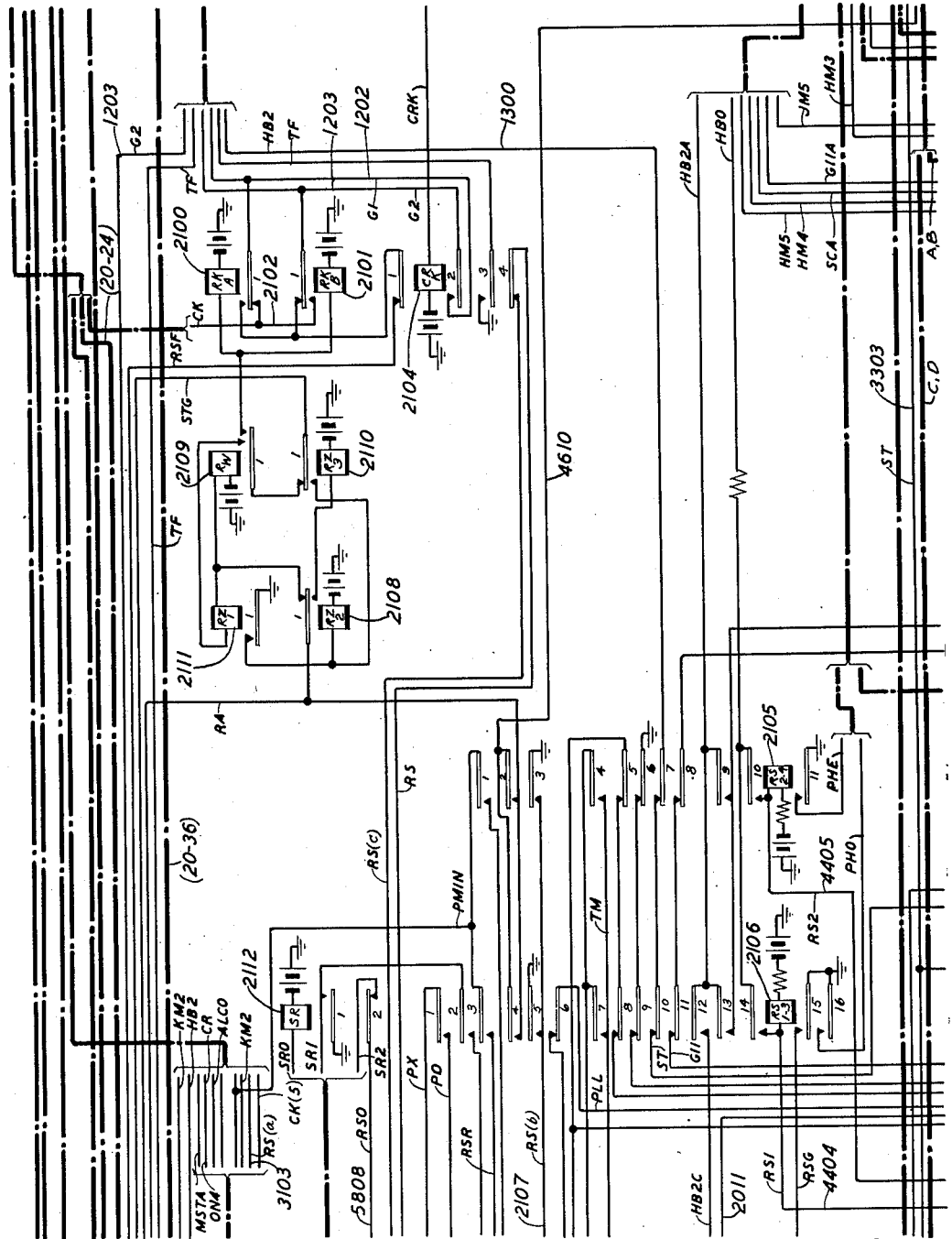
Figure 22:
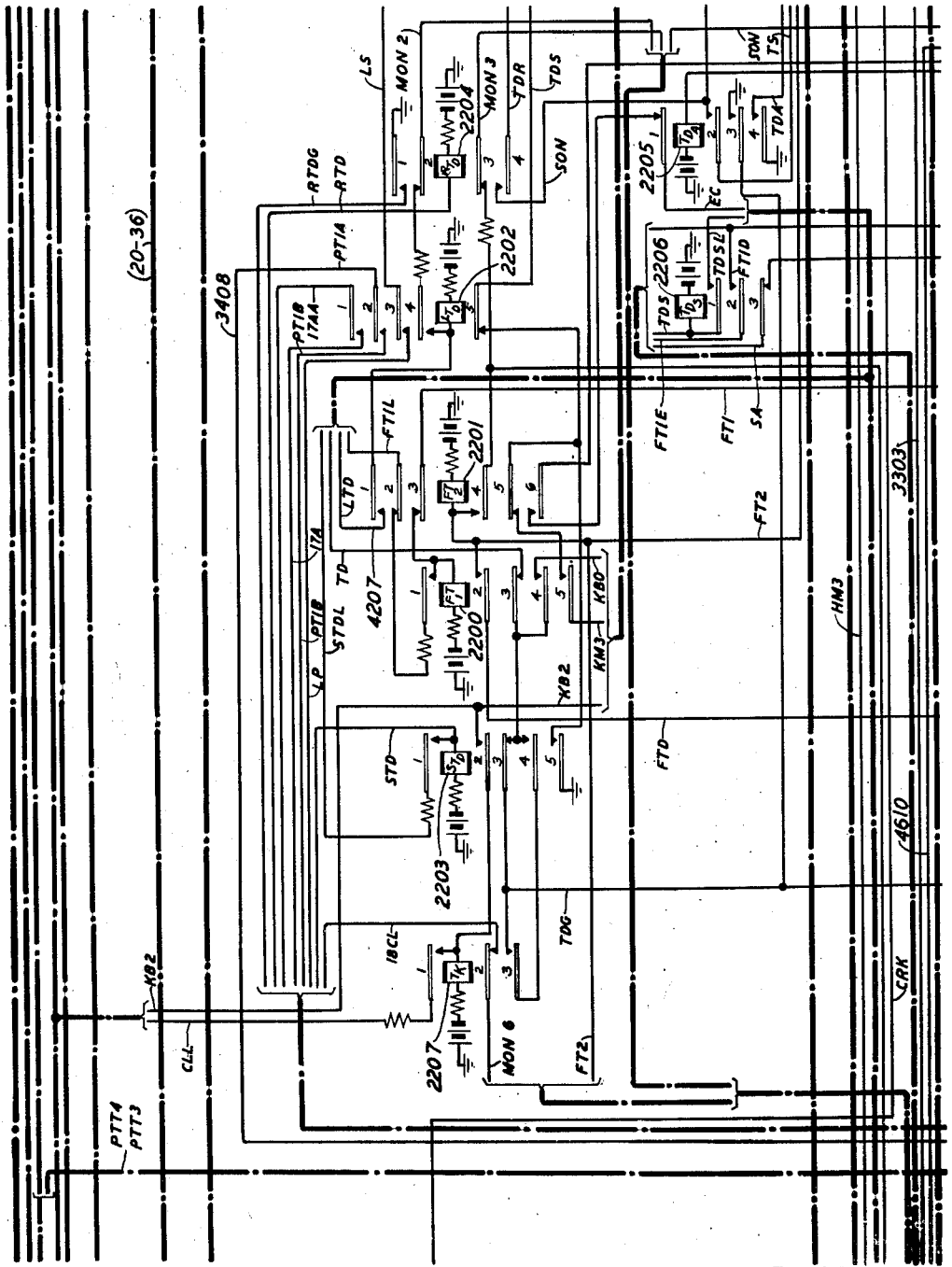
Figure 23:
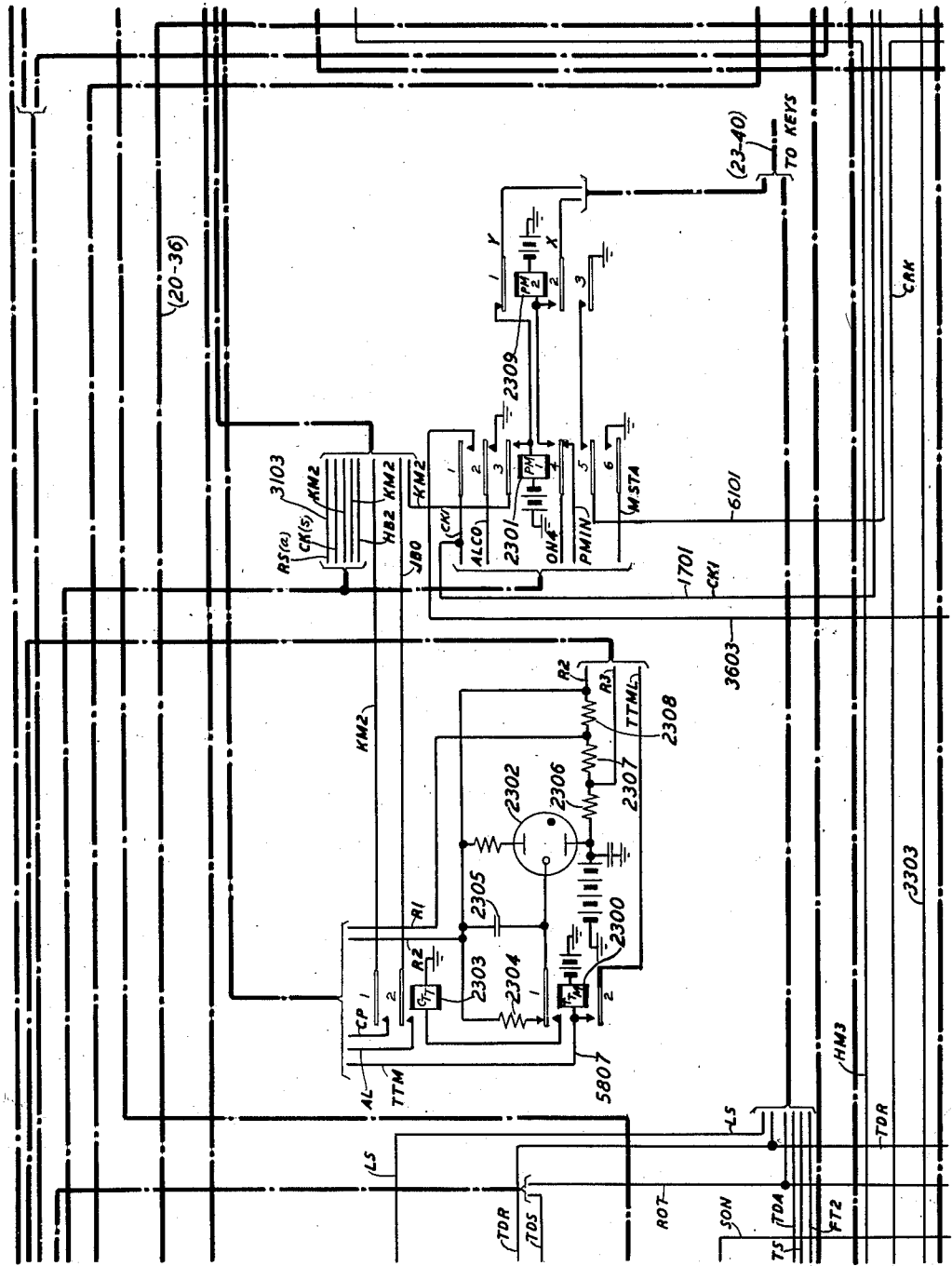
Figure 25:
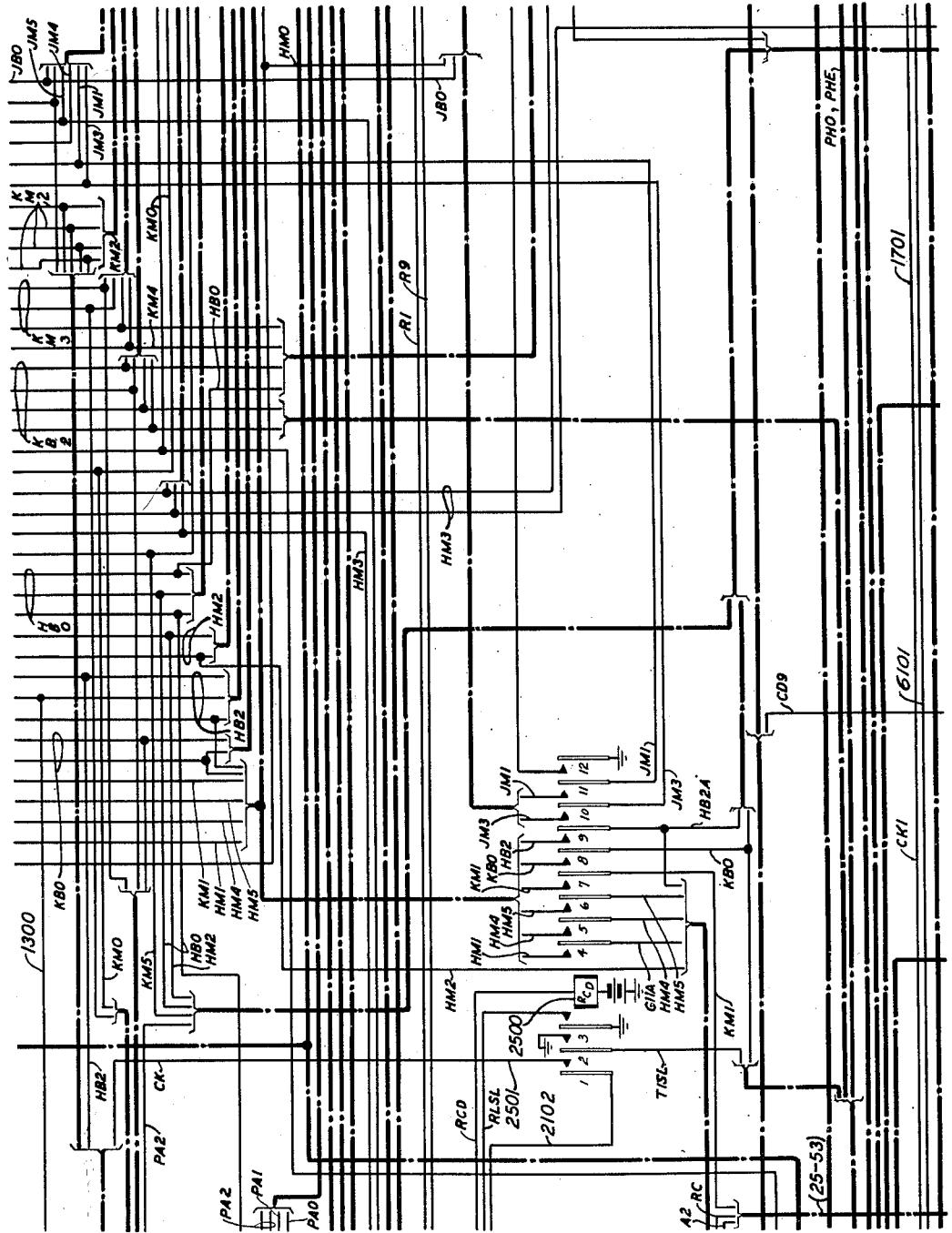
Figure 26:
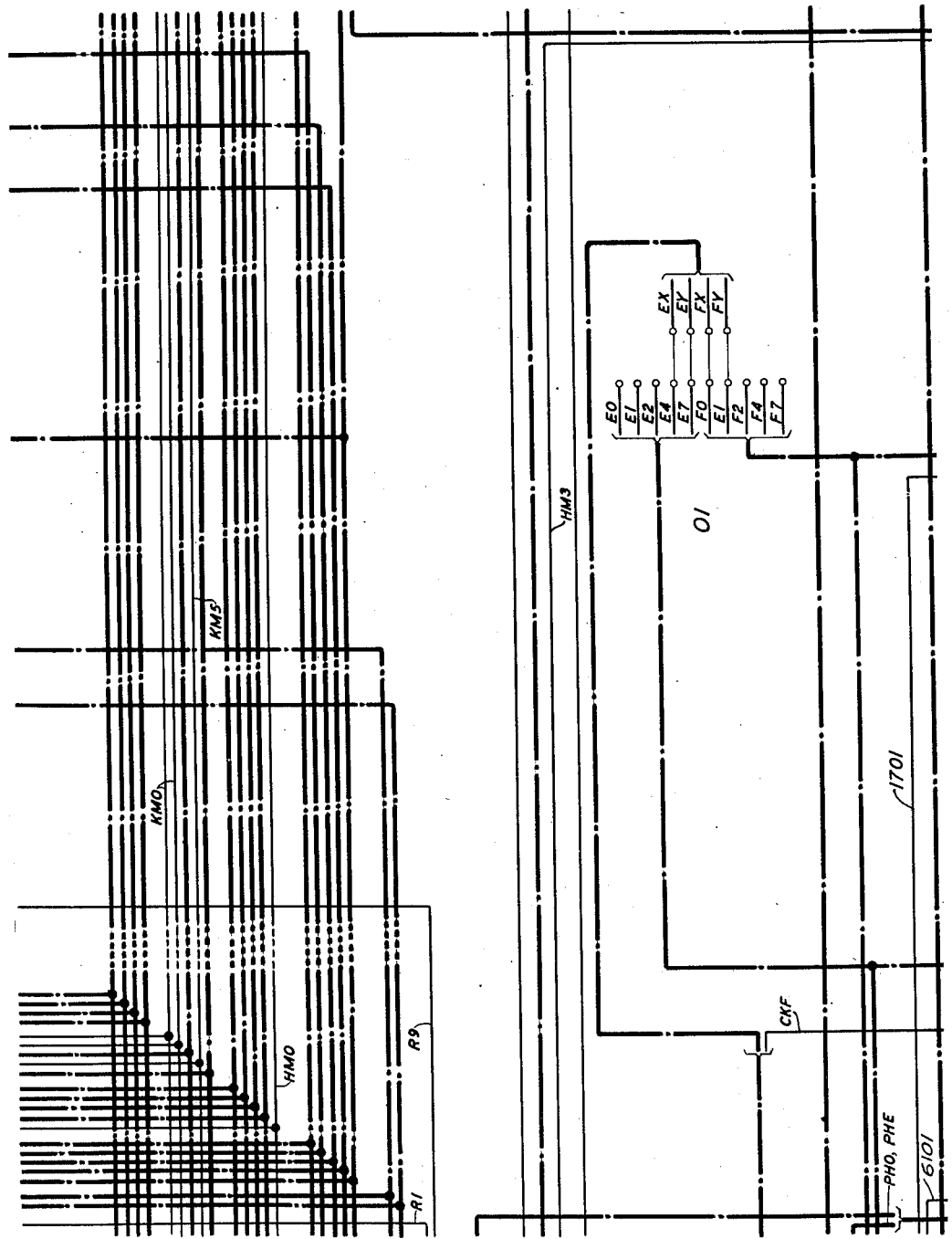
Figure 27:
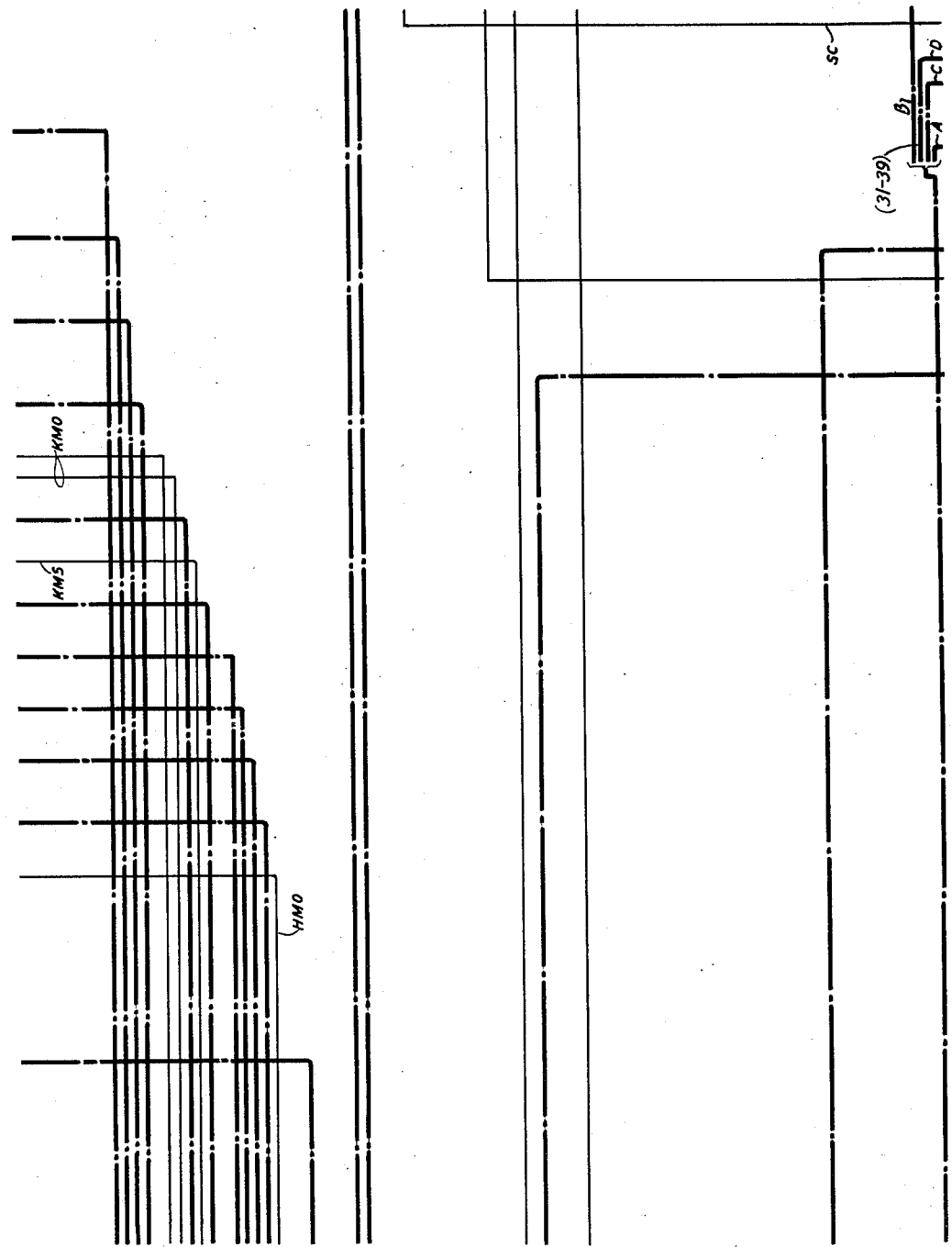
Figure 28:
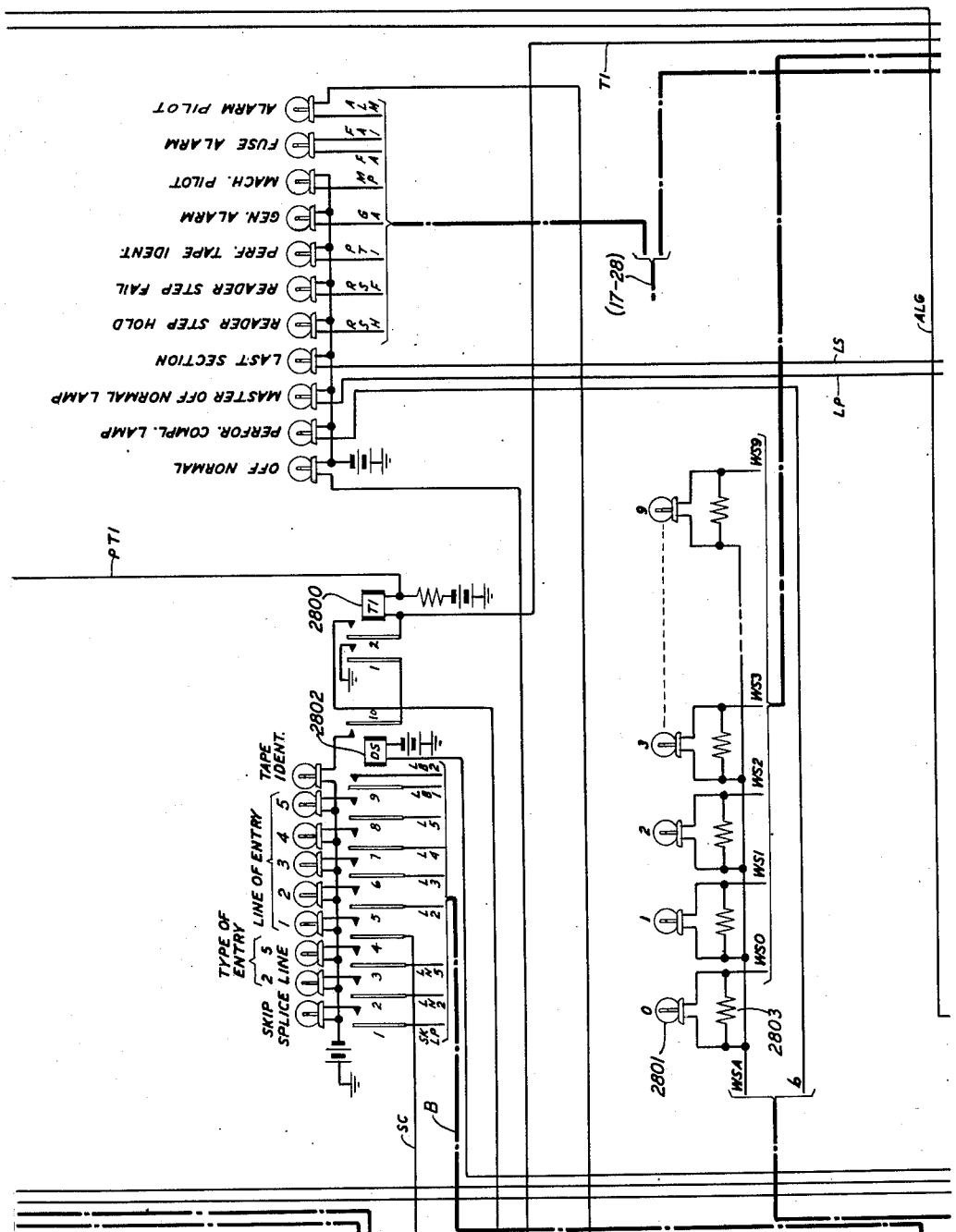
Figure 29:
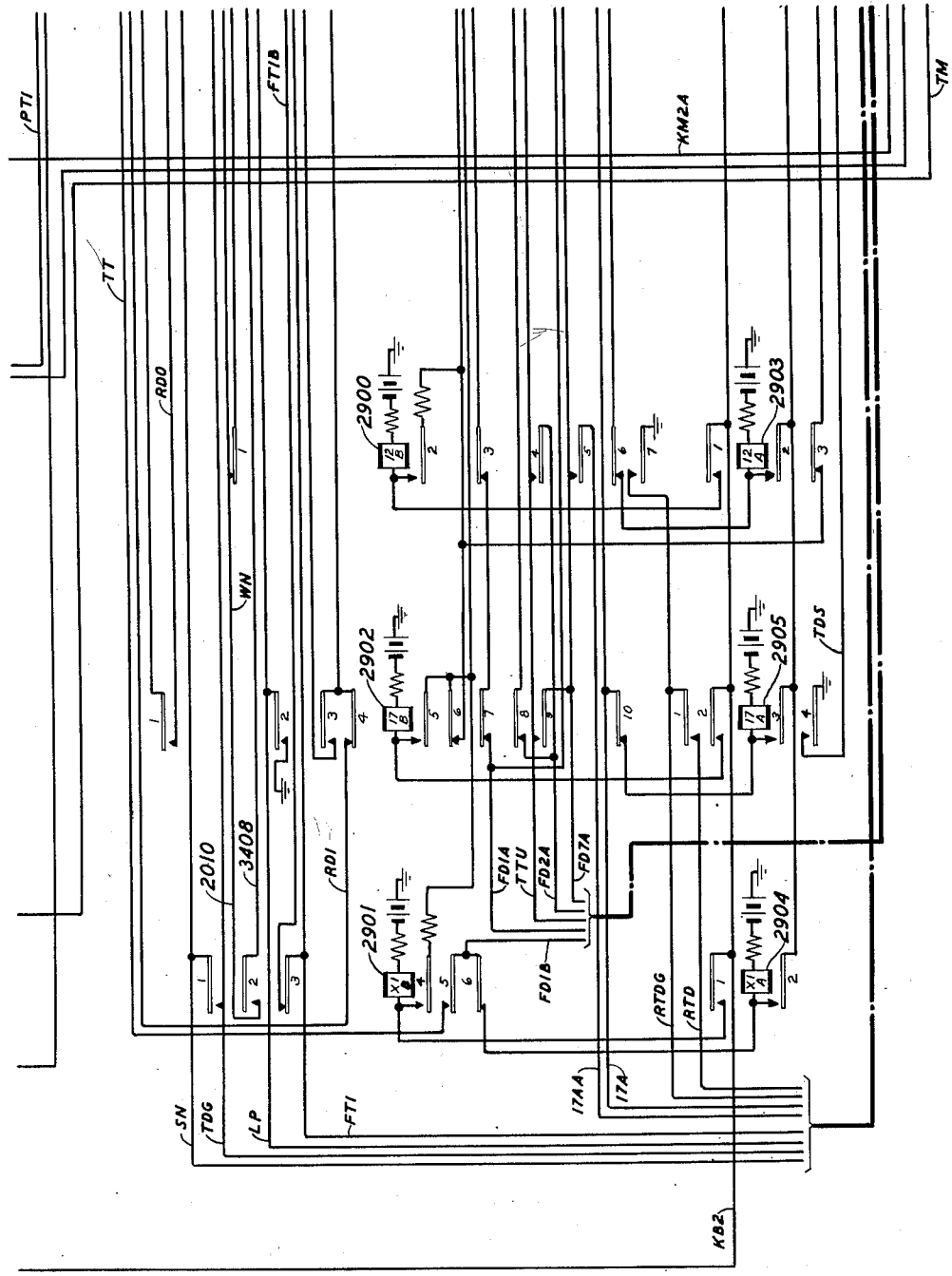
Figure 30:
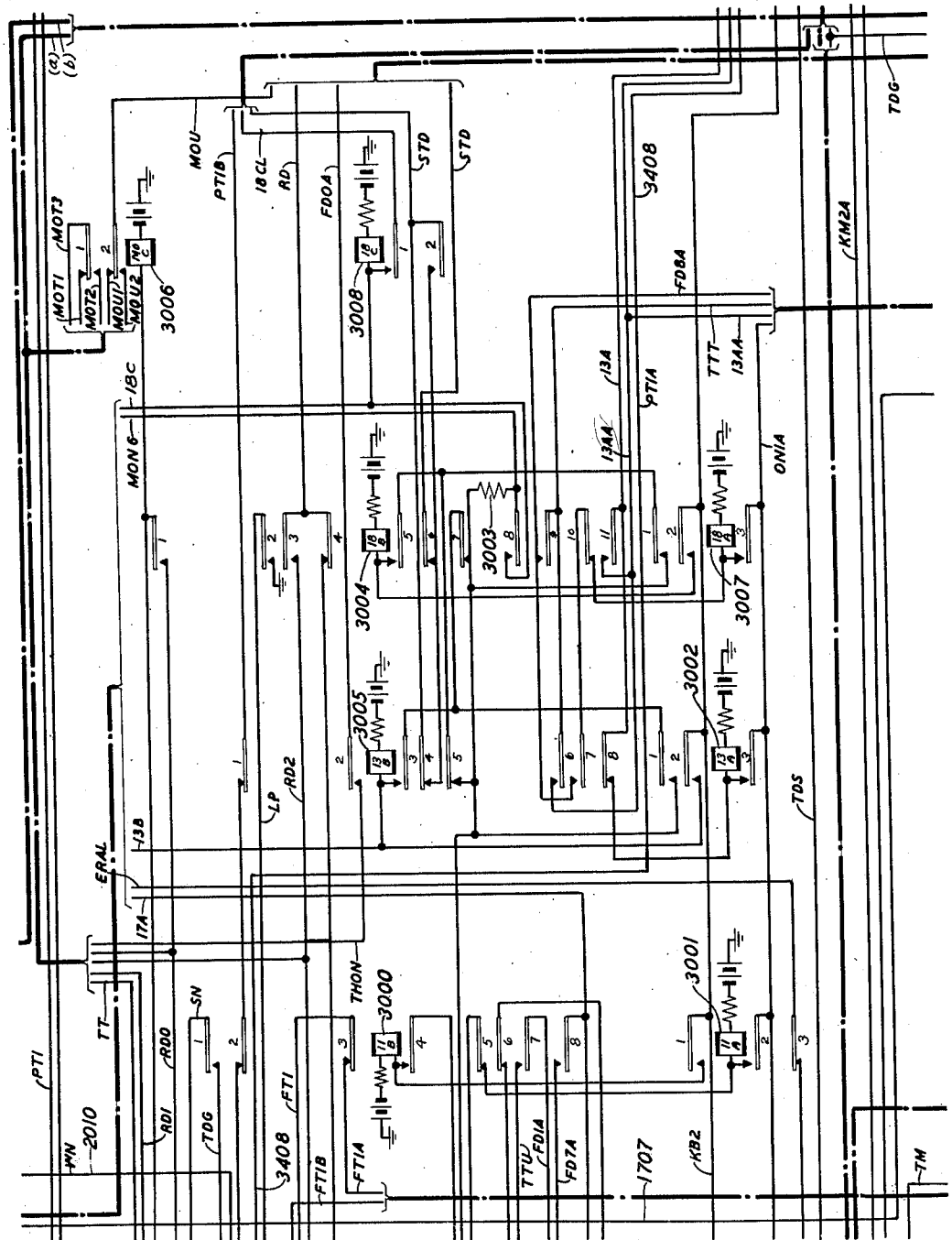
Figure 31:
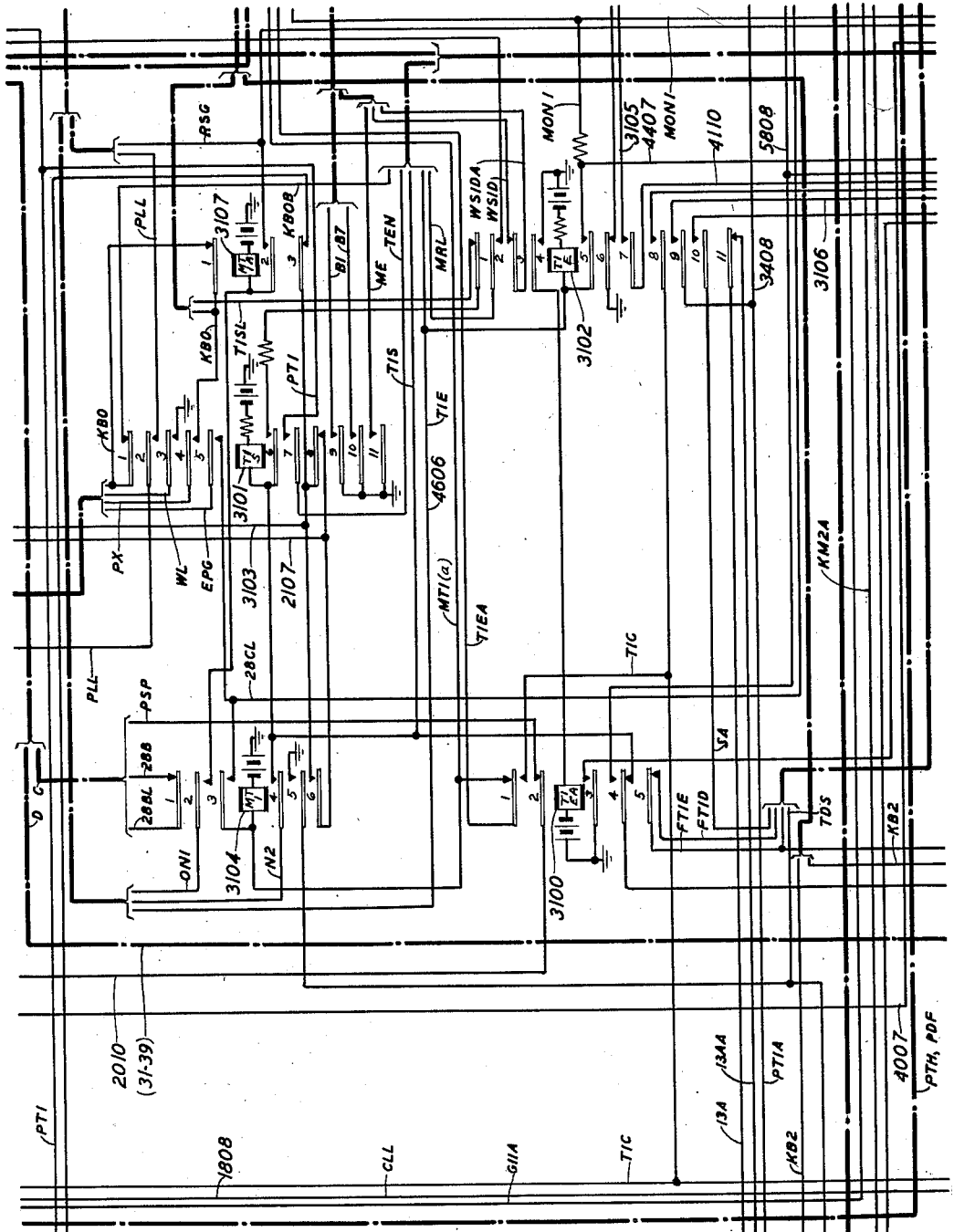
Figure 32:
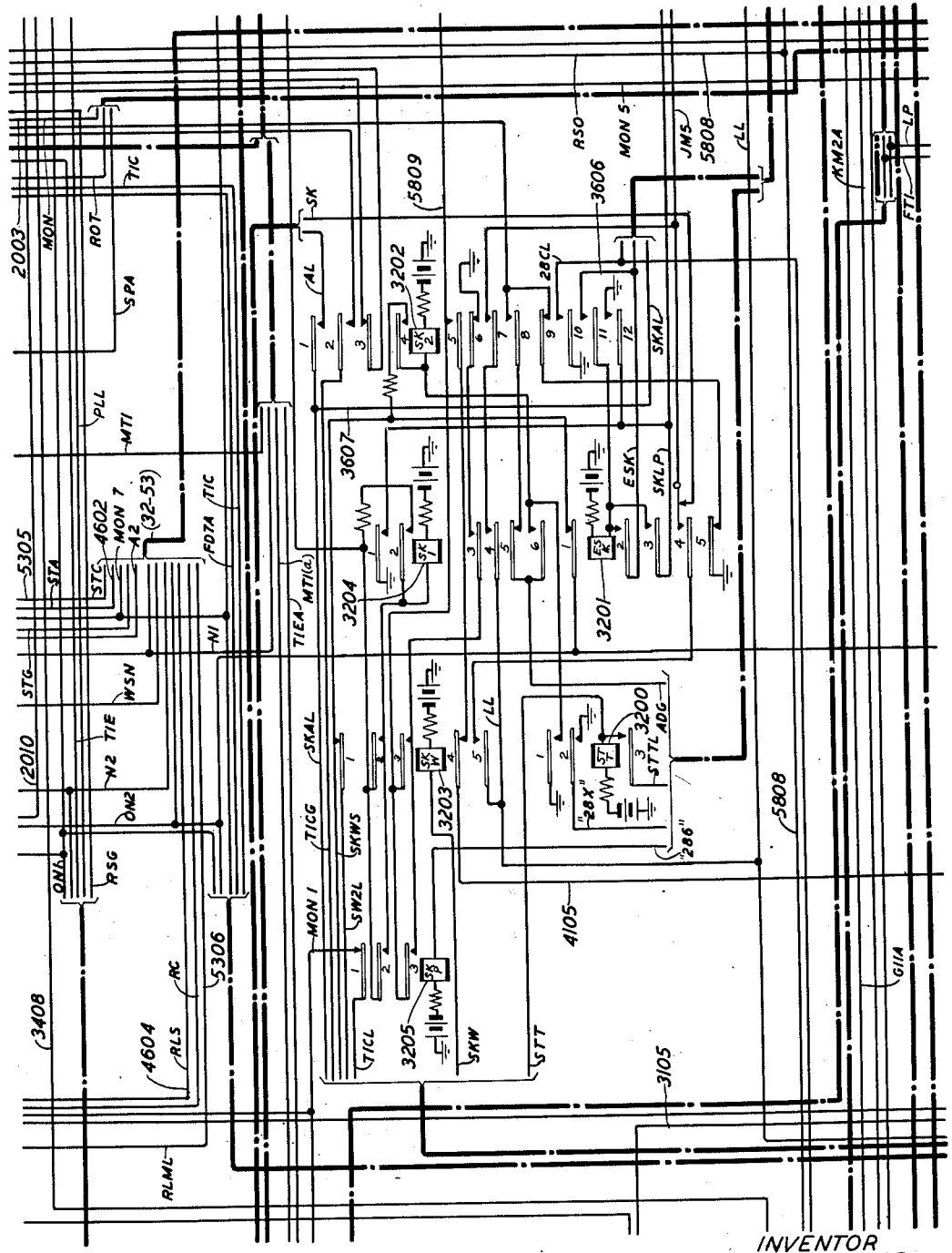
Figure 33:
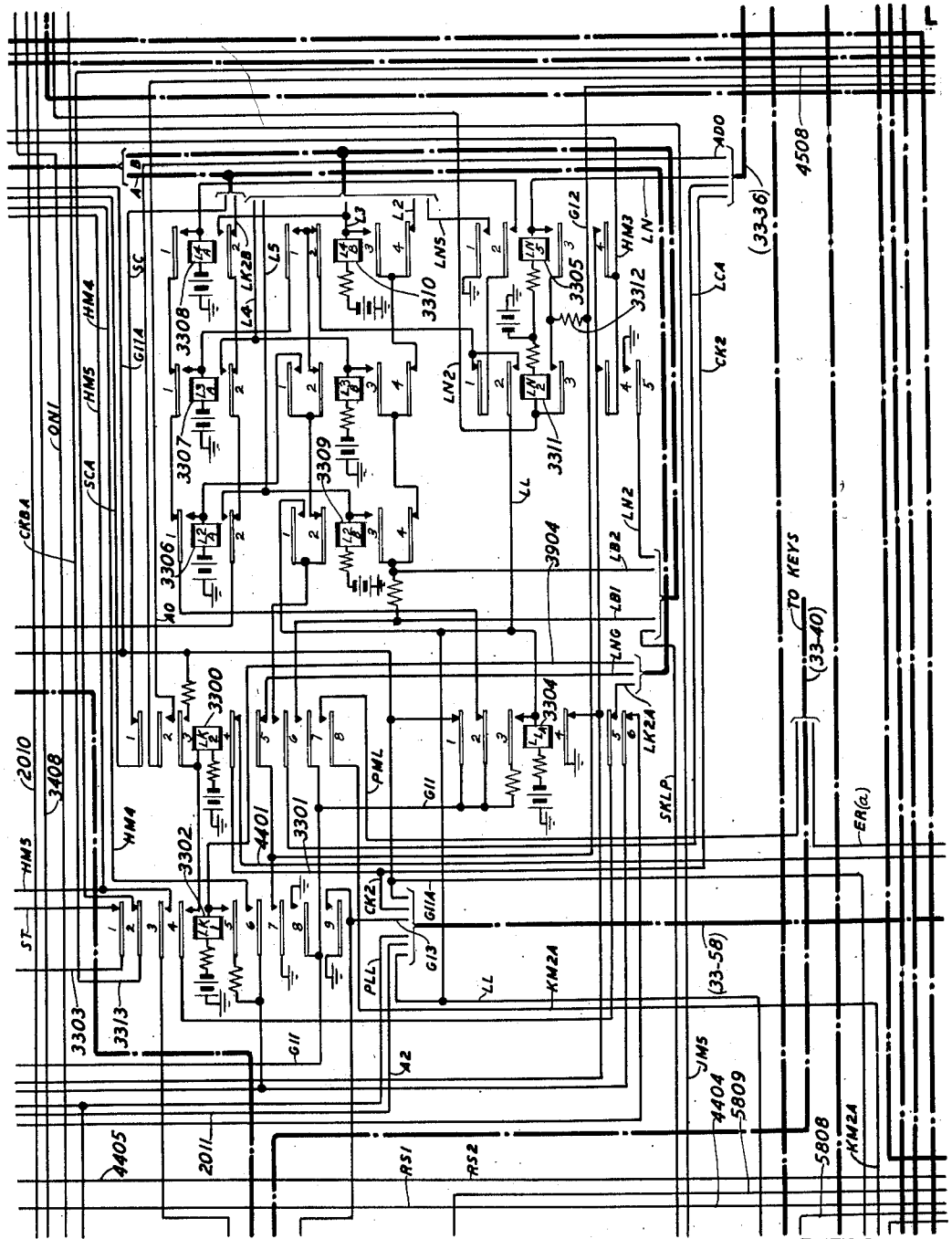
Figure 34:
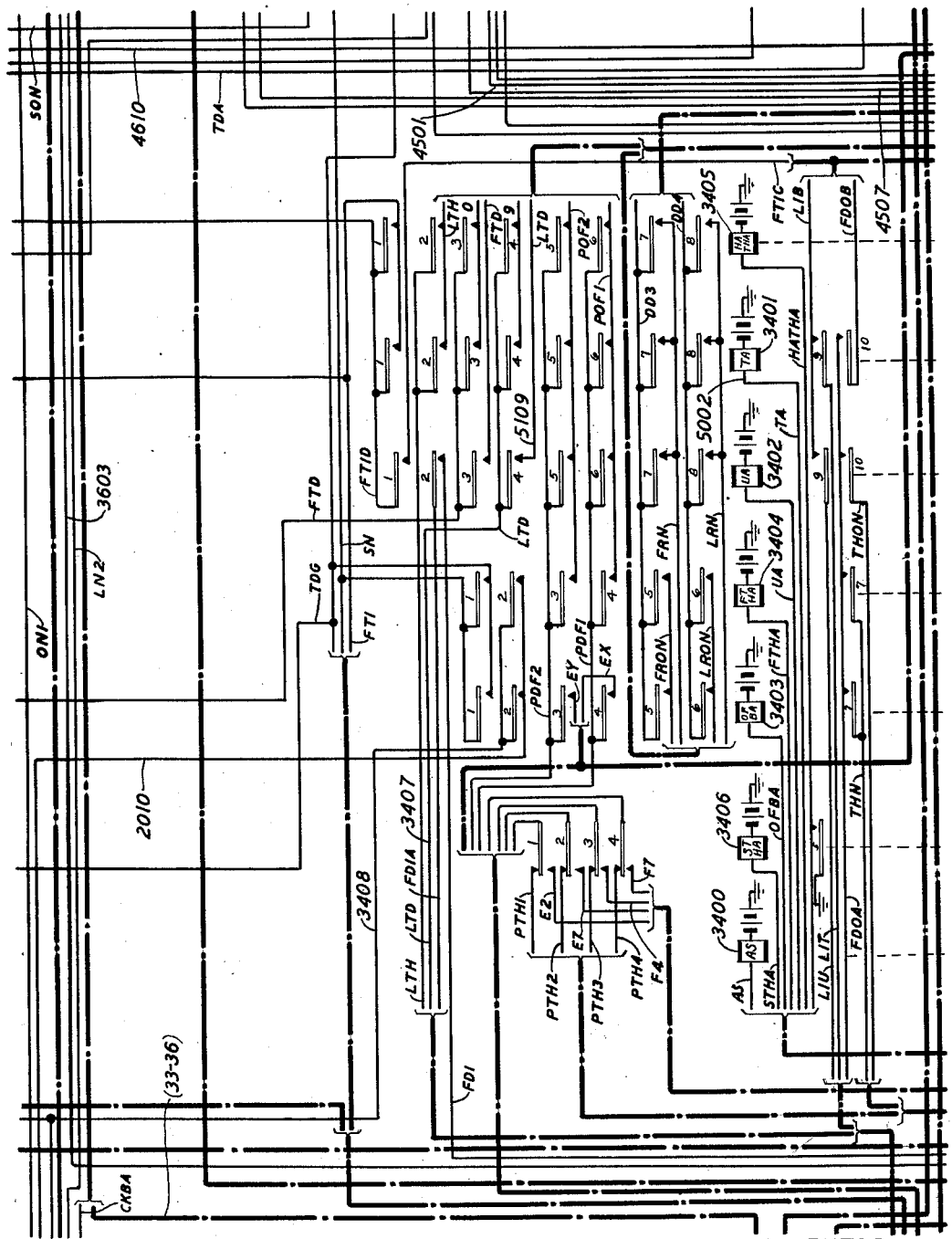
Figure 35:
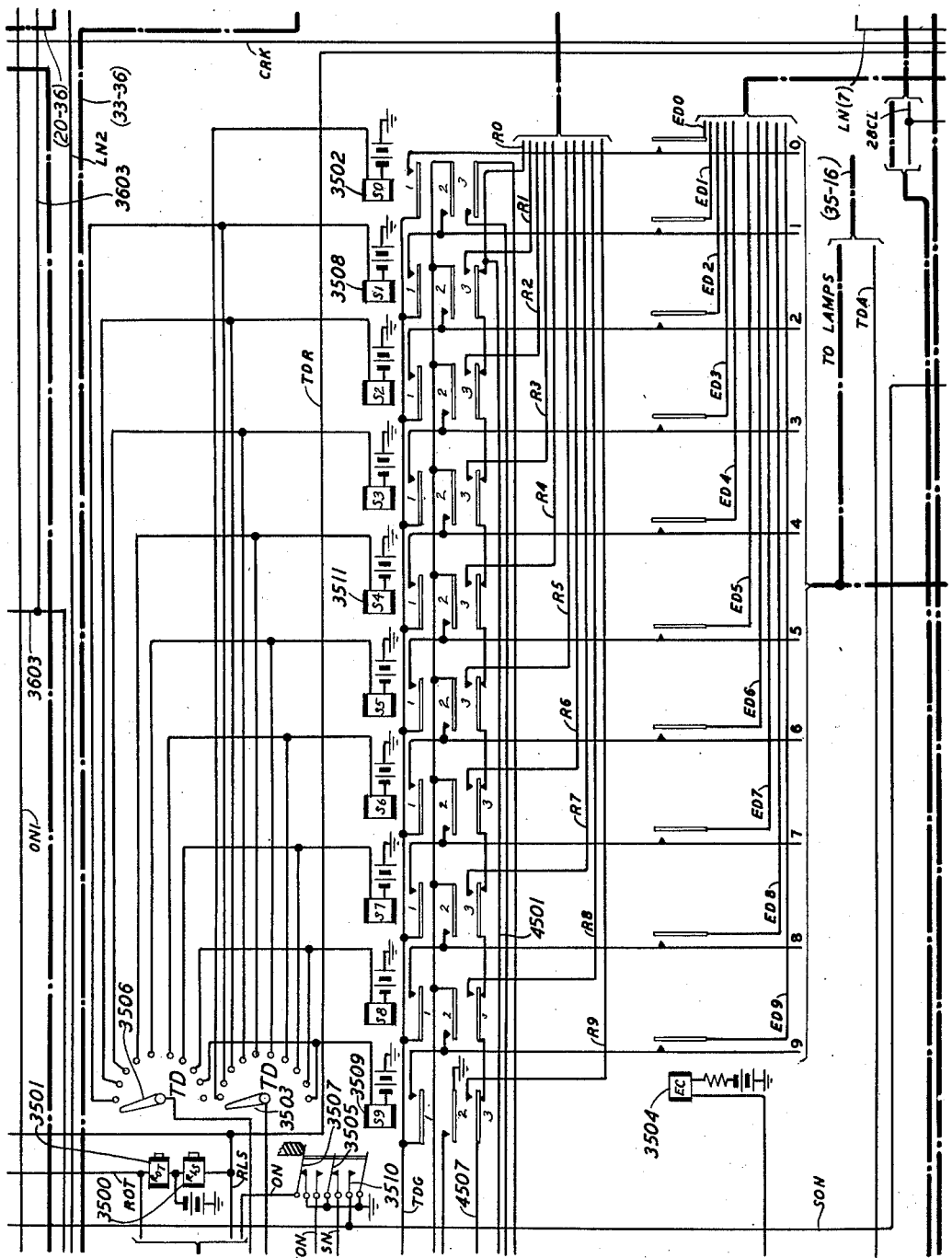
Figure 36:
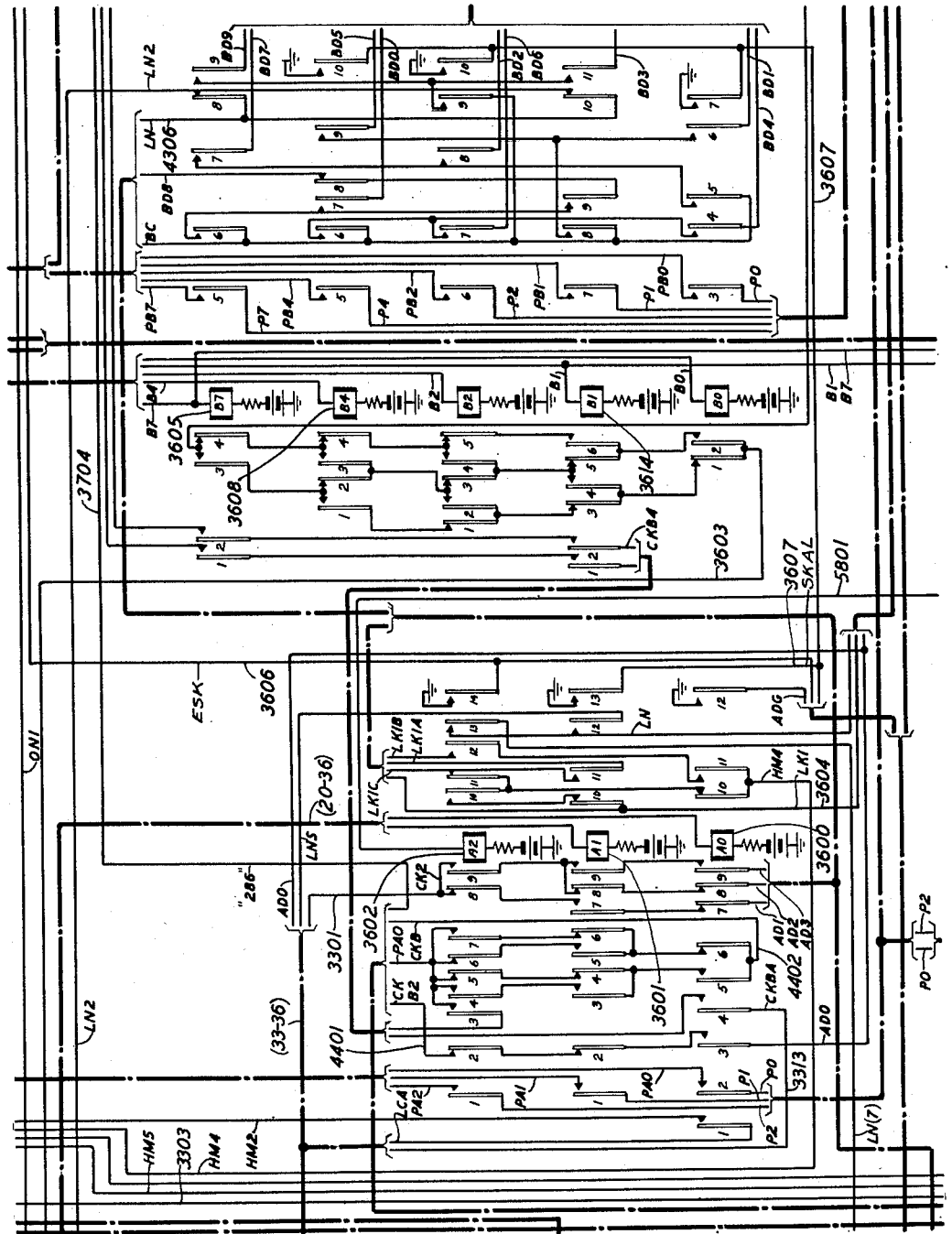
Figure 37:
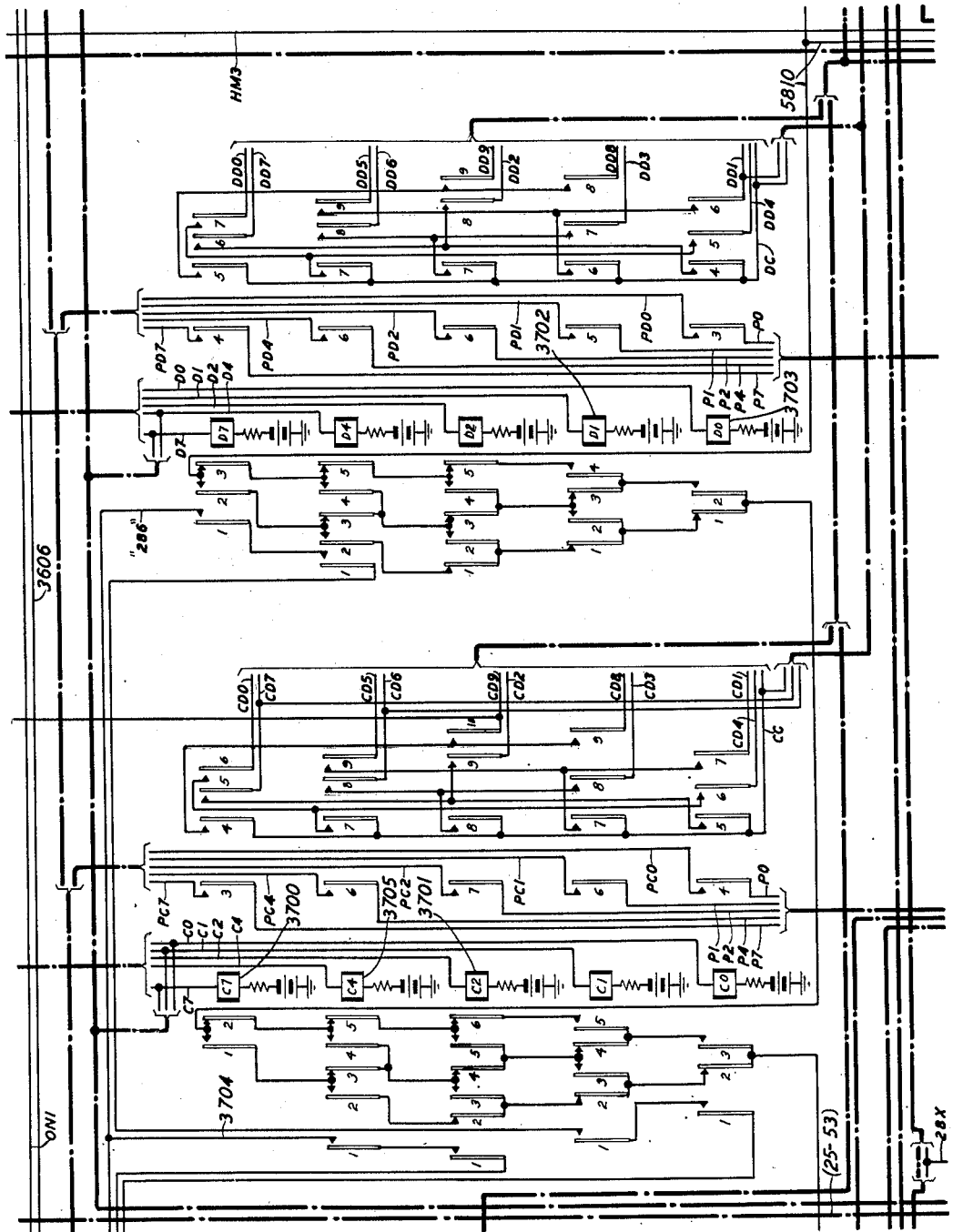
Figure 38:
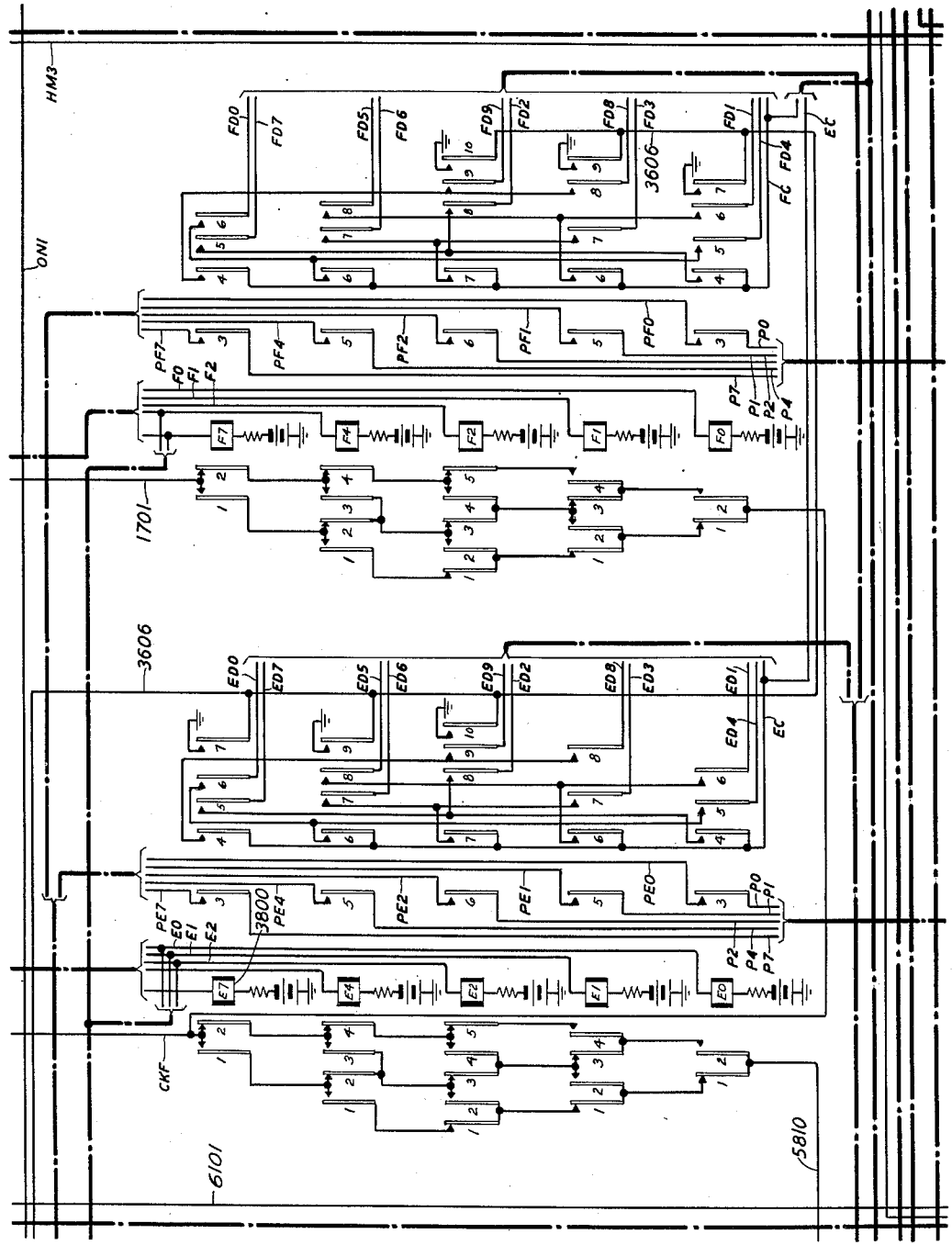
Figure 39:
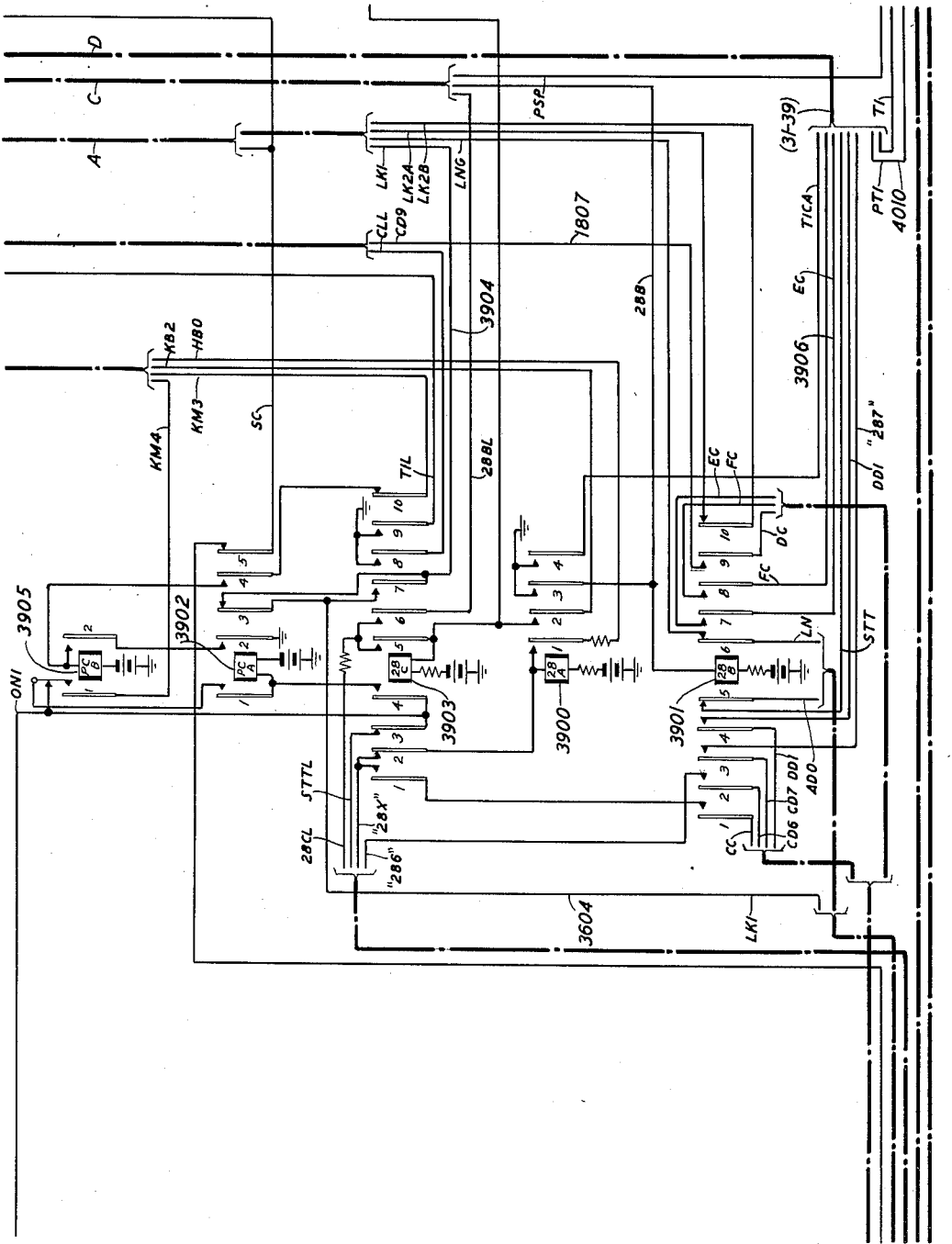
Figure 40:
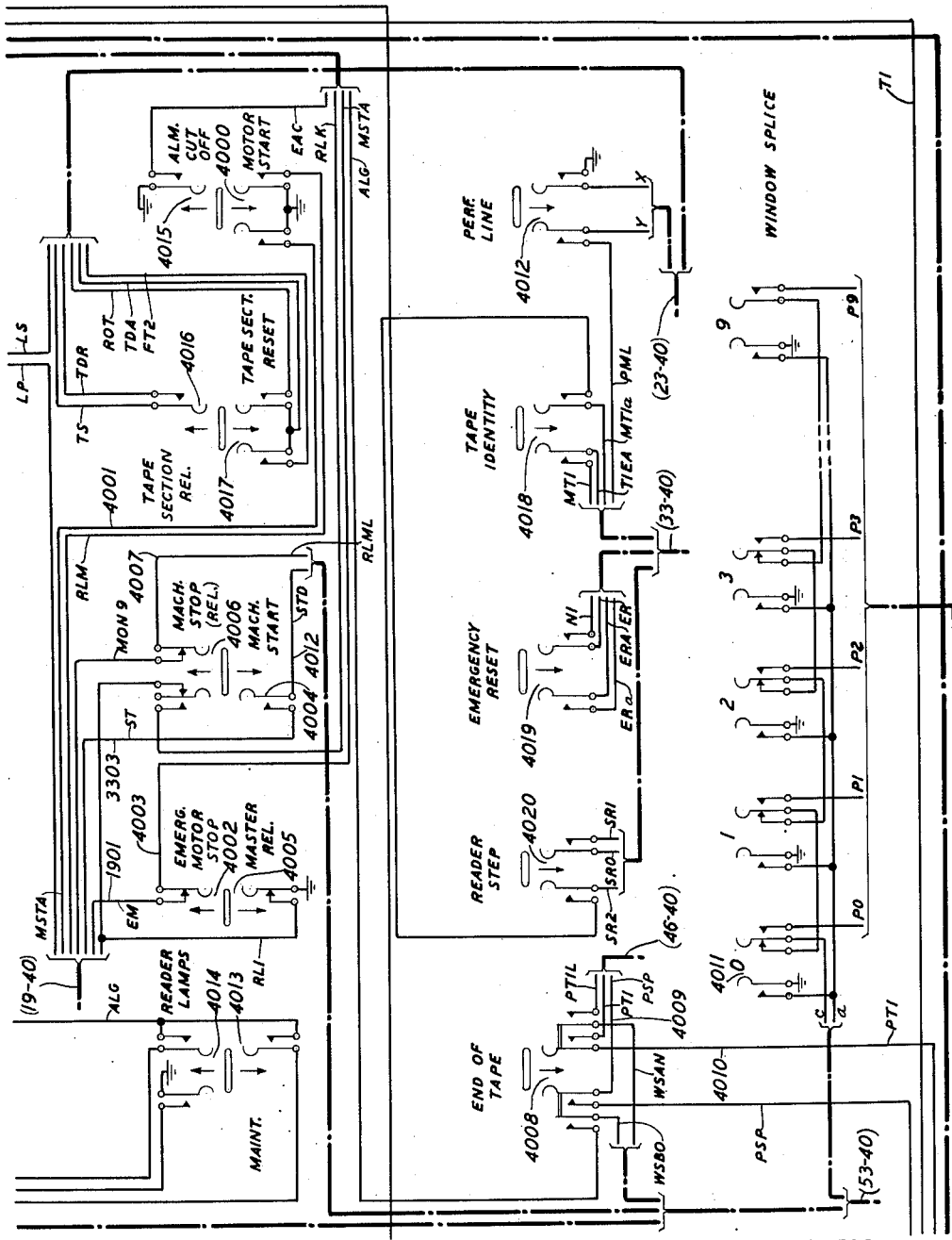
Figure 42:
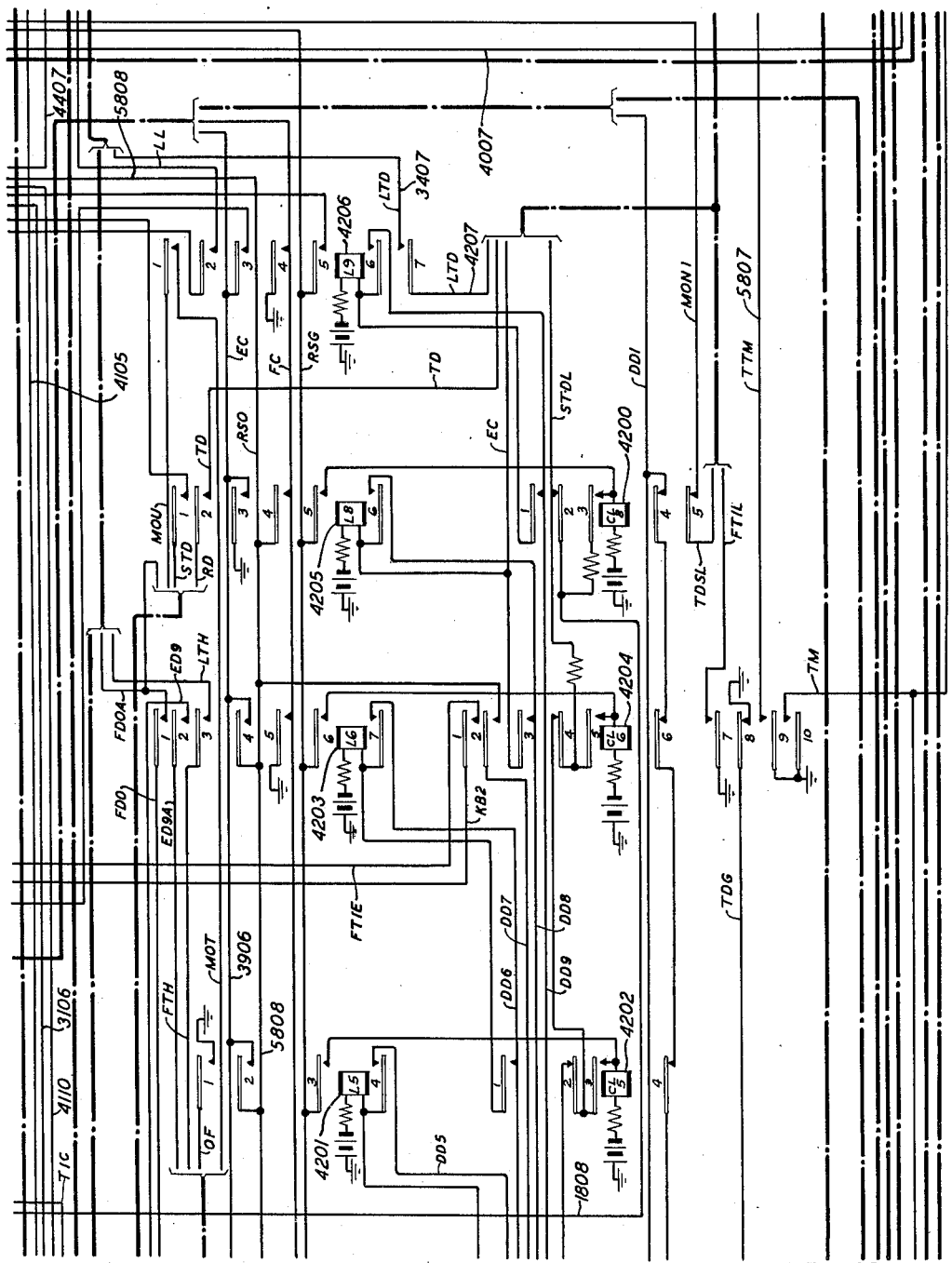
Figure 44:
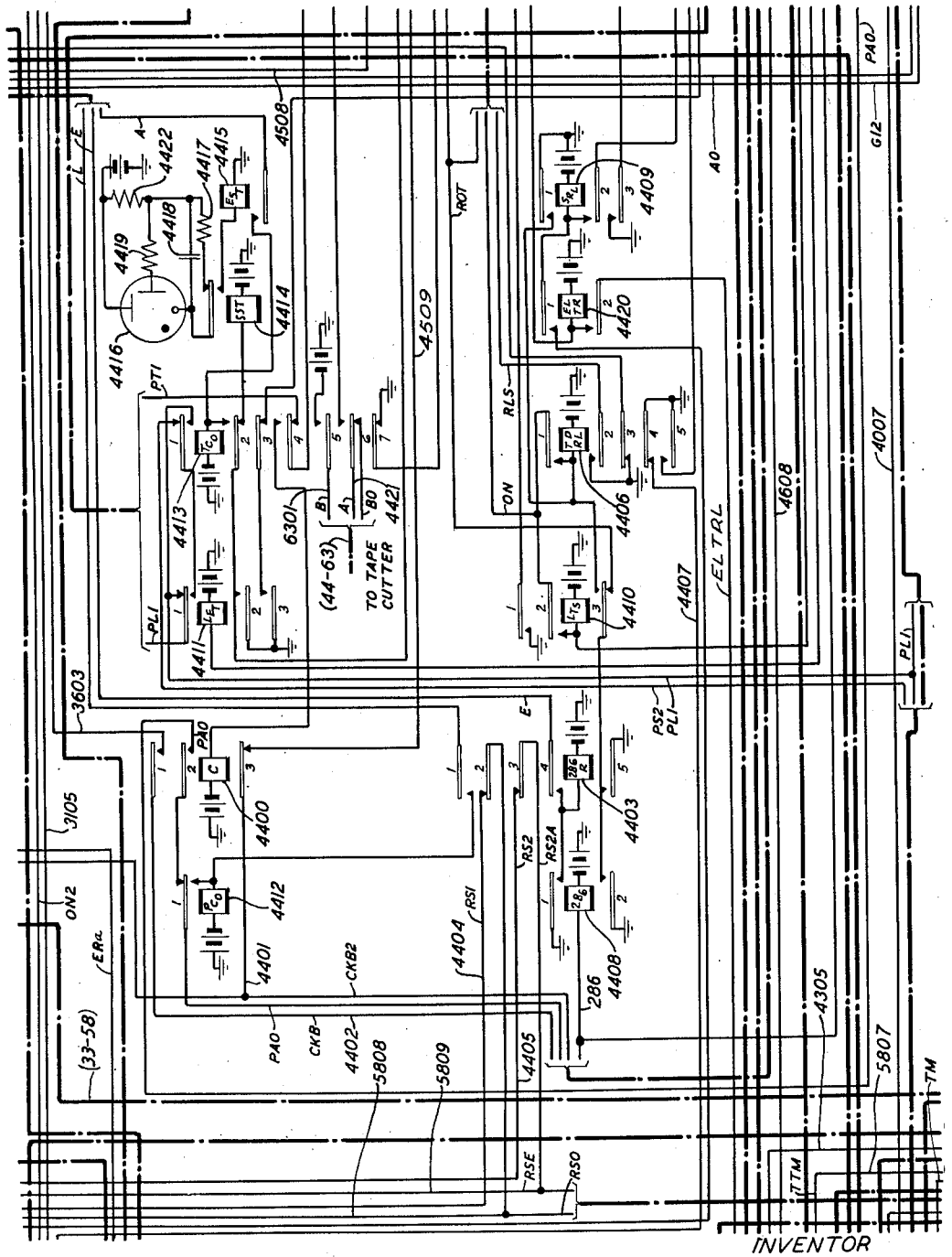
Figure 45:
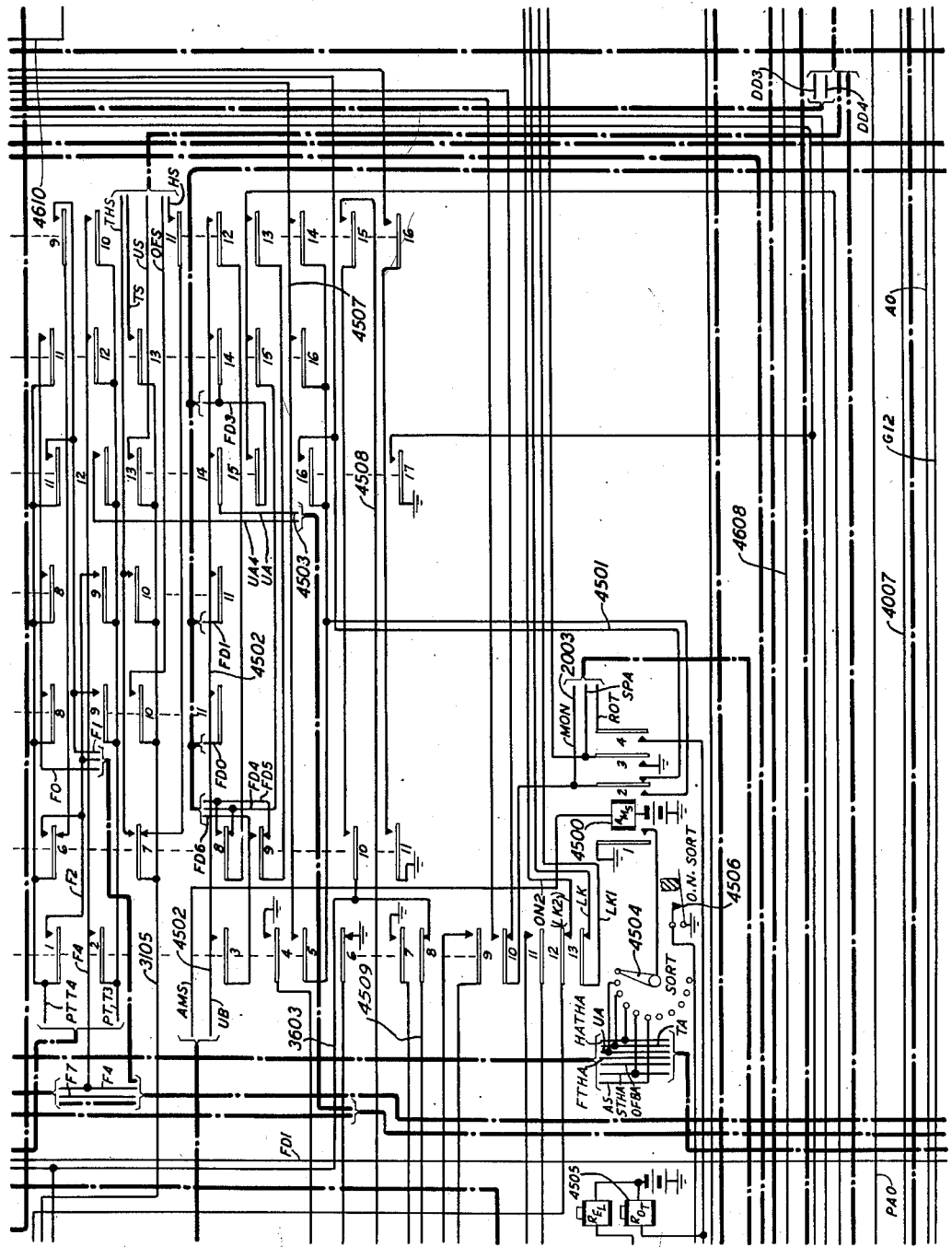
Figure 46:
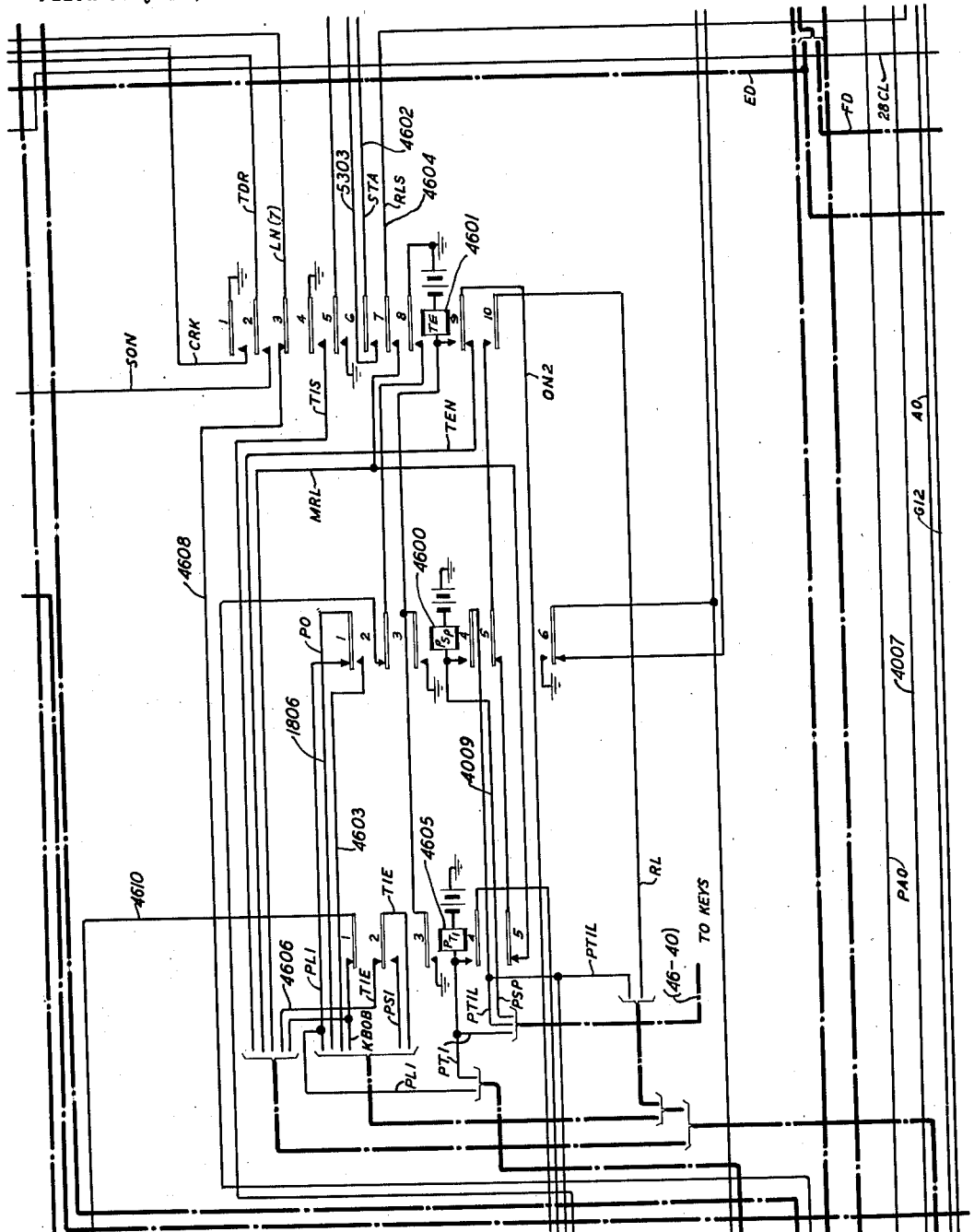
Figure 47:
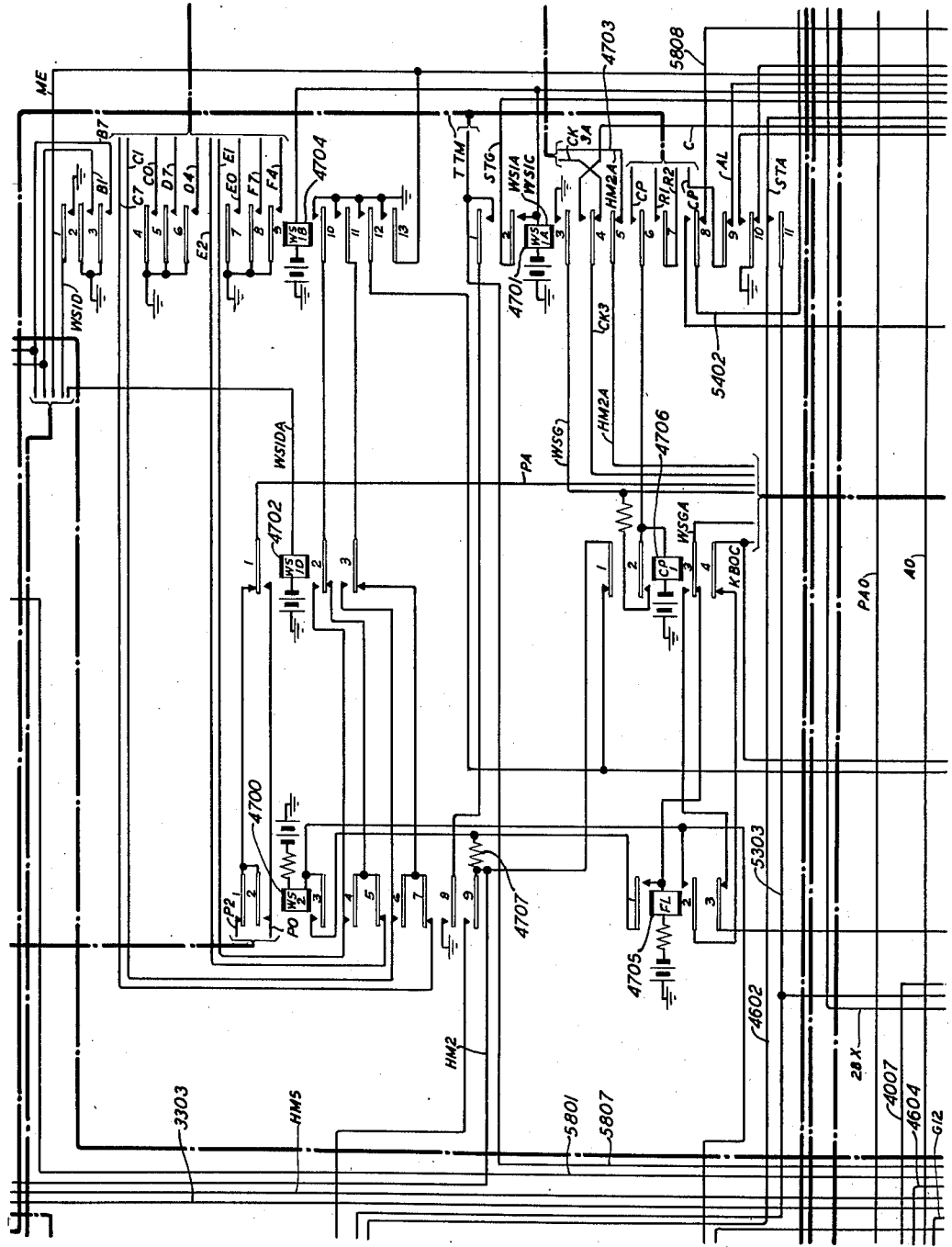
Figure 48:
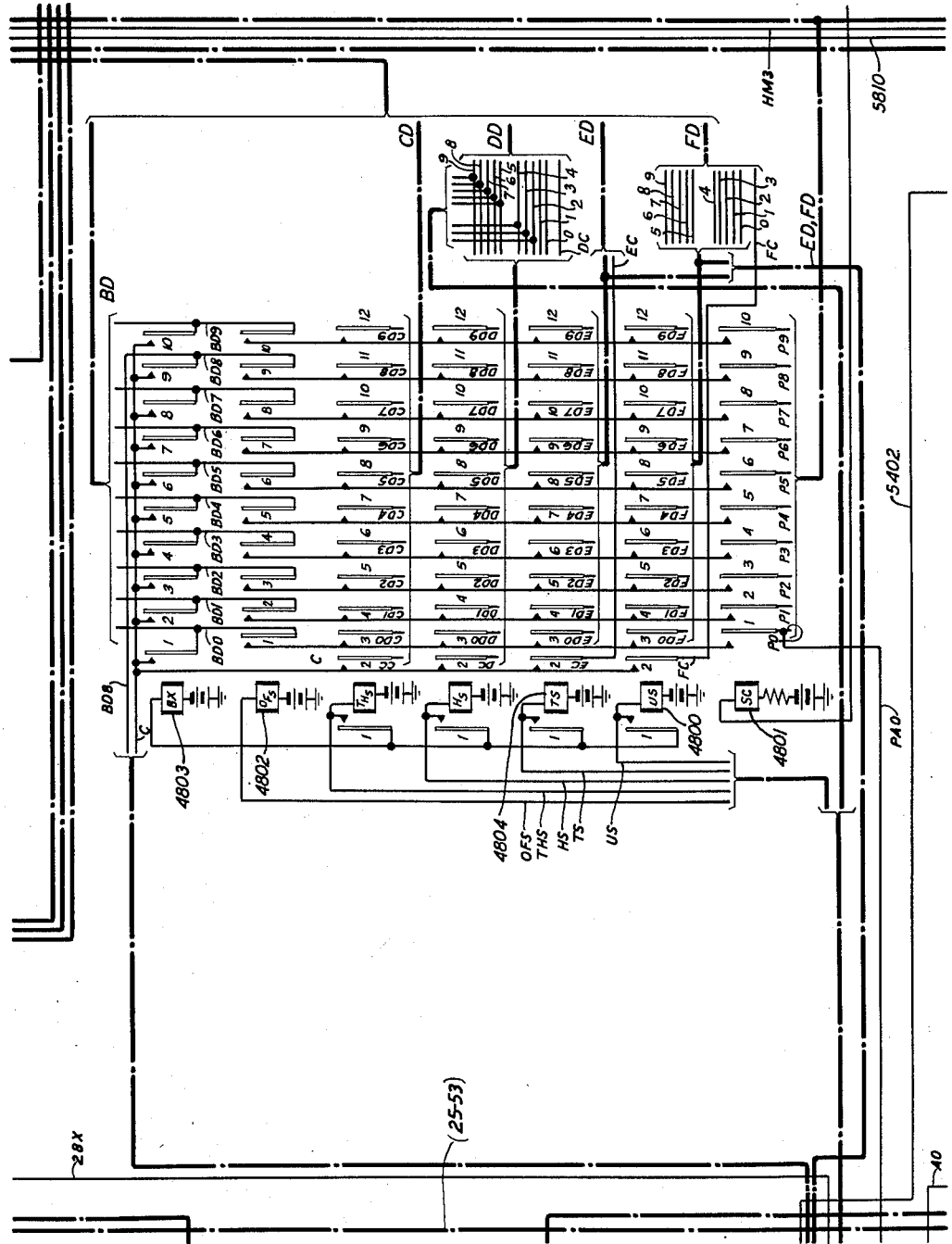
Figure 49:
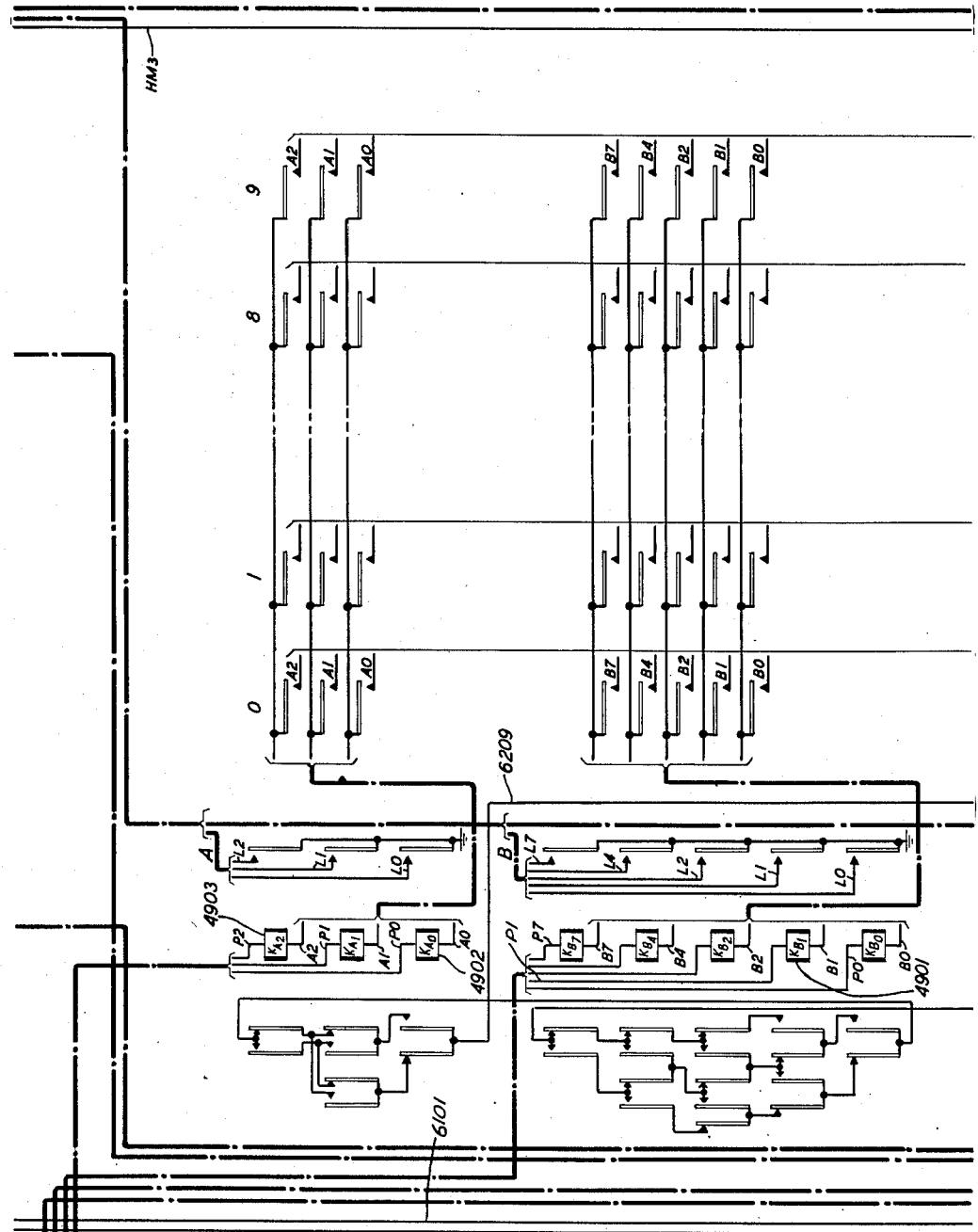
Figure 50:
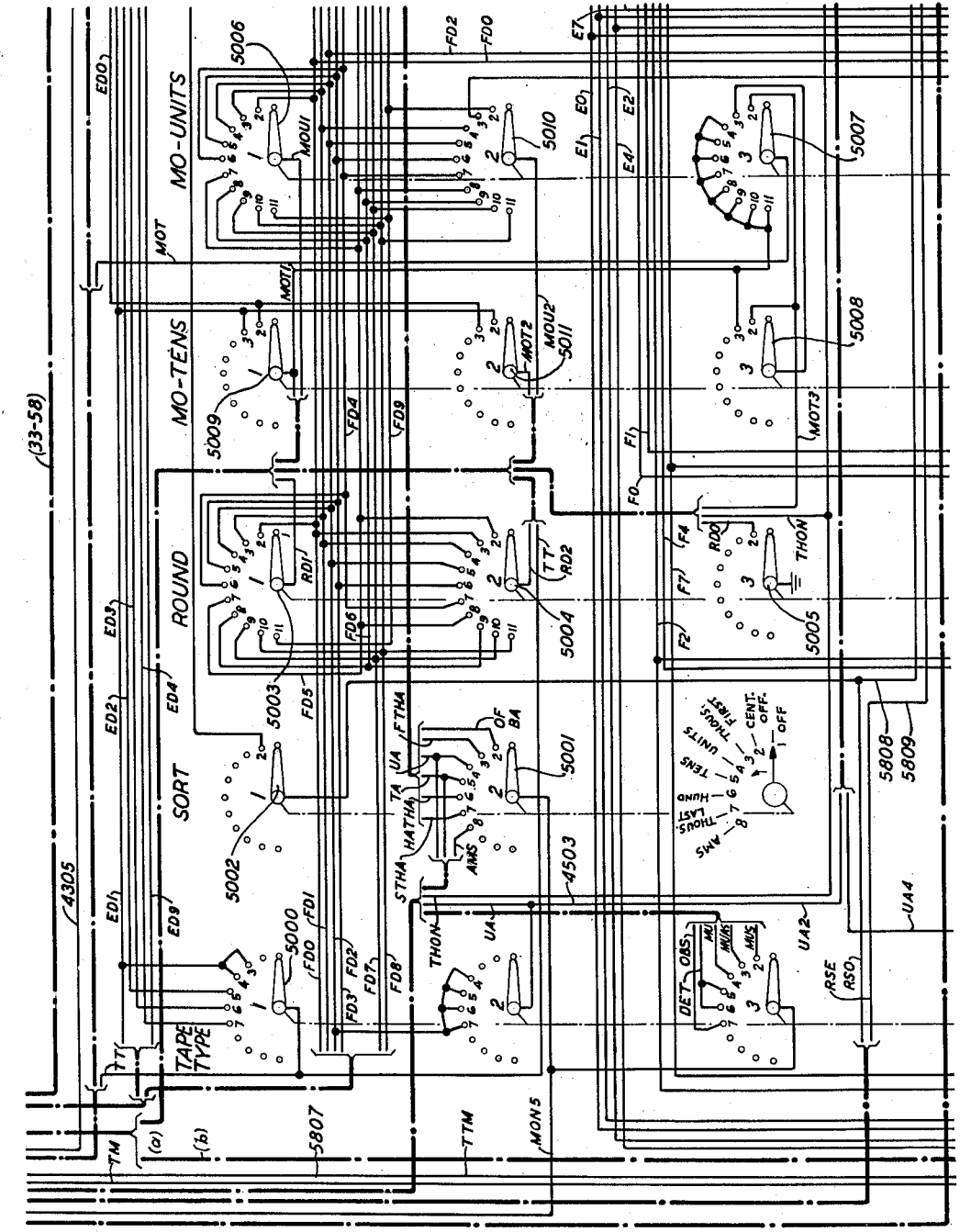
Figure 51:
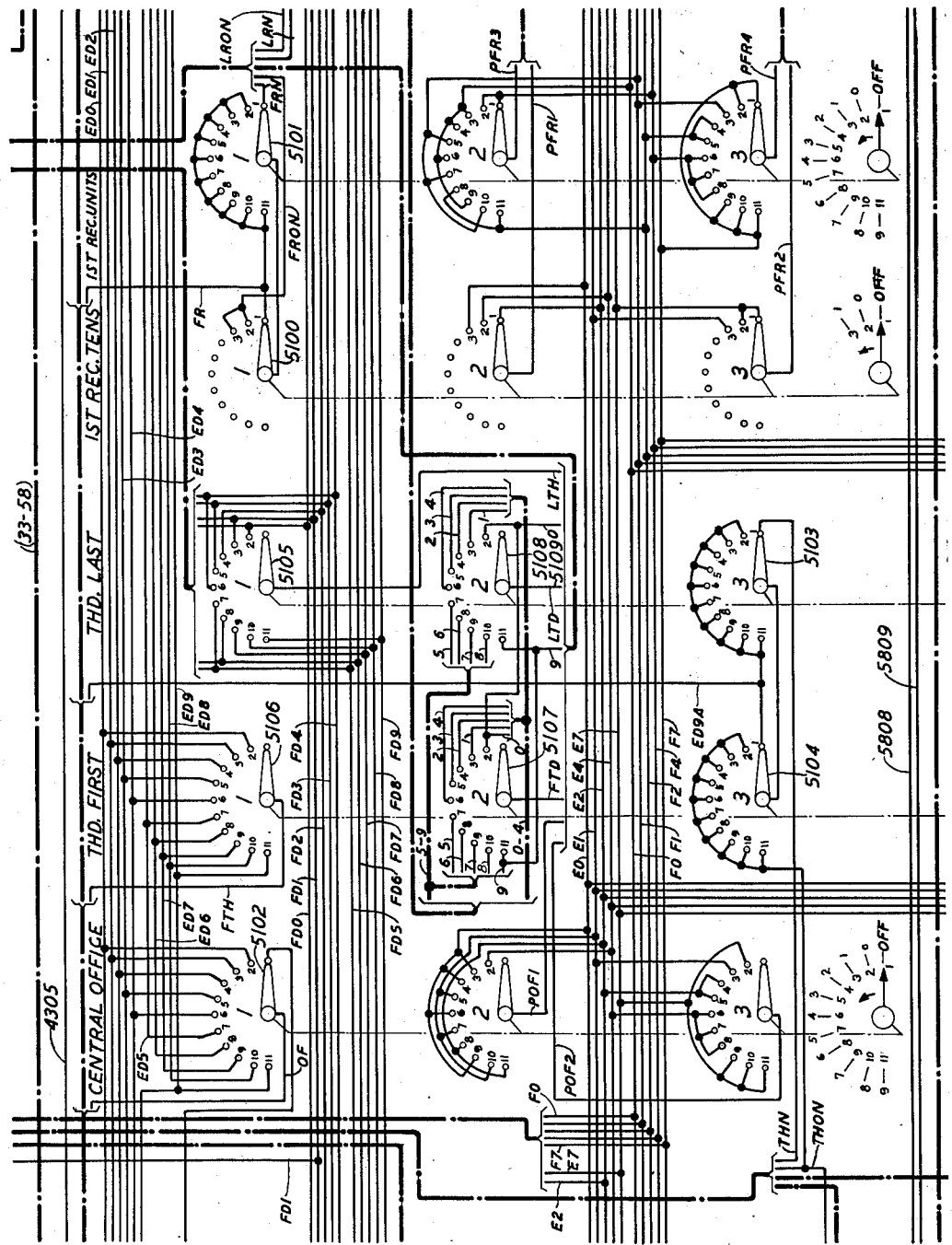
Figure 52:
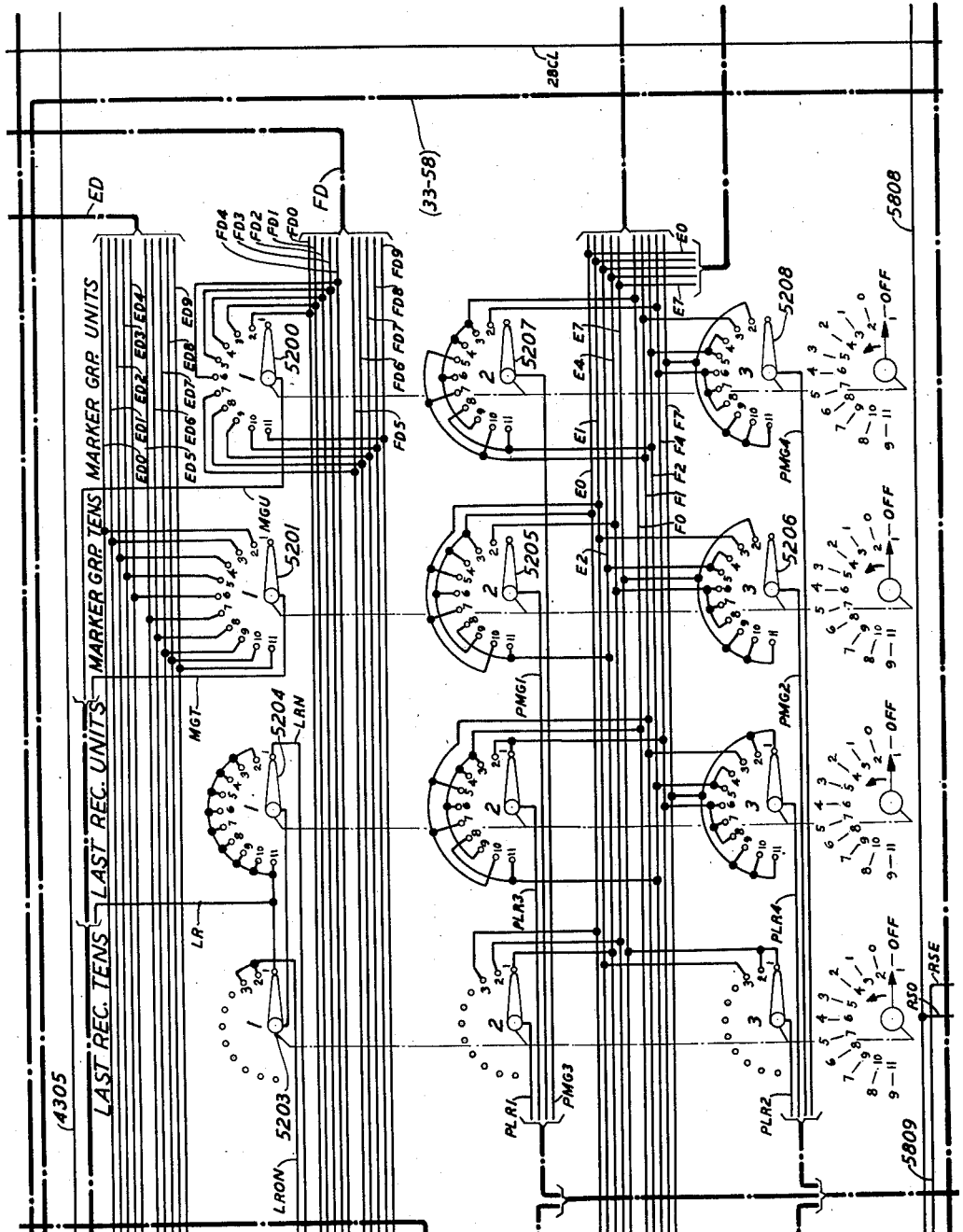
Figure 53:
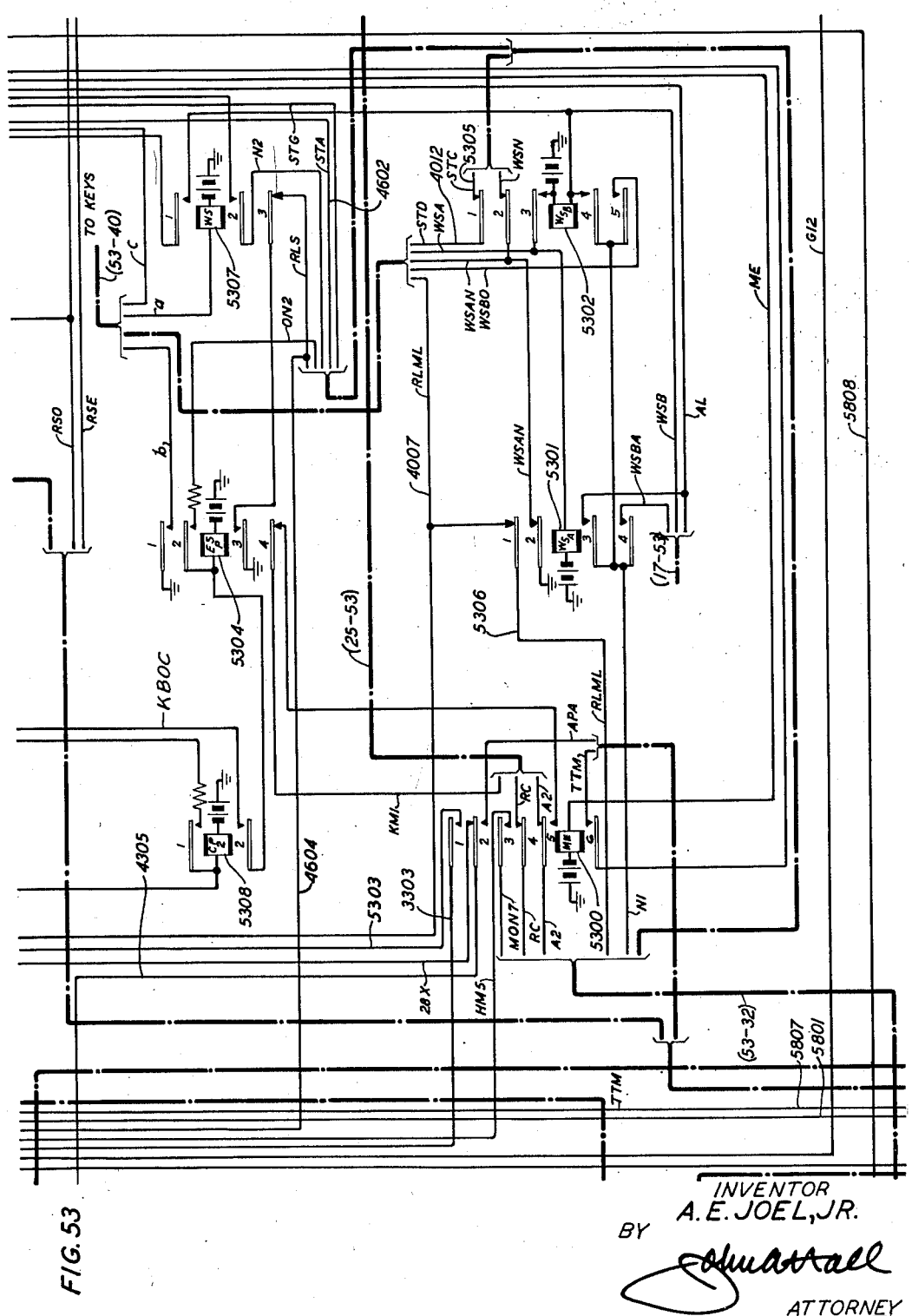
Figure 54:
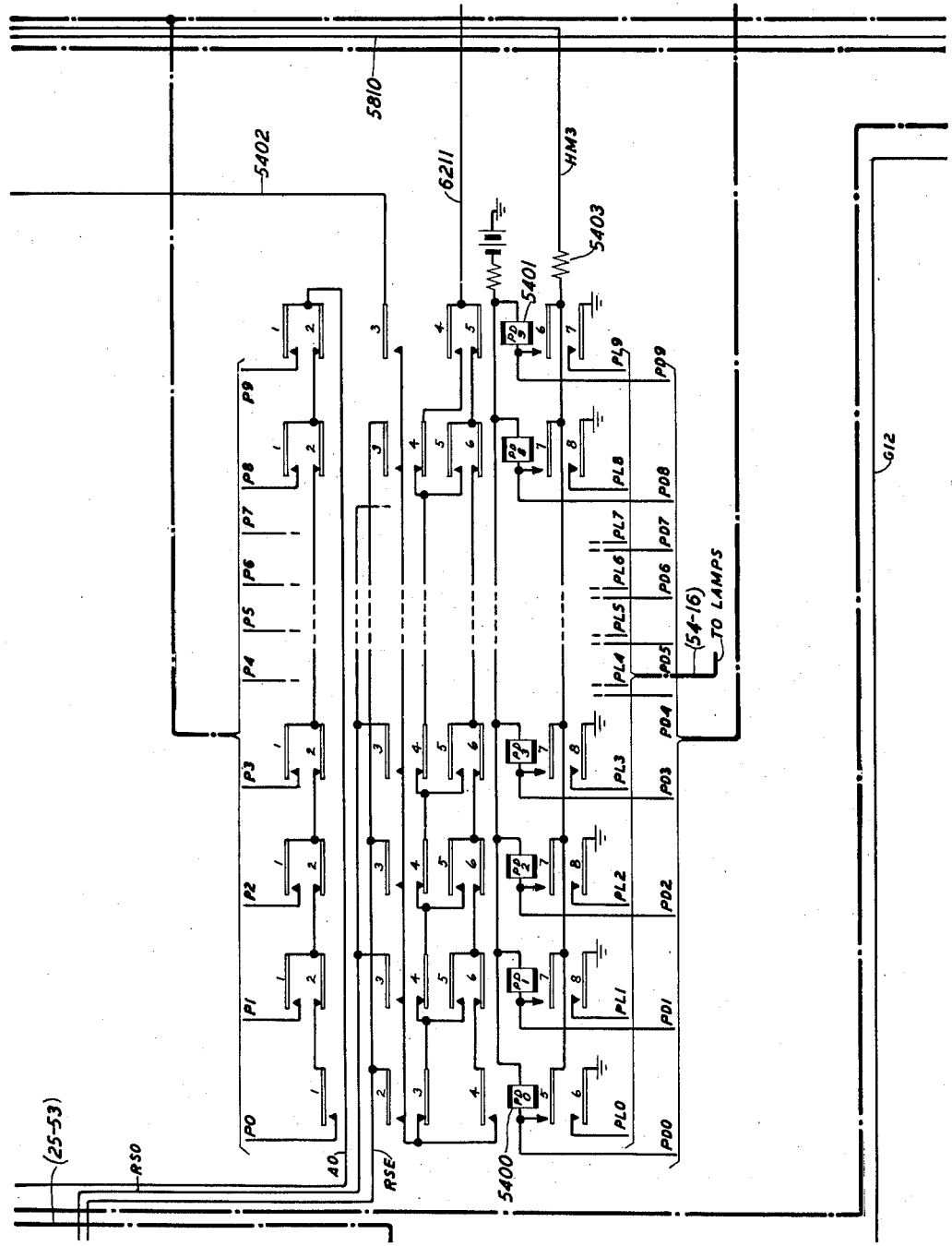
Figure 55:
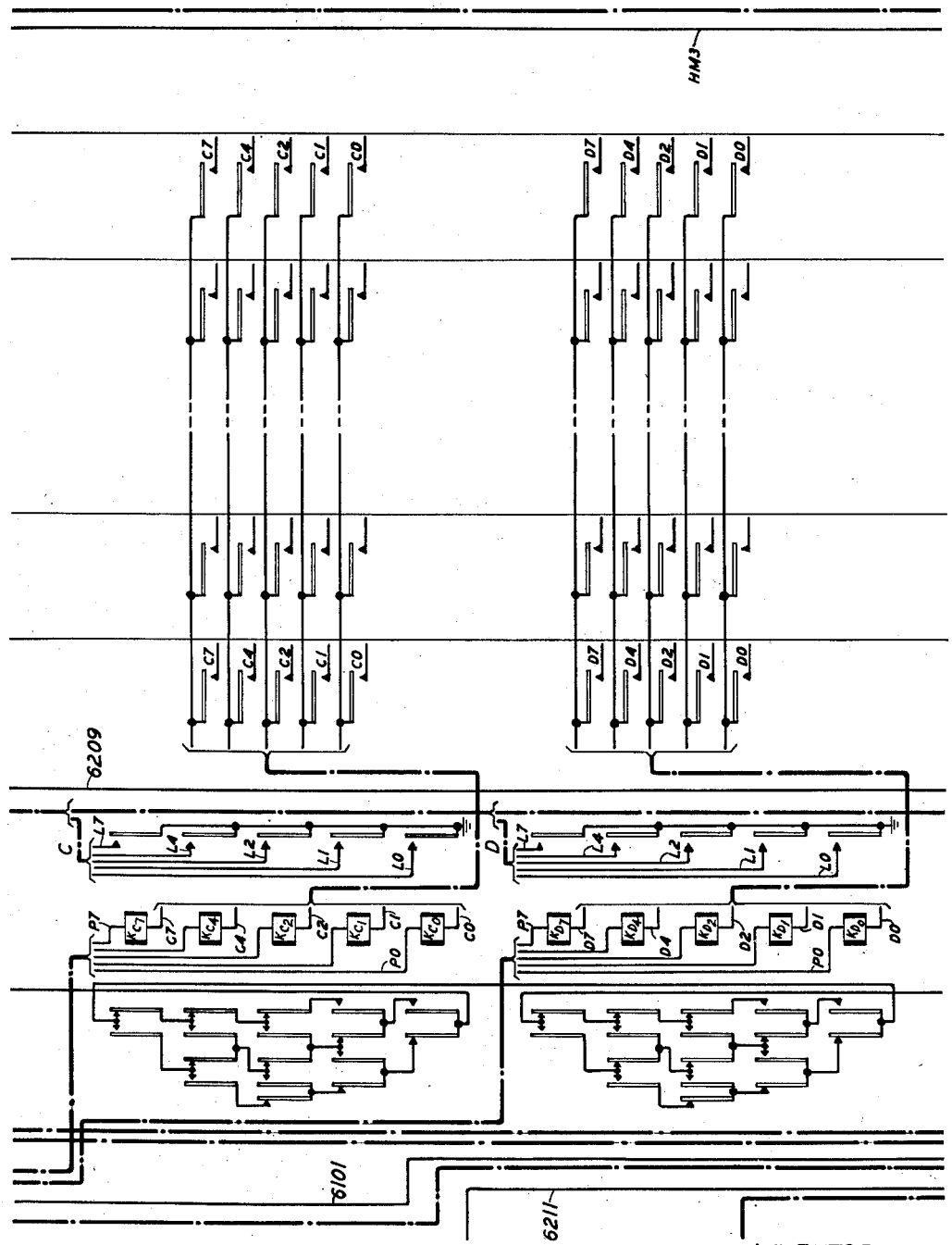
Figure 56:
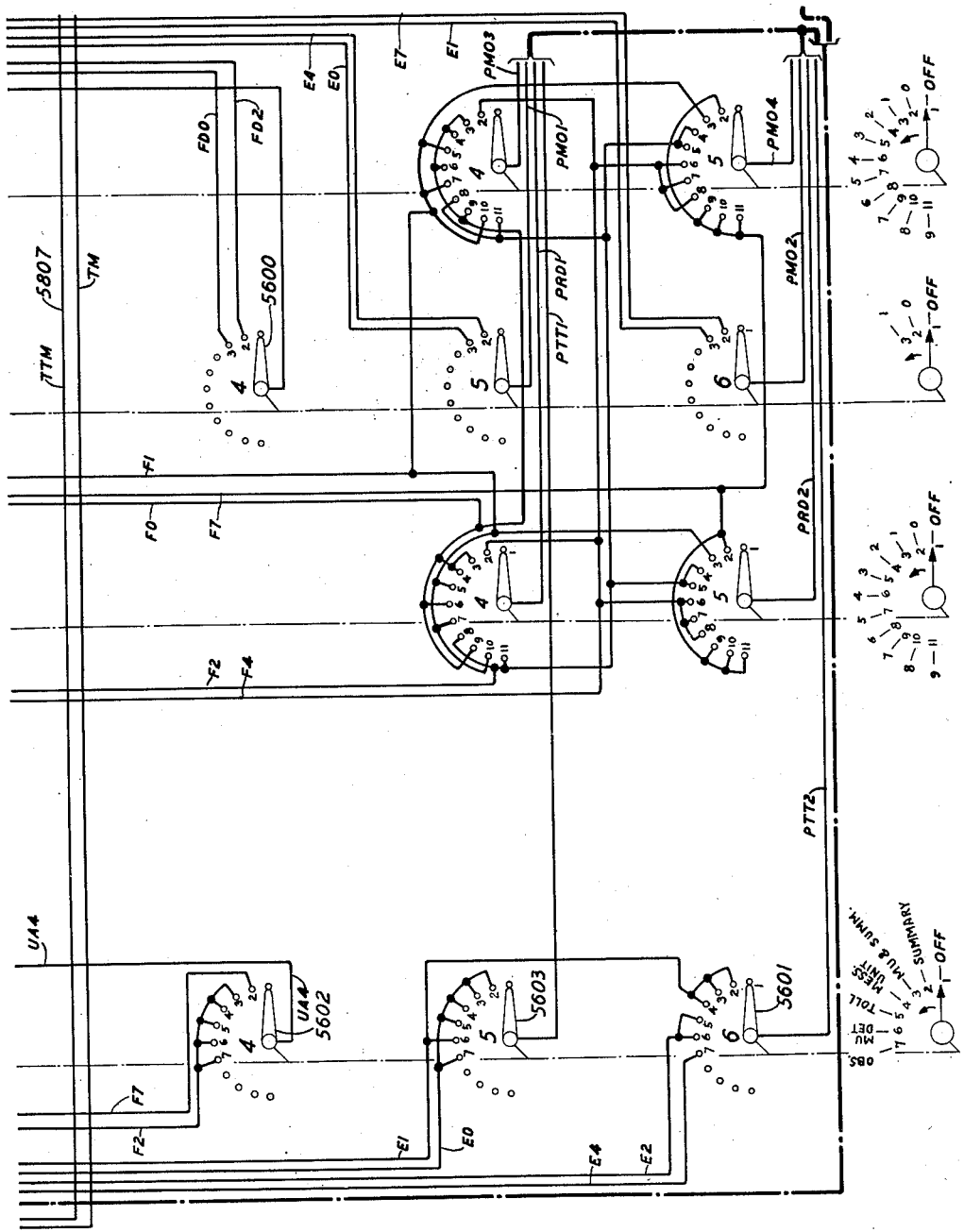
Figure 57:
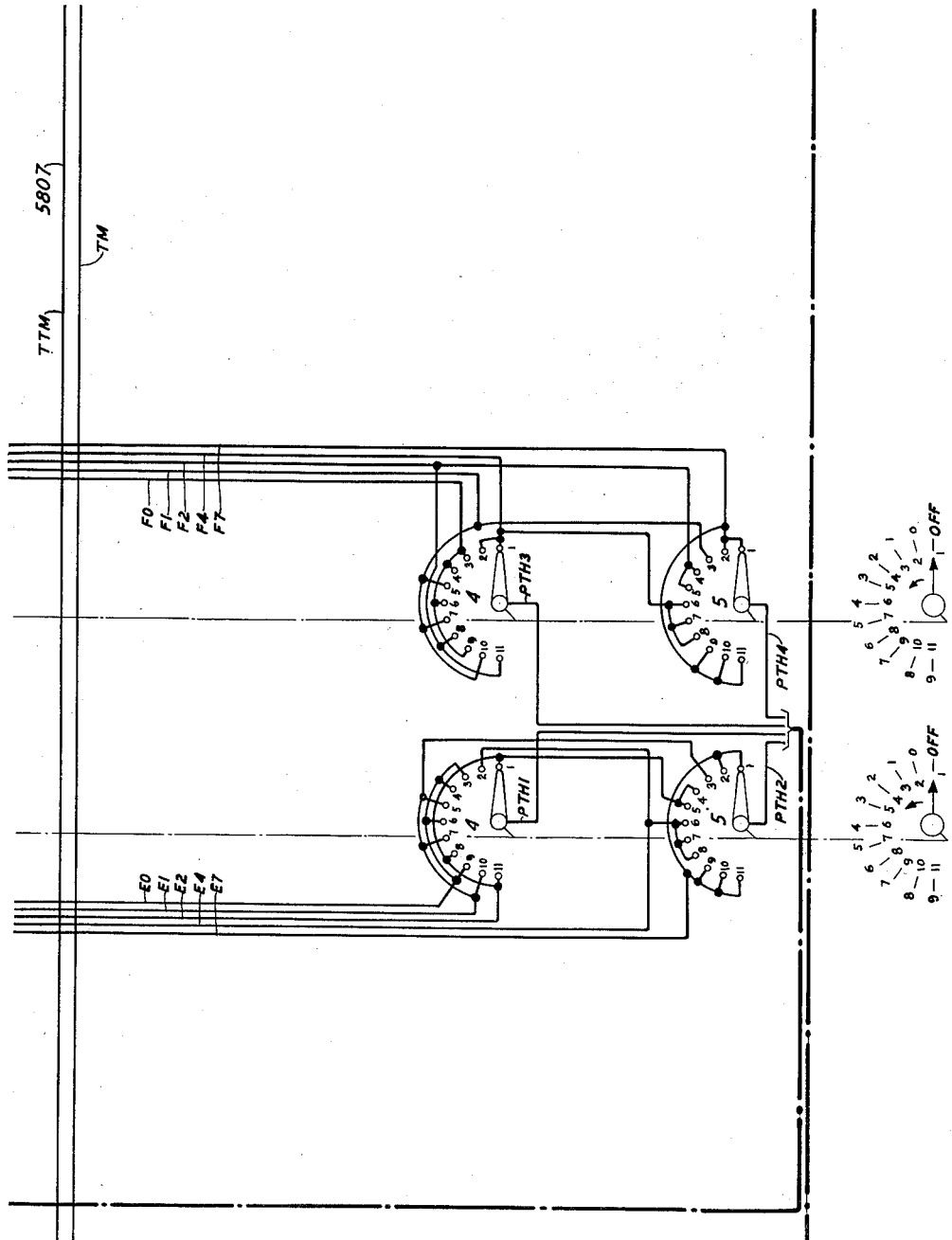
Figure 59:
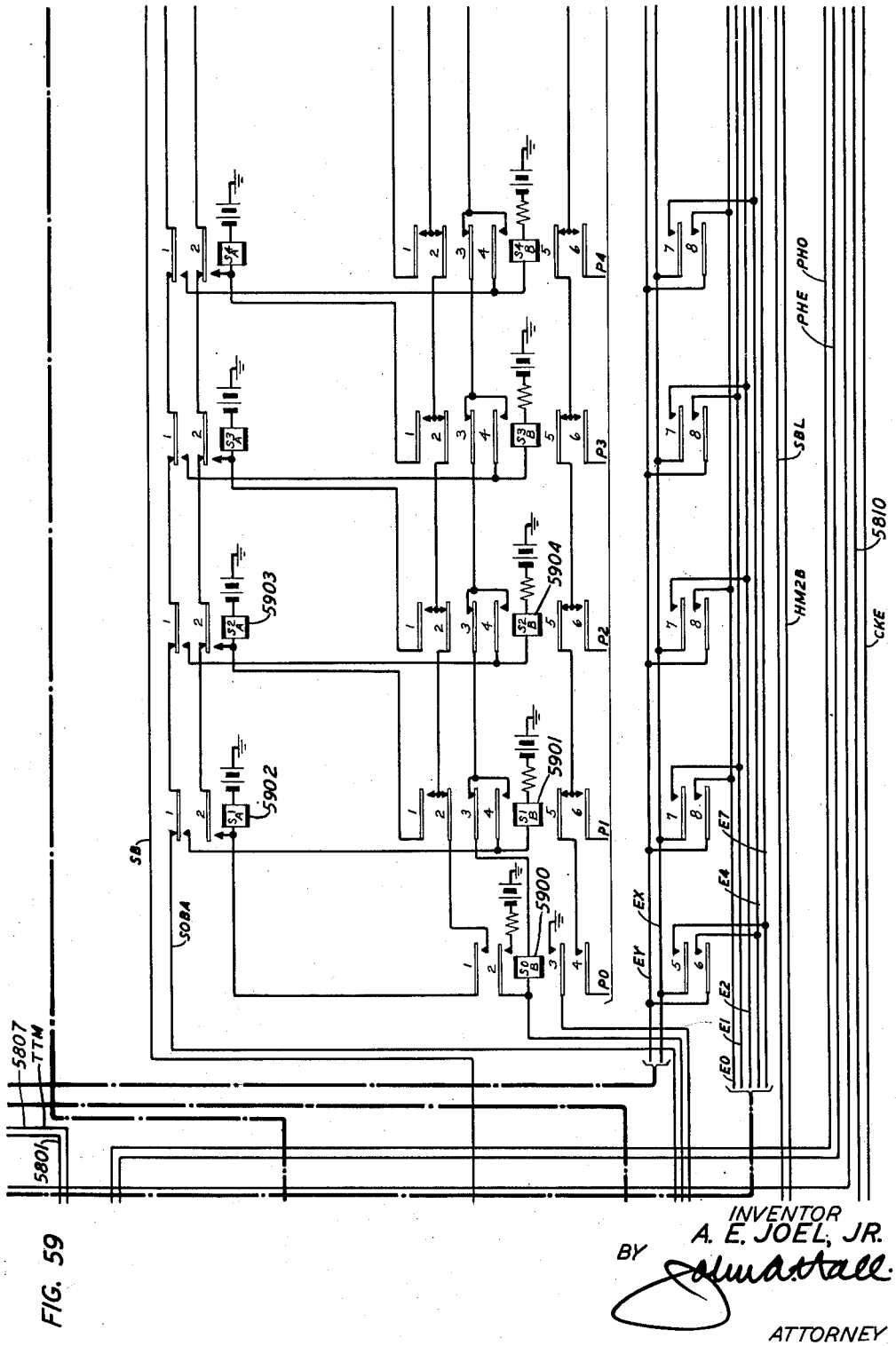
Figure 60:
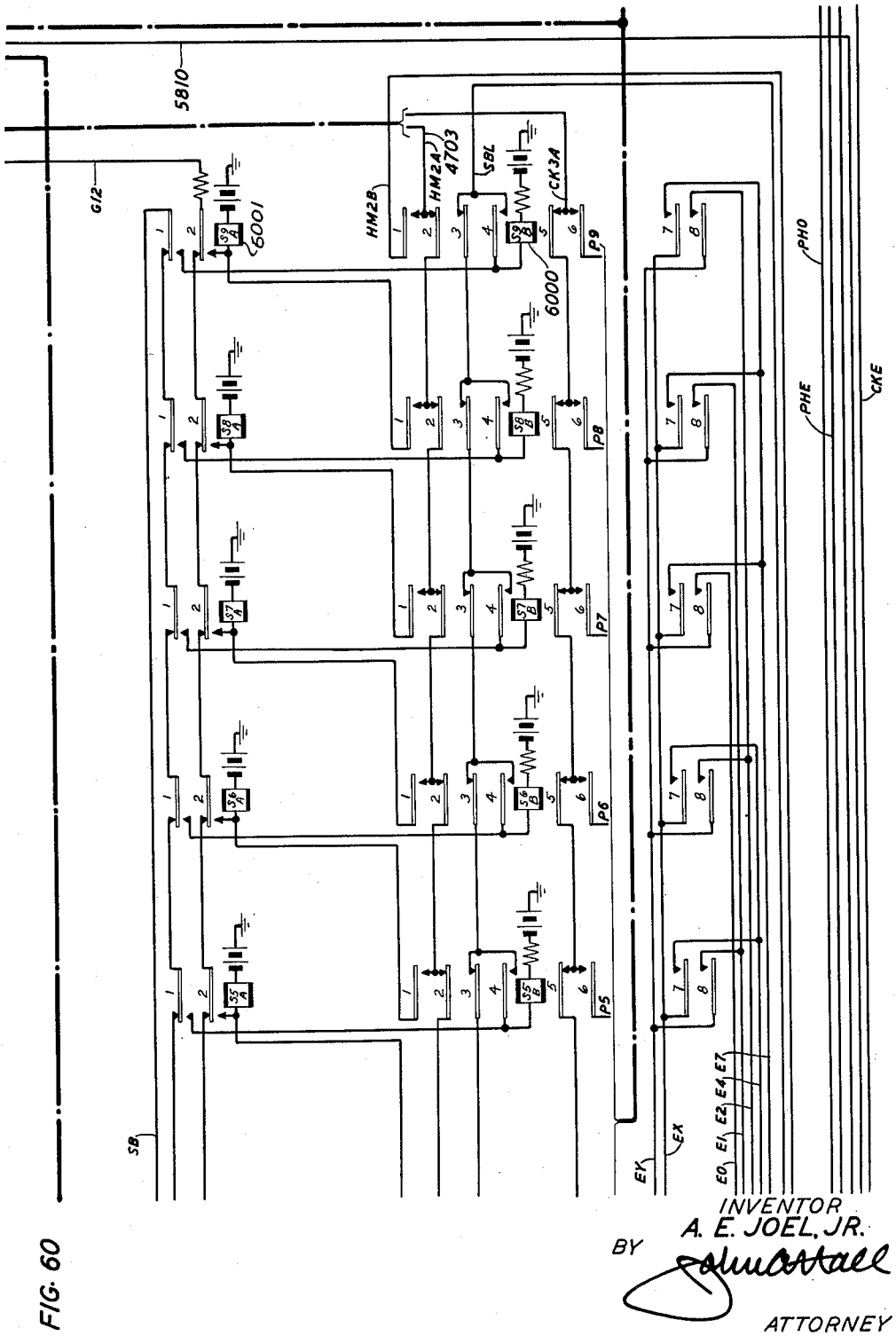
Figure 61:
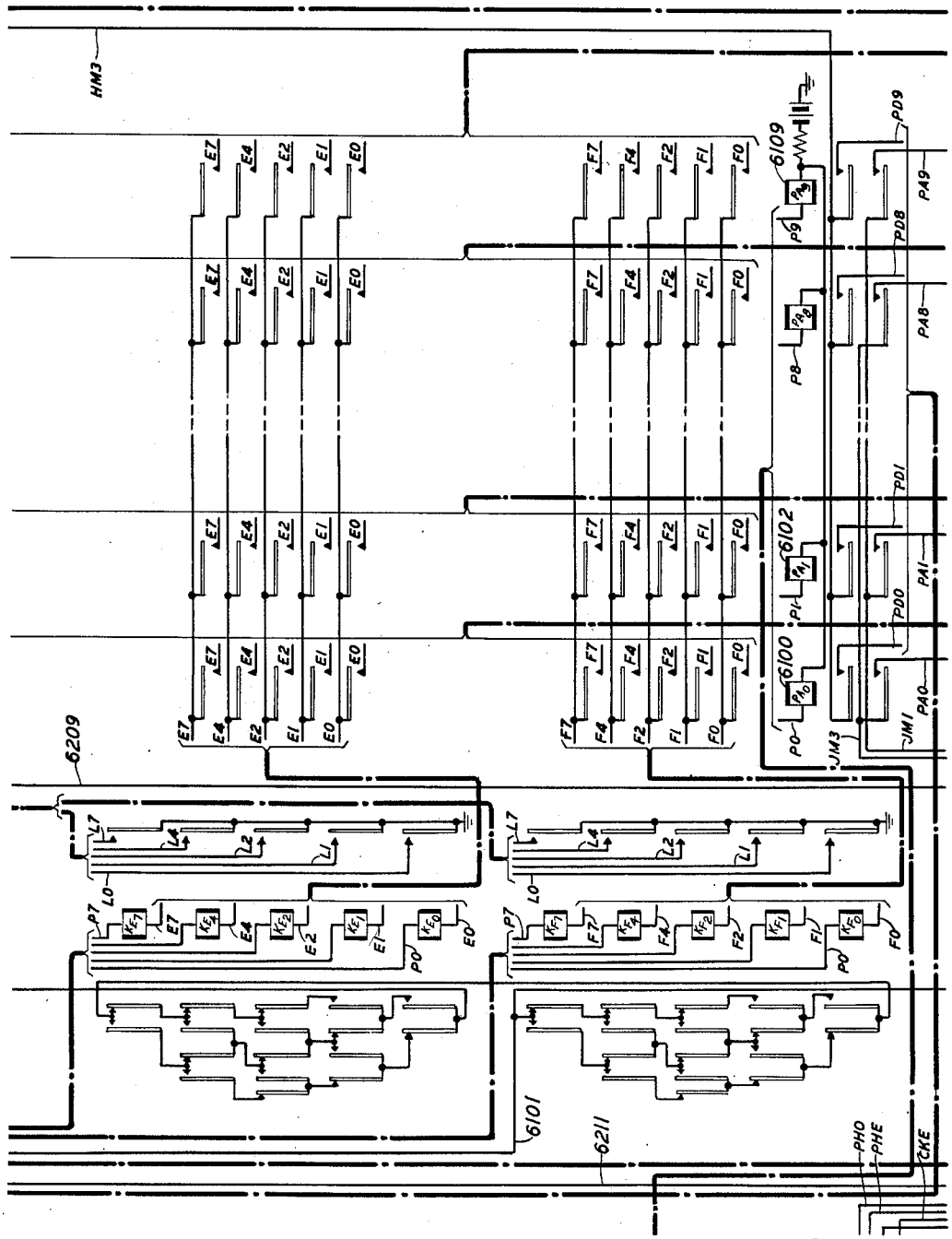
Figure 62:
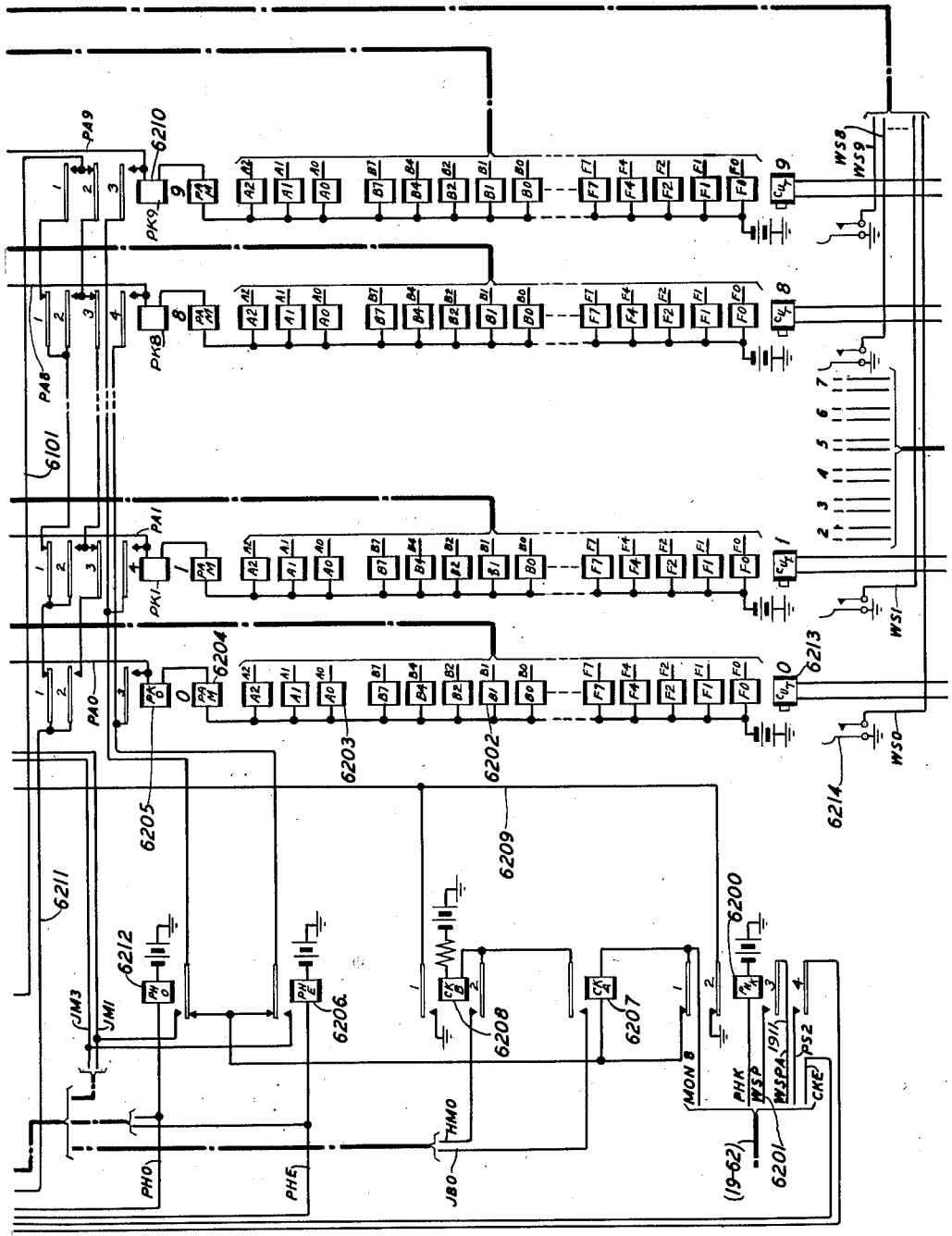
Figure 63:

Figs. 14 and 15 together show a rectangle to indicate reader 9 and in some detail the tape feed motor control and reader connector therefor;

Fig. 16 shows certain indicator lamps, particularly those for reading the value of the digit 7 any particular time such digit is expressed either by a reader or by a perforator, together with the appropriate connector relays therefor;

Fig. 17 shows the alarm circuit and the alarm timing circuit used in conjunction therewith;

Fig. 18 shows the tape identity perforate progress circuit;

Fig. 19 shows certain common circuits associated with the tape identity perforate progress circuit and the relays of the motor control circuit;

Fig. 20 shows the off-normal and start circuits;

Fig. 21 shows the reader step relays and the reader step check circuit;

Fig. 22 shows the tape section register;

Fig. 23 shows the splice pattern timing circuit and the perforate mutilated line control circuit;

Figs. 24 and 25 shows the reader connector circuits, Fig. 24 showing the connector for extending the actual reading contacts and Fig. 25 showing the connector for extending the circuits of the reader control contacts;

Fig. 26 shows the cross-connecting arrangement for machine number identification;

Figs. 26 and 27 both show wiring between the tape feed motor control and reader connector circuits for readers 1 to 9, inclusive, and the reader connector relays;

Fig. 28 shows a number of the signal lamps for miscellaneous checking purposes;

Figs. 29 and 30 show the tape index register, Fig. 29 showing the relays used in connection with type 12 and type 17 tapes and Fig. 30 showing the relays used in connection with type 11, type 13 and type 18 tapes;

Fig. 31 shows the tape identity perforate control circuit;

Fig. 32 shows the skip splice control circuit;

Fig. 33 shows the reader line count circuit;

Fig. 34 shows the tape identity sort connector;

Fig. 35 shows the tape section connector and the tape section register;

Fig. 36 shows the reading relays for the A and B digits;

Fig. 37 shows the reading relays for the C and D digits;

Fig. 38 shows the reading relays for the E and F digits;

Fig. 39 shows the reading relay translator;

Fig. 40 shows a number of the keys used for control purposes and for seeking the cause of an alarm;

Figs. 41 and 42 show the tape identity reading progress circuit, Fig. 41 showing the line 1 and line 2 relays and Fig. 42 showing the line 5, line 6, line 8 and line 9 relays;

Fig. 43 shows the tape index connector;

Fig. 44 shows certain of the control relays;

Fig. 45 shows the sort class connector;

Fig. 46 shows the tape end perforate control;

Fig. 47 shows the window splice perforate control;

Fig. 48 shows the perforate sort connector;

Fig. 49 shows the perforate magnet check relays for the A and B digits and the perforator connector armatures and contacts for these two digits;

Figs. 50, 51, 52, 56 and 57 show the set-up switches, Figs. 50 and 56 showing the tape type switch, the sort switch, the round switch, the month tens switch and the month units switch, Figs. 51 and 57 showing the central office switch, the thousands first switch, the thousands last switch, the first recorder tens switch and the first recorder units switch and Fig. 52 showing the last recorder tens switch, the last recorder units switch, the marker group tens switch and the marker group units switch;

Fig. 53 shows the window splice perforate control circuit;

Fig. 54 shows the perforator register circuit;

Fig. 55 shows the perforate magnet check circuit for the C and D digits and the armatures and contacts of the perforator connector relays for these same two digits;

Fig. 58 shows the entry spread control circuit;

Figs. 59 and 60 show the entry spread progress circuit, Fig. 59 showing the relays operating in conjunction with perforators 0 to 4, inclusive, and Fig. 60 showing the relays used in conjunction with perforators 5 to 9, inclusive;

Fig. 61 shows the perforate magnet check circuit for the E and F digits and the relay windings of the perforator connectors as well as their armatures and contacts for the E and F digits;

Fig. 62 shows the perforator advance check circuit, the perforator hold check circuit and has an indication of the perforators; and Fig. 63 shows the tape cutter circuit.

In the following description the various relays are designated by both letters and numerals, which letters have come to have certain significance to persons familiar with the technical details of the disclosed arrangements. By way of example, the reading relays are known as the A0, A1 and A2 relays for the first group thereof used to register the A digit of the six-digit line used in the automatic accounting system tapes. In the present case there are three relays in the first, or A set and five relays, such as the B0, B1, B2, B4 and B7 relays, in each of the remaining five sets. In a great many cases a relay will have only such an alphabetic or letter designation; but, in other cases it will have in addition a numerical designation which always consists of the figure number plus two other digits, whereby the location of a piece of apparatus can be found at once by turning to the corresponding figure number. Where conductors are designated by numerals, in addition to the usual alphabetic designation thereof, the number used will be a combination including the figure number wherein the conductor is first picked up in the tracing of a circuit and this number will be retained even though the conductor may extend through another large number of figures. Another convention used herein for the sake of clarity is a numbering scheme for the cables or bundles of conductors which must be carried over long distances. This is the use of a hyphenated number such as 12–24 indicating that this cable or bundle of conductors extends between Fig. 12 and Fig. 24.

By way of example, the circuit by which the A0 reading relay 3600 is operated may be traced from the A0 contact 1200 of the No. 0 reader, over conductor A0, through an armature and front contact of the R0 relay 1201, over conductor A0 through a bundle of conductors 12–24 leading from this Fig. 12 to Fig. 24, thence through a contact of the RCA relay 2400, conductor A0, again through a bundle of conductors 20–24 to Fig. 20, and in Fig. 20 through the armature 1 and front contact of the ST3 relay 2000, conductor A0, thence through the bundle of conductors 20–36 to Fig. 36, where in Fig. 36 the conductor extends directly to the winding of the A0 reading relay 3600.

For obvious purposes, in certain cases, conductors will bear the same alphabetic designation as other apparatus. This is not to be taken as a duplication of the designation but will be readily understood as indicating a circuit condition wherein such a conductor bears an intimate relation to the other piece of apparatus.

Similar logical means for designating various elements of the circuits will be found in the drawings and are used as an aid to the clear understanding of the present invention.

The operative apparatus of the disclosed embodiment includes relays, tape readers, tape reperforators, otherwise designatable as recorders, and auxiliary equipment for supplying tape and for storing the used or reproduced tapes.

A suitable tape reader is disclosed in the application of W. W. Carpenter, Serial No. 666,280, filed May 1, 1946, and allowed August 17, 1953; obviously other devices of similar function may be employed.

The tape perforators may consist of devices such as disclosed in the Patent 2,583,086 to W. W. Carpenter of January 22, 1952.

The present disclosure is related to the disclosures of a group of patents and applications generally relating to equipment which may constitute an accounting office. The object of an accounting office from the over-all viewpoint is to process a tape of the kind produced in a central office having recorded thereon data relative to telephone calls specifically originating in or, more generally, set up through or by means of said central office and to process said tape with the ultimate result of producing through successive steps typed records giving the details of toll calls made by each subscriber during a given period of time, typed message unit records giving the number of units to be charged to each subscriber for a given period of time in cases where such subscribers are billed on a total message unit basis, and typed records of so-called straddle calls, i. e., those in which, for one reason or another, the answer time entry, the disconnect time entry and the initial entry relating to a call are present on more than one tape. Within the scope of the accounting system certain other information may be derived and produced as a typed record, for example, line observing information, verification of numbers of newly connected subscribers, etc.

A tape suitable for initial use in an accounting office of the class referred to may be one produced in accordance with the disclosure of Patent 2,599,358 to Cahill-Carpenter-Dimond of June 3, 1952, or the application of Carpenter-Collis, Serial No. 759,402, filed July 7, 1947, or the equivalent thereof.

Such a tape may contain entries resulting from the use of many transmission circuits (which may be known as district junctors or trunks or by other designations) of the central office. Such tapes contain the initial entries, including among other information, the calling subscriber line number, and contain answer entries, disconnect entries, and day and hour entries. Because a single recorder may be used in common to and ordinarily is used in common to a number of transmission circuits, the initial, the answer, and the disconnect entries of a particular call are interspersed on the tape at random among entries relating to other calls. Initial entries of calls which are never answered may also be recorded. However, each such entry is identified by the transmission circuit used for the purpose of this call and the number of this circuit forms a part of the entry record.

The principal stages of processing are the assembling, the computing, the sorting, the summarizing and the printing stages.

The first step in the accounting center is to assemble all of the recorded data on each call, so that subsequent processing can deal with complete information per call. This is accomplished by a machine known as an assembler which perforates assembled messages on its output tapes. Such a machine is disclosed in Patent 2,558,476 to Carpenter and Gooderham of June 26, 1951. Assembling is the process whereby the fragments of information belonging to a particular call are identified by a two-digit call identity index number (which is generally the trunk or junctor number used as the transmission path) and by their time sequence on the central office tape and such fragments are sorted onto output tapes in accordance with these indices without disturbing the time sequence of the various calls.

After the calls have been assembled, the output tapes of the assembler may be fed into a computer for performing the next or computing step of the process. The computer computes and prepares output tapes providing data on each call as to the chargeable time for toll calls and the chargeable message units for bulk-billed calls. Uncompleted calls are discarded. Portions of calls which straddle accounting periods are preserved on straddle tapes. Other miscellaneous tape outputs are made for calls whose segregation is desired for various reasons. A suitable computer is disclosed in Patent 2,630,269 to A. E. Joel, Jr., of March 3, 1953.

Since the objective of the accounting center processing is to determine the total charges applicable to each telephone customer, the computed messages are next arranged in a sorting step by a sorter according to the telephone numbers of the calling subscribers. The output tapes of such a machine contain all of the messages originated by a particular subscriber adjacent to each other and all such subscriber groupings are arranged in ascending order of calling subscribers' telephone numbers. Patent 2,590,625 to A. E. Joel, Jr., of March 25, 1952, discloses a sorter whereby such sorting may be accomplished in a number of discrete steps, each step comprising a separate sort by a different telephone number digit.

After all of the bulk-billable messages for subscribers have been brought together by means of the assembling, computing, and sorting steps, these may now be summarized by a summarizer which produces an output tape containing the total number of message units chargeable to each subscriber. A suitable summarizer is disclosed in Patent 2,572,132 to Giroud-Irwin-Kille-Retallack-Riggs-Strickler of October 23, 1951.

The last process step is the printing process which translates the sorted and/or summarized tapes into information understandable in terms of the actual billing of a customer. The printer accordingly may accept these sorted and/or summarized tapes and produce from them typewritten lists of message units and typewritten toll slips which may then be used to bill the customer. Such a printer arrangement is disclosed in Patent 2,510,061 to Branson-Locke-Marshall of June 6, 1950.

The present invention is related to the above outlined accounting system in that it relates to the sorting process and is shown by example herein as embodied in a sorter of an improved nature. The sorter of the present invention automatically sorts computer output tapes by calling-subscriber directory numbers in one continuous and automatic step by virtue of the various novel features of the invention described and claimed herein.

GENERAL APPEARANCE

The general appearance of one embodiment of the invention is similar to that of certain other of the Joel applications above listed. There are a number of tall glass front cabinets in which relays and other small apparatus are mounted. The key and lamp panels occupy one section of this cabinet and are placed at convenient eye level for an operator standing before such cabinet. Then, there are ten cabinets each containing a perforator and an associated reader mounted at a convenient level for observation by an attendant. Each of these is covered with a transparent plastic cover whereby the operation through the closed cabinet may be observed. Below the readers and perforators will be found tape storage and waste bins.

THE INPUT TAPE

Fig. 1 is a diagram having the characteristics of a flow chart and designed to show how a tape which is to become the input tape of the device of the present invention is produced. Assuming that the movement of the tapes in this figure is downwardly, then the tape 1 is shown as entering the reader 2 of the assembler 3. On a second sort operation the code 289101, in the tape 1 entering the reader 2, is the first valid code following the usual splice pattern codes, the last two digits 01 being the tape index and denoting that this input tape is one which has been produced by the assembler on a first sort operation and, therefore, is the only kind of tape which will be accepted by the assembler on a second sort operation. In the operation the perforator 4 of the assembler 3 will produce an 02 type tape 8 which will be accepted only by the computer 5. The tape 8 extending from the perforator 4 of the assembler 3 to the reader 6 of the computer 5 is shown with the code 289102 entering the reader 6 and the code 2860XX leaving the perforator 4. The code 289102 is the first valid code of the input tape which will be read by the reader 6 and the code 2860XX is the last valid code issued by the perforator 4 of the assembler 3. The tape 8 is shown as broken between these codes to indicate the presence of a large number of tape identity codes and codes for specific items of information.

The tape 9 issuing from the perforator 7 of the computer 5 is shown broken in a number of places, at two of which places are arrows pointing toward the right indicating that within these limits the complete tape which will be used as the incoming tape for the device of the present invention is included. This tape will have a leading end shown at the bottom containing a number of the 081010 splice pattern codes. The first valid code thereafter will be the code 289111 which is the first line of the tape identity information and which contains the tape index 11, being the output tape from the computer which was fed with an 02 type input tape. Again the last valid code in this tape will be the skip splice pattern code 2860XX followed by a number of the splice pattern codes 081010.

It may be noted here that in the apparatus of the present invention there will be a tape extending from each of the perforators to its companion reader. Such a tape extending from the 0 perforator to the 0 reader will be cut somewhere within its splice code pattern and the tape indicated in Fig. 1 will be spliced thereinto as indicated by the arrows from Fig. 1.

In Figs. 2 to 7, inclusive, three companion sets of perforators and readers are shown numbered 0, 1 and 9, with the other seven indicated. A tape issuing from a perforator enters its companion reader and this tape, after having been read, is fed into a waste bin. In Fig. 2 the device is shown in the condition made ready for its operation. A sufficient length of splice pattern code has been prepared by each perforator to extend to its companion reader to allow for the full automatic operation thereafter. The computer output tape has been inserted in the tape extending from the perforator 0 to the reader 0. The first valid code which the reader 0 will en- counter is the code 289111, indicating by the tape index 11 that this is a tape sorted in accordance with the office designation of the calling line number by the computer and that this tape will be accepted by the sorter only for the purpose of performing a sorting operation in accordance with the units digit of the calling line number. The device is, therefore, ready for operation which will then consist of operating the reader 0 so that all the items of information found in this tape will be directed by the reader connector progress circuit 10 through the reading relays 11 and through the perforator connector distributor circuit 12 into the various perforators reached thereby, each perforator being reached in accordance with the units digit of the calling line number found in the separate items of information. By way of example, if a line is found having within its calling line number the units digit 0, then the perforator connector distributor circuit 12 will route this item into the perforator 0 and it will be then recorded in the 0 tape. If such an item is found having the units digit 9, then the perforator connector distributor circuit 12 will route this item into the perforator 9 so that it will be recorded in that tape.

Fig. 3 shows the end of this operation and the condition in which it is found ready to start the next operation. The code shown entering each of the readers, and on which each reader has halted, will be 289113, the first valid code of such a tape and which is the first line of tape identity bearing the tape type index 13. This is a tape which has been sorted in accordance with the units digit and will be accepted by the sorter only on a tens digit sort. It will be noted that the codes in each of these tapes are indicated by a series of X's with the last digit thereof the only one shown. Each of the units digits in the tape between the 0 perforator and the 0 reader has 0 for its last digit. Likewise, every item in the tape between the perforator 9 and the reader 9 has 9 in its last digit. In each case the last valid code formed by the perforator is indicated as just having issued from such perforator. In each case this is the skip splice code 2860XX. Actually a length of splice pattern codes has also been perforated but the skip splice code is shown as the virtual end of the tape produced on this sort. Below each reader the tape issuing therefrom is shown as being fed into the waste bin 13.

Figure 4:
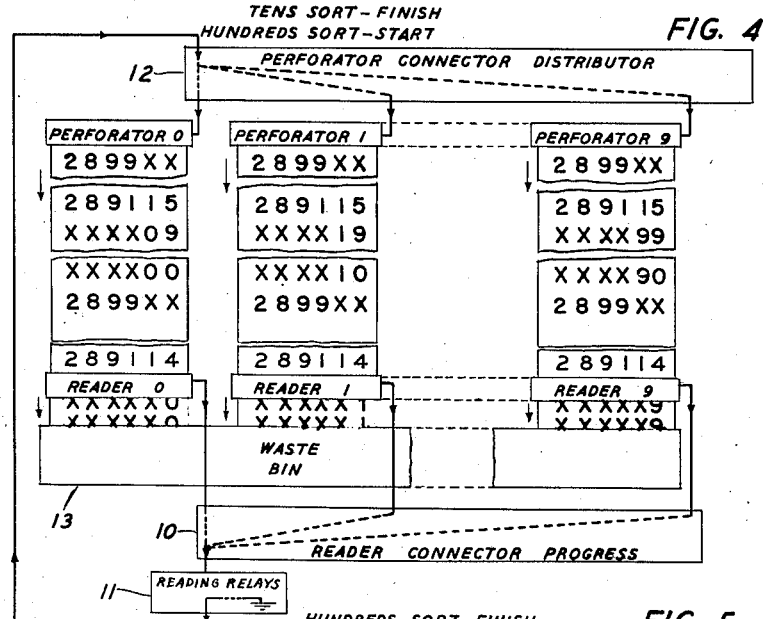
Fig. 4 shows the condition of the tapes at the end of the tens sort and at the beginning of the hundreds sort.

In Fig. 4 the device is shown in the condition reached at the end of the tens sort and ready for the beginning of the hundreds sort. Each of the tapes entering its reader is shown with the first valid code 289114 on which the tape is halted in the tens sort and in which the tape type index 14 indicates a tape which has been sorted in accordance with the tens digit and which is now ready to be sorted in accordance with the hundreds digit. The items of information are now indicated as covering the complete sort by two digits; that is, the items between the perforator 0 and the reader 0 each have the tens digit 0 and the units digits running completely through the scale from 0 to 9, inclusive. Likewise, the items of information between the perforator 9 and the reader 9 will invariably have 9 for the tens digit and run through the scale from 0 to 9 in the units digits. The last valid code issuing from each of the perforators again is the 2860XX code. Likewise, the tapes issuing from the readers are shown entering the waste bin 13.

Figure 5:
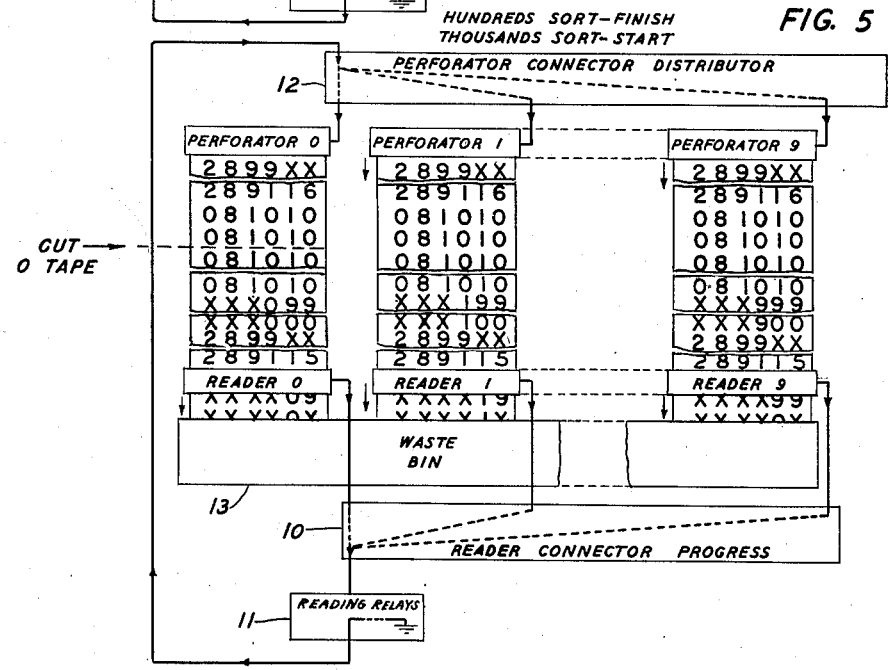
Fig. 5 shows the conditions of the tapes at the end of the hundreds sort and at the beginning of the thousands sort.
Figure 6:
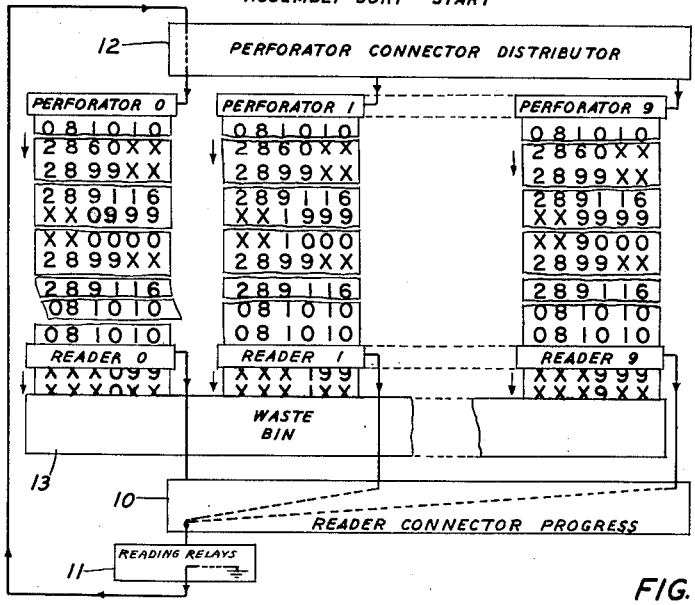
Fig. 6 shows the condition of the tapes at the end of the thousands sort and at the beginning of the final or consolidation sort.
Figure 7:
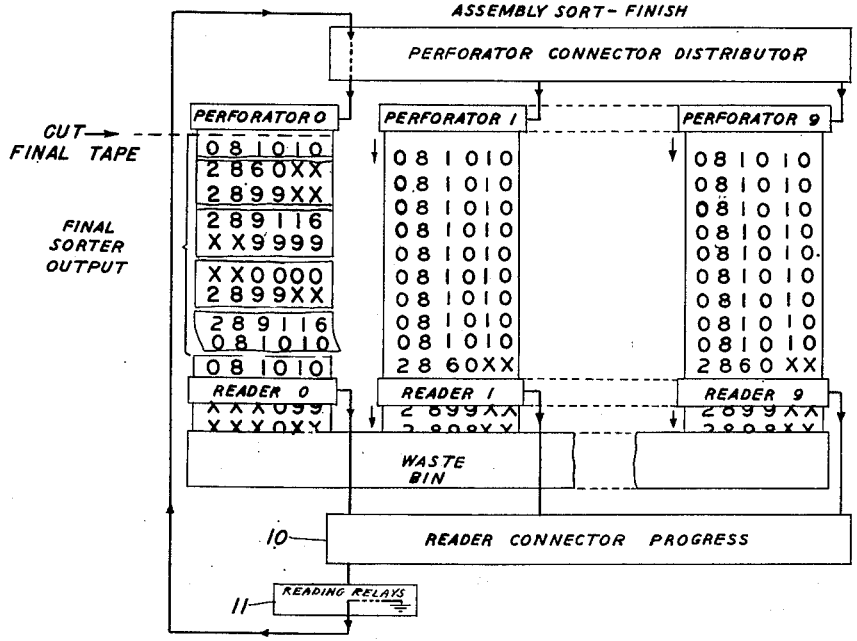
Fig. 7 shows the condition of the tapes at the end of the consolidation sort.

Fig. 5 shows the condition of the device at the end of the hundreds sort and at the beginning of the thousands sort. The tapes issuing from each of the perforators have been shown slightly further advanced than in the other cases because at this point the tape issuing from the perforator 0 must be automatically cut. Therefore, all the tapes are shown with splice pattern codes recorded therein so that at the beginning of the thousands sort an automatic operation will cause the tape between the perforator 0 and the reader 0 to be cut just after it has left the perforator 0. This leaves a tape in each reader having the items of information sorted in accordance with the hundreds digit. The tape in the 0 devices will have 0 for its hundreds digit and numbers running from 00 to 99, inclusive, in its tens and units digits. Likewise, the tape between the perforator 9 and the reader 9 will have 9 in its hundreds digit and numbers running from 00 to 99 in each of its tens and units digits. During the thousands sort the reader 0 will read its items through the reader connector progress circuit 10 into the reading relays 11 and the items will then be routed by the perforator connector distributor circuit 12 into the various perforators in accordance with the thousands digit of the calling line numbers. At the end of this operation the condition depicted in Fig. 6 will obtain. The tape running through the reader 0 will have taken off every item of information found therein and will have reached the skip splice code 2860XX depositing the tape in the waste bin 13. The tape issuing from the perforator 0 will have become a clean cut tape starting with a number of splice code patterns followed by the tape identity codes, the first of which is shown as 289116. The tape type index 16 shown in this code indicates a tape which has been sorted by the thousands digit and which is, therefore, the final tape to be issued by the sorter. In the 0 tape the calling line numbers are numbers running from 0000 to 0999, inclusive. In the same manner the numbers listed in the No. 9 tape run from 9000 to 9999. In the operation following this condition only the tapes from the 1 to 9 readers will be fed through the reader connector progress circuit 10 and each of these will invariably go into the perforator 0. Therefore, when the last items on the No. 9 tape have been read by the No. 9 reader through the reader connector progress circuit and the reading relays onto the 0 perforator, the tape issued from the 0 perforator will contain all the information originally contained in the tape 9 of Fig. 1, but with the items rearranged in accordance with the calling line numbers. This 0 tape having been cut as indicated in Fig. 5 and, therefore, not feeding through the reader 0 will be the final output of the device. Each tape ends with the skip splice code 2860XX and, in each instance in this assembly sort, when the reader reaches this code the reading is stopped and the device is left in the condition shown, that is, the reader will be standing on the skip splice code and a length of tape with splice code will be extending from the perforator to the reader.

The device as a whole operates in the manner shown schematically in Figs. 9 and 10. There is a switch 900, shown in the sort class connector, which switch is automatically advanced over its serially numbered contacts for the various sorting steps. By means of the entry spread progress circuit 901, each of the perforator connector relays shown in the rectangle 902 will be automatically and sequentially operated so that the various perforators 100, 1001 to 1009 will cause the splice code pattern 081010 to be perforated in the tapes issuing therefrom. After this tape end preparation, the device is set into operation and the sort class connector switch 900 moves to its first position whereby the UA relay 903 is operated. This relay causes the operation of the units sort relay 904 so that the various FD conductors (FD0 to FD9, inclusive), will be connected through the armatures of this relay and through the armatures of the sort connector SC relay 905 to the various perforator connector relays such as 906, 907 and 908. If, during the operation, the reader 0 is connected by the R0 reader connector relay 1002 through the reader connector 1003 to the reading relays shown in the rectangle 1004, then the particular FD conductor which is affected by the value of the units digit of the calling line number being read will cause a particular one of the perforator connector relays 906, 907 or 908 to be operated so that the items are properly distributed in accordance with their units digits. The actual item of information will be transmitted from the reading relays through the contacts of the operated perforator connector relay.

A circuit known as the tape selection connector 1005 has a pair of switches 1006 and 1007 which advance step by step to sequentially render the various readers effective. Thus, on the first step of these two switches the switch 1007, deriving ground from the back contact of the AS relay 909, will become effective to cause the operation of the S0 relay 1008. The function of the S9 relay 1008 is not shown here but it is added as part of the series of relays S0 to S9, inclusive. During the time that the tape selection switch 1007 remains on its 0 terminal to operate the S0 relay 1008, the R0 relay 1002 is operated so that the 0 reader is effective. At the end of the tape being read by the 0 reader the 2860XX code, followed by splice pattern and then the first line 289113 of the next section, will be found and this, being read by the reading relays 1004, will cause the operation of the 28G relay 1011, which in turn will operate the rotary magnet 1010.

On this units sort during the operation of the UA relay 903 and the US relay 904, the complete tape inserted between the 0 reader and the 0 perforator is read and during this time the 0 section of the units sort is produced by the 0 perforator 1000. Therefore, the 0 reader 1015 will first encounter the valid line code 2860XX of the tape which was used as the input tape, will then pass over a number of splice codes and will finally reach the first line 289113 of the new section which the 0 perforator 1000 has prepared. With the circuit in the condition it is at the present time, that is, while the switch 900 is on its first contact the device is set to receive only tapes having the tape type index 289112 and, therefore, when the code 289113 is encountered it will not be accepted by the reader 0. However, the value 3 in the F digit thereof will ground the FD3 lead and this will be extended through the armature 2 and front contact of the UA relay 903 to cause the operation of the 28G relay 1011. The 28S relay 1011 thereupon becomes operated to extend a connection to the armature 3 and front contact of the UA relay 903 to operate the rotary magnet 909, thereby to advance the sort switch arm 900. This connection is also extended over armature 4 and front contact of the UA relay 903 to operate the release magnet 1014, thus returning the switch arms 1006 and 1007 to normal so that upon the next operation they will again start from their first position.

In the second position of the arm 900 the TA relay 910 is operated and this in turn operates the tens sort TS relay 911. In this case the ED conductors, which are affected by the E reading relays and which represent the tens digit of the calling line number, will control the selection of the proper perforator connector relay such as the relays 906, 907 and 908. This sort will be regular in all manner. The 286 relay will operate at the end of the reading of the 0 tape. When, in this instance, the first line of the tape identity 289114 of the tape produced in the 0 perforator on the tens sort is reached, the 0 reader again will not accept this code but the FD4 lead will be grounded. The grounded FD4 lead, through the armature 2 and front contact of the TA relay (now operated since the switch 900 is on its second contact), will be extended to the 286 relay 1011 so that the rotary magnet 1010 will be operated. This advances the switch arms 1006 and 1007 to their second positions, whereby the switch arm 1007 will cause the operation of the S1 relay 1012. The R1 relay 1013 is now operated and the R0 relay 1002 is released, so that the tape in the No. 1 reader will then be read. The switches 1006 and 1007 advance step by step each time a 289114 code is encountered until finally the S9 relay is operated. At the end of the tape read by the No. 9 reader, the operation of the 286 relay will close a circuit through armature 1 and front contact of the S9 relay to operate the rotary magnet 909 of the sort class connector to advance the switch therein to its next or hundreds sort position. At the same time this ground will also be extended through armature 3 and front contact of the S9 relay 1016 to operate the release magnet 1014, thereby releasing the tape section selector to normal where it will start out on a new series of steps starting with the No. 0 terminal associated with the arm 1007. In the third position of the sort class connector switch 900, the HATHA relay 912 will be operated. This will close a circuit from ground, the armature 1 and back contact of the STHA relay 913, thence through armature 1 and contact of the HATHA relay 912, to operate the hundreds sort HS relay 914. The hundreds sort is made in a normal manner and finally the switch 900 is advanced to its fourth position where the STHA relay 913 is operated to cause the operation of the thousands sort relay 915. It may be noted that when the HATHA relay 912 is operated the FD5 conductor will be rendered effective through the back contact and armature 2 of the STHA relay 913 and the armature 2 of the HATHA relay 912. In the next position of the switch 900, when the STHA relay 913 is operated, a ground will be extended from armature 3 thereof to the winding of the HATHA relay 912, so that for the thousands sort both of these relays are operated. In this instance, the FD6 conductor is effective through the front contacts and armatures 2 of the STHA relay 913 and the HATHA relay 912. During the operation of these two relays 912 and 913 the THS relay 915 is operated and the HS relay 914 is released.

At the end of the thousands sort, the sort class connector switch 900 is advanced to its fifth position where the assembly sort AS relay 909 is operated. This relay causes the tape selection connector switch arm 1006 to be effective rather than the tape selection switch arm 1007. Consequently, the S1 relay and the R1 connector relay are the first to be operated. This is because on the assembly sort the tape issuing from the No. 0 perforator already has the 0 section of the final tape recorded on it and it is only necessary to record on this same tape the sections represented by the tape issuing from the No. 1 to No. 9 perforators, inclusive. Therefore, with the switch arm 1006, instead of the switch arm 1007, in effective control, this last or assembly sort starting from the condition depicted in Fig. 6 will be carried out.

During this assembly sort when the No. 1 reader encounters the skip splice code, then in this case a circuit is established through the A, B and C digit reading relays to cause the operation of the 286 relay 1011 and the No. 1 reader is left standing on this 2860XX code. The operation of the 286 relay 1011 advances the switch arms 1006 and 1007 and the next reader is brought into play. As each reader in turn encounters the skip splice code 2860XX it comes to a halt in this position, causes the operation of the 286 relay 1011 and advances the circuit so that the records in tapes 1 to 9, inclusive, are copied each in turn by the 0 perforator.

Thus a single tape, having but a single section issued by the computer, is placed in the device of the present invention and a multisection tape bearing the same items of information but sorted in accordance with four digits is issued by the No. 9 perforator. Other tapes are made, used and automatically discarded in the process but require no other handling than that afforded by the devices employed.

DETAILED DESCRIPTION OF CIRCUITS

Since the circuits of this device are long and complicated, the method used for describing them in detail is to list the various functions of the device and to describe the particular circuits used in each instance. In order to make a logical arrangement of this matter the circuit description will be put into the form of a manual preceded by a table of contents numbered in accordance with various sections as follows:

TABLE OF CONTENTS

1. Purpose of circuit
3. Circuit functions
   3.1 Tape processing
   3.2 Call entry sorting
   3.3 Splice skipping
   3.4 Tape identity checking
   3.5 Tape identity and splice perforating
   3.6 Circuit control and keys
   3.7 Lamps
5. General method of operation
   5.1 Description of sorting
      5.11 Automatic operation
   5.2 Order of sorting
      5.21 Message unit calls
      5.22 Toll, message unit detail and observing calls
6. Principal parts of sorter and relay functions
7. Key functions
8. Set-up switches
9. Description of apparatus
   9.1 Reader
   9.2 Perforator
10. Entries
   10.1 Message unit entries
   10.2 Summary entries
   10.3 Detail entries
   10.4 Tape identity entries
   10.5 Miscellaneous entries
   10.6 Code of punched holes
11. Perforating splice at start of output tapes
   11.1 Starting motor
   11.2 Inserting input tape
   11.3 Operating the start relays
   11.4 Starting the tape identity perforate circuits
   11.5 Perforating first line of splice pattern
   11.6 Perforator hold check
   11.7 Spreading first line of splice pattern on all tapes
   11.8 Perforating remaining splice lines
   11.9 Completion of splice on output tapes 12. Reading and checking tape identity on input tape
    12.01 Start
    12.02 Skipping splice
    12.03 End of splice
    12.04 Checking tape index
    12.05 Checking marker group
    12.06 Checking First Recorder switches
    12.07 Checking Last Recorder switches
    12.08 Checking office
    12.09 Checking thousands range
    12.10 Stepping tape section selector to initial position
    12.11 Skipping days of round
    12.12 Checking tape section and round
    12.13 Checking month
        12.131 General
        12.132 Current month
        12.133 Previous month
        12.134 Completion of month check
13. Perforating tape identity on leading end of output tapes
    13.01 Arranging to perforate tape index
    13.02 Spreading tape index
    13.03 Spreading marker group
    13.04 Spreading first recorder
    13.05 Spreading last recorder
    13.06 Spreading office
    13.07 Spreading thousands range
    13.08 Spreading days of round
    13.09 Spreading tape section and round
    13.10 Spreading month
14. Processing call entries
    14.1 Preparing for call entries
    14.2 Five-line entry
        14.21 First line
        14.22 Second line
        14.23 Third line
        14.24 Fourth line
        14.25 Fifth line
    14.3 Three-line entry
    14.4 Two-line entry
    14.5 One-line entry
15. End of one input tape and start of next input tape
    15.01 Checking tape identity at trailing end of tape
    15.02 Skipping skip splice entry and splice pattern
    15.03 End of input tape
    15.04 Starting new tape
    15.05 Checking tape index
        15.051 General
        15.052 New tape index same as previous tape index
        15.053 Tape index 17 follows tape index 11
        15.054 Tape index 17 follows tape index 12
        15.055 Tape index 18 follows tape index 13
        15.056 Tape index 13 follows tape index 18
    15.06 Checking marker group first and last recorder, office and thousands range
    15.07 Resetting tape section selector
        15.071 General
        15.072 Tape index 17 follows tape index 11
        15.073 Tape index 17 follows tape index 12
    15.08 Skipping days of round
    15.09 Checking tape section and round
        15.091 General
        15.092 Tape section agrees with selector
        15.093 Tape section is one greater than selector
        15.094 Last tape section
    15.10 Checking month
16. End of last input tape
    16.1 Checking tape identity
    16.2 Tape runs out
    16.3 Perforating tape identity at trailing end of output tapes
    16.4 Perforating skip splice entry and splice pattern at trailing end of output tapes
    16.5 Restoring circuit
    16.6 Stopping motor
    16.7 Automatic sorting
        16.71 General
        16.72 Units sort
        16.73 Tens sort
        16.74 Hundreds sort
        16.75 Thousands sort
        16.76 Assembly sort
17. Window splice in input tape
    17.1 Skipping skip window entry
    17.2 Skipping splice pattern
    17.3 Skipping second skip window entry
18. Window splice in output tape
    18.1 General
    18.2 Skip window entries
    18.3 Stopping the circuit for window splice
    18.4 Starting the circuit
    18.5 Perforating first line of window
    18.6 Perforating subsequent lines of window
    18.7 Perforating last line window
    18.8 Release of circuit after window splice
19. Regular release
    19.1 Registering release signal
    19.2 Awaiting stopping point
    19.3 Stopping the circuit and releasing
20. Starting after regular release
    20.1 Starting motor
    20.2 Starting circuit
    20.3 Stopping motor when circuit is not running
21. Timing circuits
    21.1 Short timer
    21.2 Long timer
    21.3 Automatic operation timer
22. Alarm
    22.1 Operation of alarm relays
    22.2 Functions of alarm relays
    22.3 Alarm cut-off
    22.4 Releasing after alarm
    22.5 AL relay fuse blows
23. Master release
24. Tape section reset and release
25. Reader step check
    25.1 Alternate line contacts
    25.2 G1 contact is closed initially
    25.3 G2 contact is closed initially
    25.4 Reader step failure
    25.5 Prevention of RSF alarm when end of tape key is operated
26. RS- relay release check
27. Manual reader step
28. Perforating mutilated line
29. Mutilated tape identity
    29.1 Mutilated tape identity at start of first tape
    29.2 Mutilated tape identity during run
30. Emergency reset
31. Lamps
    31.1 Lamps under control of reader lamps key
    31.2 Lamps under control of maintenance key
    31.3 Lamps not under key control Relay index 1. *Purpose of circuit*

1.1 This circuit is for use in the sorting operations of the AMA system in the accounting center.

1.2 The circuit is used to process message unit, toll, message unit detail and observing tapes from the computer and to sort the calls into numerical order by the directory numbers of the calling subscribers. Message unit summary tapes from the summarizer may be introduced into the sorting of message unit tapes from the computer to include all message unit calls from the beginning of the billing month in the output.

3. *Circuit functions*

*3.1 Tape processing*

3.101 To sort message unit tapes for one round from the computer, which may have sorted them by office, thousands or units, to produce a tape containing message unit calls for the round, in numerical order of the directory numbers of the calling subscribers.

3.102 To sort message unit tapes, as described in 3.101, combining them with the summary tape for the previous round from the summarizer, to produce a record of calls in numerical order of the directory numbers of the calling subscribers, the list for each subscriber to contain the total message units for the previous round in the billing month, plus the individual calls for the round being processed.

3.103 To sort toll, message unit detail and observing tapes from the computer to produce for each type of tape a record of calls in numerical order of the directory numbers of the calling subscribers.

3.104 To read one-line entries on the message unit tape, representing calls of from 1 to 9 local message units and to reperforate each entry unchanged on one of ten output tapes, sorting by the TH, H, T or U digit of the directory number, as required.

3.105 To read and reperforate two-line entries on the message unit tape, representing from 10 to 99 local message units or from 1 to 99 extended area message units, in the same manner as in 3.104.

3.106 To read two-line entries on the message unit tape, representing summaries of local area message unit calls and to reperforate each entry unchanged on one of ten output tapes, sorting by the TH, H or T digit of the directory number, as required.

3.107 To read two-line entries on the summary tape, representing summaries of local area message unit calls and to reperforate each entry unchanged on one of ten output tapes, sorting by the T or U digit of the directory number, as required.

3.108 To read and reperforate three-line entries on the message unit tape, representing combined summaries of local area and extended area message unit calls in the same manner as in 3.106. This is an optional feature.

3.109 To read and reperforate three-line entries on the summary tape, representing combined summaries of local area and extended area message unit calls in the same manner as in 3.107. This is an optional feature.

3.110 To read five-line entries on the toll, message unit detail and observing tapes and to reperforate each entry unchanged on one of ten output tapes, sorting by the calling office digit or the TH, H, T or U digit of the directory number, as required.

3.111 To read and reperforate five-line entries on the observing tape, representing unanswered observing calls, in the same manner as in 3.110.

3.2 Call entry sorting 3.201 To select one of the ten perforators, depending upon information in the setup switches and in the first line of the entry.

3.202 To perforate the supplementary lines of each entry on the same output tape as the initial line.

3.203 To determine the number of lines in the entry from the first line.

3.204 To count the lines in an empty and block if too few or too many are received.

3.205 To block if the A digit on the input tape is anything other than 0, 1, 2 or all three.

3.206 To block if the B, C, D, E or F digit on the input tape has more or less than two holes perforated.

3.207 To block if the A digit perforating magnets are operated in any combination other than 0, 1, 2 or all three.

3.208 To block if the B, C, D, E or F digit perforating magnets are operated in any other combination than two per digit.

3.209 To block if the perforator advance magnet is not energized when required.

3.210 To hold the perforator advance magnet from releasing if the perforator magnets are operated in an improper combination.

3.211 To check the path for holding the magnet, as described in 3.210, at the start and end of each run.

3.212 To block if the reader fails to step when it is required to.

3.213 To block if the reader steps falsely.

3.214 To prevent processing call entries unless splice pattern was applied to the output tapes and tape identity was checked and perforated initially.

3.215 To prevent processing call entries after receipt of tape identity at the trailing end of an input tape section until tape identity at the leading end of the next input tape section has been checked.

3.216 To check that each entry is perforated on only one perforator.

3.217 To check that only one perforator advances at a time.

3.3 Splice skipping 3.301 To skip splice at the start of the first input tape when the Machine Start key is operated if splice pattern has been applied to the output tapes and the A digit being read is 0.

3.302 To skip splice at the start of subsequent input tapes (where input tapes are not spliced together) when the Machine Start key is operated to provided the A digit being read is 0.

3.303 To skip splice at the end of input tapes provided a skip splice entry has been received.

3.304 To skip splice at the start of input tapes (where input tapes are spliced together) provided a skip splice entry has been received at the end of the preceding tape.

3.305 To skip window splice following receipt of a skip window entry.

3.306 To pass by a skip splice entry and prepare to skip splice.

3.307 To pass by a skip window entry not preceded by splice pattern and prepare to skip splice.

3.308 To stop skipping whenever an A digit other than 0, a B digit other than 8, an E digit other than 1 or an F digit other than 0 is received.

3.309 To pass by a skip window entry following a window splice and resume regular operation.

3.310 To block if splice pattern is not followed by tape identity or a skip window entry.

3.4 Tape identity checking 3.41 To read tape identity entries at each end of each input tape and check them against the setup switches, as follows:

3.4101 Tape index

| Input Tape Index | Switches | |
|---|---|---|
| | Tape Type | Sort |
| 11 | Mess. Unit | Thous. First. |
| 11 | do | Units. |
| 11 | MU & Summ | Do. |
| 12 | Mess. Unit | Do. |
| 12 | MU & Summ | Do. |
| 13 | Mess. Unit | Tens. |
| 13 | MU & Summ | Do. |
| 14 | Mess. Unit | Hunds. |
| 15 | do | Thous. Last. |
| 17 | Summary | Units. |
| 17 [1] | MU & Summ | Do. |
| 18 [2] | do | Tens. |
| 20 | Toll | Cent. Office. |
| 21 | do | Thous. First. |
| 21 | do | Units. |
| 22 | do | Do. |
| 23 | do | Tens. |
| 24 | do | Hunds. |
| 25 | do | Thous. Last. |
| 30 | MU Det | Cent. Office. |
| 31 | do | Thous. First. |
| 31 | do | Units. |
| 32 | do | Do. |
| 33 | do | Tens. |
| 34 | do | Hunds. |
| 35 | do | Thous. Last. |
| 40 | Observ | Cent. Office. |
| 41 | do | Thous. First. |
| 41 | do | Units. |
| 42 | do | Do. |
| 43 | do | Tens. |
| 44 | do | Hunds. |
| 45 | do | Thous. Last. |

NOTE:
[1] Tape index 17 must follow a tape index 11 or 12.
[2] Tape index 18 must follow a tape index 13.

3.4102 Marker group

To check the marker group entry of all input tapes against the Marker Group switches.

3.4103 First Recorder

To check the First Recorder switches off-normal on office and first thousands sorts, and off on units, tens, hundreds and second thousands sorts.

3.4104 Last recorder

To check the Last Recorder switches off-normal on office and first thousands sorts, and off on units, tens, hundreds and second thousands sorts.

3.4105 Office (a) To check the Cent Office switch off on office sort.
(b) To check the office entry of all input tapes against the Cent Office switch on all sorts except office.

3.4106 First thousands (a) To check the Thousand First switch off on office and first thousands sorts.
(b) To check the Thousand First switch off-normal on units sort.
(c) To check the first thousands digit of the thousands range entry against the Thousand First switch on units sort of all tapes, on a message unit tape combined with a summary tape in tens sort, and on a tens sort of a message unit tape from the computer.
(d) To check the first thousands digit of the thousands range entry of all input tapes against the Thousand First switch on tens, hundreds and second thousands sorts, except tens sort of a message unit tape from the sorter.

3.4107 Last thousands (a) To check the Thousand Last switch off on office and first thousands sorts.
(b) To check the Thousand Last switch off-normal on units sort.
(c) To check the last thousands digit of the thousands range entry against the Thousand Last switch on units sort of all tapes, on a message unit tape combined with a summary tape in tens sort, and on a tens sort of a message unit tape from the computer.
(d) To check the last thousands digit of the thousands range entry of all input tapes against the Thousand Last switch on tens, hundreds and second thousands sorts, except tens sort of a message unit tape from the sorter.

3.4108 To skip the input tape entry indicating first and last days of round.

3.4109 Tape section (a) To omit a tape section check on office and first thousands sorts.
(b) To omit a tape section check on units sort of message unit tapes which have not been sorted by thousands.
(c) To omit a tape section check on units sort of all toll, message unit detail and observing tapes which have not been sorted by thousands.
(d) To make a tape section check on units sort of all message unit, toll, message unit detail and observing tapes which have been sorted by thousands.
(e) To make a tape section check on units sort of all summary tapes.
(f) To make a tape section check on tens, hundreds and second thousands sorts of all tapes.
(g) To check, as covered in (d) and (e) above, that the tape section of the first tape agrees with the setting of the Thousand First switch, that each succeeding tape has a tape section equal to or one greater than the preceding tape, and that the tape section of the last tape agrees with the setting of the Thousand Last switch.
(h) To check, as covered in (f) above, that the tape section of the first tape is 0, that each succeeding tape has a tape section equal to or one greater than the preceding tape, and that the tape section digit of the last tape is 9. In the case of a combined tens sort of message unit and summary tapes the further check is made that tapes are processed in the order: MU tape 0, S tape 0, MU tape 1, S tape 1, . . . MU tape 9, S tape 9.

3.4110 Round (a) To check the round of all input tapes against the Round switch on all sorts except when making a combined units or tens sort of message unit and summary tapes.
(b) To check the round of all message unit tapes against the Round switch on combined units or tens sorts of message unit and summary tapes.
(c) To check that the round of all summary tapes is the round immediately preceding that set up on the Round switch on combined units or tens sorts of message unit and summary tapes.

3.4111 Month (a) To check the month entry of all input tapes against the Month switches on all sorts except when making a combined units or tens sort of message unit and summary tapes.
(b) To check the month entry of all message unit tapes against the Month switches on combined units or tens sorts of message unit and summary tapes.
(c) To check the month entry of all summary tapes against the Month switches on combined units or tens sorts of message unit and summary tapes except when the message unit tape is for round 0.
(d) To check that the month of all summary tapes is the month immediately preceding that set up on the Month switches on combined units or tens sorts of message unit and summary tapes when the message unit tape is for round 0.

3.42 To block if any of the nine lines of tape identity is missing, repeated, or in the wrong order, except that missing or repeated third, fourth or seventh lines will not cause the circuit to block.

3.43 To block if any item of the tape identity group does not check.

3.44 To block if the tape identity group is missing from the beginning of any input tape.

3.5 Tape identity and splice perforating 3.501 To perforate splice pattern at the start of all output tapes under control of the End-of-Tape key.

3.502 To block if perforation of one line of splice pattern on all perforators is not completed within 2.1 seconds (nominal).

3.503 To stop perforating splice when the End-of-Tape key is released.

3.504 To perforate nine tape identity entries on all output tapes following splice pattern provided the tape identity entries at the start of the input tape have been checked. These entries are perforated as follows:

3.50401 Tape index

| Tape Type Switch | Sort Switch | | | | | |
|---|---|---|---|---|---|---|
| | Off. | 1-TH | U | T | H | 2-TH |
| Summ | | | 18 | | | |
| MU & Summ | | | 13 | 14 | | |
| Mess. Unit | | 12 | 13 | 14 | 15 | 16 |
| Toll | 21 | 22 | 23 | 24 | 25 | 26 |
| Mess. Unit Det | 31 | 32 | 33 | 34 | 35 | 36 |
| Observing | 41 | 42 | 43 | 44 | 45 | 46 |

3.50402 Marker group

Marker group is perforated as set up on the Marker Group switches.

3.50403 First recorder (a) First recorder is perforated as set up on the First Recorder switches on office and first thousands sorts.

(b) 90 is perforated for first recorder on units, tens, hundreds and second thousands sorts.

3.50404 Last recorder (a) Last recorder is perforated as set up on the Last Recorder switches on office and first thousands sorts.

(b) 90 is perforated for last recorder on units, tens, hundreds and second thousands sorts.

3.50405 Office (a) Office is perforated on office sort to indicate the office of each output tape.

(b) Office is perforated on all output tapes as set up on the Cent Office switch for all sorts except office.

3.50406 First thousand (a) 9 is perforated for first thousands on office, first thousands and second thousands sorts.

(b) First thousands is perforated as set up on the Thousand First switch on units, tens and hundreds sorts.

3.50407 Last thousand (a) 0 is perforated for last thousands on office, first thousands and second thousands sorts.

(b) Last thousands is perforated as set up on the Thousand Last switch on units, tens and hundreds sorts.

3.50408 Days of round 00 is perforated for the days of round entry.

3.50409 Tape section

The tape section perforated on each output tape agrees with the digit by which the tape was sorted.

3.50410 Round

Round is perforated as set up on the round switch.

3.50411 Month

Month is perforated as set up on the Month switches.

3.505 To stop the reader on the last of the nine lines of the tape identity group at the start of the input tape while perforating tape identity.

3.506 To block if perforation of nine lines of tape identity is not completed within 9.2 seconds (nominal).

3.507 To perforate nine tape identity entries, as described in 3.503, a skip splice entry and splice pattern at the end of all output tapes, under control of the End-of-Tape key. The key is effective only under the following conditions:

(a) *Office and first thousands sorts.*—Tape identity checked and perforated initially, tape identity checked at trailing end of tape, no skip window splice entry received, circuit not operating.

(b) *Units sort.*—Message unit, toll, message unit detail or observing tapes not sorted by thousands: tape identity checked and perforated initially, tape identity checked at trailing end of tape, no skip window splice entry received, circuit not operating.

Combined message unit and summary; tape identity checked and perforated initially, tape identity checked at trailing end of tape, no skip window splice entry received, circuit not operating, all message unit and summary tapes received. Message unit, toll, message unit detail or observing tapes sorted by thousands: tape identity checked and perforated initially, tape identity checked at trailing end of tape, no skip window splice entry received, circuit not operating, all tapes received. Summary tape alone: tape identity checked and perforated initially, tape identity checked at trailing end of tape, no skip window splice entry received, circuit not operating, all tapes received.

(c) *Tens, hundreds and second thousands sorts.*—Tape identity checked and perforated initially, tape identity checked at trailing end of tape, no skip window splice entry received, circuit not operating, all tapes received.

3.508 To perforate all nine tape identity entries and skip splice signal before stopping if the End-of-Tape key is released before the circuit begins to perforate splice pattern.

3.509 To block if perforation of nine tape identity entries and skip splice signal is not completed with 9.2 seconds (nominal).

3.510 To stop perforating splice when the End-of-Tape key is released during perforation of splice pattern.

3.511 To block when any perforator encounters a window or end of tape. Circuit will complete a call entry or a set of tape identity entries before stopping.

3.512 To perforate a skip window entry, approximately 40 lines of splice pattern and a second skip window entry on any output tape under control of a Window Splice 0–9 key, provided the perforator window signal was received when the End-of-Tape key was normal.

3.513 To perforate approximately 40 lines of splice pattern, not preceded by or followed by skip window entries, on any output tape under control of a Window Splice 0–9 key, provided the perforator window signal was received when the End-of-Tape key was operated.

3.6 Circuit control and keys 3.601 To start the motor by means of a Motor Start key, if the alarm is not in.

3.602 To stop the motor at any time by means of the Emerg. Motor Stop key.

3.603 To stop the motor when the circuit blocks.

3.604 To stop the motor after tape identity and splice have been perforated at the completion of a run.

3.605 To start the motor when the Perforate Line key is operated.

3.607 To rotate the reader drum continuously under control of the Tape Feed key on the reader when the motor is running and the circuit is not operating.

3.608 To permit the Tape Feed key to be used to feed tape into the reader while the circuit is perforating splice pattern at the start of the output tapes.

3.609 To permit the Tape Feed key to be used to run tape out of the reader while the circuit is perforating tape identity, skip splice entry and splice pattern at the end of the output tapes.

3.610 To start the sorting process by means of the Machine Start key provided splice pattern has been applied to the output tapes, the motor is running, there is no alarm, there is no perforator window contact closed, and the reader is not on a supplementary line of an entry.

3.611 To synchronize the relay circuit with the reader when starting.

3.612 To stop under control of the Machine Release key upon completion of an entry, window splice skipping or the tape identity functions.

3.613 To stop immediately and release the circuit completely, except for the tape section (TD) selector, upon simultaneously operating the Machine Release and the Master Release keys.

3.614 To restore the tape section (TD) selector when the End-of-Tape key is operated at the start or end of a run.

3.616 To block if the input tape runs out of the reader.

3.617 To block if a fuse blows.

3.618 To time out and block if the circuit is unsuccessful in several attempts to read a line of the input tape.

3.619 To time out and block if the circuit is unsuccessful in several attempts to perforate a line on an output tape.

3.620 To cancel the short time-out feature and start the long timer while reading the thousands range entry to allow time for stepping the tape section (TD) selector.

3.621 To block if the RS- relays remain operated more than approximately 0.25 second, except when skipping.

3.622 To light the ALM lamp on the face of the sorter whenever the circuit blocks.

3.623 To light a Machine Pilot lamp whenever the circuit blocks.

3.624 To signal the alarm circuit to sound an audible alarm whenever the circuit blocks.

3.625 To silence the audible alarm and extinguish the Machine Pilot lamp by means of the Alarm Cut-Off key.

3.626 To release the circuit after an alarm by means of the Machine Release key.

3.627 To step the tape section (TD) selector by means of the Tape Section Reset key provided the circuit is not operating or has blocked and the Reader Lamps key is operated.

3.628 To restore the tape section (TD) selector by means of the Tape Section Release key provided the circuit is not operating or has blocked and the Reader Lamps key is operated.

3.629 To step the reader one line at a time by means of the Reader Step key, provided the motor is running, the Reader Lamps key is operated and the circuit is not operating.

3.630 To perforate, by means of the Perforate Line key, any supplementary line of an entry exactly as it appears on the input tape when the circuit has blocked because the line on the input tape has too few or too many holes.

3.631 To simulate a check of tape identity by stepping the reader with the Reader Step key to the first line following the tape identity group, operating the Tape Identity button and the Machine Start key.

3.632 To restore the circuit to operating condition after a power failure by operating the Emerg. Reset button.

3.7 Lamps 3.701 To read a line on the input tape by means of twenty-eight lamps, under control of the Reader Lamps key.

3.702 To indicate the position of the reader cam shaft by means of the Reading Position lamp under control of the Reader Lamps key.

3.703 To indicate the position of the tape section (TD) selector by means of the Tape Section 0–9 lamps under control of the Reader Lamps key.

3.704 To indicate the number of lines in a call entry by means of the Type of Entry (2 line), (3 line), (5 line) lamps under control of the Reader Lamps key.

3.705 To indicate on which line of an entry the circuit blocked by means of the Line of Entry 1–5 lamps under control of the Reader Lamps key.

3.706 To indicate when the circuit is checking tape identity by means of the Tape Ident. lamp under control of the Reader Lamps key, if the circuit has blocked.

3.707 To indicate when the circuit is perforating tape identity by means of the Perf. Tape Ident. lamp, if the circuit has blocked.

3.708 To indicate on which perforator an entry is being perforated by means of the Perforator in Use 0–9 lamps under control of the Maint. key when the circuit is blocked.

3.709 To indicate which perforating magnets are energized by means of twenty-eight lamps under control of the Maint. key when the circuit has blocked.

3.710 To indicate when the last tape section of a run is being processed by means of the Last Section lamp.

3.711 To indicate when the circuit is off-normal (but not necessarily operating) by means of the Master Off-Normal lamp.

3.712 To indicate when the circuit is operating by means of the Off-Normal lamp.

3.713 To indicate which perforator has encountered a window or end of tape by means of the Window Splice 0–9 lamps.

3.714 To indicate the completion of window splice perforation by means of the Perf. Compl. lamp.

3.715 To indicate a blown fuse by means of the Fuse Alarm lamp.

3.716 To indicate that the reader overstepped or failed to step by means of the Rdr. Stp. Fail lamp.

3.717 To indicate that the circuit blocked for some reason other than a blown fuse or a reader step failure by means of the Gen. Alarm lamp.

3.718 To indicate that the circuit was skipping splice when it blocked by means of the Skip Splice lamp, under control of the Reader Lamps key.

3.719 To indicate that the RS- relays have been operated for more than 0.25 second (nominal) by means of the Rdr. Stp. Hold lamp.

DESCRIPTION OF OPERATION

5. General method of operation

5.1 Description of sorting operation

After the set-up switches have been set for the particular sort to be made the reader motor is started by operating the Motor Start key. The End-of-Tape key is then operated to perforate splice pattern at the beginning of the ten output tapes. At the same time the input tape is fed into the reader. When sufficient splice has been perforated the End-of-Tape key is released and the Machine Start key is operated. The sorter skips the splice pattern at the start of the input tape, reads and checks the tape identity information on the input tape against the set-up switches, and then perforates tape identity information on all ten output tapes. It then proceeds to read each call entry and to reperforate it on one of the output tapes. The output tape selected depends upon the value of the digit of calling subscriber's directory number by which the tape is being sorted. At the end of the first section of input tape the circuit again encounters tape identity which it checks. It then skips the splice which follows and proceeds to the next section of input tape (if the tapes are spliced together). It again checks tape identity, sorts call entries, and checks tape identity, and proceeds to the next section. The circuit stops at the end of the last section of input tape and sounds an alarm to call the operator. The operator releases the circuit with the Machine Release key, starts the motor, and operates the End-of-Tape key. This causes the circuit to perforate tape identity information on all output tapes, followed by a skip splice signal and splice pattern. When sufficient splice pattern has been perforated the End-of-Tape key is released and the entire circuit releases. The input tape is run out of the reader while the circuit is perforating tape identity and splice. The operator presses the Tape Cutter button to cut the output tapes. If the sections of input tape are not spliced together the circuit sounds the alarm at the end of each section. The operator operates the Machine Release key, starts the motor, runs out the old section of tape, feeds in the next section, and operates the Machine Start key.

5.11 Automatic multiple sorting

After the set-up switches have been set, in this instance particularly to undertake the automatic multiple sorting operation wherein the sort switch is placed in its eighth or AMS position, the reader motor start circuit is activated by the operation of the Motor Start key. The End-of-Tape key is then operated to perforate splice pattern at the beginning of the ten output tapes. After a sufficient length of leading end of these output tapes has been prepared with the splice pattern code, these ends are each fed into the associated reader. In the case of the No. 0 reader the tape from the computer which is to be the input tape has its leading end fed into the No. 0 reader and its trailing end spliced to the prepared end of the output tape from the 0 recorder. Thereafter, the Machine Start key is operated. The sorter skips the splice pattern at the start of the input tape, reads and checks the tape identity information on the input tape against the set-up switches and then perforates tape identity on all ten output tapes. It then proceeds to read each call entry on this input tape to the No. 0 reader and to reperforate these call entries on the various perforators in accordance with the units digit of the calling line numbers in such entries. There will be but a single section on the input tape since this is an office sorted tape from the computer and each office tape is separately processed. When all of the call entries have been read by the reader and reperforated on the ten output tapes the reader again checks the tape identity at the end of which it encounters the skip splice code 2860XX. This operates the 286 relay which in this instance causes several operations: (a) the release of the tape section selector so that on the next operation the No. 0 reader will again be the first effective one to be used and (b) the operation of the rotary magnet of the sort class connector so that the following sorting operation will be carried out in accordance with the tens digit of the calling line numbers. Thereupon the sorting operation will be carried out anew. The tape identity codes on the No. 0 tape will be read, the call entries therein read and distributed to the various perforators and finally after the tape identity codes have been read at the trailing end of this section the 286 code will be encountered and the tape section selector will be operated to advance the circuit to cause the No. 1 perforator to be placed in operation. In this manner each of the readers 0 to 9, inclusive, will be operated each in turn reading the call entries and distributing them to the various perforators in accordance with the tens digit of the calling line number. At the end of this operation, when the 286 code is encountered at the trailing end of the tape in the No. 9 reader, the tape selection circuit will be released to start the next operation again with the No. 0 reader and the sort class connector switch will be advanced to the position wherein the sorting will be in accordance with the hundreds digit.

The hundreds sort is then accomplished in the same manner with only a single difference. This is that at the end of the hundreds sort an automatic operation will take place to cut the tape issuing from the No. 0 perforator so that there will be left in the associated 0 reader the tape bearing the hundreds sort but the tape issuing from the 0 perforator will be free and not threaded into the associated reader. Thereupon the thousands sort will take place in the usual manner, the tape from the 0 perforator running free while the tapes from the No. 1 to No. 9 perforators will still be fed into their associated readers. At the end of the thousands sort the tape from the 0 perforator, therefore, contains all the call entries having 0 in their thousands digit. Thereupon the assembly operation will take place. This operation will start with the No. 1 reader since it is unnecessary to reread the call entries on the 0 tape. The various readers will thereafter read in sequence so that the tape issuing from the 0 perforator will have ten sections recorded therein, the first section having all call entries with 0 in their thousands digit, the second section having call entries with 1 in their thousands digit and the last section having call entries with 9 in their thousands digit. When the 286 code from the last tape in the No. 9 reader is encountered the automatic operation will be finished. The operator may then cause a certain minimum number of splice code patterns to be recorded after which she may cut all ten tapes through an operation of the tape cutting key. There will be but a single output tape, that coming from the 0 perforator which will now contain ten sections but otherwise being a duplicate of the incoming tape with the call items properly sorted.

5.2 Order of sorting

5.21 Message unit calls

5.211 Office being processed is not only one in marker group, and business of office is to much for one sorter (a) When the computer processes calls of a marker group containing more than one office, message unit calls are sorted by office in the computer, which makes as many message unit tapes as there are offices. The tape for a particular office is then processed in the sorter to arrange the calls in directory number order. If desired the sorting may be expedited by using more than one sorter simultaneously. To do this the tape from the computer is first sorted by the thousands digit of the directory number in one sorter, producing ten output tapes. These output tapes may be divided into several groups and fed into several sorters for the remainder of the sorting process. For example, tapes 0 to 4 may be processed in one sorter and tapes 5 to 9 in another. Any other grouping may be used as long as each group consists of consecutive thousands arranged in numerical order. In the example above the group of tapes consisting of 0 to 4 would be sorted next by units, then by tens, hundreds, and finally by thousands again. The output from the last sort would then be five tapes, the first containing calls from directory Nos. 0000 to 0999; the second, 1000 to 1999, etc. The 5 to 9 group of tapes would be similarly sorted in another sorter.

(b) If the tapes from the first thousands sort are divided into individual thousands, the second thousands sort is omitted in each sorter which is processing calls for only one thousand.

(c) The process described above applies only to the end of the first round of billing month. At the end of each subsequent round in the billing month the summary of all calls for previous rounds in the same billing month is introduced into the sorter so that the output tapes contain for each directory number both the total for previous rounds and the individual calls for the latest round.

(d) To accomplish this the summary tape from the summarizer for the particular office being processed is fed into the sorter immediately following the message unit tapes during units sort. The summary tape must first be divided into separate thousands or groups of thousands in the same manner as the message unit tapes.

5.212 Office being processed is not only one in marker group, and business of office can be handled by one sorter (a) This case is similar to 5.211 except that since it is not necessary to separate the tape from the computer to process it in more than one sorter, the first sort by thousands can be omitted. The tape from the computer is fed into one sorter where it is sorted by units, tens, hundreds and thousands. In the event that all the directory numbers in the office are in the same thousand, the thousands sort is omitted.

(b) At the end of each round except the first in the billing month, the summary tape is introduced as described in 5.211(d). The complete summary tape is fed into the sorter without being split.

5.213 Office being processed is only one in marker group, and business of office is too much for one sorter (a) When the computer is processing calls of a marker group containing only one office, message unit calls are sorted by either thousands or units. In case it is desired to use more than one sorter, the computer makes first thousands sort, producing ten output tapes, one for each thousand. These tapes are divided into groups as described in 5.211 (a) and fed into several sorters. Each sorter makes units, tens, hundreds and thousands sorts. If the tapes from the computer are divided into individual thousands, the second thousands sort is omitted in each sorter which is processing calls for only one thousand.

(b) At the end of each round except the first in the billing month the summary tape is introduced as described in 5.211(d).

5.214 Office being processed is only one in marker group, and business of office can be handled by one sorter (a) In this case the computer sorts the message unit calls by units. The ten output tapes form a single input tape for the sorter which sorts them by tens, hundreds and thousands. The thousands sort is omitted in the event that all the directory numbers in the office are in the same thousand.

(b) Since the sorter does not make a units sort of the message unit tapes in this case, the summary tape must be introduced at the tens sort. Before this is done the summary tape for the previous round is sorted by units in the sorter, producing ten sections of summary tape. These sections are introduced into the tens sort in such a way that each of the ten sections of message unit tape from the computer is followed by the corresponding section of summary tape. Thus, message unit tape 0 is fed in first, then summary tape 0, then message unit tape 1, then summary tape 1, etc.

5.22 Toll, message unit detail, and observing calls

5.221 Office being processed is not only one in marker group, and business of office is too much for one sorter The computer does not sort toll, message unit detail and observing calls. It produces one tape for each of these classes. Each of these tapes is then processed separately in the sorter. If the marker group contains more than one office, therefore, the sorter must sort the tape by office, producing one output tape for each office. The output tape for the particular office whose calls are being processed is then sorted further in the sorter to arrange the calls in directory number order. If it is desired to expedite the sorting process the sorter is arranged to sort the tape by thousands. The output tapes from this sort may then be divided into several groups and fed into several sorters for the remainder of the sorting process. For example, tapes 0 to 4 may be processed in one sorter and tapes 5 to 9 in another. Any other grouping may be used as long as each group consists of consecutive thousands arranged in numerical order. In the example above, the group of tapes consisting of 0 to 4 is sorted next by units, then by tens, then by hundreds, and finally by thousands. The output from this last sort is then five tapes, the first containing calls for directory No. 0000 to 0999;

the second, 1000 to 1999, etc. If the tapes from the first thousands sort are divided into individual thousands, the second thousands sort is omitted in each sorter which is processing calls for only one thousand.

*5.222 Office being processed is not only one in marker group, and business of office can be handled by one sorter*

This case is similar to 5.221 except that the first thousands sort is omitted. The tape from the computer is sorted by office first, and the output tape for a particular office is next sorted by units, then by tens, hundreds and thousands. The thousands sort is omitted in the event that all the directory numbers in the office are in one thousand.

*5.223 Office being processed is only one in marker group, and business of office is too much for one sorter*

In this case the tape from the computer requires no office sort. It is, therefore, sorted by thousands in the sorter, after which it may be divided into groups for simultaneous sorting by more than one sorter. Each such group is sorted next by units, tens, hundreds and thousands, except that the second sort by thousands is omitted in any sorter which is processing calls for only one thousand.

*5.224 Office being processed is only one in marker group, and business of office can be handled by one sorter*

In this case neither office nor first thousands sort is required. The tape is sorted in the sorter by units, tens, hundreds and thousands. In the event that all the directory numbers in the office are in the same thousand, the thousands sort is omitted.

*6. Principal parts of sorter and relay functions*
*6.03 Reader*

Figure 12:
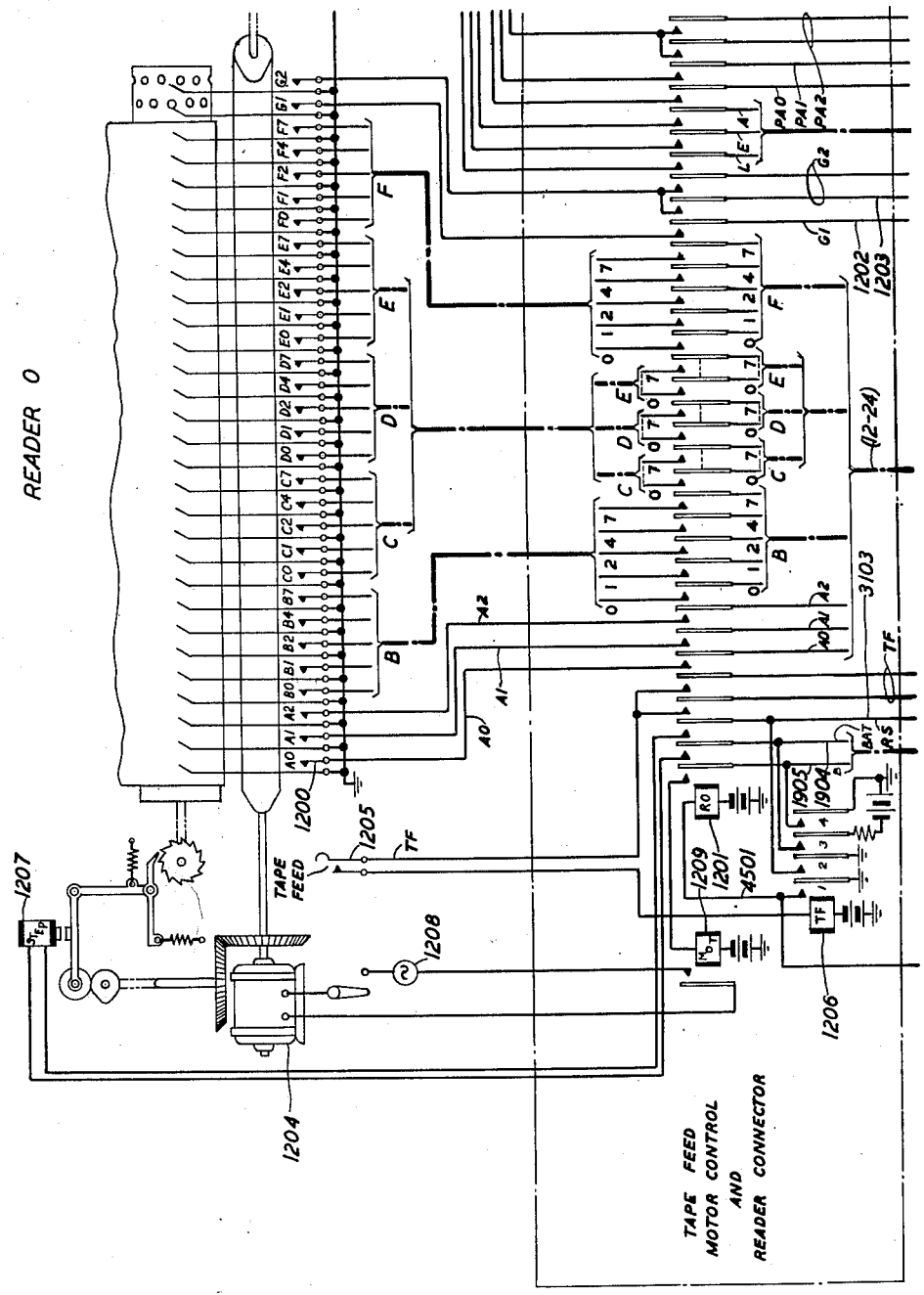
Figs. 12 and 13 show an indication of the reader 0 and the tape feed motor control and reader connector therefor.
Figure 13:
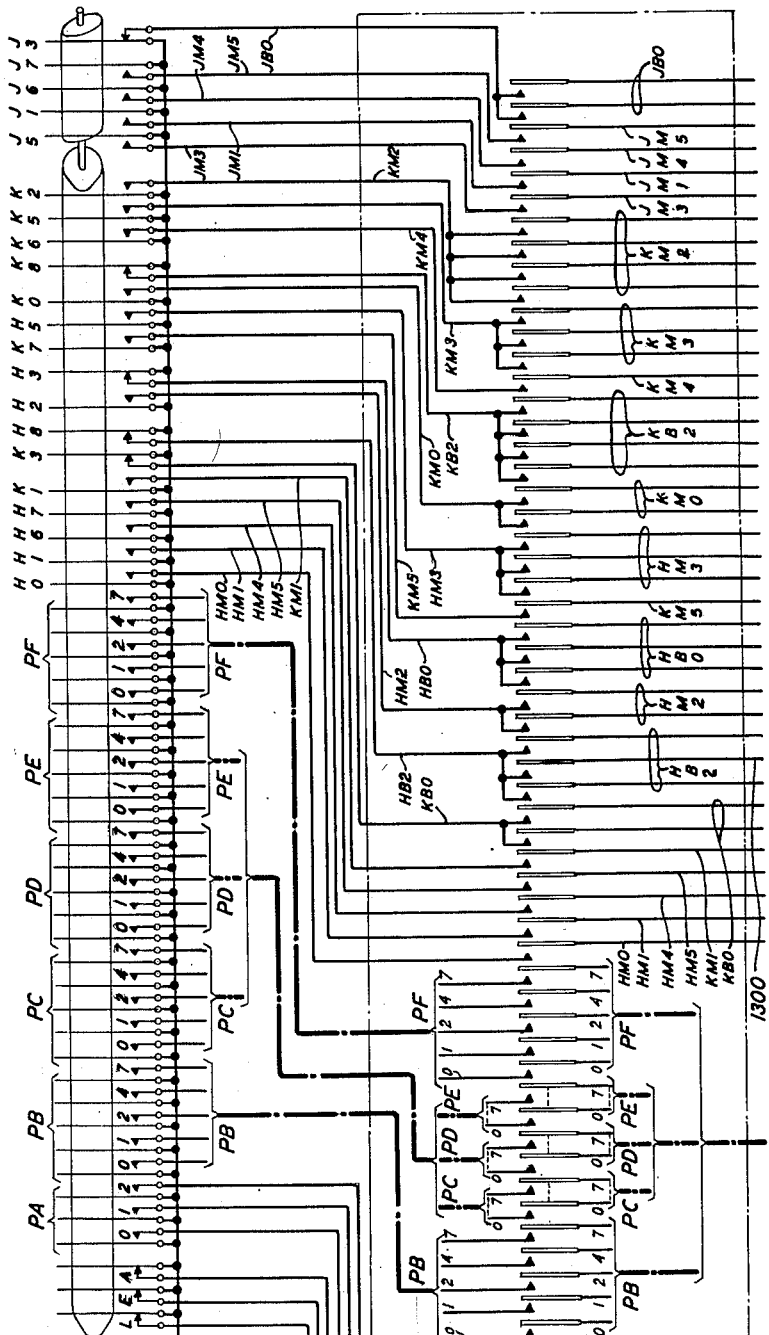

Figs. 12 and 13 contain the No. 0 reader which is described in 9.1.

*6.04 Fig. 21.—Reader step check*

Relays RW, RZ1, RZ2 and RZ3 form an alternate line counting circuit under control of the G1 and G2 contacts of the reader. They control relays RKA and RKB which keep the reading check lead CK closed and the reader step failure alarm lead RSF open unless the reader steps falsely or fails to step. CRK is used to cancel this check.

*6.05 Figs. 24 and 25.—Reader connector*

The RCA relay connects the reading contacts of the reader to the rest of the circuit when the input tape is being read, and opens these leads during perforation of splice and tape identity. RCD closes through certain of the leads to the reader control contacts.

*6.06 Fig. 20.—Off-normal and start*

MON is the master off-normal relay for the sorter. ST1, ST2, ST3 and ST3A are the start relays which synchronize the circuit with the reader when starting and serve as off-normal relays. RLS is the release relay, used in stopping the circuit. SPA, when operated, indicates that splice pattern has been applied to the output tapes. ER and ERA are used in connection with the Emerg. Reset key 4019 to start the circuit after a power failure.

*6.07 Fig. 36.—Reading relays "A" digit*

The A0, A1 and A2 relays are connected to the correspondingly designated reading contacts of the reader for reading the A digit on the input tape.

*6.08 Figs. 36, 37 and 38.—Reading relays "B" to "F" digits*

The B0, B1, B2, B4, B7, . . . F7 relays are connected to the reading contacts of the reader to read the B, C, D, E and F digits on the input tape.

*6.09 Fig. 39.—Reading relay translator*

The 28A, 28B and 28C relays are used when reading lines on the input tape where the A digit is 2 and the B digit is 8. PCA and PCB are provided to delay the circuit by one reader cycle after perforating tape identity and before processing call entries, to insure adequate time for certain relay operations.

*6.10 Fig. 33.—Reader line count*

LN2 and LN5 indicate the number of lines in call entries. LK1 is a locking relay which operates on the first line of all but one-line entries. LK2 is a similar relay which operates between the first and second lines of multiline entries. L2A, L2B, L3A, L3B, L4A, L4B and LLA are relays used to count lines of entries. L2A and L2B count the next to the last line, L3A and L3B count the third from the last line, and L4A and L4B count the fourth from the last line. LLA counts the last line.

*6.11 Fig. 21.—Reader step control*

RS1–3 and RS2–4 are operated when the reader is to be stepped. RS1–3 (odd) operates for approximately half the reader step operations, and RS2–4 (even) operates for the other operations. This is done to decrease wear on the relays. SR is used for stepping the reader manually.

*6.12 Fig. 48.—Perforate sort connector*

SC is the main sort conductor relay which connects contacts on the reading relays to the perforator during the processing of call entries, and disconnects them at other times to prevent backups. The individual OFS, THS, HS, TS and US relays are used on office, thousands, hundreds, tens and units sorts, respectively. BX is used when sorting by any digit other than the B digit (all sorts except office).

*6.13 Fig. 49.—Perforating magnet check "A" digit*

The KA0, KA1 and KA2 relays are used as series checking relays for the corresponding perforating magnets.

*6.14 Figs. 49, 55 and 61.—Perforating magnet check "B" to "F" digits*

The KB0, KB1, KB2, KB4, KB7, KC0, . . . KF7 relays are used as series checking relays for the corresponding perforating magnets.

*6.15 Figs. 49, 55 and 61.—Perforator connector*

Ten PA relays with suitable sets of contacts are provided to connect the perforators one at a time to the relay circuit.

*6.16 Fig. 62.—Perforator*

Fig. 62 contains the perforator, which is described in 9.2.

6.17 Fig. 54.—Perforator register

One of the PD0 to PD9 relays is operated on the first line of a multiline entry to serve as a register relay, causing the remainder of the entry to be perforated on the same output tape as the initial line.

6.18 Fig. 62.—Perforator advance check

The ten PK0 to PK9 relays are used as series checking relays for the perforator advance magnets.

6.19 Fig. 62.—Perforator hold check

PHK is operated while the first line of splice is being spread at the beginning of a run and while the skip splice entry is being perforated at the end of a run. It serves to initiate the perforator hold check. CKA, CKB, PHE and PH0 relays accomplish the perforator hold check.

6.20 Figs. 47 and 53.—Window splice perforate control

WSA and WSB are associated with the perforator window detecting contacts and lamps. WS is associated with the Window Splice keys. WS1A, WS1B, WS1D and WS2 prepare the circuit for perforating window splice. ME (manufactured entry) is operated for any lines to be perforated which are not copies from the input tape. FL operates during the first line of window splice, and CP1 and CP2 (change pattern) operate during the last line. ESP (end splice pattern) operates when the window splice perforation is complete.

6.21 Fig. 23.—Splice pattern timing

TTM activates the cold cathode tube timer for timing window splice perforating, tape section selector stepping, tape identity perforating and splice pattern perforating. When the tube fires it operates CTT.

6.22 Fig. 46.—Tape end perforate control

PSP (perforate splice) is operated by the End-of-Tape key 4008 at the start of a run, and PTI (perforate tape identity) is operated by the same key 4008 at the end. TE (tape end) operates both times.

6.23 Fig. 32.—Skip splice control

SK1, SK2, SKP and SKW control the splice skipping functions. ESK (end skip) operates to stop skipping. STT (start tape) is used to initiate skipping at the beginning of a tape.

6.24 Figs. 41 and 42.—Tape identity reading progress

L1, L1T, L1UA, L2, L5, L6, L8 and L9 are the relays which make connections to the set-up switches and to the reading relays for checking the lines of tape identity. L1 is used for checking the first line, L2 for the second, etc. L1UA and L1T are used for the first line when message unit and summary tapes are being processed together. CL1, CL2, CL5, CL6 and CL8 indicate that the corresponding lines of tape identity have been checked. TIC (tape identity checked) is operated when tape identity has been checked at the leading end of a tape section, to permit the circuit to process call entries. It is released when the initial line of tape identity has been checked at the trailing end of a tape section. TICA operates when tape identity is being read at the trailing end of a tape section. It is released when the circuit stops skipping.

6.25 Figs. 50, 51, 52, 56 and 57.—Set-up switches

The fourteen switches in these figures are used in preparing the sorter for a particular run. They are discussed in section 8.

6.26 Fig. 22.—Tape section register

The TD selector is used for counting input tapes during a run. It is brought into play by the FT1 and FT2 (first tape) relays initially, advanced by means of STD (step tape digit), and restored by RTD (restore tape digit). LTD is used to indicate that the last tape has been received. TDA furnishes ground for the tape section lamps during an alarm condition. TDS (tape digit step) prepares for stepping the selector. TK indicates an OK check of the tape digit after the switch is reset.

6.27 Fig. 31.—Tape identity perforate control

MTI and MTIA (mutilated tape identity) are associated with the Tape Ident. key 4018 for simulating a tape identity check. TIE and TIEA are operated after tape identity has been checked and perforated at the start of a run. TIS is the start and off-normal relay for tape identity and splice perforation.

6.28 Figs. 18 and 19.—Tape identity perforate progress.

PX allows a reader cycle to pass before perforating splice or tape identity to provide time for certain relay functions. W1 to W9, with auxiliary relay W2A, form a walking circuit used, in perforating tape identity, to walk from one line of identity to the next. WSP is part of the same chain, and operates prior to splice perforation. PL1 to PL9 control the perforating of the nine lines of tape identity. EP (end perforation) operates upon completion of these nine lines. PS1 is used for perforating the skip splice entry, PS2 for perforating splice pattern, and PS3 for perforating splice pattern and making the perforator hold check.

6.29 Fig. 58.—Entry spread control

A2S is a substitute for the A2 reading relay (Fig. 36) when splice and tape identity are being perforated. APA, APB-C and APD (all perforators) recycle the perforator walking circuit after each line of splice or tape identity has been spread. SS (skip step) takes the place of the RS– relays (Fig. 21) during splice and tape identity spreading, and advances the circuit without stepping the reader.

6.30 Figs. 59 and 60.—Entry spread progress

S1A to S9A and S0B to S9B form the walking circuit which progresses from one perforator to the next when spreading splice pattern and tape identity.

6.31 Fig. 17.—Alarm

AL and ALA are the alarm relays which, when operated, stop the circuit and signal the external alarm circuit. ALCO (alarm cut-off) restores these relays when the circuit is released. EAC (external alarm cut-off) silences the alarm under control of the Alarm Cut-Off key 4015. FAL is the fuse alarm relay. RSF operates if the reader fails to step or steps falsely. RSR times the RS– relays (Fig. 21) and operates RSH if the RS– relays remain operated too long. RSH brings in the alarm under this condition.

6.32 Fig. 17.—Alarm timing

The TM relay is a condenser-timed polarized relay used as the short timer.

6.33 Figs. 16 and 28.—Lamp connectors

PLA—D connects those which are under control of the Maint. key 4013. Connectors RLA, B, C, TDD connect lamps under control of the Reader Lamps key 4014. TI controls the Tape Ident. lamp. DS connects miscellaneous progress lamps.

6.35 Fig. 19.—Motor control

The MST and RLM relays control the starting and stopping of the reader motor. MRL is the master release relay. MST also provides battery to the reader Step magnet, such as 1207.

6.36 Fig. 23.—Perforate multilated line control

The PM1 and PM2 relays are under control of the Perforate Line key 4012 and are used to perforate a mutilated supplementary line of a call entry.

6.37 Fig. 34.—Tape identity sort connector

OFBA is operated on office sort, FTHA on first thousands sort, STHA on second thousands sort, HATHA (hundreds and thousands) on hundreds and thousands sorts, TA on tens sort and UA on units sort. They make the necessary interconnections in the tape identity checking circuit.

6.38 Fig. 43.—Tape index connector

These relays serve as additional contacts on the Tape Type switch (Figs. 50 and 56). MU is used for message unit tapes, MUS for summary tapes, MUAS for message unit and summary tapes together, DET for toll and message unit detail tapes, and OBS for observing tapes.

6.39 Figs. 29 and 30.—Tape index register

The MOC (month check) relay is used to check the tape identity month entry during a sort of message unit and message unit summary tapes combined. The remaining relays, 11A, 11B, 12A, 12B, 13A, 13B, 17A, 17B, 18A, 18B and 18C are used in checking tape indices 11, 12, 13, 17 and 18 as indicated by the numerals in the relay designations. X1A and X1B are for tapes 11, 21, 31 and 41.

6.40 Fig. 35.—Tape selection connector

The S0 to S9 relays, inclusive, operate to augment the capacity of the tape section selector represented by the step-by-step selector switch. These relays control the selective operation of the ten readers. The EC relay is used to connect the E digit reading relays to the selector.

6.41 Fig. 63.—Tape cutter

There is a tape cutter key 6305, etc. which when manually operated will switch ten condensers from their normally connected charging circuit to the ten tape cutter magnets associated with the ten perforators whereupon these condensers discharge into the cutter magnets and cause the tapes to be severed. An automatic operation is controlled from the control relay circuit (Fig. 44) to cause the tape cutter of the 0 perforator only to operate.

7. Key functions

7.01 Motor start

The Motor Start key 4000 is a non-locking key used to start the reader motor. It is operated before starting the sorter, either with the End-of-Tape key 4008 or the Machine Start key 4004. If the Perforate Line key 4012 is to be used the Motor Start key 4000 is not used, as the motor starts automatically.

7.02 Emerg. motor stop

The Emerg. Motor Stop key 4002 is a non-locking key used to stop the motor if the sorter must be stopped immediately because of a tape not feeding properly, or some serious mechanical difficulty. Normally the Machine Release key 4006 is used for stopping.

7.03 End of tape

The End-of-Tape key 4008 is a locking key which is used at the start and end of each run. At the start it is operated after the motor has been started, to perforate splice pattern on the output tapes. It is released when sufficient splice pattern has been applied. After the completion of the last tape of a run the circuit is released, the motor started and the End-of-Tape key 4008 again operated. This time it causes the perforation of tape identity, a skip splice entry and splice pattern. When sufficient splice pattern has been applied the key 4008 is restored.

7.04 Machine start

The Machine Start key 4004 is a non-locking key. It is used to start the sorter after splice pattern has been applied to the output tapes and after an input tape has been put into the reader. It is used to start the circuit whenever it has been stopped by the operation of the Machine Release key 4006. It is also used to start the circuit after it has blocked and after the Machine Release and Motor Start keys 4006 and 4000 have been operated. It is used to start the circuit following the application of window splice.

7.05 Machine release

The Machine Release key 4006 is a non-locking key which is used to stop the circuit during sorting. The circuit does not stop immediately, but waits until a proper stopping point is reached. The Machine Release key 4006 is also used after the circuit has blocked to release the circuit before it is started again.

7.06 Alarm cut-off

The Alarm Cut-Off key 4015 is a non-locking key used following an alarm to silence the bell and to extinguish the machine pilot lamp (Fig. 28).

7.07 Window splice 0–9

The ten Window Splice keys, of which key 4011 is the "0" key, are locking keys used to perforate splice pattern on the output tapes. After the circuit has blocked with one of the Window Splice lamps (such as lamp 2801) lit the Machine Release and Motor start keys 4006 and 4000 are operated and then the Window Splice key (such as key 4011) corresponding to the lamp is turned. When the perforation is complete the key 4011 is restored and the Motor Start and Machine Start keys 4006 and 4000 are operated.

7.08 Reader step

The Reader Step key 4020 is a non-locking key which is effective when the circuit is not operating and when the Reader Lamps key 4014 is operated. Each time key 4020 is operated the reader advances the tape one line.

7.09 Tape feed

The Tape Feed key 1205 is a push-button type key located on the reader (Fig. 12). Its operation causes the reader drum to rotate continuously. It is used for feeding tape into the reader and for running tape out of the reader.

7.10 Master release

The Master Release key 4005, a non-locking key, is ineffective when operated alone. When operated with the Machine Release key 4006 it releases all relays in the circuit, leaving only the TD selector (Fig. 35) off normal. This operation is used only if a run is stopped before completion, or if the circuit is inadvertently advanced off normal.

7.11 Perforate line

The Perforate Line key 4012, a non-locking key, is used when the sorter has stopped on a supplementary line of a call entry because of a mutilation in the input tape. Operation of this key 4012 will automatically start the motor, release the alarm, perforate the mutilated line as read and permit the circuit to proceed.

7.12 Tape section reset

The Tape Section Reset key 4017, non-locking, advances the TD selector (Fig. 35) one step for each operation provided the alarm is in or the circuit is not operating. It is used only if a tape in a series is missing. If the tape was accidentally omitted it cannot be fed into the reader out of turn without upsetting the sorting process.

7.13 Tape section release

The Tape Section Release key 4016, non-locking, restores the TD selector (Fig. 35) when an alarm is in or when the circuit is not operating. It can be used if, for some reason, the selector was not automatically restored to normal.

7.14 Tape ident.

The Tape Ident. key 4018 is a push-button mounted beneath a cover. If the tape identity portion of an input tape is mutilated the tape is stepped to the first line following tape identity. The Tape Ident. key 4018 is then operated, after which the circuit is started by means of the Machine Start key 4004.

7.15 Emerg. reset

The Emerg. Reset key 4019 is a push-button mounted beneath a cover. It is used following a power failure which occurred during processing to restore the necessary relays to permit the sorting to proceed. After its operation the circuit is started with the Machine Start key 4004.

7.16 Reader lamps

The Reader Lamps key 4014 is a locking key which may be operated at any time to read the input tape by means of reading lamps. In case the circuit blocks, the key is operated to light lamps indicating the number of lines in the call entry in process, the line of the entry on which the circuit blocked, the position of the TD selector (Fig. 35) and whether the circuit is checking tape identity or skipping.

7.17 Maint.

The Maint. key 4013 is a non-locking key which is used in case of trouble to light lamps indicating the perforator in use and the perforating magnets operated.

8. Set-up switches

8.01 General

Before a sorting process is started, the fourteen set-up switches on the panel of the machine must be set for the operation to be perforated.

8.02 Tape type

This switch has seven positions, as follows:

Off
   Summary
   MU and Summ
   Mess. Unit
   Toll
   MU Det.
   Observ.

The "Off" position is used only for maintenance purposes. The switch is set to one of the other positions depending upon the type of tape to be processed. Since the switch setting is not changed during a run, it must be set to "MU and Summ." whenever both message unit and summary tapes are to be sorted together on units or tens sort. The output tapes resulting from such a combined sort are treated as message unit tapes on subsequent sorts. The switch position designated "Summary" is used only on units sort for the summary tape which is to be combined with the message unit tape in tens sort.

8.03 Sort

The Sort switch has eight positions, as follows:

Off
   Cent. Office
   Thous. First
   Units
   Tens
   Hunds.
   Thous. Last
   Automatic Multiple Sort The "Off" position is used only for maintenance purposes. The other positions are used to control the directory number digit by which calls are to be sorted. The switch is set to "Thous. Last" for the thousands sort following hundreds sort, whether or not a first thousands sort was made.

8.04 Marker group tens and marker group units

Each of these two switches has an "Off" position, used only for maintenance purposes, and ten positions designated 0 to 9, only two having been shown on the indicator for the tens switch in Fig. 56. The switches are set for the marker group to which the office whose tapes are being processed belongs.

8.05 First recorder tens and first recorder units

Each of these two switches has an "Off" position. The First Recorder Tens switch has two other positions designated 0 and 1, and the First Recorder Units switch has ten other positions designated 0 to 9. On office and first thousand sorts these switches are set to indicate the lowest numbered recorder in the group of tapes being processed. On other sorts the switches are set to the "Off" position.

8.06 Last recorder tens and last recorder units

Each of these two switches has an "Off" position. The Last Recorder Tens switch has two other positions designated 0 and 1, and the Last Recorder Units switch has ten other positions designated 0 to 9. On office and first thousands sorts these switches are set to indicate the highest numbered recorder in the group of tapes being processed. On other sorts the switches are set to the "Off" position.

8.07 Cent. office

The Cent. Office switch has an "Off" position and ten positions designated 0 to 9. On office sort the switch is set to the "Off" position, and on all other sorts it is set to indicate the office whose tapes are being processed. Where the office is the only one in a marker group, it is arbitrarily called 0, and the switch is set to position 0.

8.08 Thousand first

This switch has an "Off" position and ten positions designated 0 to 9. On office and first thousands sorts the switch is set to the "Off" position. On all other sorts it is set to the lowest numbered thousands digit of directory number of the tapes being processed.

8.09 Thousand last

This switch has an "Off" position and ten positions designated 0 to 9. On office and first thousands sorts the switch is set to the "Off" position. On all other sorts it is set to the highest numbered thousands digit of directory number of the tapes being processed.

8.10 Round

This switch has an "Off" position, used only for maintenance purposes, and ten positions designated 0 to 9. The switch is set to indicate the round of the tapes being processed. In the case of a combined sort of message unit and summary tapes the Round switch is set for the round of the message unit tape.

8.11 Month tens and month units

Each of these two switches has an "Off" position, used only for maintenance purposes. The Month Tens switch has two other positions designated 0 and 1, and the Month Units switch has ten other positions designated 0 to 9. These two switches are set to indicate the month of the tapes being processed. In the case of a combined sort of message unit and summary tapes the Month switches are set for the month of the message unit tape.

9. Description of apparatus

9.1 Reader

9.11 General

The reader provides means for reading the input tape, and in addition serves as a mechanism for timing and synchronizing the sorter circuit operation. The input tape enters a chute and passes around a perforated drum, emerging by another chute. The perforations in the tape fit into the holes in the drum to provide traction. A motor drives a cam shaft, causing twenty-eight reading pins to attempt to enter the drum through the tape. Those pins which coincide with perforations in the tape move far enough to close one make contact for each pin. The cam controlling the reading pins is cut so that the contacts are closed for approximately two-thirds of the cam shaft revolution.

9.13 Reader

9.131 Stepping mechanism

The drum is rotated by the square motion action of a step rack in association with the step gear attached to the drum. The drum advance is controlled by a Step magnet which permits advance when operated and prevents advance when released. A centrifugal throw-out ratchet in the flywheel is operative at low speeds to prevent the reader shaft from being turned back.

9.132 Alternate line contacts

Contacts G1 and G2 are similar to the reading contacts. Each is equipped with a reading pin, but these pins strike the drum outside the tape. This part of the drum has holes arranged so that contact G1 closes in one position of the drum, G2 in the next, etc. These contacts are used as part of the circuit which checks that the reader steps properly.

9.134 Tape feed key

A push-button type Tape Feed key is provided on the reader to cause the drum to step continuously for feeding tape into and out of the reader. It is ineffective unless the circuit is normal or is perforating splice at the start of a run or tape identity and splice at the end of a run.

9.135 Control contacts

Three sets of ten contacts each, designated H, J, and K are provided. They are driven by cams on the main cam shaft. Contacts H3, H4, H8, H9, J3, J4, J8, J9, K3, K4, K8 and K9 are break contacts; the others are makes. The H and K contacts are in phase with the reading contacts so that the make contacts are closed for the same two-thirds cycle as the reading contacts. The J contacts close 0.008-second later. The H, J and K contacts are not equipped with reading pins, and therefore operate each cycle.

9.136 Perforating contacts

There are thirty additional contacts used to operate the perforator magnets. These contacts, designated L, E, A, PA0, PA1, PA2, PB0, ... PF7, are all make contacts and operate in phase with the reading contacts. They are not equipped with reading pins.

9.137 Feeding tape into the reader

Tape is always fed into the reader of the sorter in the same direction in which it emerged from the previous machine. It is pushed into the upper tape chute of the reader with the perforations down and the A digit on the left. The tape is engaged on the exposed surface of the drum and the Tape Feed key is operated to rotate the drum.

9.2 Perforator

9.21 General

The perforators convert unperforated tape into perforated output tapes. Ten perforators are provided in the sorter, designated 0 to 9. All call entries whose sorting digit is 0 are perforated on perforator 0, those whose sorting digit is 1 are perforated on perforator 1, etc. The ten tapes from the perforators, taken in order, constitute the output of a sorting process.

9.22 Perforating mechanism

The perforator is equipped with a perforated drum, similar to that in the reader. Unperforated tape is inserted so that it passes over the top of the drum. Above the drum are twenty-eight punches, each operated by a perforating magnet. When a magnet is energized its punch strikes the paper, driving it into a tapered hole in the drum, producing a perforation. The perforations engaging in the drum, provide traction for advancing the paper when the drum rotates.

9.23 Stepping mechanism

The drum is rotated by a ratchet operated by the perforator advance magnet (PAM). Operation of the magnet cocks the ratchet arm, and release of the magnet steps the drum, advancing the tape one line.

9.24 Window detecting contact

A switch, operated by a pivoted arm, is provided to detect a window in the unperforated tape feeding into the perforator, or the end of the tape. The arm rides on the tape as it approaches the drum, and when the tape ends, or a window is encountered, the arm moves, closing the contact. Normally, before the supply of tape to a perforator is exhausted, a new supply is spliced to the end of the old. A window, a rectangular opening in the center of the tape, is cut at the point of splicing to stop the sorter before the splice gets into the perforator. A length of splice pattern is then perforated on this output tape to cover the spliced portion, preventing the sorter from attempting to perforate call entries through the splice, where the added thickness of paper prevents proper perforations from being made.

10. Entries

10.1 Message unit entries

10.11 1-9 local message units

This entry appears on message unit tapes:

```
A    B      C      D      E      F
1    MU     TH     H      T      U
            ------ Calling line ------
                   number
```

10.12 10-99 local message units or 1-99 extended area message units

This entry appears on message unit tapes:

```
A    B      C      D      E      F
2    0      TH     H      T      U
            ------ Calling line ------
                   number
0    MU index  0   0      x      x
                          --- MU ---
```

10.2 Summary entries

10.21 Local message units

This entry appears on summary tapes, and on message unit tapes after a combined sort has been made of message unit and summary tapes:

```
A    B      C      D      E      F
2    0      TH     H      T      U
            ------ Calling line ------
                   number
0    3,4    x      x      x      x
                   ---- Message units ------
```
3=less than 1000 message units
4=exactly 1000 message units

10.22 Local and extended area message units

This entry appears on summary tapes, and on message unit tapes after a combined sort has been made of message unit and summary tapes:

```
A    B      C      D      E      F
2    1      TH     H      T      U
            ------ Calling line ------
                   number
0    3,4    x      x      x      x
                   --- Local message units ---
0    5,6    x      x      x      x
                   ------ Extended area ------
```
3 and 5=less than 1000 message units
4 and 6=exactly 1000 message units

10.3 Detail entries
10.31 Completed call

This entry appears on toll, message unit detail and observing tapes:

```
A    B         C         D        E        F
1    Office    TH        H        T        U
     index           ------ Calling line ------
                            number
0              ------ Start time ------
0    Area               Called No.  ------ Called ------
     index              index              office code
0    TTH                TH           H     T        U
                  -------- Called line number --------
0    MU index          Charge-    ---- Message ----
                       able-           units
                       time
```

10.32 Unanswered call

This entry appears on observing tapes:

```
A    B         C         D        E        F
3    Office    TH        H        T        U
     index           --- Calling line number ---
0              ------------ Start time ----------
0    Area               Called No.    -- Called office --
     index              index                code
0    TTH                TH           H     T        U
                  -------- Called line number --------
0    0         0         0         0        0
```

10.4 Tape identity entries

| A | B | C | D | E | F | |
|---|---|---|---|---|---|---|
| 2 | 8 | 9 | 1 | x | x | Tape index. |
| 2 | 8 | 9 | 2 | x | x | Marker group. |
| 2 | 8 | 9 | 3 | x | x | First recorder number. |
| 2 | 8 | 9 | 4 | x | x | Last recorder number. |
| 2 | 8 | 9 | 5 | x | 0 | Office. |
| 2 | 8 | 9 | 6 | x | x | Thousands range. |
| 2 | 8 | 9 | 7 | x | x | Days of round. |
| 2 | 8 | 9 | 8 | x | x | Tape section and round. |
| 2 | 8 | 9 | 9 | x | x | Month. |

10.5 Miscellaneous entries

| A | B | C | D | E | F | |
|---|---|---|---|---|---|---|
| 2 | 8 | 6 | 0 | x | x | Skip splice (xx=machine number). |
| 2 | 8 | 7 | 0 | 2 | 0 | Skip window. |
| 0 | 8 | 1 | 0 | 1 | 0 | Splice. |

10.6 Code of punched holes
10.61 A digit

| 0 | 1 | 2 | |
|---|---|---|---|
| x | ---- | ---- | 0 |
| ---- | x | ---- | 1 |
| ---- | ---- | x | 2 |
| x | x | x | 3 |

10.62 B, C, D, E and F digits

| 0 | 1 | 2 | 4 | 7 | |
|---|---|---|---|---|---|
| -- | -- | -- | x | x | 0 |
| x | x | -- | -- | -- | 1 |
| x | -- | x | -- | -- | 2 |
| -- | x | x | -- | -- | 3 |
| x | -- | -- | x | -- | 4 |
| -- | x | -- | x | -- | 5 |
| -- | -- | x | x | -- | 6 |
| x | -- | -- | -- | x | 7 |
| -- | x | -- | -- | x | 8 |
| -- | -- | x | -- | x | 9 |

11. Perforating splice at start of output tapes

11.1 Starting motor

At the start of a run all keys and relays in the circuit and the TD selector (Fig. 35) should be normal. The selector is automatically restored at the start and end of each run.

The motor start key 4000 is operated to start the motor. Through its left-hand contacts it places a ground on the MSTA lead 4001 which may be traced through the armature 1 and back contact of the MRL relay 1900, over the EM conductor 1901, the contacts of the emergency motor stop key 4002, the MSTA conductor 4003, the back contact and armature 2 of the AL relay 1700, the MST conductor 1702 to the winding of the MST motor start relay 1902. Through its right-hand contacts the motor start key 4000 places ground on the RLM conductor leading directly to the winding of the RLM relay 1903 so that both the MST and the RLM relays 1902 and 1903 are immediately operated upon the operation of the motor start key 4000. The RLM relay 1903 makes the machine start key 4004 effective for later use by closing through at its armature 2 and front contact the conductor leading to the winding of the ST1 start relay 2001. The MST relay 1902 operates the master off-normal relay 2002 by extending ground from the master release key 4005, over the RL1 conductor through the armature 3 and front contact of the MST relay 1902 to the winding of the master off-normal relay 2002. Through its armature 1 and front contact the MST relay 1902 extends a battery connection over the conductor 1904 for the reader step magnets, such as step magnet 1207. Through its armature 2 and front contact the MST relay 1902 extends ground over the conductor 1905 for operating the motor relays of the various readers, such as the MOT motor relay 1209. As soon as the master off-normal relay 2002 has operated, a ground is extended by its armature 12 and front contact, over the conductor 2003, which may be traced through the armature 2 and back contact of the AMS relay 4500, over the R0 conductor 4501 to the winding of the R0 relay 1201, so that the 0 reader shown in Figs. 12 and 13 will be normally rendered operative. Thus, the MOT motor relay 1209 in this circuit will operate to connect the source of power 1208 to the motor 1204, thereby to put this reader into operation by starting the reader motor 1204.

The master off-normal relay 2002 locks to the ground on the normally closed contacts of the master release key 4005, over the RL1 conductor, the armature 2 and back contact of the MRL relay 1900, the armature 4 and front contact of the MON relay 2002 and thence through the winding thereof. The MON relay 2002 operates the RSR relay 1703 from ground over its armature 7 and front contact to the winding of the RSR relay 1703 and thence through a resistance 1704 to battery. Through its armature 11 and front contact the MON relay 2002 places a ground on the LP conductor leading to the master off-normal lamp shown in Fig. 28. Another circuit may be traced from ground, armature 2 and front contact of the MON relay 2002, the MON9 conductor, the right-hand contacts of the machine stop key 4006, the RLML conductor 4007, the armature 1 and back contact of the WSA relay 5301, over the RLML conductor 5306, the armature 1 and front contact of the RLM relay 1903 and thence through the winding thereof for locking purposes. Master off-normal grounds will also be supplied by the MON relay 2002 from the front contact and armature 13 thereof, over conductor MON5, through the tape type switch (Fig. 50) to operate one of the relays of Fig. 43 and through the sort switch (Fig. 50) to operate one of the relays of Fig. 34. The MON master off-normal relay 2002 also locks the MST relay 1902 in a circuit from ground, armature 2 and front contact of the MST relay 1902 over the MON9 conductor, the front contact and armature 3 of the RLM relay 1903, the front contact and armature 4 of the MST relay 1902 and thence over the MSTA conductor 4001, the armature 1 and back contact of the MRL relay 1900, the EM conductor 1901, the contacts of the emergency key 4002, the MSTA conductor 4003, the back contact and armature 2 of the AL relay 1700, the MST conductor 1702, to the winding of this motor start relay 1902.

11.2 Inserting input tape

The first input tape to be sorted is fed into the reader as described in section 9.137 by using the tape feed key, such as the tape feed key 1205 on the reader. The tape feed key 1205 is effective only if the CRK relay 2104 is operated, thereby placing a ground through its front contact and armature 3 on one of the TF conductors, or if the ST3A relay 2004 is unoperated, so that ground is extended through the back contact and armature 1 thereof to the other TF conductor. Under these conditions (ST3A relay 2004 released and CRK relay 2104 released), the TF relay 1206 is operated and battery and ground are thus extended over the armatures 3 and 2 of this relay to the winding of the step magnet 1207 of the reader. The reader drum thus steps continuously under these circumstances. The key 1205 can be used if the motor is running and if the circuit is normal. It can also be used while the circuit is perforating splice at the start of the output tapes and while it is perforating tape identity skip splice entry and splice pattern at the end of the output tapes. Thus, the input tape may be fed into the reader during the splice perforating operation to be described hereinafter.

11.3 Operating the start relays

The end-of-tape key 4008 is now operated. As a result a circuit is established from ground, through armature 2 and back contact of the WSA relay 5301, over the WSAN conductor, through the armature 2 and back contact of the WSB relay 5302, the WSN conductor, through the armature 10 and back contact of the ST3A relay 2004, armature 2 and back contact of the TIEA relay 3100, the PSP conductor, the inner left-hand contacts of the end-of-tape key 4008, over the PSP conductor 4009, to the winding of the PSP relay 4600, so that this relay is operated. Relay 4600 locks in a circuit from the front contact and armature 2 of the MON relay 2002, the MON9 conductor, through the right-hand normally closed contacts of the machine stop key 4006, the RLML conductor 4007, through the back contact and armature 4 of the WSP relay 1906, the PTIL conductor, through the armature 4 and front contact of the PSP relay 4600 to the winding of this relay. Another circuit for locking the PSP relay 4600 during the time the end-of-tape key 4008 is operated may be traced from ground, armature 2 and back contact of the WSA relay 5301, the WSAN conductor, thence through the operated outer right-hand contacts of the end-of-tape key 4008, directly to the PTIL conductor. The operation of the PSP relay 4600 causes the operation of the TE relay 4601 in an obvious circuit and causes the operation of the WS2 relay 4700 through the front contact and armature 6 of the PSP relay 4600. The operation of the TE relay 4601 results in the application of ground through the armature 1 and front contact thereof, to the CRK conductor leading to the CRK relay 2104, to cause the operation of this latter relay. In a similar manner, the TIS relay 3101 is operated from armature 4 and front contact of the TE relay 4601, over the TIS conductor. If the selector of Fig. 35 is off-normal, then a ground will be supplied through the off-normal contacts to the SON conductor, and this will now be extended through the front contact and armature 2 of the TE relay 4601, over the TDR conductor, to the winding of the RLS release magnet 3500, so that this selector will now be restored to its normal position.

The operation of the TIS relay 3101 results in the extension of ground from armature 11 and front contact thereof, over the ME conductor, to the winding of the ME relay 5300, so that this relay becomes operated at this time. In the first open period of the reader following the operation of the ME relay 5300, the ST1 relay 2001 will be operated in a circuit from ground, the H8 reader contact (Fig. 13), the HB2 conductor, through an armature and front contact of the R0 relay 1201, conductor 1300, armature 7 and the back contact of the RS2–4 relay 2105, the armature 10 and back contact of the RS1–3 relay 2106, the ST conductor, leading through the back contact and armature 1 of the LK1 relay 3302, the ST conductor 3303, the armature 1 and front contact of the ME relay 5300, conductor 5303, the front contact and armature 6 of the TE relay 4601, the STA conductor 4602, the armature 3 and back contact of the ST2 relay 2005, the armature 2 and back contact of the RLS relay 2006, the armature 2 and front contact of the RLM relay 1903, to the winding of the ST1 relay 2001. Upon the operation of the ST1 relay 2001, a circuit is closed from ground through the armature 4 and front contact thereof, over the RCD conductor, to the winding of the RCD relay 2500 to cause this relay to operate. At its armature 1 and back contact the ST1 relay 2001 opens the circuit through the SR lead, which appears on the left-hand contacts of the reader step key 4020, so as to render this key ineffective. The ST1 relay also closes a path from ground, through the armature 1 and front contact of the MON relay 2002, the front contact and armature 7 of the ST1 relay 2001, to one terminal of the ST2 relay 2005, the other terminal of which has been traced through the winding of the ST1 relay 2001, so that this becomes a locking circuit for the ST1 relay 2001. Since the ST2 relay 2005 has its other terminal ground at this time, it cannot operate; but, when the H8 reader contact (Fig. 13) opens then this locking circuit becomes effective and the ST2 relay 2005 operates. Upon operation, this latter relay 2005 prepares the operating path for the ST3 relay 2000 which may be traced from the H8 contact (Fig. 13) over the circuit previously described through the conductor 3303, thence through the front contact and armature 6 of the ST1 relay 2001, the armature 3 and front contact of the ST2 relay 2005, and to the winding of the ST3 relay 2000, so that upon the next closure of this H8 contact the ST3 relay 2000 will operate. At its armatures 1, 2 and 10, respectively, the ST3 relay 2000 closes the paths of the A0, A1 and A2 reading relays 3600, 3601 and 3602, respectively; but, since the RCA reader connector relay 2400 is not operated, these reading relays are not connected to the reader. The ST3 relay 2000 at its front contact and armature 9, closes the circuit for the ST3A relay 2004. A circuit is also established from ground, armature 1 and front contact of the MON relay 2002, armature 2 and front contact of the ST2 relay 2005, back contact and armature 1 of the RLS relay 2006, armature 6 and front contact of the ST3 relay 2000, to function as a holding circuit for this latter relay. At its front contact and armature 4 the ST3 relay 2000 supplies a holding ground over the RCD conductor for the RCD relay 2500. The ST3A relay 2004 supplies battery through its armature 5 and front contact, to conductor 2007, leading to the two windings of the TM relay 1705 to activate this timing relay. Lastly, the ST3A relay 2004 extends ground through its armature 9 and front contact, over the ON2 conductor, through armature 12 and back contact of the AS relay 3400, to the armature 9 and front contact of the TE relay 4601 for locking this latter relay.

*11.4 Starting the tape identity perforate circuits*

When the TIS relay 3101 operates, it operates the ME relay 5300 as described above and at the same time closes a circuit from ground, armature 9 and front contact of the ST3A relay 2004, the ON2 conductor, armature 12 and back contact of the AS relay 3400, armature 9 and back contact of the TE relay 4601, over the TEN conductor, the armature 7 and front contact of the TIS relay 3101, the PTI conductor, to the battery terminal of the TI relay 2800, thereby to shunt this relay and to prevent its operation from ground over the T1 conductor. The TIS relay 3101 extends grounds to the B1 and B7 conductors over its armatures 9 and 10 and front contacts, leading to the windings of the B1 reading relay 3614 and the B7 reading relay 3605, so as to permanently register the value 8 in the B digit reading relays during the tape identity process. The TIS relay 3101 locks in a circuit from ground, front contact and armature 2 of the RCD relay 2500, the TISL conductor, the back contact and armature 1 of the TIE relay 3102, the front contact and armature 6 of the TIS relay 3101 and thence through the winding thereof. At its armature 8 and back contact the TIS relay 3101 opens the reader step lead 3103 to the step magnet 1207 of the reader so that the reader cannot step during the perforating of splice pattern codes on the output tapes. Upon the operation of the TIS relay 3101, a circuit is established from the K3 reader contact (Fig. 13), through one of the front contacts and armatures of the R0 relay 1201, the front contact and armature 8 of the RCD relay 2500, over the KB0 conductor, the front contact and armature 4 of the TIS relay 3101, thence over the PX conductor either through the armature 1 and back contact of the W2A relay 1801 to the P0 conductor or through the armature 1 and front contact of the RS1-3 relay 2106 to the P0 conductor, and thence through a chain circuit starting with armature 2 and back contact of the WSP relay 1906, and through an obvious circuit through the armatures and back contacts of the EP relay 1907 and the W relays starting with the W9 relay 1802 and ending with the W1 relay 1803 to the winding of the PX relay 1800 to battery. The PX relay locks in a circuit from the K7 reader contact (Fig. 13), the KM5 conductor, through a front contact and armature of the R0 relay 1201, the back contact and armature 5 of the SS relay 5802, the PLL conductor, armature 2 and front contact of the TIS relay 3101, armature 8 and back contact of the PS2 relay 1908, and thence in an obvious chain circuit including armatures and back contacts of the PS3 relay 1909, the PS1 relay 1910 and the PL relays starting with the PL9 relay 1804 and ending with the PL1 relay 1805, to the armature 2 and front contact of the PX relay 1800 and thence through the winding thereof. The function of the PX relay 1800 is to use an extra reader cycle to provide time for the ME relay 5300 to operate fully when splice pattern is automatically perforated at the end of a tape. In the case under discussion this extra time is not required.

The PX relay 1800 prepares a path for the W1 relay 1803 so that the W1 relay 1803 operates in the following reader closed period: from ground supplied by the K5 reader contact (Fig. 13), the KM3 conductor over a front contact and armature of the R0 relay 1201, the armature 6 and back contact of the PS2 relay 1908, and thence in an obvious chain circuit through the armatures and back contacts of the PS3 relay 1909, the PS1 relay 1910, the PL relays to the PL1 relay 1805, the armature 1 and front contact of the PX relay 1800, to the winding of the W1 relay 1803. During the same reader closed period the A2 reading relay 3602 is also operated. In this case the A2 reading relay 3602 is not operated from the A2 reading pin (Fig. 12) of the reader. Since the RCA relay 2400 is normal, instead, the A2 reading relay 3602 is operated from ground at a reader contact K1 (Fig. 13), over the KM1 conductor, a front contact and armature of the R0 relay 1201, the front contact and armature 7 of the RCD relay 2500, the KM1 conductor, the armature 4 and back contact of the ESP relay 5304, the front contact and armature 5 of the ME relay 5300, the A2 conductor, the front contact and armature 9 of the ST3 relay 2000, the A2 conductor 2011, armature 10 and back contact of the APB-C relay 5800, conductor 5801, to the winding of the A2 reading relay 3602. The A2 reading relay 3602 operates the LK1 relay 3302 from the H6 reader contact, the HM4 conductor, through a front contact and armature of the R0 relay 1201, the front contact and armature 5 of the RCD relay 2500, the armature 10 and back contact of the A0 reading relay 3600, the armature 10 and front contact of the A2 reading relay 3602, the back contact and armature 10 of the A1 reading relay 3601, the LK1 conductor 3604, and thence through a circuit leading either through the armature 3 and back contact of the PCA relay 3902 or the armature 7 and front contact of the 28C relay 3903, the LK1 conductor 3904, to the winding of the LK1 relay 3302. The LK1 relay 3302 locks from ground supplied over the front contact and armature 3 of the ST3A relay 2004, the back contact and armature 6 of the LLA relay 3304, the armature 5 and front contact of the LK1 relay 3302 and thence to the winding thereof. The LK1 relay 3302 grounds a lead at this time through its armature 7 and front contact, which grounded lead has the purpose of operating either the LN2 relay 3311 or the LN5 relay 3305 but, with both the B1 and B7 reading relays (Fig. 36) operated, this lead is held open at armature 8 and back contact of the B7 reading relay 3605 and at armature 10 and back contact of the B1 reading relay 3614. In the reader open period following the operation of the W1 relay 1803, the PS3 relay 1909 is operated over the following path: from ground on the K3 reader contact, the KB0 conductor, through a front contact and armature of the R0 relay 1201, the KB0 conductor, armature 8 and front contact of the RCD relay 2500, the KB0 conductor, leading to the front contact and armature 4 of the TIS relay 3101, thence over the PX conductor, the back contact and armature 1 of the W2A relay 1801, the P0 conductor, the armature 2 and back contact of the WSP relay 1906, and thence in an obvious chain circuit to the armature 1 of the now operated W1 relay 1803, the front contact thereof, the P0 conductor 1806, the armature 1 and front contact of the PSP relay 4600, the PS3 conductor 4603, to the winding of the PS3 relay 1909. A locking circuit for the PS3 relay 1909 may be traced from the K7 reader contact, the KM5 conductor, an armature and front contact of the R0 relay 1201, the armature 5 and back contact of the SS relay 5802 to the PLL conductor, or alternatively from ground through the front contact and armature 2 of the ST3A relay 2004, the back contact and armature 6 of the RS1-3 relay 2106, to the PLL conductor, thence through the front contact and armature 2 of the TIS relay 3101, the armature 8 and back contact of the PS2 relay 1908, the armature 7 and front contact of the PS3 relay 1909, to the winding thereof. Through the movement of the armature 8 of the PS3 relay 1909, the locking circuit of the PX relay 1800 is opened and this relay releases. The PS3 relay 1909, in operating, extends ground through its front contact and armature 5, over the PHK conductor, leading directly to the winding of the PHK relay 6200, whereby this relay becomes operated. Through its armatures 3, 4, 2, 1, 9, 10, 11 and 12 the PS3 relay 1909 operates the C0, C1, D4, D7, E0, E1, F4 and F7 reading relays (Figs 37 and 38), respectively. Since the B1 and B7 reading relays (Fig. 36) are operated, the B, C, D, E and F digits now express the value 81010. Immediately hereafter, the A digit will be set to express the value 0 so that the splice code pattern 081010 will be properly expressed.

*11.5 Perforating first line of splice pattern*

The A2 reading relay 3602 releases at the end of the reader closed period in which it operated and it reoperates on the next closed period. There are now two reading relays (Figs. 36, 37, 38) operated for each digit B through F and the reading check path is closed, operating the APA relay 5803. This path may be traced as follows: ground originates at either of the two alternate line reader contacts G1 and G2 (Fig. 12) which are tied together by the CRK relay 2104 through the back contact of the RKA relay 2100 or the front contact of the RKB relay 2101, one of which paths is closed at this time through the CK lead 2102, the armature 1 and front contact of the RCD relay 2500, the CK conductor 2501, the armature 1 and back contact of the AL relay 1700, the CK1 lead 1701, thence through the two-out-of-five check path shown in the network of the left-hand armatures and contacts of the F digit reading relay (Fig. 38), which is closed when and only when two of the five reading relays are operated, thence through similar circuits controlled by the E, D, C and B reading relays (Figs. 36, 37 and 38), to the CKI conductor 3603, the back contact and armature 8 of the AS relay 3400, the back contact and armature 3 of the C relay 4400, the conductor 4401, the back contact and armature 4 of the LK2 relay 3300, the CK2 conductor 3301, the front contact and armature 9 of the A2 reading relay 3602, the back contact and armature 8 of the A1 reading relay 3601, the back contact and armature 8 of the A0 reading relay 3600, the AD2 conductor which may be traced to Fig. 43 where it is connected in multiple to an armature of each of the relays therein, so that it will eventually be extended through one or more of the front contacts of one of these relays, such as the armature 3 and front contact of the DET relay 4301, conductor 4305, the armature 2 and front contact of the ME relay 5300, the APA conductor, armature 5 and back contact of the APD relay 5804, to the winding of the APA relay 5803, thus causing the operation of this latter relay.

The WSP relay 1906 operates at the same time as the A2 reading relay 3602 from the K5 reader contact, through a front contact and armature of the R0 relay 1201, the KM3 lead, the armature 6 and back contact of the PS2 relay 1908, the WSPA lead 1911, the armature 3 and front contact of the PHK relay 6200, the WSP conductor 6201, and thence through the winding of the WSP relay 1906. This relay locks in a circuit from ground, the armature 3 and front contact of the TIS relay 3101, over the WL conductor, to the armature 3 and front contact of the WSP relay 1906. In operating, the WSP relay 1906 releases the W1 relay 1803 and operates the W2A relay 1801 which also locks to the TIS relay 3101 over the WL lead, above traced. The W2A relay 1801 opens, at its armature 1, the lead from the back contact of the reader K3 contact, which previously operated the PX relay 1800 and the PS3 relay 1909, so that this lead is now connected to the K3 contact, but only when the RS1-3 relay 2106 is operated. The APA relay 5803 operates the S9B relay 5900, at the same time checking the chain circuits through the S-A and S-B relays of Figs. 59 and 60. The S0B relay 5900 is operated in a circuit from the K7 reader contact, through a contact and armature of the R0 relay 1201, over the KM5 lead, the front contact and armature 2 of the APA relay 5803, the SBL conductor, the back contact and armature 3 of the S9B relay 6000, and thence in an obvious chain circuit through the back contact and armature 3 of the S1B relay 5901, the winding of the S0B relay 5900, the front contact and armature 6 of the APA relay 5803, the back contact and armature 1 of the S1A relay 5902, and thence in an obvious chain circuit ending with the armature 1 and back contact of the S9A relay 6001, over the SB lead, the front contact and armature 3 of the APA relay 5803, to a source of battery. Through its armature 2 and front contact the S0B relay 5900 connects its winding to a source of battery in parallel with the circuit through the armatures and back contacts of the S-A relays of Figs. 59 and 60. A circuit in parallel with the K7 reader contact (Fig. 13) may be traced from ground, front contact and armature 2 of the ST3A relay 2004, the back contact and armature 6 of the RS1-3 relay 2106, the PLL conductor, the back contact and armature 5 of the SS relay 5802, to the KM5 conductor, so that until the SS relay 5802 or the RS1-3 relay 2106 is operated the energization of the S0B relay 5900 does not depend entirely on the ground supplied by the K7 reader contact. The KM5 conductor may also be traced through the front contact and armature 4 of the APD relay 5804, to the SBL conductor, so that when the APA relay 5803 releases, a holding resistance 5805 is inserted in the circuit. The APA relay 5803 also connects the APB-C relay 5800, through its armature 5 and front contact, to the HB2A conductor, deriving ground through the armature 9 and front contact of the RCD relay 2500, from the H2 reader contact. The APB-C relay 5800 locks itself through its front contact and armature 7, to the G11A conductor, which is supplied with ground from the front contact and armature 8 of the LK1 relay 3302 and through the armature 1 and back contact of the LLA relay 3304. The APB-C relay 5800 switches the lead, which operated the A2 relay 3602, from armature 10 and back contact to armature 9 and front contact, so that in the next closed period the A2S relay 5806 becomes operated. The APB-C relay 5800 disconnects the RS1-3 and RS2-4 reader step relays 2106 and 2105 from the RS0 and RSE leads extending from the armatures of the perforator connector relays of Fig. 54. The operation of the APB-C relay 5800 operates the APD relay 5804 from ground supplied by the front contact and armature 3 of the S0B relay 5900 over armature 6 and front contact of the APB-C relay 5800. When the APD relay 5804 operates, it releases the APA relay 5803, locks itself operated under the control of the APB-C relay 5800 and connects the RS0 lead through armature 2 and front contact of the APB-C relay 5800 and the RSE lead through the armature 3 and front contact of the APB-C relay 5800, both through the armature 2 and front contact of the APD relay 5804, to the winding of the SS relay 5802. When the APD relay 5804 operates, a path is closed to operate the TTM relay 2300 from ground, armature 10 and back contact of the WS1A relay 4701, armature 6 and front contact of the ME relay 5300, the TTM conductor, through armature 6 and front contact of the APD relay 5804, the TTM conductor 5807, to the winding of the TTM relay 2300. The operation of this TTM relay 2300 starts the long timer, whose function and operation will be described in more detail hereinafter.

At the beginning of the next closed period of the reader the A2S relay 5806 operates over the path previously used to operate the A2 relay 3602. This switch took place at contacts of armatures 9 and 10 of the APB-C relay 5800 when the latter are operated. This relay extends a circuit from the H2 reader contact (Fig. 13), over a front contact and armature of the R0 relay 1201, over the HM2 conductor, through the armature 1 and front contact of the A2S relay 5806, the HM2A conductor, the armature 5 and back contact of the WS1A relay 4701, the HM2A conductor 4703, to the back contact and armature 2 of the S9B relay 6000, and thence over an obvious chain circuit to the armature 2 of the S1B relay 5901, the front contact and armature 1 of the S0B relay 5900, to the winding of the S1A relay 5902, so that the S1A relay 5902 operates at this time. It will be locked in a circuit from ground, armature 7 and front contact of the LK1 relay 3302, over the G12 conductor, the armature 2 and back contact of the S9A relay 6001, through an obvious chain circuit including armature 2 and front contact of the S1A relay 5902. The A2S relay 5806 also connects the reading check path described earlier in this section and now found on the CK2 conductor connected to armature 2 of the A2S relay 5806, through the front contact thereof, the CK3 conductor, armature 4 and back contact of the WS1A relay 4701, the CK conductor, back contact and armature 5 of the S9B relay 6000, and thence in an obvious chain circuit to the front contact and armature 4 of the S0B relay 5900, over the P0 conductor leading to the PA0 perforator connector relay 6100, whereby the twenty-eight magnets of the perforator 0 are now connected to their corresponding reading relays through the K- - series checking relays (Figs. 49, 55 and 61). Those magnets corresponding to the operated reading relays are connected to perforating contacts on the reader (Fig. 13) which are closed during the closed period of the reader. By way of example, when, during the closed period of the reader, the PB1 reader contact (Fig. 13) is closed, then a ground is connected through the corresponding front contact and armature of the R0 relay 1201, the PB1 conductor, through the front contact and armature 7 of the B1 reading relay 3614, the P1 conductor to the winding of the KB1 relay 4901, the corresponding armature and front contact controlled by the PA0 relay 6100, to the B1 perforator magnet 6202, and thence to battery. The A0 perforating magnet 6203 finds a circuit from the PA2 reader contact (Fig. 13), through a front contact and armature of the R0 relay 1201, the PA2 conductor, the armature 3 and front contact of the A2S relay 5806, the PA conductor, armature 1 and back contact of the WS1D relay 4702, the armature 2 and front contact of the WS2 relay 4800, the P0 conductor, through the KA0 relay 4902, the corresponding A0 armature and contact of the PA0 relay 6100, to the A0 perforator magnet 6203. Eleven perforating magnets operate perforating the code 081010 on output tape 0. The corresponding series relays KA0, KB1 and KB7 (Fig. 49) operate and the PD0 perforator register relay 5400 is included in this circuit from the H5 reader contact (Fig. 13), over the HM3 conductor, the first lower armature and front contact of the PA0 relay 6100, the PD0 conductor leading directly to the winding of the PD0 relay 5400. This relay is not required when spreading lines on all output tapes and its locking circuit is open since no one of the LN2 or LN5 relays is operated at this time. When the J make contacts on the reader close approximately 8 milliseconds after the start of the reader closed period, the PAM perforator advance magnet 6204 is operated in series with the PK0 relay 6205 when a contact is closed from the JM3 conductor (Figs. 13 and 25) through an armature and front contact of the PA0 perforator connector relay 6100. Operation of the PAM perforator advance magnet 6204 cocks the ratchet pawl but does not step the perforator drum.

*11.6 Perforator hold check*

In normal operation the perforating magnets are operated as described above followed by the operation of the associated PAM magnet. If the perforating check lead is closed through, as it is when the proper perforating magnets operate (as will be described hereinafter), the reader step relays are operated to step the reader and proceed to the next line. At the end of the reader closed period the perforating magnets release and shortly after that the perforator advance magnet releases, stepping the perforator. In the event that the perforating check lead is not closed because of failure of the proper magnets to be energized, a path is provided to hold the PAM magnet 6204 operated. If this were not done, the perforator would step and, since the reader would not step, the same line would be perforated again on the output tape. This holding path is checked at the beginning of each run during the perforation of the first line of splice pattern and at the end of each run during the perforation of the 2860XX skip splice pattern code. The check is brought into play by the PHK relay 6200, which operates from the PS3 relay 1909 at the beginning of a run and from the PS1 relay 1910 at the end of a run.

At the end of the reader closed period during which the first splice code 081010 was perforated, the A2S relay 5806, the PA0 relay 6100, and the perforating magnets (Fig. 62) and their series K- - relays (Figs. 49, 55 and 61) all release. 8 milliseconds later the reader J contacts (Fig. 13) open; but, the PAM and the PK9 relays 6204 and 6205 are locked through the armature 3 and front contact of the PK0 relay 6502, through the armature and back contact of the PHE relay 6206, the winding of the CKA relay 6207, to the MON8 conductor, which derives ground from armature 5 and front contact of the MON relay 2002. The CKA relay 6207 operates, in turn operating the CKB relay 6208 from the JB0 ground over the JB0 conductor when the reader (Fig. 13) again closes its J contacts. The A2S relay 5806 and the connector relays operate again in the next reader closed period, reoperating the same perforator magnets and series relays and the PD0 relay 5400. The perforating check lead is now closed from ground, over the front contact and armature 1 of the CKB relay 6208, conductor 6209, through the check circuit comprising the armature and contact network controlled by the left-hand armatures of the KA0, KA1 and KA2 relays (Fig. 49), thence through the two-out-of-five check circuits of the KB (Fig. 49), the KC and the KD (Fig. 55), the KE and the KF (Fig. 61) relays, the conductor 6101, the back contact and armature 2 of the PK0 relay 6210 for the number 9 perforator and thence in an obvious chain circuit through the front contact and armature 2 of the PK0 relay 6205 for the number 0 perforator (now assuming to be operated), conductor 6211, armature 5 and back contact of the PD9 relay 5401, through an obvious chain circuit to the armature 4 and front contact of the PD0 relay 5400, the front contact and armature 2 thereof, the RSE conductor, armature 3 and front contact of the APB-C relay 5800, armature 2 and front contact of the APD relay 5804, to the winding of the SS relay 5802. The SS relay operates the PHE relay 6206 and the PH0 relay 6212 through its armatures 1 and 2 respectively. The PHE relay 6206, upon operating opens the locking circuit for the PAM magnet 6204 so that when the J make contact operates, the magnet will release. The SS relay 5802 locks to reader contact H3 (Fig. 13) and shunts the condenser 1706 connected to the TM relay 1705 by placing ground on the TM conductor through its armature 3 and front contact. At the end of the closed period the A2S relay 5806, the S0B relay 5900, the PA0 perforator connector relay 6100, the PD0 relay 5400, the perforator magnets (Fig. 62) and their series K relays (Figs.

49, 55 and 61 all release. Shortly thereafter the PAM magnet 6204, the PK0 relay 6205 and the CKA relay 6207 release, followed in turn by the release of the CKB relay 6208. The SS relay 5802 remains locked to the HB0 lead until the end of the open period of the reader. The release of the PAM magnet 6204 steps the perforator.

11.7 Spreading first line of splice pattern on all tapes

During the open period of the reader the S1B relay 5901 is operated from the H8 reader contact, a contact and armature of the R0 relay 1201, the HB2 conductor, the front contact and armature 9 of the RCD relay 2500, the HB2A conductor, the back contact and armature 4 of the APA relay 5803, the armature 6 and front contact of the SS relay 5802, the SB conductor, armature 1 and back contact of the S9A relay 6001, through a chain circuit to armature 1 and front contact of the S1A relay 5902, to the winding of the S1B relay 5901, so that this relay now operates and locks to the circuit heretofore used for the supply of ground to the S0B relay 5900. The S1B relay 5901 prepares the operating path for the S2A relay 5903 and for the P1A perforator connector relay 6102. At the start of the next reader closed period, the SS relay 5802 releases and the A2S relay 5806 and the S2A relay 5903 operate.

The A2S relay 5806 now operates the PA1 connector relay 6102, thus rendering the No. 1 perforator effective. The perforator hold check circuit again operates so that two reader cycles are used to perforate 081010 on the output tape No. 1. The operation is the same as for perforator 0 except that the PAM magnet (Fig. 62) of the No. 1 perforator operates in series with the PK1 relay (Fig. 62) and locks through the PH0 (odd) relay 6212 instead of the PHE (even) relay 6206, as in the previous case. The SS relay 5802 is operated at the end of the second cycle over the RS0 (odd) conductor instead of the RSE (even) conductor. The same K-- series checking relays (Figs. 49, 55 and 61) are used for all perforators. At the end of the second closed period, the SS relay 5802 is again operated and the S2B relay 5904 operates. The circuit continues in this manner perforating the first line of the 081010 splice pattern code on each of the ten output tapes, taking two reader cycles for each perforator.

11.8 Perforating remaining splice lines

When the A2S relay 5806 operates at the start of the first reader closed period for perforating the first 081010 on tape 9, ground is extended from the reader contact H2 through a front contact and armature of the R0 relay 1201, over the HM2 contact, through armature 1 and front contact of the A2S relay 5806, the HM2A conductor, armature 5 and back contact of the WS1A relay 4701, the HM2A conductor 4703, the front contact and armature 1 of the S9B relay 6000, the HM2B conductor, the front contact and armature 11 of the APB-C relay 5800, the LL conductor, to the winding of the LLA relay 3304. The LLA relay 3304 thus operates and locks through its front contact and armature 3 to the ground supplied at the armature 8 and front contact of the LK1 relay 3302. During the second reader closed period for perforator 9, the closure of the perforating check lead extends a circuit through the front contact and armature 3 of the PD9 relay 5401, to conductor 5402, armature 8 and back contact of the WS1A relay 4701, the RS0 conductor 5803, armature 2 and back contact of the 28SR relay 4403, the RS1 conductor 4404, to the winding of the RS1-3 reader step relay 2106, whereby this reader step relay now becomes operated. In operating, the RS1-3 relay 2106, through its armature 5 and front contact, places a ground on the RS(b) conductor 2107 which, if the TIS relay 3101 were normal, would be extended through the back contact and armature 8 thereof to the RS(a) conductor 3103, which would then be extended through an armature and front contact of the R0 relay 1201 to the step magnet 1201. However, the TIS relay 3101 is operated at this time and hence the operation of this RS1-3 reader step relay 2106 does not result in the stepping of the reader. The RS1-3 relay 2106 locks through its front contact and armature 14 to the HB0 conductor which derives ground from the H3 reader contact (Fig. 13). The RS1-3 relay 2106 shunts down the timing condenser 1705 connected to the TM relay 1705 by extending ground from armature 5 and back contact of the ESK relay 3201, the armature 9 and back contact of the SK2 relay 3202, the armature 7 and front contact of the RS1-3 relay 2106, to the TM conductor shunting the timing condenser 1706. The RS1-3 relay 2106 also extends a ground from armature 8 and front contact of the ST3A relay 2004, over the ON4 conductor, the armature 4 and back contact of the PM1 relay 2301, the PM1N conductor, armature 3 and front contact of the RS1-3 relay 2106, the RSR conductor, to the battery side of the RSR relay 1703, for the purpose of shunting down the RSR relay 1703 at this time. Through its armature 16 and front contact, the RS1-3 relay 2106 also grounds the PH0 conductor, whereby the PH9 relay 6212 is operated.

With the LLA relay 3304 and the RS1-3 relay 2106 both operated, the APB-C relay 5800, the LK1 relay 3302 and the S9B relay 6000 are now locked only to the reader make contacts (Fig. 13), other locking paths having been opened. At the end of the second closed period for perforator 9, the following relays release: A2S relay 5806, PA9 relay 6109, the perforating magnets of the No. 9 perforator (Fig. 62), LLA relay 3304, LK1 relay 3302, PS3 relay 1909 and the S9B relay 6001. The release of the APB-C relay 5800 releases the APD relay 5804 and the release of the LK1 relay 3302 releases the S9A relay 6001. In turn, the release of the APD relay 5804 releases the TTM relay 2300. The release of the PS3 relay 1909 opens the circuits of the PHK relay 6200 and F the C, D, E and F reading relays (Figs. 37 and 38), which the PS3 relay 1909 had operated. The PAM magnet (Fig. 62) and the associated PK9 relay 6210 and the CKA relay 6207 release shortly after the end of the closed period when the reader contact J1 (Fig. 13) opens. The CKA relay 6207 in turn releases the CKB relay 6208. At the start of the open period, ground is extended from reader contact K3 through one of the contacts of the R0 relay 1201, over the KB0 conductor, through the front contact and armature 8 of the RCD relay 2500, the KB9 conductor, front contact and armature 4 of the TIS relay 3101, the PX conductor, through the armature 1 and front contact of the RS1-3 relay 2106, the P9 conductor, the armature 2 and front contact of the WSP relay 1809, armature 2 and front contact of the W2A relay 1801, the PS2 conductor, to the winding of the PS2 relay 1908, to cause the operation of this latter relay. The RS1-3 relay 2106 remains locked up until the end of the open period. The PS2 relay 1908 reoperates the C0, the C1, the D4, the D7, the E0, the E1, the F4 and the F7 reading relays (Figs. 37 and 38) and the PS2 relay 1908 itself locks, at the end of the open period, through its front contact and armature 7 to the KM0 conductor deriving ground from the K0 reader contact (Fig. 13). When the reader closed period starts the A2 reading relay 3602 operates since the APB-C relay 5800 has released. The reading check path is closed from the conductor 3301, through the front contact and armature 9 of the A2 reading relay 3602, back contacts and armatures 8 of the A1 and A0 reading relays 3601 and 3600, the AD2 conductor, to operate the APA relay 5803 as hereinbefore described in section 11.5. The A2 reading relay 3602 also operates the LK1 relay 3302 and the APA relay 5803 operates the S0B relay 5900 as described in section 11.5. During the open period, the APB-C relay 5800 and the APD relay 5804 operate and the latter again operates the TTM relay 2300. On the following closed period, the A2S relay 5806 operates instead of the A2 relay 3602. This operates the PA0 connector relay 6100 for perforator 0 and the splice code 081010 is perforated again on output tape 0; but, since the PHK relay 6200 is released, only one cycle is required for each perforator. Ground from the back contact and armature 2 of the PHK relay 6200 grounds the conductor 6209, which heretofore had to wait for the operation of the CKB relay 6203 for this connection. This lead 6209 is, therefore, grounded as soon as the perforating magnet series K relays (Fig. 49) operate, operating in turn the SS relay 5802. The SS relay 5802 operates the PHE relay 6206 and the PH0 relay 6212, opening the holding path for the PAM magnet so that it releases, thereby stepping the perforator 0 after one closed period. The circuit walks from one perforator to the next in the same manner as when perforating the first line of 081010, except that it now takes only one cycle per perforator. When perforator 9 is reached the RS1-3 relay 2106 operates instead of the SS relay 5802 and the LLA relay 3304 operates releasing the LK1 relay 3302 and the APB-C relay 5800. The circuit then repeats its walking across all ten perforators, again perforating a third line of 081010 on each output tape. This operation continues until the operator releases the end-of-tape key 4008.

11.9 Completion of splice on output tapes

When sufficient splice pattern has been perforated on the output tapes the operator releases the end-of-tape key 4008, which releases the PSP relay 4600. Release of this relay opens the operating circuit for the TE relay 4601 leaving it locked through its front contact and armature 9 to the ON2 conductor grounded by the ST3A relay 2004. The SPA relay 2008 is now operated from ground, armature 8 and front contact of the TE relay 4601, the armature 2 and back contact of the PSP relay 4600, over the SPA conductor, to the winding of the SPA relay 2008. The SPA relay 2008 locks through its front contact and armature 2, to ground supplied on the MON3 conductor from the front contact and armature 8 of the MON relay 2002. Perforation of splice pattern continues until a line has been spread across all perforators. The RS1-3 relay 2106 operates at the end of this line as previously described. In the open period of the reader following the operation of the RS1-3 relay 2106, the RLS relay 2006 is operated from ground at the H8 reader contact, through a contact and armature of the R0 relay 1201, the front contact and armature 9 of the RCD relay 2500, the HB2A conductor, the armature 12 and front contact of the RS1-3 relay 2106, the HB2C conductor, armature 5 and front contact of the PS2 relay 1908, the RL conductor, the armature 10 and front contact of the TE relay 4601, the armature 5 and back contact of the PSP relay 4600, the armature 5 and back contact of the PTI relay 4605, the MRL conductor, the front contact and armature 7 of the TE relay 4601, the RLS conductor 4604, to the winding of the RLS relay 2006 to cause this relay to operate. RLS relay 2006 locks to ground on armature 3 and front contact of the RCD relay 2500, over the RLSL conductor, to the front contact and armature 3 of the RLS relay 2006. The operation of the RLS relay 2006 releases the ST1, the ST2, the ST3 and the ST3A relays (Fig. 20). The ST3A relay 2004 removes battery from the TM relay 1705 and the release of the ST1 and the ST3 relays 2001 and 2000 releases the RCD relay 2500 and the TE relay 4601. When the RCD relay 2500 releases, it opens the locking circuit of the RLS relay 2006 and releases the TIS relay 3101. With the release of the four ST-relays (Fig. 20) and the TIS relay 3101, all the relays in the circuit are released except those associated with the motor starting function and the MON master off-normal relay 2002, the splice pattern applied SPA relay 2008 and the RSR reader step release check relay 1703.

12. Reading and checking tape identity on input tape

12.01 Start

After splice has been perforated at the beginning of all the output tapes, the machine start key 4004 is operated momentarily. This key is effective only if the motor (Fig. 12) is running, the reader step relays (Fig. 21) are released, the LK1 relay 3302 is released and no perforator has its window detecting contact (such as 6214 for perforator 0) closed. Ground from the H8 reader contact, over the HB2 conductor, a front contact and armature of the R0 relay 1201, conductor 1300, the armature 7 and back contact of the RS2-4 relay 2105, the armature 10 and back contact of the RS1-3 relay 2106, the ST conductor, to armature 1 and back contact of the LK1 relay 3302, the conductor 3303, the contact of the machine start key 4004, the STD conductor 4012, the armature 1 and back contact of the WSB relay 5302, the STC conductor 5305, the armature 1 and front contact of the SPA relay 2008, the STA conductor 4602, to the armature 3 and back contact of the ST2 relay 2005, and thence over the circuit hereinbefore described through the armature 2 and back contact of the RLS relay 2006, the armature 2 and front contact of the RLM relay 1903, to the winding of the ST1 relay 2001, thus causing the operation of this last named relay. This renders the reader step key 4020 ineffective, operates the RCA relay 2400 through the back contact and armature 4 of the ME relay 3500 from ground over the front contact and armature of the ST1 relay 2001, operates the RCD relay 2500 directly from the same ground, over its front contact and armature 6 shunts the contact on the machine start key 4004 which operated the ST1 relay 2001 (to hold the ST1 and the ST2 relays 2001 and 2005 operated after the key is released) and applies ground over its front contact and armature 7 to the winding of the ST2 relay 2005, in the manner hereinbefore described. The ST2 relay 2005 remains shunted down until the end of the reader open period when the H8 reader back contact (Fig. 13) opens. The operation of the ST2 relay 2005 then prepares operating and locking paths for the ST3 relay 2000, which will become effective upon the next closure of the reader H8 contact (Fig. 13). The operation of the RCA relay 2400 connects the B, C, D, E and F digit reading relays (Figs. 36, 37 and 38) to the reading contacts of the reader (Fig. 12) and certain of these relays operate during each reader closed period, releasing during the open periods. The A digit reading relays (Fig. 36) do not operate in the first closed period because the ST3 relay 2000 has not as yet become operated. This relay operates in the second open period upon the closure of the H8 contact, operating over a path heretofore described to conductor 3303, thence through the front contact and armature 6 of the ST1 relay 2001, conductor 4602, the armature 3 and front contact of the ST2 relay 2005, to the winding of the ST3 relay 2000. This relay operates and, through its front contact and armature 9, causes the operation of the ST3A relay 2004. The ST3 relay 2000 now locks in a circuit from ground, armature 1 and front contact of the MON relay 2002, armature 2 and front contact of the ST2 relay 2005, the back contact and armature 1 of the RLS relay 2006, the armature 6 and front contact of the ST3 relay 2000. The ST3 relay 2000 connects the A digit reading relays (Fig. 36) to the reader (Fig. 12).

In the next closed period, the reading relays for all digits operate. The first portion of the input tape consists of splice pattern 031010 operating reading relays A0, B1, B7, C0, C1, D4, D7, E0, E1, F4 and F7 (in Figs. 36, 37 and 38). Ground is extended from the CK1 conductor 1701, through the reading check path, to conductor 3603, the back contact and armature 8 of the AS relay 3400, conductor 4509, back contact and armature 3 of the C relay 4400, the CKBZ conductor 4401, the back contact and armature 2 of the A2 relay 3602, the back contact and armature 2 of the A1 relay 3601, the front contact and armature 3 of the A0 relay 3600, the ADO conductor, the armature 5 and back contact of the 28B relay 3901, the STT conductor, back contact and armature 7 of the TIC relay 4101, the STT conductor, to the winding of the STT relay 3200, so that this relay now becomes operated. It will be noted that this STT relay 3200 is operated over a back contact of the 28B relay 3901, so that the path for the STT relay 3200 will be opened at this point during tape identity checking and perforating and during normal splice skipping. The circuit also goes through the back contact of the TIC relay 4101, which becomes operated when the tape identity check is complete and, therefore, the STT relay 3200 is prevented from operating during call entries. In the present case, the STT relay 3200 becomes operated and locks in a circuit from ground, the front contact and armature 6 of the ST3A relay 2004, the ON1 conductor, the armature 3 and back contact of the 28C relay 3903, the STTL conductor, to the armature 3 and front contact of the STT relay 3200. This relay thereupon closes a circuit through its armature 1 and front contact for the operation of the SK2 relay 3202, which locks over a plurality of circuits through its armature 4 and front contact as follows: (1) ground, front contact and armature 9 of the ST3A relay 2004, the ON2 conductor, the armature 1 and back contact of the ESK relay 3201, to armature 4 of the SK2 relay 3202 and (2) the same ground on the ON2 conductor, the back contact and armature 7 of the L1 relay 4104, the back contact and armature 7 of the L1UA relay 4103, the back contact and armature 7 of the L1T relay 4102, to the SW2L conductor, where the circuit divides and extends in one direction through the back contact and armature 1 of the SKW relay 3203 and over conductor SKWS to armature 4 of the SK2 relay 3202 and in the other direction through the armature 3 and back contact of the TIC relay 4101 to the same SKWS conductor. The operation of the STT relay 3200 also closes a circuit from ground, through its armature 2 and front contact, over the 28X conductor, the armature 2 and back contact of the 28C relay 3903, to the winding of the 28A relay 3900. This relay operates and locks to ground supplied from the H3 reader contact, over the HB0 conductor, to the armature 1 and front contact of this 28A relay 3900. This latter relay, through its armature 3 and front contact, causes the operation of the 28B relay 3901 in an obvious circuit. The 28A relay 3900 closes a circuit from the K8 reader contact (Fig. 13), over the KB2 conductor, and through the front contact and armature 2 of the 28A relay 3900 to cause the operation of the 28C relay 3903. The 28B relay 3901 performs no functions at this time. The RS2-4 relay 2105 is now operated from the J7 reader contact (Fig. 13), front contact and armature of the R0 relay 1201, the JM5 conductor, the normally closed contacts associated with armature 4 of the ESK relay 3201, the SK conductor, back contact and armature 8 of the AL relay 1700, conductor 1707, the back contact and armature 1 of the L1T relay 4102, the back contact and armature 1 of the L1UA relay 4103, the back contact and armature 1 of the L1 relay 4104, conductor 4105, the armature 4 and back contact of the SKW relay 3203, the armature 5 and front contact of the SK2 relay 3202, conductor 5809, the armature 3 and back contact of the 286R relay 4403, the RS2 conductor 4405, to the winding of the RS2-4 relay 2105. The SK2 relay 3202 opens a circuit at its armature 3 and back contact which would normally otherwise be extended from ground, armature 8 and front contact of the ST3A conductor 2004, the ON4 conductor, the armature 4 and back contact of the PM1 relay 2301, the PM1N conductor, the armature 1 and front contact of the RS2-4 relay 2105, the armature 3 and back contact of the SK2 relay 3202, the RSR conductor, to the battery terminal of the RSR relay 1703. The operation of the SK2 relay 3200 at this time, therefore, prevents the RS2-4 relay 2105 from shunting down the RSR relay 1703, which preventive act cancels a checking feature (including the release of the RSR relay 1703) which is intended to block the circuit if the reader step relays fail to release (see section 26 hereinafter).

12.02 Skipping splice

In each reader closed period a J reader contact (Fig. 13) operates the RS2-4 relay 2105 and this operates the STEP step magnet 1207 of the reader. As long as the RS2-4 relay 2105 keeps operating, the STEP step magnet 1207 will continue to advance the reader drum one line each cycle. In this way all the splice lines are skipped at the start of the input tape. At the start of the open period following the operation of the 28A and 28B relays 3900 and 3901, the 28C relay 3903 operates from the K8 reader contact (Fig. 13) in the circuit above described. The 28C relay 3903 locks itself and the 28B relay 3901 to a ground supplied at the armature 10 and front contact of the SK2 relay 3200 and applied to the 28CL conductor. The locking circuit of the STT relay 3200, heretofore described as passing through the armature 3 and back contact of the 28C relay 3903, is, therefore, opened at this time. Since the operating path for the STT relay 3200 is open at armature 5 of the operated 28B relay 3901, the STT relay 3200 releases. The 28C relay 3903 also operates the PCA relay 3902 from the ground on the ON1 conductor, through the armature 4 and front contact of the 28C relay. The PCA relay 3902 then locks to the ON1 conductor through the normally closed contacts of armature 1 of the PCB relay 3905. The operating path for the 28A relay 3900 is opened at armature 2 and the back contact of the 28C relay 3903 and this 28A relay 3900 then releases at the end of the open period when the ground is removed from the HB0 conductor.

12.03 End of splice

Splice pattern is followed by the first tape identity line 2891XX at the start of a tape and window splice pattern is followed by 287020. Therefore, the appearance of a 2 in the A digit is the signal to stop skipping. The A2 reading relay 3602, through its front contact and armature 14, grounds the conductor 3606, which is now extended through the front contact and armature 11 of the SK2 relay 3202 to the winding of the ESK relay 3201, so that in response to the operation of the A2 relay 3602 the ESK relay 3201 is caused to operate. This opens the operating path for the RS2-4 relay 2105 and the circuit stops skipping. The ESK relay 3201 is also operated by any one of the E2, E4, E7, F0, F1 or F2 relays (Fig. 38) which are arranged to ground the conductor 3606. Thus, in the event that the operation of the A2 relay 3602 fails to operate the ESK relay 3201, the reading of an E digit other than 1 or an F digit other than 0 will also operate the ESK relay 3201. If, because of an irregular tape condition, an A digit of 1 or any B digit other than 8 appears, then the SKAL conductor 3607 will be grounded and this will be extended through the armature 1 and front contact of the SK2 relay 3202 to the AL conductor leading to the winding of the AL alarm relay 1700. Thus under these circumstances, the AL alarm relay 1700 will be operated to bring in an alarm (see section 22). This possible operation of the AL relay 1700 also opens at its armature 8 the operating path for the RS2-4 relay 2105 so that the circuit stops skipping. As a further safeguard against skipping too far, the short timer TM relay 1705 (see section 21.1) is recycled (by a shunt across condenser 1706) each time a 0 is read in the A digit. If the timer is not recycled, the AL alarm relay 1700 will be operated in approximately 0.25 second. This covers the time required to skip a splice between tapes when the reading pins may not penetrate the tape. The circuit for recycling the timer is from ground, front contact and armature 12 of the A0 relay 3600, the ADG conductor, the armature 5 and back contact of the SK1 relay 3204, the armature 3 and front contact of the SK2 relay 3202, the armature 4 and front contact of the RS2-4 relay 2105, the TM conductor, to one terminal of the timing condenser 1706.

12.04 Checking tape index

The first line of tape identity is 2891XX in which the E and F digits indicate the tape index of the input tape. These digits are checked against both the tape type switch (Figs. 50 and 56) and the sort switch (Fig. 50). There are three methods used to check tape index depending upon the tape index and the sort. The following table lists all the possible combinations and shows in which of the three following sections each combination is described:

| Input Tape | Sort | Tape Index | Section |
|---|---|---|---|
| MU tape alone | 1 TH | 11 | 12.041 |
| Do | U | 11 | 12.043 |
| Do | U | 12 | 12.041 |
| Do | T | 13 | 12.041 |
| Do | H | 14 | 12.041 |
| Do | 2 TH | 15 | 12.041 |
| Summary tape alone | U | 17 | 12.041 |
| MU and summary tapes | U | 11 and 17 | 12.042 |
| Do | U | 12 and 17 | 12.042 |
| Do | T | 13 and 18 | 12.042 |
| Toll tape | Office | 20 | 12.041 |
| Do | 1 TH | 21 | 12.041 |
| Do | U | 21 | 12.043 |
| Do | U | 22 | 12.041 |
| Do | T | 23 | 12.041 |
| Do | H | 24 | 12.041 |
| Do | 2 TH | 25 | 12.041 |
| MU detail tape | Office | 30 | 12.041 |
| Do | 1 TH | 31 | 12.041 |
| Do | U | 31 | 12.043 |
| Do | U | 32 | 12.041 |
| Do | T | 33 | 12.041 |
| Do | H | 34 | 12.041 |
| Do | 2 TH | 35 | 12.041 |
| Observing tape | Office | 40 | 12.041 |
| Do | 1 TH | 41 | 12.041 |
| Do | U | 41 | 12.043 |
| Do | U | 42 | 12.041 |
| Do | T | 43 | 12.041 |
| Do | H | 44 | 12.041 |
| Do | 2 TH | 45 | 12.041 |

12.041

When the A2 relay 3602 operates on the 2891XX line, it operates the ESK relay 3201 as described above and also operates the LK1 relay 3302 over the following path: the reader contact H6 (Fig. 13), a front contact and armature of the R0 relay 1201, the HM4 conductor, the front contact and armature 5 of the RCD relay 2500, the HM4 conductor, to armature 10 and back contact of the A0 relay 3600, the armature 10 and front contact of the A2 relay 3602, the back contact and armature 10 of the A1 relay 3601, the LK1 conductor 3604, the front contact and armature 7 of the 28C relay 3903, the LK1 conductor 3904, to the winding of the LK1 relay 3302. The LK1 relay 3302 operates and locks in a circuit from ground, front contact and armature 3 of the ST3A relay 2004, the back contact and armature 6 of the LLA relay 3304, and over the armature 5 and front contact of the LK1 relay 3302 to the winding thereof. As soon as the reading relays operate (Figs. 36, 37 and 38), the L1 relay 4104 comes up through the reading relays and the reading check path. Ground originates either at reader contact G1 (Fig. 12), through a front contact of the R0 relay 1201 and through the RKA relay 2100 in its normal position or at reader contact G2 (Fig. 12), through a front contact of the R0 relay 1201 and through the RKB relay 2101 in its operated position (the operation of these relays is described in section 25), and is extended over the CK conductor, through the armature 1 and front contact of the RCD relay 2500, the CK conductor 2501, the armature 1 and back contact of the AL relay 1700, the CK1 lead 1701, thence through the two-out-of-five check circuits for the F, E, D, C and B reading relays (Figs. 38, 37 and 36), conductor 3603, the back contact and armature 8 of the AS relay 3400, conductor 4509, the back contact and armature 3 of the C relay 4400, conductor 4401, the back contact and armature 4 of the LK2 relay 3300, conductor 3301, the front contact and armature 9 of the A2 reading relay 3602, the back contact and armature 8 of the A1 reading relay 3601, the back contact and armature 8 of the A0 reading relay 3600, the AD2 conductor leading to the tape index connector circuit (Fig. 43) where it is extended by the OBS relay 4300, or the DET relay 4301 to conductor 4305 or alternatively by the MU relay 4302, the MUAS relay 4303 or the MUS relay 4304, to the BC conductor. The B conductor extends through the armature 6 and front contact of the B7 relay 3605, the front contact and armature 9 of the B1 reading relay 3614, the armature 8 and back contact of the B4 reading relay 3608, the BDB conductor, and thence through an armature and front contact again of one of the relays MU 4302, MUAS 4303 or MUS 4304 to the conductor 4305. This conductor 4305 is further extended over armature 2 and back contact of the ME relay 5300, the 28X conductor, through the front contact and armature 1 of the 28C relay 3903, the front contact and armature 1 of the 28B relay 3901, the CC conductor, the armature 4 and front contact of the C7 reading relay 3700 and the front contact and armature 10 of the C2 reading relay 3701 (expressing the value 9), over the CD9 conductor, the back contact and armature 4 of the PX relay 1800, the CD9 conductor 1807, the front contact and armature 9 of the 28B relay 3901, the D. C. conductor, the armature 6 and front contact of the D1 reading relay 3702 and the front contact and armature 6 of the D0 reading relay 3703 (expressing the value 1), the DD1 conductor, the front contact and armature 4 of the 28B relay 3901, the DD1 conductor, to the back contact and armature 4 of the CL8 relay 4200, and thence in a chain circuit through back contacts and armatures of the other CL relays in Figs. 42 and 41, the L1A conductor 4106, and thence through an armature and front contact of any one of the tape index connector relays in Fig. 43, to the L1 conductor, leading to the winding of the L1 relay 4104. This relay operates and locks directly to the DD1 conductor through its front contact and armature 6. The operation of the L1 relay 4104 releases the SK2 relay 3200, which in turn releases the ESK relay 3201.

The RS1-3 relay 2106 is operated if the tape index perforated on the input tape agrees with the setting of the tape type and sort switches. Let it be assumed that the tape type switch is set on it No. 4 terminal (to indicate message unit type tape) and that the sort switch is placed on its No. 5 terminal (to indicate that the tape is to be sorted by tens). In accordance with the foregoing table this would be a tape index 13. A circuit is then established from ground, armature 13 and front contact of the MON relay 2002, the MON5 conductor, sort switch arm 5001, over the TA conductor to the winding of the TA relay 3401. Therefore, a path will be established from ground, armature 4 and front contact of the L1 relay 4104, the FC conductor, through the front contact and armature 8 of the 28B relay 3901, the FC conductor leading into the network of the F digit reading relays, and thence through armatures and contacts of the F1 and F2 reading relays (Fig. 38) to the FD3 conductor, the armature 14 and front contact of the TA relay 3401, the UB conductor 4502, the armature 1 and back contact of the MUS relay 4304, the S conductor, armature 2 and front contact of the L1 relay 4104, the TT conductor, tape type switch arm 5000 on its number 4 MU terminal, the ED1 conductor leading into the network of the E digit reading relays (Fig. 38), and thence through the armatures and contacts of the E1 and E0 reading relays to the EC conductor, front contact and armature 7 of the 28B relay 3901, the EC conductor 3906, the front contact and armature 3 of the L1 relay 4104, the RS0 conductor 5808, the armature 2 and back contact of the 286R relay 4403, to the winding of the RS1-3 relay 2106 over the RS1 conductor 4404. The connection between the tape type switch (Figs. 50 and 56) and the E reading relays (Fig. 38) is such that the tens digit of the tape index (E) must be 1 for message unit or summary, 2 for toll, 3 for message unit detail and 4 for observing. The connection between the sort switch (Fig. 50) and the F digit reading relays (Fig. 38) is such that the units digit of the tape index (F) must be 0 for office sort, 1 for first thousands sort, 3 for tens sort, 4 for hundreds sort, 5 for second thousands sort, while for units sort it must be 2 for message unit, toll, message unit detail and observing tapes and 7 for summary tapes (for message unit and summary tapes combined see section 12.042).

When checking a 17-type tape alone in units sort with the tape type switch (Figs. 50 and 56) set on its No. 2 or MUS contact and the sort switch (Fig. 50) placed on its No. 4 or units sort position, a circuit may be traced from ground, armature 4 and front contact of the L1 relay 4104, the FC conductor, the front contact and armature 8 of the 28B relay 3901, the FC conductor leading to the F digit reading relays (Fig. 38), and thence through the armatures and contacts of the F0 and F7 reading relays to the FD7 conductor, the front contact and armature 1 of the MUS relay 4304, the UB conductor 4502, the front contact and armature 14 of the UA relay 3402, the UA conductor 4503, the armature 3 and front contact of the MUS relay 4304, the ED1A conductor, the armature 9 and front contact of the L1 relay 4104, the ED1 conductor through the network of the E digit reading relays (Fig. 38) established by the operation of the E0 and E1 reading relays to the EC conductor, through the front contact and armature 7 of the 28B relay 3901, the EC conductor 3906, the front contact and armature 3 of the L1 relay 4104, the RS0 conductor 5808, the armature 2 and back contact of the 286R relay 4403, the RS1 conductor 4404, to the winding of the RS1-3 relay 2106 to cause the operation of this last named relay. The RS1-3 relay 2106 locks over the reader open period causing the reader to step. A circuit is established from ground, armature 15 and front contact of the RS1-3 relay 2106, over the RSG conductor, armature 5 and front contact of the L1 relay 4104, to the winding of the CL1 relay 4107, whereupon the CL1 relay 4107 operates and locks in a circuit from ground, front contact and armature 8 of the 28C relay 3903, the CLL conductor, the armature 3 and back contact of the PX relay 1800, the CLL conductor 1808, armature 2 and back contact of the CL8 relay 4200, and thence in a chain circuit through the armatures and back contacts of the other CL relays (Figs. 42 and 41), to the armature 2 and front contact of the CL1 relay 4107. The CL1 relay 4107 operates the TI relay 2800 over the TI conductor from its front contact and armature 7. The TI relay 2800 in turn locks to the ground on the front contact and armature 9 of the 28C relay 3903. The CL1 relay 4107 opens the original operating path of the L1 relay 4104 at its armature 3 and back contact and at its armature 1 prepares an operating path for the L2 relay 4108. The L1 relay 4104 releases at the end of the closed period, at which time the reading relays (Figs. 36, 37 and 38) also release. If the SK2 relay 3202 fails to release when the L1 relay 4104 operates, the operation of the CL1 relay 4107 will operate the AL alarm relay 1700 in a circuit from ground, armature 6 and front contact of the CL1 relay 4107, the SKAL conductor, armature 1 and front contact of the SK2 relay 3202, to the AL alarm conductor leading to the winding of the AL relay 1700.

*12.042*

This section describes the tape index check for message unit tapes combined with summary tapes in units or tens sort. When the reading relays operate, the ESK relay 3201 and the LK1 relay 3302 are operated as previously described. Instead of the L1 relay 4104 being operated, either the L1T relay 4102 or the L1UA relay 4103 will operate as follows: the same path is followed as was described in section 12.041, checking the reading relays and then reading the A, B, C and D digits since the MUAS relay 4303 is operated instead of one of the other relays of Fig. 43. The conductor 4106, instead of being extended to the L1 conductor, is now extended over armature 3 and front contact of the MUAS relay 4303, over the L1B conductor, and thence through the front contact and armature 9 of the units sort UA relay 3402, to the L1U conductor leading to the winding of the L1UA relay 4103, or alternatively through the front contact and armature 9 of the tens sort TA relay 3401, and over the L1T conductor leading to the winding of the L1T relay 4102. The operation of either one of these relays at its armature 7 and back contact releases the SK2 relay 3202 and this in turn releases the ESK relay 3201. Either of these L1UA or L1T relays 4103 or 4102 locks through its armature 6 and front contact to the conductor DD1. Two cycles of the reader are required for checking tape index under the conditions of this section. The first input tape on units sort is either tape index 11 or 12. The first tape on tens sort is 13. Therefore, one of the three 11A, 12A or 13A relays 3001, 2903 or 3002 is operated during the first cycle. The circuit for the 11A relay 3001 may be traced from ground, armature 4 and front contact of the L1UA relay 4103, the FC conductor, the front contact and armature 8 of the 28B relay 3901, the FC conductor leading to the network of the F digit reading relays (Fig. 38), and thence through the path provided by the operated F0 and F1 relays, to the FD1 conductor, the front contact and armature 10 of the L1UA relay 4103, the FD1A conductor, through the back contact and armature 7 of the 17B relay 2902, the back contact and armature 3 of the 12B relay 2900, the armature 5 and back contact of the 11B relay 3000, to the winding of the 11A relay 3001. Similarly, the 12A relay 2903 may be operated in a circuit beginning with the front contact and armature 4 of the L1UA relay 4103 and the 13A relay 3002 may be operated in a circuit beginning with the front contact and armature 4 of the L1T relay 4102. The operated 11A, 12A or 13A relay 3001, 2903 or 3002 locks to a ground supplied by armature 6 and front contact of the ST3A relay 2004, extended over the ON1 conductor through the back contact and armature 5 of the CL1 relay 4107, to the ON1A conductor supplying a locking circuit for the A relays of Figs. 29 and 30, such as the 11A relay 3001. A circuit from the K8 reader contact (Fig. 13) extended over the KB2 conductor will be extended by each of these A relays to its companion B relay as, by way of example, through armature 1 and front contact of the 11A relay 3001, to the winding of the 11B relay 3000. Therefore, in the following reader closed period this companion B relay operates and locks to ground from armature 3 and front contact of the MON relay 2002, the MON6 conductor, the resistance 3003, the back contact and armature 7 of the 18B relay 3004 for the 13B relay 3005, and the back contact and armature 6 of the 17B relay 2902 for the 12B relay 2900 and for the 11B relay 3000. Each of these B relays, when operated, opens the original operating path of its companion A relay.

When the second reader closed period begins, the reading relays again operate and a path is now closed to operate the RS1–3 relay 2106. By way of example, one of these circuits may be traced from ground, armature 4 and front contact of the L1UA relay 4103, the FC conductor, the front contact and armature 8 of the 28B relay 3901, the FC conductor leading into the network provided by the F digit reading relays of Fig. 38, and through a path provided by the operated F0 and F1 reading relays, the FD1 conductor, the front contact and armature 10 of the L1UA relay 4103, the FD1A conductor, the armature 7 and front contact of the 11B relay 3000, the TTU conductor, armature 2 and front contact of the L1UA relay 4103, the TT conductor, the tape type switch arm 5000 now set on its number 3 or MU and SUM position, the ED1 conductor, and thence over the circuit previously traced to the RS1–3 relay 2106. Since the tape type switch (Figs. 50 and 56) is set to MUAS the E digit must be 1. The RS1–3 relay 2106 locks over the reader open period causing the reader to step. This relay also operates the CL1 relay 4107 in the manner previously described and the CL1 relay 4107 operates the tape identity TI relay 2800, also as previously described. The CL1 relay 4107 locks in a circuit from ground, front contact and armature 8 of the 28C relay 3903, the CLL conductor, the armature 3 and back contact of the PX relay 1809, the CLL conductor 1808, the armature 2 and back contact of the CL8 relay 4200, and thence in a chain circuit through each of the CL relays in Figs. 42 and 41, to the armature 2 and front contact of the CL1 relay 4107. The CL1 relay 4107 also opens the operating path for the L1UA or the L1T relay 4103 or 4102 and prepares the operating path for the L2 relay 4108. The L1UA or the L1T relay 4103 or 4102 remains operated during the closed period of the reader but when the G1 or the G2 contact (Fig. 12) opens at the end of this period, whichever one of these relays is operated now releases, at which time the reading relays (Figs. 36, 37 and 38) also release. If the SK2 relay 3202 fails to release when the L1UA or the L1T relay 4103 or 4102 operates, the operation of the CL1 relay 4107 operates the AL alarm relay 1700, as before described, to bring in the alarm.

12.043

This section describes the tape index check on units sort for tapes 11 (alone), 21, 31 and 41. Two cycles are required in these cases in order to operate the X1B relay 2901 to cancel thousands check on these tapes. During the first reader closed period the L1 relay 4104 is operated and the SK2 relay 3202 and the ESK relay 3201 are released, as described in section 12.041. Ground originating at armature 4 and front contact of the L1 relay 4104 is extended through circuits previously described, over the FD1 conductor from the F-relays of Fig. 38, through the front contact and armature 2 of the UA relay 3402 (the units sort relay is operated since the sort switch has been set on its number 4 or units sort position), the FD1A conductor, the front contact and armature 8 of the L1 relay 4104, the FD1B conductor, the armature 6 and back contact of the X1B relay 2901, to the winding of the X1A relay 2904, so that this last relay becomes operated and locks to off normal ground supplied over the ON1A conductor, through the armature 5 and back contact of the CL1 relay 4107, from the ON1 conductor which is grounded by armature 6 of the ST3A relay 2004. The X1B relay 2901 then operates during the following open period. On the second closed period the RS1-3 relay 2106 operates in a circuit similar to that heretofore described starting with the front contact and armature 4 of the L1 relay 4104 and extended through the contacts of the 28B relay 3901, the F digit reading relays (Fig. 38), the UA relay 3402, the L1 relay 4104, the X1B relay 2901, the tape type switch (Figs. 50 and 56), the E digit reading relays (Fig. 38), the 28B relay 3901 and the L1 relay 4104. The E digit relays (Fig. 38) are connected to the tape type switch (Figs. 50 and 56) so that the E digit must be 1 for message unit, 2 for toll, 3 for message unit detail and 4 for observing. The reader steps and the CL1 relay 4107 is operated and locked as described above. The CL1 relay 4107 releases the X1A relay 2904. If the SK2 relay 3202 fails to release when the L1 relay 4104 operates, the operation of the CL1 relay 4107 will cause the operation of the alarm AL relay 1700, through the path provided by the operated SK2 relay 3202, to bring in an alarm.

12.05 Checking marker group

The second line of tape identity is 2892XX in which the E and F digits indicate the marker group. These digits are checked against the marker group tens and marker group units switches shown in Fig. 52 for all tapes on all sorts. Ground over the reading check lead through the A, B, C and D digit reading relays (Figs. 36 and 37) and over the operated armature 1 of the CL1 relay 4107, operates the L2 relay 4108 during the reader closed period. The L2 relay 4108 locks to its operating lead independently of the armature 1 and front contact of the CL1 relay 4107. Ground on the armature 3 and front contact of the L2 relay 4108 may be traced over the FC conductor, the front contact and armature 8 of the 28B relay 3901, the FC conductor leading into the F digit reading relays (Fig. 38) and thence out over one of the FD leads corresponding to the units digit of the marker group and on which units digit the marker group units switch (Fig. 52) is set, the marker group units switch arm 5200, the MGU conductor, front contact and armature 1 of the L2 relay 4108, the MGT conductor, the marker group tens switch arm 5201 which is set on a position corresponding to the tens digit of the marker group, thence over the corresponding ED conductor, through the contact network provided by the E digit reading relays (Fig. 38), and if these relays express the proper number to the EC conductor, through the front contact and armature 7 of the 28B relay 3901, the EC conductor 3906, the front contact and armature 2 of the L2 relay 4108, the RS0 conductor 5808, the armature 2 and back contact of the 286R relay 4403, the RS1 conductor 4404, to the winding of the RS1-3 relay 2106, whereby this latter relay becomes operated. The set-up switches are so connected that the same number must be perforated in the E and F positions of the tape as are expressed by the setting of the marker group switches (Fig. 52). The RS1-3 relay 2106 steps the reader in the open period and operates the CL2 relay 4109, through the front contact and armature 4 of the L2 relay 4108, which results in the release of the CL1 relay 4107. The CL2 relay 4109 locks to the ground (on the STDL condenser of Fig. 42) previously used to hold the CL1 relay 4107 operated.

12.06 Checking first recorder switches

The third line of tape identity is 2893XX in which the E and F digits indicate the number of the first recorder. This item is not checked on input tapes but a check is made that the first recorder switches are off-normal on office and first thousands sorts and in the off position on all other sorts. In this case the circuit for the operation of the RS1-3 reader step relay 2106 may be traced over the reading check lead, over a path heretofore described to the DC conductor coming from the front contact and armature 9 of the 28B relay 3901, through the D digit reading relays (Fig. 37) over the DD3 lead (this is the third line of tape identity), and thence over the armature 5 and front contact of the OFBA relay 3403 or the armature 5 and front contact of the FTHA relay 3404 (depending on whether the sort switch has been set for central office or for first thousands sort), the FRON conductor, thence over either terminal 2 or terminal 3 of the first recorder tens switch arm 5100 (depending on whether this has been set to express 0 or 1, respectively), the first recorder unit switch arm 5101 in any one of its positions, the FR conductor, the armature 6 and front contact of the CL2 relay 4109, the RS0 conductor 5808, back contact and armature 2 of the 286R relay 4403, and over the RS1 conductor to cause the operation of the RS1-3 relay 2106. On all other sorts as, for instance, when the setting of the sort switch (Fig. 50) has caused the operation of the UA relay 3402 or the TA relay 3401 or the HATHA relay 3405, the DD3 conductor in Fig. 34 will be extended to the FRN conductor (instead of the FRON conductor) leading to the first recorder units switch arm 5101 in its off position, the first recorded tens switch arm 5100 in its off position and thence over the FR conductor as before to cause the operation of the reader step relay.

12.07 Checking last recorder switches

The fourth line of tape identity is 2894XX in which the E and F digits indicate the number of the last recorder. This item is not checked on input tapes but a check is made that the last recorder switches are off-normal on office and first thousands sorts and normal (in the off position) on all other sorts. The circuit for operating the RS1-3 reader step relay 2106 is similar to that described in the previous section, except in this case that the digit 4 must be expressed in the D digit reading relays (Fig. 37). Therefore, the DD4 conductor connected to armature 6 of the OFBA office sort and FTHA first thousands sort relays 3403 and 3404 is extended to the LRON conductor and is connected to armature 8 of the UA units, TA tens and HATHA hundreds sorts relays 3402, 3401 and 3405 and is extended thereby to the LRN conductor. In the first case, where it is to be checked that the last recorder switch is off-normal, the DD4 conductor extended to the LRON conductor connects to the last recorder tens switch arm 5203 in either its number 2 or number 3 position (where it expresses the digit 0 or 1, respectively), the last recorder units switch arm 5204 (set on any of its positions other than off), thence over the LR conductor, through armature 5 and front contact of the CL2 relay 4109, and over the circuit previously traced to the winding of the RS1-3 relay 2106. In other cases, where the UA, TA or HATHA relay 3402, 3401, or 3405 is operated, the DD4 conductor is extended over the LRN conductor, through the last recorder units switch arm 5204 in its off position, the last recorder tens switch arm 5203 in its off position, to the LR lead to cause the operation of the RS1-3 reader step relay 2106 in the circuit above described.

12.08 Checking office

The fifth line of tape identity is 2895XO in which the E digit indicates the office. This item is checked on all sorts except the office sort where a check is made that the central office switch (Fig. 51) is in the off position. Ground over the reading check lead, through the A, B, C and D digit reading relays (Figs. 36 and 37), the DD5 conductor, and over the front contact and armature 1 of the CL2 relay 4109 will cause the operation of the L5 relay 4201. Ground through the front contact and armature 1 of the L5 relay 4201 will extend over the OF conductor, the central office switch arm 5102 in its off position, the number 2 or central office terminal of the sort switch arm 5002, the RSO conductor 5808, and thence over the circuit previously described to cause the operation of the RS1-3 relay 2106. On other sorts this same ground through the central office switch arm 5102 will extend the circuit over a corresponding ED conductor. Thus, if the reading relays (Fig. 38) properly check out over the EC conductor, ground will extend over front contact and armature 7 of the 28B relay 3901, the EC conductor 3906, the front contact and armature 2 of the L5 relay 4201, and the RSO conductor 5808 to cause the operation of the RS1-3 relay 2106. The circuit is connected so that the F digit must agree with the switch setting. The RS-1-3 reader step relay 2106 steps the reader and operates the CL5 relay 4202. This latter relay releases the CL2 relay 4109 and locks to the circuit previously used for holding this CL2 relay 4109 operated.

12.09 Checking thousands range

The sixth line of tape identity is 2896XX in which the E and F digits indicate first and last thousands, where required, or appear as 90 where first and last thousands information is not needed. The following table indicates on which tapes 90 or thousands is received:

| F and L Thous. | 90 |
| --- | --- |
| 13 from sorter | 11. |
| 14 | 12. |
| 15 | 13 from computer. |
| 18 | 17. |
| 23, 33, 43 | 20, 30, 40. |
| 24, 34, 44 | 21, 31, 41. |
| 25, 35, 45 | 22, 32, 42. |

Ground over the reading check lead through the A, B, C and D digit reading relays (Figs. 36 and 37), over the DD6 lead, through the front contact and armature 1 of the CL5 relay 4202, operates the L6 relay 4203. On office and first thousands sorts all input tapes will have 9 and 0 for the first and last thousands digits and the switches will be in the off position. The L6 relay 4203 grounds the FC conductor at its armature 5 and front contact, whereupon the FD0 lead will be grounded and the circuit extended through the armature 1 and front contact of the L6 relay 4203, to the FD0A conductor, from which it is extended over the front contact and armature 7 of the OFBA relay 3403 (when the sort switch is set in the central office position) or through the front contact and armature 7 of the FTHA relay 3404 (when the sort switch is set in the first thousands position) to the THN conductor leading to the off position terminal of the thousands last switch arm 5103, the thousands first switch arm 5104 in its off position, the ED9A conductor, to armature 2 and front contact of the L6 relay 4203, the ED9 conductor, to the network provided by the E digit reading relays (Fig. 38), to thereafter be extended in the manner described to the RS1-3 relay 2106. The FD0A conductor may also be extended through the front contact and armature 10 of the UA relay 3402 (when the sort switch is placed in its units position) to the THON conductor or alternatively over the front contact and armature 10 of the TA relay 3401 (when the sort switch is in its tens sort position) and thereafter over the FD0B conductor and through the front contact and armature 1 of the MU relay 4302 to the THON conductor, or again alternatively over the armature 2 and front contact of the 13B relay 3005, to the THON conductor, thence to any one of the positions (excepting off) on which the thousands first switch arm 5104 is set, through the thousands last switch arm 5103 (set in any one of its positions excepting the off position), thence over the ED9A conductor as before described to cause the operation of the RS1-3 relay 2106. On units sort all input tapes will have 90 perforated on them but the switches will be set to control the tape section count. The L6 relay 4203 operates the RS1-3 reader step relay 2106 through one of the circuits just described. The actual switch settings are not checked at this time. During the tape section check, however, if the switches are not properly set, the circuit will block on failure of the tape section checking circuit. On tens sort of all tapes, except tape 13 from the computer, the tape will indicate first and last thousands and the switches will be off normal. The L6 relay 4203 will operate the RS1-3 reader step relay 2106 through the circuit described including the front contact and armature 10 of the TA relay 3401. In this case the E and F digits on the tape must agree with the thousands first and thousands last switches (Figs. 51 and 57), respectively. On tens sort of type 13 tape from the computer the L6 relay 4203 operates the RSI-3 reader step relay 2106 with the thousands first and thousands last switches in any position other than off. On the hundreds and second thousands sorts the L6 relay 4203 operates the RSI-3 reader step relay 2106 in a circuit coming out of the F digit relays (Fig. 38) on a particular FD lead, thence through the thousands last switch arm 5105 (which must now be set properly), over the LTH lead, and thence through either the armature 2 and front contact of the TA relay 3401 or the HATHA relay 3405, the LTH lead, to the front contact and armature 3 of the L6 relay 4203, the FTH lead, to the thousands first switch arm 5106 (now set on one of its terminals connected to the ED leads such as the ED4 lead which must correspond to the operation of the E digit reading relays of Fig. 38), and thence over the circuit before described to cause the operation of the RSI-3 reader step relay 2106. The RSI-3 reader step relay 2106 steps the reader and operates the CL6 relay 4204, which thereupon releases the CL5 relay 4202 and locks itself to the STDL conductor locking circuit through its armature 5 and front contact.

*12.10 Stepping tape section selector to initial position*

During the reader open period following the check of the 2896XX line the tape section selector shown in Fig. 35 is stepped off normal in those cases where its use is required. The selector is never used on office and first thousands sorts and it is always used on tens, hundreds and second thousands sorts. On units sorts it is not used for tape 11 alone or tapes 21, 31 or 41. It is used for tapes 12 alone, 17 alone and tapes 22, 32 and 42. When tapes 11 and 17 are processed together, the selector is used only for tape 17. When tapes 12 and 17 are processed together the selector is used twice, once for tape 12 and then again, after a resetting, for tape 17. If the selector is to be used, the FTI relay 2200 is operated to step the selector from its normal portion to its initial position. The FTI relay 2200 is operated through the CL6 relay 4204 during the reader open period. On tens, hundreds and second thousands sorts this FTI relay 2200 is operated in a circuit from ground at the reader back contact K8, one of the KB2 conductors, the front contact and armature 1 of the CL6 relay 4204, armature 5 and back contact of the TIEA relay 3100, the FTID conductor, armature 1 of the UA relay 3402 and of the TA relay 3401 and of the HATHA relay 3405, and through the front contacts of either of the latter two relays to the FTI conductor, thence through the armature 3 and back contact of the FT2 relay 2201, to the winding of the FTI relay 2200, or alternatively through the armature 1 and front contact of the UA relay 3402, over the FTIC conductor and in one direction through the armature 7 and front contact of the MUS relay 4304 to the FTI conductor for the operation of the FTI relay 2200. On units sort of message unit tapes alone, toll message unit detail or observing tapes, the FTIC conductor is extended by the MU relay 4302 or the DET relay 4301 or the OBS relay 4300 to the FTIB conductor, which passes through the back contact and armature 3 of the XIB relay 2901, to the FTI conductor. The operation of the XIB relay 2901 for tapes 11, 21, 31 and 41 prevents the operation of the FTI relay 2200 for these tapes. On units sort of summary tapes alone, the path is that described through the armature 7 and front contact of the MUS relay 4304. On units sort of tapes 12 and 17 the FTIC conductor passes through the armature 6 and front contact of the MUAS relay 4303, thence over the FTIA conductor, the back contact and armature 3 of the IIB relay 3000, to the FTI conductor, for operating the FTI relay 2200 as before described. The FTI relay 2200, therefore, operates for tapes 12 and 17, but not for tape 11 when it is followed by tape 17. If the FTI relay 2200 operates, it locks in a circuit from ground, armature 7 and front contact of the CL6 relay 4204, the FTIL conductor, the armature 2 and back contact of the FT2 relay 2201, the armature 1 and front contact of the FTI relay 2200, to battery through the FTI relay 2200. In the following reader closed period the ROT rotary magnet 3501 of the selector is operated from ground, the K5 reader contact (Fig. 13), one of the KM3 leads, to armature 5 of the FTI relay 2200, the back contact and armature 5 of the FT2 relay 2201, the back contact and armature 5 of the LTD relay 2202, the TDS conductor, to the back contact and armature 1 of the ALA relay 1708, and over the ROT lead extending directly to the winding of the ROT magnet 3501. The TD selector (Fig. 35) steps from normal position to its first terminal, which corresponds to tape section 0. At the end of the closed period the ROT rotary magnet 3501 releases. During the next closed period the selector takes another step, unless the FT2 relay 2201 has operated. It continues to take one step for each reader cycle until stopped by the operation of the FT2 relay 2201. On tens, hundreds and second thousands sorts, where the selector is always used to check tape sections 0 through 9, the FT2 relay 2201 operates when the selector reaches the position corresponding to tape digit 0 as follows: ground through the reader break contact K3, the KB0 conductor, the front contact and armature 4 of the FTI relay 2202, the back contact and armature 3 of the STD relay 2203, the TDG conductor connected in parallel to all the armatures numbered 1 of the S relays in Fig. 35, and thence through the armature 1 and front contact of the S0 relay 3502 (operated because the selector switch arm 3503 is on its first contact), over the 0 conductor, and thence through the front contact and armature 3 of either the HATHA relay 3405 or the TA relay 3401 (operated because the sort switch is either on its tens or hundreds position), thence over the FTD lead, armature 2 and front contact of the FTI relay 2200 to the winding of the FT2 relay 2201. On units sort the selector is used to check a series of tape sections whose value and lower limits are determined by the setting of the thousands first and thousands last switches. In this case, ground from the reader contact K3 is extended over the circuit previously described, to the 0 conductor at the front contact and armature 1 of the S0 relay 3502, thence through the thousands first switch arm 5107 set on its 0 indicating position (or alternatively on a position to correspond to another one of the operated S relays of Fig. 35), over the FTD conductor leading to the front contact and armature 3 of the UA relay 3402, and thence over the FTD conductor and the circuit previously described to armature 2 and front contact of the FTI relay 2200, to operate the FT2 relay 2201. Thus the selector is stopped in a position corresponding to the setting of the thousands first switch. The FT2 relay 2201 releases the FTI relay 2200 and locks to the MON3 ground over armature 3 and back contact of the RTD relay 2204. The FT2 relay 2201 connects the EC relay 3504 through the armtaure 6 and front contact of the FT2 relay 2201, and the back contact and armature 1 of the TDA relay 2205, over the EC conductor in parallel with the L8 relay 4205. The release of the FT1 relay 2200 prevents further stepping of the selector at this time.

12.11 Skipping days of round

The seventh line of tape identity is 2897XX in which the E and F digits indicate the first and last days of round. These items are not checked by the sorter. Ground over the reading check lead, through the A, B, C and D digit reading relays (Figs. 36 and 37) coming out on the DD7 lead, is extended through the armature 2 and front contact of the CL6 relay 4204 directly to the RS0 lead 5808, whereby, as previously described, the RSI-3 relay 2106 is operated to step the reader.

12.12 Checking tape section and round

The eighth line of tape identity is 2898XX in which the E digit is the tape section and the F digit is the round. Round is checked on all tapes in all sorts. The tape section is the digit by which the tapes were previously sorted. In the sorter, for example, during a hundreds sort the output tape perforated by perforator 0, in which all hundreds digits are 0, carries tape section 0. The conditions under which tape section is checked are given in section 12.10; they are those cases where the tape section selector is stepped off normal. Ground over the reading check lead, through the A, B, C and D digit reading relays (Figs. 36 and 37), coming out now on the DD8 lead and extending through the front contact and armature 3 of the CL6 relay 4204, causes the operation of the L8 relay 4205. In those cases where no check is made of tape section the selector will not have stepped off normal. A circuit will, therefore, be established from ground, contacts 3505 of the tape section selector off-normal springs, the SN conductor, and thence either through armature 1 and front contact of the OFBA relay 3403 or of the FTHA relay 4304 or of the X1B relay 2901 or the 11B relay 3000, to the TDG conductor leading through armature 3 and back contact of the STD relay 2203, the armature 3 and back contact of the FT1 relay 2200, the TD conductor, the front contact and armature 2 of the L8 relay 4205, the RD conductor, the armature 4 and back contact of the 18B relay 3004, the armature 4 and back contact of the 17B relay 2902, the RD1 conductor, the round switch arm 5003 (now set on the contact representing the value of the round through the corresponding FD conductor), and thence through the network of contacts provided by the F digit reading relays (Fig. 38), (providing these relays express the same round digit value), thence out over the FC conductor, the armature 8 and front contact of the 28B relay 3901, the FC conductor, to the front contact and armature 4 of the L8 relay 4205, and thence to the RS0 conductor 5808 leading, as previously described, to the winding of the RSI-3 relay 2106, whereby the reader is stepped. This checks that the round digit on the tape agrees with the setting of the round switch. The contacts of the OFBA relay 3403, the FTHA relay 3404, the 11B relay 3000 and the X1B relay 2901 are provided so that if the selector fails to step off normal in a case where it should, then the path from its off-normal contacts will not be closed. If a summary tape alone is being sorted, the round switch is set to correspond with the round of the tape. Whenever a summary tape is being sorted with a message unit tape, the round switch is set to correspond to the round of the message unit tape and the circuit checks that the summary tape is for a previous round. On such a combined sort the 17B relay 2902 or the 18B relay 3004 is operated whenever the tape is being processed and the round check is made through the switch arm 5004 of the round switch, checking that the round digit of the summary tape is for the round preceding that set up on the round switch. It may be noted, by way of example, that if the round switch (Figs. 50 and 56) is set on its number 6 contact, then the round switch arm 5004 will be connected to the FD3 conductor, whereas the round switch arm 5003 will be connected to the FD4 conductor. Where the tape section selector has been stepped off normal, ground is extended from armature 3 and front contact of the L8 relay 4205, over the EC conductor 3906, the armature 7 and front contact of the 28B relay 3901, the EC conductor leading into the network provided by the contacts of the E digit reading relays (Fig. 38), through one of the ED conductors, thence through a corresponding armature and contact of the EC relay 3504, over a front contact and armature 1 of a corresponding S relay of Fig. 35, to the TDG conductor, and thence over the circuit previously described to operate the RSI-3 reader step relay 2106, so that this ground replaces the ground from the off-normal springs of the TD selector (Fig. 35). If the selector was stepped off normal, then it stepped to the position corresponding to tape section 0 while the circuit was skipping the 2897XX line. Thus it is already off normal when 2898XX is read, in those cases where the switch is used. The circuit waits until the selector has stepped all the way to its initial position before the path is closed for checking tape digit and round. This prevents a satisfaction check of a wrong tape section while the selector is still stepping. The check path is not closed until the EC relay 3504 operates following the operation of the FT2 relay 2201, by which time the selector has reached its initial position. While the selector is stepping and tape section and round are being checked, the TM relay 1705 timing circuit is prevented from operating by ground placed on the TM conductor at the front contact and armature 10 of the CL6 relay 4204. The CL6 relay 4204 also grounds, through its armature 9 and front contact, the TTM conductor to operate the TTM relay 2300, thereby to start the long timer. The RSI-3 reader step relay 2106 steps the reader and operates the CL8 relay 4200, which locks to the CLL conductor 1808 and releases the CL6 relay 4204.

12.13 Checking month

12.131 General

The ninth and last line of tape identity is 2899XX in which the E and F digits indicate the month. This is checked against the month tens and month units switches (Figs. 50 and 56) on all tapes in all sorts. In most cases the month shown on the tape agrees with the switches. This is true for message unit tapes alone, summary tapes alone, toll, message unit detail and observing tapes. It is also true on combined sorts of message unit and summary tapes whenever the message unit tape is being processed and when the summary tape is being processed provided the message unit tape is not for round 0. In this one case when the summary tape is being processed in a combined sort with a message unit tape for round 0 the circuit checks that the summary tape is for the preceding month. Since on a combined sort the summary tape is always for the round preceding the message unit tape, when the latter is for round 0 of any month, the summary tape must be for round 5 of the preceding month. The MOC relay 3006 is operated from ground through the round switch arm 5005 in its 0 indicating position, over the RD0 conductor, and thence through either the armature 1 and front contact of the 17B relay 2902 or the 18B relay 3004 (operated when the previous month is to be checked, otherwise it remains normal). Ground over the reading check lead, through the A, B, C and D digit relays (Figs. 36 and 37) coming out over the DD9 conductor, and extending through the front contact and armature 1 of the CL8 relay 4209, causes the operation of the L9 relay 4206.

12.132 Current month

When the MOC relay 3006 is normal, the path for checking the month is as follows:

*Month 01.*—Ground is extended over armature 4 and front contact of the L9 relay 4206, the FC conductor, the front contact and armature 8 of the 28B relay 3901, the FC conductor leading into the network provided by the F digit reading relays (Fig. 38), out over the FD1 conductor (the F relays must express the value 1), the month units switch arm 5006 with the month units switch moved to its number 3 contact to express the month units value 1, the MOU1 conductor, the back contact and armature 2 of the MOC relay 3006, the MOU conductor, the armature 1 and front contact of the L9 relay 4206, the MOT conductor, the month units switch arm 5007 also set on its number 3 contact, the month tens switch arm 5008 set on its number 2 contact to express the value 0, the MOT3 conductor, armature 1 and back contact of the MOC relay 3006, the MOT1 conductor, month tens switch arm 5009 also set on its number 2 contact, the ED0 conductor leading into the network provided by the E digit reading relays (Fig. 38) and, providing these relays now express the value 0 as they should, then out over the EC conductor, the front contact and armature 7 of the 28B relay 3901, the EC conductor 3906, the armature 3 and front contact of the L9 relay 4206, the armature 4 and back contact of the TIEA relay 3100, to the winding of the TIS relay 3101.

*Month 02–09.*—Ground is extended over armature 4 and front contact of the L9 relay 4206, the FC conductor, the armature 8 and front contact of the 28B relay 3901, the FC conductor leading into the network provided by the F digit reading relays (Fig. 38) and thence out over one of the FD2 to FD9 conductors in accordance with the units digit of the month and, providing the month units set-up switch is set to express the same value, thence over the month units switch arm 5006, the MOU1 conductor, the back contact and armature 2 of the MOC relay 3006, the MOU conductor, armature 1 and front contact of the L9 relay 4206, the MOT conductor, the month units switch arm 5007 on any one of its contacts expressing the units digit of the month 2 to 9, the MOT1 conductor, the month tens switch arm 5009 set on its number 2 contact to express the value 0, the ED0 conductor through the network provided by the E digit reading relays (Fig. 38) and, providing these relays now express the month tens value 0, over the EC conductor, the front contact and armature 7 of the 28B relay 3901, the EC conductor 3906, the armature 3 and front contact of the L9 relay 4206, the armature 4 and back contact of the TIEA relay 3100, to the winding of the TIS relay 3101.

*Month 10.*—Ground is extended over armature 4 and front contact of the L9 relay 4206, the FC conductor, armature 8 and front contact of the 28B relay 3901, the FC conductor leading to the network provided by the F digit reading relays (Fig. 38) and, providing these relays now express the value 0 for the units digit of the month, out over the FD0 conductor, the month units switch arm 5006 set to express the value 0, the MOU1 conductor, the back contact and armature 2 of the MOC relay 3006, the MOU conductor, the armature 1 and front contact of the L9 relay 4206, the MOT conductor, the month units switch arm 5007 set to express the value 0, the MOT3 conductor, the armature 1 and back contact of the MOC relay 3006, the MOT1 conductor, the month tens switch arm 5009 set on its number 3 contact to express the tens digit 1 of the month, the ED1 conductor leading into the network provided by the E digit reading relays (Fig. 38) and, providing these now properly express the value 1, over the EC conductor, the front contact and armature 7 of the 28B relay 3901, the EC conductor 3906, the armature 3 and front contact of the L9 relay 4206, the armature 4 and back contact of the TIEA relay 3100, to the winding of the TIS relay 3101.

*Month 11.*—Ground is extended over armature 4 and front contact of the L9 relay 4206, the FC conductor, the armature 8 and front contact of the 28B relay 3901, the FC conductor leading into the network provided by the F digit reading relays (Fig. 38) and, providing these relays now properly express the value 1, out over the FD1 conductor, the month units switch arm 5006 set on its number 3 contact to express the units digit value 1, the MOU1 conductor, the back contact and armature 2 of the MOC relay 3006, the MOU conductor, armature 1 and front contact of the L9 relay 4206, the MOT conductor, the month units switch arm 5007 set on its number 3 contact, the month tens switch arm 5008 set on its number 3 contact to express the value 1, the MOT1 conductor, the month tens switch arm 5009 also set on its number 3 contact, the ED1 conductor leading into the network provided by the E digit reading relays (Fig. 38) and, providing these now properly express the months tens digit 1, out over the EC conductor, the front contact and armature 7 of the 28B relay 3901, the EC conductor 3906, the armature 3 and front contact of the L9 relay 4206, the armature 4 and back contact of the TIEA relay 3100, to the winding of the TIS relay 3101.

*Month 12.*—Ground is extended over armature 4 and front contact of the L9 relay 4206, the FC conductor, the armature 8 and front contact of the 28B relay 3901, the FC conductor leading into the network provided by the F digit reading relays (Fig. 38) and, providing these now properly express the units digit value 2, out over the FD2 conductor, the month units switch arm 5006 set on its number 4 contact to express the value 2, the MOU1 conductor, the back contact and armature 2 of the MOC relay 3006, the MOU conductor, the armature 1 and front contact of the L9 relay 4206, the MOT conductor, the month units switch arm 5007 set on its terminal 4 to express the value 2, the MOT1 conductor, the month tens switch arm 5009 set on its number 3 contact to express the value 1, the ED1 conductor into the network provided by the E digit reading relays (Fig. 38) and, providing these reading relays now properly express the month tens value 1, out over the EC conductor, the front contact and armature 7 of the 28B relay 3901, the EC conductor 3906, the armature 3 and front contact of the L9 relay 4206, the armature 4 and back contact of the TIEA relay 3100, to the winding of the TIS relay 3101.

*12.133 Previous month*

When the MOC relay 3006 is operated the path for checking month is as follows:

*Month expressed on tape—12, on switches—01.*—Ground is extended over armature 4 and front contact of the L9 relay 4206, the FC conductor, the armature 8 and front contact of the 28B relay 3901, the FC conductor into the network provided by the F digit reading relays (Fig. 38) and, providing these relays now properly express the units digit value 2, thence over the FD2 conductor, the month tens switch arm 5600 set on its number 2 terminal to express the month tens value 0, the number 3 terminal for the month units switch arm 5010 set on this terminal to express the month units value 1, the MOU2 conductor, the front contact and armature 2 of the MOC relay 3006, the MOU conductor, armature 1 and front contact of the L9 relay 4206, the MOT conductor, the month units switch arm 5007 set on its number 3 contact, the month tens switch arm 5008 set on its number 2 contact, the MOT3 conductor, the armature 1 and front contact of the MOC relay 3006, the MOT2 conductor, the month tens switch arm 5011 set on its number 2 contact, the ED1 conductor into the network provided by the E digit reading relays (Fig. 38) and, providing these relays are now set to express the month tens digit value 1, thence out over the EC conductor, the front contact and armature 7 of the 28B relay 3906, the EC conductor 3906, the armature 3 and front contact of the L9 relay 4206, the armature 4 and back contact of the TIEA relay 3100, to the winding of the TIS relay 3101.

*Month expressed on tape—01 to 08, on switches—02 to 09.*—Ground is extended over armature 4 and front contact of the L9 relay 4206, the FC conductor, armature 8 and front contact of the 28B relay 3901, the FC conductor leading into the network provided by the F digit reading relays (Fig. 38) and, providing these relays are now set to express the units digit value 1 to 8, out over one of the conductors FD1 to FD8, thence through the month units switch arm 5010 set on one of its terminals to express the month units value 2 to 9, the MOU2 conductor, the front contact and armature 2 of the MOC relay 3006, the MOU conductor, armature 1 and front contact of the L9 relay 4206, the MOT conductor, the month units switch arm 5007 set on any one of its terminals to express the value 2 to 9, the month tens switch arm 5009 set on its number 2 terminal to express the month tens value 0, the ED0 conductor leading into the network provided by the E digit reading relays (Fig. 38) and, providing these relays now properly express the value 0, out over the EC conductor, the front contact and armature 7 of the 28B relay 3901, the EC conductor 3906, the armature 3 and front contact of the L9 relay 4206, armature 4 and back contact of the TIEA relay 3100, to the winding of the TIS relay 3101.

*Month expressed on tape—09, on switches—10.*—Ground is extended over armature 4 and front contact of the L9 relay 4206, the FC conductor, the armature 8 and front contact of the 28B relay 3901, the FC conductor leading into the network provided by the F digit reading relays (Fig. 38) and, providing these relays now properly express the month units value 9, out over the FD9 conductor, the month units switch arm 5010 set on its number 2 contact to express the value 0, the MOU2 conductor, the front contact and armature 2 of the MOC relay 3006, the MOU conductor, armature 1 and front contact of the L9 relay 4206, the MOT conductor, the month units switch arm 5007 set on its number 2 contact to express the value 0, the MOT3 conductor, armature 1 and front contact of the MOC relay 3006, the MOT2 conductor, month tens switch arm 5011 set on its number 3 conductor to express the value 1, the ED0 conductor into the network provided by the E digit reading relays (Fig. 38) and, providing these relays now properly express the month tens digit 0, out over the EC conductor, the front contact and armature 7 of the 28B relay 3901, the EC conductor 3906, the armature 3 and front contact of the L9 relay 4206, the armature 4 and back contact of the TIEA relay 3100, to the winding of the TIS relay 3101.

*Month expressed on tape—10, on switches—11.*—Ground is extended over armature 4 and front contact of the L9 relay 4206, the FC conductor, the armature 8 and front contact of the 28B relay 3901, the FC conductor leading into the network provided by the F digit reading relays (Fig. 38) and, providing these relays now properly express the month units digit 0, out over the FD0 conductor, the contact 3 of the month tens switch arm 5600 set on this contact to express the value 1, the number 3 contact and the month units switch arm 5010 set thereon to express the value 1, the MOU2 conductor, the front contact and armature 2 of the MOC relay 3006, the MOU conductor, armature 1 and front contact of the L9 relay 4206, the MOT conductor, month units switch arm 5007 set on its number 3 contact, the month tens switch arm 5008 set on its number 3 contact, the MOT1 conductor, the month tens switch arm 5009 set on its number 3 contact, the ED1 conductor leading into the network provided by the E digit reading relays (Fig. 38) and, providing these relays now properly express the month tens digit 1, out over the EC conductor, the front contact and armature 7 of the 28B relay 3901, the EC conductor 3906, the armature 3 and front contact of the L9 relay 4206, the armature 4 and back contact of the TIEA relay 3100, to the winding of the TIS relay 3101.

*Month expressed on tape—11, on switches—12.*—Ground is extended over armature 4 and front contact of the L9 relay 4206, the FC conductor, the armature 8 and front contact of the 28B relay 3901, the FC conductor leading into the network provided by the F digit reading relays (Fig. 38) and, providing these relays now properly express the month units digit 1, over the FD1 conductor, the number 4 contact and the month units switch arm 5010 set thereon to express the value 2, the MOU2 conductor, the front contact and armature 2 of the MOC relay 3006, the MOU conductor, armature 1 and front contact of the L9 relay 4206, the MOT conductor, the month units switch arm 5007 set on its number 4 contact, the MOTI conductor, the month tens switch arm 5009 set on its number 3 contact to express the month tens digit 1, the EDI conductor leading into the network provided by the E digit reading relays (Fig. 38) and, providing these relays now properly express the month tens digit 1, out over the EC conductor, the front contact and armature 7 of the 28B relay 3901, the EC conductor 3906, the armature 3 and front contact of the L9 relay 4206, the armature 4 and back contact of the TIEA relay 3100, to the winding of the TIS relay 3101.

12.134 Completion of month check

The TIS relay 3101 operates in the circuits above described, instead of the RS1–3 reader step relay 2106, at the completion of the month check. The reader is not stepped at this time and hence remains on the 2899XX line during tape identity perforating which follows.

13. Perforating tape identity on leading end of output tapes

13.01 Arranging to perforate tape index

Upon its operation the TIS relay 3101 locks in a circuit from ground, front contact and armature 2 of the RCD relay 2500, the TISL conductor, the back contact and armature 1 of the TIE relay 3102, the front contact and armature 6 of the TIS relay 3101 and thence through the winding thereof. At its armature 8 and back contact the TIS relay 3101 opens the connection between conductors 2107 and 3103 to prevent the reader advance during tape identity perforating. At its armature 11 and front contact the TIS relay grounds the ME conductor leading directly to the winding of the ME relay 5300, so that this relay operates. A circuit is also established from ground, armature 9 and front contact of the ST3A relay 2004, the ON2 conductor, through the armature 9 and back contact of the TE relay 4601, the TEN conductor, the armature 7 and front contact of the TIS relay 3101, the PTI conductor leading to the righthand terminal of the TI relay 2800, so that this relay is shunted down by the operation of the TIS relay 3101. A connection is also established by the TIS relay 3101 from its armatures 9 and 10, respectively, to ground the leads to the B1 and B7 reading relays (Fig. 36) directly and independently of the tape. The operation of the ME relay 5300 opens the circuit for the RCA relay 2400 at armature 4 and back contact of the ME relay, so that the reading relays (Figs. 36, 37 and 38) are disconnected from the reader and all of them with the exception of the B1 and B7 relays (Fig. 36) are now released. The ME relay 5300 extends a connection from the K1 reader contact (Fig. 13) over the KM1 conductor, through the armature 4 and back contact of the ESP relay 5304, and thence through the front contact and armature 5 of the ME relay 5300, over the back contact and armature 10 of the APB–C relay 5800, to the A2 reading relay (Fig. 36), so that the A2 reading relay 3602 thus operates during reader closed periods providing the APB–C relay 5800 is normal. In the reader open period, ground from reader contact K3 (Fig. 13), over the KB0 conductor, the front contact and armature 8 of the RCD relay 2500, the KB0 conductor, the front contact and armature 4 of the TIS relay 3101, the PX conductor, back contact and armature 1 of the W2A relay 1801, the P0 conductor, armature 2 and back contact of the WSP relay 1906, and thence in a chain circuit through armatures and back contacts of the EP relay 1907, the W9 to W1 relays 1802 to 1803, to the winding of the PX relay 1800, which thereupon operates and locks to ground supplied over the front contact and armature 2 of the ST3A relay 2004, back contact and armature 6 of the RS1–3 reader step relay 2106, the PLL conductor, front contact and armature 2 of the TIS relay 3101, and thence in a chain circuit controlled by the PS2 relay 1908, the PS3 relay 1909, the PS1 relay 1910, and the PL relays of Fig. 18, to armature 2 and front contact of the PX relay 1800. An alternative locking circuit for the PX relay 1800 may be traced from the K7 reader contact (Fig. 13), over the KM3 conductor, the armature 5 and back contact of the SS relay 5802, front contact and armature 2 of the TIS relay 3101, to the PLL conductor. The operation of the PX relay 1800 releases the CL8 relay 4200 since the connection to the CLL conductor 1808 is opened at the back contact of armature 3 of the PX relay 1800. In the next reader closed period the W1 relay 1803 operates from ground supplied over the H5 reader contact, the KM3 conductor, the armature 6 and back contact of the PS2 relay 1908, and thence over an obvious chain circuit to the armature 1 and front contact of the PX relay 1800, thence to the winding of the W1 relay 1803. The W1 relay 1803 now locks in a circuit from ground, front contact and armature 3 of the TIS relay 3101, the WL conductor, armature 3 and back contact of the WSP relay 1906, and thence through an obvious chain circuit to armature 2 and front contact of the W1 relay 1803. This extra reader cycle is provided before tape identity perforating to allow the ME relay 5300 to operate fully. In the open period following, the PL1 relay 1805 operates from ground through the reader back contact K3 (Fig. 13), the KB9 conductor, the front contact and armature 8 of the RCD relay 2500, the KB0 conductor, the front contact and armature 4 of the TIS relay 3101, the PX conductor, the back contact and armature 1 of the W2A relay 1801, the P0 conductor, the armature 2 and back contact of the WSP relay 1906, and thence in a chain circuit over the armatures and back contacts of the EP relay 1907 and the W relays of Fig. 18, to armature 1 and front contact of the W1 relay 1803, thence over the P0 conductor 1806, the armature 1 and back contact of the PSP relay 4600, the PL1 conductor, to the winding of the PL1 relay 1805. This relay now operates and opens the holding circuit for the PX relay 1800 and locks itself into this same circuit.

13.02 Spreading tape index

The PL1 relay 1805 releases the PX relay 1800 and locks to the ground to which the PX relay 1800 had been locked. The PL1 relay 1805 also operates reading relays C2, C7, D0 and D1 (Fig. 37) directly through its armatures 3, 4, 2 and 1, respectively, and operates reading relays through the tape type switch (Figs. 50 and 56) and the sort switch (Fig. 50), the latter by means of the tape identity sort connector relays of Fig. 34 which are controlled by the sort switch of Fig. 50, in such a way that the following tape index numbers will be perforated:

| Tape | Sort | | | | | |
|---|---|---|---|---|---|---|
| | Off | 1TH | U | T | H | 2TH |
| Summary | | | 18 | | | |
| MU and Summ | | | 13 | 14 | | |
| MU | | 12 | 13 | 14 | 15 | 16 |
| Toll | 21 | 22 | 23 | 24 | 25 | 26 |
| MU Detail | 31 | 32 | 33 | 34 | 35 | 36 |
| Observing | 41 | 42 | 43 | 44 | 45 | 46 |

In the next reader closed period the A2 reading relay 3602 again operates and the W2 relay 1809 operates from the reader make contact K5 (Fig. 13), the KM3 conductor, over back contacts and armatures of the PS– relays of Fig. 19, back contacts and armatures of the PL– relays of Fig. 18, and through the armature 5 and front contact of the PL1 relay 1805. The W2 relay 1809 locks in the circuit heretofore used for locking the W1 relay 1803 and thereby releases the W1 relay 1803. The W2A relay 1801 is operated by the W2 relay 1809 in a circuit from ground, armature 8 and front contact of the ST3A relay 2004, the ON4 conductor, the armature 1 and front contact of the W2 relay 1809, to the winding of the W2A relay 1801. The W2A relay 1801 locks over its front contact and armature 4, to the WL conductor, which is grounded at the front contact and armature 3 of the TIS relay 3101. At its armature 1 and back contact the W2A relay 1809 opens the circuit (between the PX and P0 conductors) controlled by the K3 reader contact (Fig. 13) so that the walking circuit of Fig. 18, controlling the items to be perforated, will step only when the RS– reader step relays (Fig. 21) operate after each line has been spread across all ten perforators.

With the reading relays operated in a proper combination the reading check lead is closed. The reading check lead connection may be traced from conductor 3603, the back contact and armature 8 of the AS relay 3400, conductor 4509, back contact and armature 3 of the C relay 4400, the conductor 4401, back contact and armature 4 of the LK2 relay 3300, the CK2 conductor 3301, the front contact and armature 9 of the A2 reading relay 3602, the back contact and armature 8 of the A1 reading relay 3601, the back contact and armature 8 of the A0 reading relay 3600, the AD2 conductor, and (thence depending on the type of tape) through connections provided by one of the relays of Fig. 43, to conductor 4305, as, by way of example, from the AD2 conductor, through armature 3 and front contact of the OBS relay 4399 to conductor 4305, the armature 2 and front contact of the ME relay 5300, the APA conductor, the armature 5 and back contact of the APD relay 5804, to the winding of the APA relay 5803. The APA relay 5803 operates the SOB relay 5900 in a circuit from battery, armature 3 and front contact of the APA relay 5803, the SB conductor, and thence in a chain circuit through the armature 1 and back contact of the S–A relays of Figs. 59 and 60 starting with the S9A relay 6001 and ending with the S1A relay 5902, the SOBA conductor, front contact and armature 6 of the APA relay 5803, to the winding of the SOB relay 5900, and thence in a chain circuit starting with armature 3 and back contact of the S1B relay 5901 and ending with armature 3 and back contact of the S9B relay 6000, the SBL conductor, the armature 2 and front contact of the APA relay 5803, to the KM5 conductor, deriving ground from the K7 reader contact. Another circuit may be traced from ground, front contact and armature 2 of the ST3A relay 2004, the back contact and armature 6 of the RS1–3 reader step relay 2106, the PLL conductor, the back contact and armature 5 of the SS relay 5802, to the KM5 conductor, so that until the SS relay 5802 or the RS1–3 reader step relay 2106 is operated, the SOB relay 5900 will be steadily energized instead of being dependent upon the periodic circuit provided by the K7 reader contact. The SOB relay 5900 locks to battery on its own front contact and armature 2. When, at some later time, the APD relay 5804 is operated and the APA relay 5803 is consequently released, the holding resistance 5895 is inserted (at armature 4 of the APD relay 5804) in the circuit of the SOB relay 5900. Through its front contact and armature 5 the APA relay 5803 connects the winding of the APB–C relay 5800 to the HB2A conductor, which derives ground from the H8 reader contact through the front contact and armature 9 of the RCD relay 2509. The APB–C relay 5800, therefore, operates in the next open period of the reader. A locking circuit for the APB–C relay 5800 may be traced from ground, the front contact and armature 8 of the LK1 relay 3302, the armature 1 and back contact of the LLA relay 3304, the G11A conductor, the armature 7 and front contact of the APB–C relay 5800. Upon operation, the APB–C relay 5800 switches the lead connected to its armatures 9 and 10 from the lead 5801, which previously operated the A2 reading relay 3602 through its armature 9 and front contact, to the winding of the A2S relay 5806 so that in the next closed period the A2S relay 5806 operates instead of the A2 reading relay 3602. The operation of the APB–C relay 5800 also disconnects the RSO and RSE leads from conductors 5808 and 5809 and transfers both of these leads to a circuit for the later operation of the SS relay 5802. When the APD relay 5804 operates, it releases the APA relay 5803 and locks over its armature 3 and front contact to the ground supplied at armature 5 and front contact of the APB–C relay 5800. The APD relay 5804 also extends the TTM conductor (connected to its armature 6) through its front contact to the TTM conductor 5807 leading to the winding of the TTM relay 2300, so that this latter relay now becomes operated.

At the beginning of the next closed period of the reader the A2S relay 5806 operates over the path previously used to operate the A2 reading relay (Fig. 13). This causes the operation of the S1A relay 5902 in a circuit from the H2 reader contact, the HM2 conductor, the armature 1 and front contact of the A2S relay 5806, the HM2A conductor, the armature 5 and back contact of the WS1A relay 4701, the HM2A conductor 4703, and thence in a chain circuit starting with the back contact and armature 2 of the S9B relay 6000 to the front contact and armature 1 of the SOB relay 5900, thence to the winding of the S1A relay 5902, which now becomes operated. This relay locks to ground supplied by armature 7 and front contact of the LK1 relay 3302, over the G12 conductor, and thence in a chain circuit starting with armature 2 and back contact of the S9A relay 6001, to armature 2 and front contact of the S1A relay 5902. The A2S relay 5806 also connects the reading check path from conductor 4401, the back contact and armature 4 of the LK2 relay 3300, the CK2 conductor 3301, the armature 2 and front contact of the A2S relay 5806, the CK3 conductor, armature 4 and back contact of the WSIA relay 4701, the CK3A conductor, and thence in a chain circuit starting with the back contact and armature 5 of the S9B relay 6000, to the front contact and armature 4 of the S0B relay 5900, to the P0 conductor leading to the winding of the PA0 perforator 0 connector relay 6100, so that the perforating magnets (Fig. 62) of the perforator 0 are now connected to the circuits over which the output line is formed. The twenty-eight perforating magnets of perforator 0 are, therefore, now connected to their corresponding reading relays through the K-- series checking relays shown in Figs. 49, 55 and 61. Those magnets whose reading relays are operated are connected to perforating contacts of the reader. The A2 perforating magnet (Fig. 62) is connected through the PA0 connector relay 6100 and KA2 series relay 4903 in a circuit from the PA2 reader contact (Fig. 13), over the PA2 conductor, the armature 3 and front contact of the A2S relay 5806, the PA conductor, the armature 1 and back contact of the WSID relay 4702, the armature 1 and back contact of the WS2 relay 4700, to the P2 conductor leading to the winding of the KA2 relay 4903. Eleven perforating magnets operate to perforate the code 2891XX on output tape 0. The corresponding series relays, such as the KA2 4903, operate and the PD0 perforator register relay 5400 also becomes operated at this time. This relay is not required when spreading entries on all output tapes and its locking circuit is opened since the LN2 and LN5 relays of Fig. 33 are both normal at the time. When the J5 make contact on the reader (Fig. 13) closes approximately .008 second after the start of the reader closed period, the PAM perforator advance magnet 6204 is operated in series with the PK0 relay 6205, over a front contact and armature of the PA0 relay 6100, to the JM3 conductor. When the perforator series checking relays, such as the PK0 relay 6205, have operated, the perforating check lead is closed to operate the SS relay 5802. A ground over the MON8 conductor, through the winding of the CKA relay 6207, to the back contact and armature of the PHE relay 6206, to the armature 3 and front contact of the PK0 relay 6205 will cause the operation of the CKA relay 6207 in series with the PK0 and PAM relays 6205 and 6204. This in turn, will connect the JB0 conductor to the winding of the CKB relay 6208, which becomes operated and locked through its armature 2 and front contact to the ground on the HM0 conductor. Through its front contact and armature 1, the CKB relay 6208 places a ground on conductor 6209, which now threads through the checking circuit provided by the left-hand armatures of the K-- series relays (Figs. 61, 55 and 49) to the check lead 6101, now extended in a chain circuit starting with the back contact and armature 2 of the PK9 relay 6210, to the front contact and armature 2 of the PK0 relay 6205, thence over conductor 6211, and again in a chain circuit starting with the armature 5 and back contact of the PD9 relay 5401, through the armature 4 and front contact of the PD0 relay 5400, the front contact and armature 2 of this same PD0 relay 5400, the RSE conductor connected to the armature 3 of the APB-C relay 5800, through the front contact thereof, the armature 2 and front contact of the APD relay 5804, to the winding of the SS relay 5802 to cause the operation of this latter relay. At the end of the closed period the S0B relay 5900 releases. During the open period of the reader, ground is extended from the H8 reader contact, over the HB2 conductor, the front contact and armature 9 of the RCD relay 2500, the HB2A conductor, the back contact and armature 4 of the APA relay 5803, the armature 6 and front contact of the SS relay 5802, over the SB conductor, and thence through a chain circuit starting with armature 1 and back contact of the S9A relay 6001, to armature 1 and front contact of the S1A relay 5902, to the winding of the S1B relay 5901, so that this relay becomes operated and locks to the ground supplied over the K7 reader contact, the KM5 conductor, the front contact and armature 4 of the APD relay 5804, the SBL conductor, and thence in a chain circuit starting with the back contact and armature 3 of the S9B relay 6000, to the front contact and armature 4 of the S1B relay 5901. Another holding circuit for the S1B relay 5901 is provided through the front contact and armature 2 of the ST3A relay 2004, the back contact and armature 6 of the RSI-3 relay 2106, the PLL conductor, and during the released periods of the SS relay 5802 through the back contact and armature 5 thereof, over armature 4 and front contact of the APD relay 5804, to the SBL conductor. The S1B relay 5901 prepares the operating path for the S2A relay 5903 and, through its front contact and armature 6, prepares for the operation of the PA1 connector relay 6102. At the start of the next reader closed period the SS relay 5802 releases and the A2S relay 5806 and the S2A relay 5903 operate. The A2S relay 5806, closing the connection between the CK2 conductor 3301 and the CK3 conductor, now grounds the P1 lead at the armature 6 of the S1B relay 5901 to operate the number 1 perforator connector relay 6102, in a circuit described hereinbefore. At the end of the closed period the SS relay 5802 is again operated and the S1B relay 5901 releases. At the start of the next reader open period the S2B relay 5904 operates. The circuit continues in this manner perforating the code 2891XX on each of the ten output tapes. When the A2S relay 5806 operates at the start of the reader closed period for perforating 2891XX on tape 9, ground is extended from the reader contact H2, over the HM2 conductor, through the front contact and armature 1 of the A2S relay 5806, the HM2A conductor, the armature 5 and back contact of the WS1A relay 4701, the HM2A conductor 4703, and thence in a chain circuit starting with the front contact and armature 1 of the S9B relay 6000, the HM2B conductor, the front contact and armature 11 of the APB-C relay 5800, the LL conductor leading to the winding of the LLA relay 3304, so that this relay now becomes operated and locked over its front contact and armature 3, to the ground supplied by the front contact and armature 8 of the LK1 relay 3302. The perforating check lead 6211 is now extended through the one-out-of-ten check through contacts of the PD- relays of Fig. 54, through the front contact and armature 3 of the PD9 relay 5401, the conductor 5402, the armature 8 and back contact of the WS1A relay 4701, to the conductor 5808, which may be traced through the armature 2 and back contact of the 286R relay 4403, to the RSI conductor 4404 leading to the RSI-3 reading relay 2106, so that this RSI-3 reader step relay 2106 operates. The SS relay 5802 does not operate for perforator 9. The RS1-3 relay 2106, however, is prevented from stepping the reader because the operating circuit for the Step stepping magnet 1207 is often at the armature 8 of the TIS relay 3101. The RS1-3 relay 2106 locks itself through its front contact and armature 14 to the H3 reader back contact over the HB0 lead and, through its front contact and armature 7 shunts the timing condenser 1706 and also attempts to shunt down the RSR relay 1703. The RSR relay 1703, as will be explained hereinafter in Section 26, is slow-releasing and will not release unless the RS1-3 or RS2-4 reader step relay 2106 or 2105 remains operated longer than one reader step period. With the LLA relay 3304 and the RS1-3 relay 2106 operated, the APB-C relay 5800 and the LK1 relay 3302 are now locked only to reader make contacts (H1 over conductor HM1 and H6 over conductor HM4 respectively), their other locking paths having been opened at the armature 6 of the LLA relay 3304 and armature 11 of the RS1-3 relay 2106. At the end of the closed period for perforator 9 the following relays release: the APB-C relay 5800, the APS relay 5806, the PA9 relay 6109, the S9B relay 6000, the perforating magnets of the number 9 perforator (Fig. 62), the LLA relay 3304, the LK1 relay 3302 and the PL1 relay 1805. The release of the APB-C relay 5800 results in the release of the APD relay 5804 and the release of the LK1 relay 3302 results in the release of the S9A relay 6001. The PAM magnet (for perforator 9 in Fig. 62) and the PK9 relay 6210 release shortly after the end of the closed period when the reader contact J1 opens. At the start of the open period, ground is extended from reader contact K3, the KB0 conductor, the front contact and armature 8 of the RCD relay 2500, the KB0 conductor, front contact and armature 4 of the TIS relay 3301, the PX conductor, armature 1 and front contact of the RS1-3 relay 2106, the P0 conductor, and thence in a chain circuit starting with the armature 2 and back contact of the WSP relay 1906, to armature 2 and front contact of the W2 relay 1809, the armature 3 and front contact of the W2A relay 1801, to the winding of the PL2 relay 1810, to cause the operation of this latter relay. The PL2 relay 1810 locks over the same path which previously held the PL1 relay 1805 locked.

*13.3 Spreading marker group*

With the PL2 relay 1810 operated a new set of reading relays is operated to perforate the line 2892XX. The E and F digits, which represent the marker group, are under control of the marker group tens and marker group units switches (Fig. 52), respectively. The circuits may be traced from ground supplied by armatures 9 to 12, inclusive, of the PL2 relay 1810 to the PMG1 to PMG4 conductors leading to the marker tens group switch arms 5205, 5206 and to the marker group units switch arms 5207 and 5208, respectively. This line is spread as described above. During the first closed period the A2 reading relay 3602 operates and causes the operation of the APA relay 5803 and the LK1 relay 3302. The APA relay 5803 operates the S0B relay 5900 and the APB-C relay 5800. Thereafter, the APD relay 5804 is operated during the open period. The next ten closed periods are used to spread the line on the ten perforators. At the end of this process the PL2 relay 1810 releases and the PL3 relay 1811 operates.

*13.04 Spreading first recorder*

With the PL3 relay 1811 operated a new set of reading relays is operated to perforate the line 2893XX. The E and F digits, which represent the first recorder, are controlled by the first recorder tens and first recorder units switches (Fig. 51), respectively, over the PFR1 to 4 leads. With these switches off normal as they are for office and first thousands sorts, and E and F reading relays (Fig. 38) corresponding to the switch settings are operated. On other sorts where the switches are in the off position the E2, E7, F4 and F7 reading relays (Fig. 38) are operated to represent the value 90. This line is spread as described above. At the end of the process the PL3 relay 1811 releases and the PL4 relay 1812 operates.

*13.05 Spreading last recorder*

With the PL4 relay 1812 operated a new set of reading relays is operated to perforate the line 2894XX. The E and F digits, which represent last recorder, are controlled by the last recorder tens and last recorder units switches (Fig. 52), respectively, over the PLR1 to 4 conductors, respectively. With these switches off normal, as they are for office and first thousands sorts, and E and F digit reading relays (Fig. 38) corresponding to the switch settings are operated. On other sorts where the switches are in the off position the E2, E7, F4 and F7 reading relays (Fig. 38) are operated to represent the value 90. This line is spread as described above. At the end of the process the PL4 relay 1812 releases and the PL5 relay 1813 operates.

*13.06 Spreading office*

With the PL5 relay 1813 operated a new set of reading relays is operated to perforate the line 2895X0. The E digit, which represents office, is under control of the central office switch (Fig. 51) on all sorts except office. On office sort each tape is given an office digit corresponding to the number of its perforator. Ground through the front contact and armatures 12 and 11 of the PL5 relay 1813, over the PDF1 and PDF2 conductors, is extended over the armatures 4 and 3 and their front contacts of the OFBA relay 3403, to the EX and EY conductors, which conductors are extended by each of the S0B to S9B relays (Figs. 59 and 60) to the E digit reading relays (Fig. 38) as, by way of example, through the armatures 5 and 6, respectively, of the S0B relay 5900, to the E7 and E4 reading relays (Fig. 38) to express the digit 0. Thus, as this line is being spread over the perforators each perforator will be caused to perforate in the E digit place a value corresponding to its number. The reading check path is carried around the E digit reading relays (Fig. 38) by a circuit which may be traced over the CKF conductor connected to the front contact of armature 1 of the E7 reading relay 3800, the armature 5 and front contact of the W2A relay 1801, the CKE conductor, armature 8 and back contact of the APB-C relay 5800, conductor 5810, to that portion of the checking circuit between the E and D reading relays in order to permit the APA relay 5803 to operate. This is necessary because the E digit reading relays (Fig. 38) do not operate until the S0B relay 5900 operates. This line is spread as described above. At the end of the process the PL5 relay 1813 releases and the PL6 relay 1814 operates.

13.07 Spreading thousands range

With the PL6 relay 1814 operated a new set of reading relays is operated to perforate the line 2896XX. The E and F digits, which represent first and last thousands, are under control of the thousand first and thousand last switches (Figs. 51 and 57), respectively, on all sorts except second thousands when they are under control of the STHA relay 3406. With these switches off normal as they are for units, tens and hundreds sorts, the E and F reading relays (Fig. 38) corresponding to the switch settings are operated. With the switches in the off position as they are for office and first thousands sorts the E2, E7, F4 and F7 reading relays (Fig. 38) are operated to represent the value 90. These same relays are also operated through the STHA relay 3406 on second thousands sort regardless of the position of the switches which are off normal. In this case this line is spread as described above. At the end of the process the PL6 relay 1814 releases and the PL7 relay 1815 operates.

13.08 Spreading days of round

With the PL7 relay 1815 operated a new set of E and F reading relays (Fig. 38) is operated to perforate the line 289700. This line is spread as described above. At the end of the process the PL7 relay 1815 releases and the PL8 relay 1816 operates.

13.09 Spreading tape section and round

With the PL8 relay 1816 operated a new set of E and F reading relays (Fig. 38) is operated to perforate the line 2898XX. The E digit, which represents tape section, is controlled by the S0B to S9B relays (Figs. 59 and 60) so that a different set of E relays is operated for each perforator in the same manner as described in section 13.06, with the exception that in this case the EX and EY conductors are grounded by armatures 9 and 10 of the PL8 relay 1816. Each tape thus receives a tape section corresponding to the number of its perforator. The F digit, which represents round, is controlled by the round switch (Figs. 50 and 56). The reading check lead is carried around the E digit reading relays in the circuit hereinabove described to permit the operation of the APA relay 5803. This is necessary because the E relays do not operate until the S0B relay 5900 operates. This line is spread as described above. At the end of the process the PL8 relay 1816 releases and the PL9 relay 1804 operates.

13.10 Spreading month

With the PL9 relay 1804 operated a new set of E and F reading relays (Fig. 38) is operated to perforate the line 2899XX. The E and F digits, which represent month, are controlled by the month tens and month units switches (Figs. 50 and 56), respectively. This line is spread as described above. The EP relay 1907 (end of perforating tape identity) operates during the closed period following the operation of the PL9 relay 1804. Ground from the K5 reader contact (Fig. 13), over the KM3 conductor, is extended over the armature 6 and back contact of the PS2 relay 1908, the armature 6 and back contact of the PS3 relay 1909, the armature 6 and back contact of the PS1 relay 1910, the armature 5 and front contact of the PL9 relay 1804, to the winding of the EP relay 1907, thereby to cause the operation of this latter relay. The EP relay 1907 locks to the circuit heretofore used for locking the W9 relay 1802 and releases this latter relay. After the operation of the EP relay 1907, the 28B relay 3901 and the 28C relay 3903 will be locked in a circuit extending (1) from the H1 reader contact (Fig. 13), the HM1 conductor, the front contact and armature 4 of the RCD relay 2500, to the G11A conductor, (2) ground, the front contact and armature 8 of the LK1 relay 3302, the armature 1 and back contact of the LLA relay 3304, to the G11A conductor and (3) from ground, the front contact and armature 8 of the LK1 relay 3302, through the back contact and armature 11 of the RS1-3 relay 2106, the back contact and armature 8 of the RS2-4 relay 2105, to the G11A conductor, and thence through the front contact and armature 4 of the EP relay 1907, the EPG conductor, armature 5 and front contact of the TIS relay 3101, the 28CL conductor, to the front contact and armature 5 of the 28C relay 3903 for locking this latter relay, and through the front contact and armature 6 of the 28C relay 3903 to the 28BL conductor, the armature 1 and back contact of the MTI relay 3104, to the 28B conductor leading to the winding of the 28B relay 3901 for locking this relay. The EP relay 1907 closes a circuit to the step magnet of the reader through its front contact and armature 1, so that, when the RS1-3 relay 2106 operates at the end of spreading this line, the reader will be stepped off the last line of tape identity on the input tape. During the open period, ground is extended from reader contact K3 (Fig. 13), over the KB0 conductor, front contact and armature 3 of the RCD relay 2500, the KB0 conductor, the front contact and armature 4 of the TIS relay 3101, the PX conductor, the armature 1 and front contact of the RS1-3 relay 2106, the P0 conductor, armature 2 and back contact of the WSP relay 1906, armature 2 and front contact of the EP relay 1907, the TIE conductor, the back contact and armature 2 of the PTI relay 4605, the TIE conductor 4606, to the winding of the TIE relay 3102. The TIE relay 3102 operates in this circuit and, through its front contact and armature 4, operates the TIEA relay 3100. Ground from armature 4 and back contact of the TDRL relay 4406 is extended over the conductor 4407, and thence through the front contact and armature 5 of the TIE relay 3102 and serves to lock this relay in operated position. Another ground from armature 10 and front contact of the MON relay 2002 over the MON1 conductor also serves as a locking ground for the TIE and TIEA relays 3102 and 3100. After the line 2899XX has been spread, the APB–C relay 5800, the APD relay 5804, the LK1 relay 3302 and the PL9 relay 1804 are released. The EP relay 1907 operates the TIC relay 4101 from ground, its armature 6 and front contact, over the TIC conductor and through the armature 1 and back contact of the TICA relay 4100, to indicate that tape identity has been checked. The TIE and TIEA relays 3102 and 3100, in operating, indicate that tape identity was checked and perforated in the outgoing tapes. The TIE relay 3102 releases the TIS relay 3101. A ground is extended from the front contact of armature 4 of the TIC relay 4101, over conductor 4110, through the armature 7 and front contact of the TIE relay 3102, over the conductor 3105, and thence to one of the US, TS, HS, THS or OFS relays of Fig. 48 in accordance with one of the sort switch relays of Fig. 34, which has been operated by the sort switch arm 5001. The TIEA relay 3100 opens the operating path for the FT1 relay 2200. The TIS relay 3101, in releasing, releases the ME relay 5300, the W2A relay 1801, the TTM relay 2300, the EP relay 1907, the B1 and B7 reading relays 3614 and 3605 and removes the shunt from about the TI relay 2800. The release of the PL9 relay 1804 releases the C, D, E and F digit reading relays (Figs. 37 and 38). The release of the ME relay 5300 operates the RCA relay 2400, thus connecting all the reading relays (Figs. 36, 37 and 38) to the reader (Fig. 12).

14 Processing call entries

14.1 Preparing for call entries

With the TIC (tape identity checked), the TIE and TIEA (tape identity end of perforating) relays 4101, 3102 and 3100 operated, the circuit is ready to handle call entries. The sort switch arm 5001 has been set in accordance with the type of sorting to be carried out and, as a result thereof, one of the relays of Fig. 34 has been operated. By way of example, if the switch arm 5001 is set on its terminal 4 to indicate a sorting by the units digit, then the UA relay 3402 is operated. As a result a circuit is established from ground, front contact and armature 4 of the TIC relay 4104, conductor 4110, armature 7 and front contact of the TIE relay 3102, conductor 3105, armature 13 and front contact of the UA relay 3402, the US conductor, to the winding of the US relay 4800. An extra reader cycle is passed, following the perforating of tape identity, to permit the release of the relays involved in this process and to allow the RCA relay 2400 to operate. Ground is extended from a reader make contact K5 (Fig. 13), over the KM3 conductor, through the armature 10 and back contact of the 28C relay 3903, armature 4 and front contact of the PCA relay 3902, to the winding of the PCB relay 3905, resulting in the operation of this latter relay, which locks to the front contact and armature 2 of the PCA relay 3902. The PCB relay 3905, in operating, transfers the locking circuit of the PCA relay 3902 from the steadily applied ground over the ON1 conductor to the periodically applied ground over the KM4 conductor, so that the PCA relay 3902 will release at the end of the closed period and, in doing so, will also release the PCB relay 3905. With the PCA relay 3902 operated, the circuit of the SC relay 4801 is maintained open at the back contact and armature 5 of the PCA relay 3902, preventing the circuit from proceeding during this cycle. As soon as the RCA relay 2400 operates, the reading relays (Figs. 36, 37 and 38) operate and the SC relay 4801 operates. A circuit is established from the front contact and outermost armature of the RCA relay 2400, the SCA conductor, the armature 1 and back contact of the LK2 relay 3300, the SC conductor, the armature 5 and back contact of the PCA relay 3902, to the winding of the SC relay 4801 to cause the operation of this relay. The release of the PCA relay 3902 also operates the LK1 relay 3302 in a circuit from the HM4 conductor, over the armature 10 and back contact of the A0 reading relay 3600, the armature 10 and front contact of the A2 reading relay 3602, the back contact and armature 10 of the A1 reading relay 3601, the LK1 conductor 3604, the armature 3 and back contact of the PCA relay 3902, the LK1 conductor 3904, to the winding of the LK1 relay 3302. This relay again locks to the ground at armature 3 of the ST3A relay 2004.

14.2 Five-line entry

14.21 First line

There are two types of five-line entries. The detail entry, which is identified by a 1 for the A digit of the first line, is found on toll, message unit detail and observing tapes. It is the only type of call entry on toll and message unit detail tapes. The unanswered call entry which is identified by a 3 for the A digit of the first line is found only on observing tapes. Except as described above, on the first call entry following tape identity where an extra cycle is allowed, one reader cycle is used per line of entry. During the first closed period the reading relays operate. If the A digit is 1 a circuit is established from the H6 reader contact (Fig. 13), the HM4 conductor, the front contact and armature 5 of the RCD relay 2500, the HM4 conductor, the armature 10 and back contact of the A0 reading relay 3600, the armature 11 and back contact of the A2 reading relay 3602, the front contact and armature 11 of the A1 reading relay 3601, the LK1A conductor, and thence through the armature 7 and front contact of the OBS relay 4300 or alternatively through the armature 6 and front contact of the DET relay 4301, to the LK1 conductor 3604, and thence over the circuit previously traced to the winding of the LK1 relay 3302. If the A digit is 3, then the path may be traced from the HM4 conductor, through armature 11 and front contact of the A0 relay 3600, the armature 12 and front contact of the A2 relay 3602, the LK1B conductor, the armature 8 and front contact of the OBS relay 4300, the LK1C conductor, the front contact and armature 11 of the A1 reading relay 3601, the LK1A conductor, the armature 7 and front contact of the OBS relay 4300, to the LK1 conductor 3604, and thence over the path previously traced to the winding of the LK1 relay 3302. The LK1 relay 3302 locks to the ground supplied by the ST3A relay 2004, hereinbefore described. The LN5 relay 3305 is operated in a circuit from ground, armature 7 and front contact of the LK1 relay 3302, armature 5 and back contact of the LK2 relay 3300, the LNG conductor, the back contact and armature 6 of the 28B relay 3901, the LN conductor, to the winding of the LN5 relay 3305. This relay operates and locks through its front contact and armature 3, the locking resistance 3312, to the G12 conductor, which is grounded at the front contact and armature 7 of the LK1 relay 3302. In order to select the proper perforator on which to perforate the entry, one set of perforator connector relays is operated corresponding to the sorting digit. The sorting digit is B for office sort, C for first or second thousands sort, D for hundreds sort, E for tens sort and F for units sort. One of the relays OFS, THS, HS, TS or US of Fig. 48 is already operated depending upon the position of the sort switch. The perforator connector relays (Fig. 61) are operated through the CK reading check lead for which ground originates either at reader contact G1 (Fig. 12) through the RKA relay 2100 unoperated or reader contact G2 through the RKB relay 2101 operated. This circuit continues over the CK lead through the armature 1 and front contact of the RCD relay 2500, the CK conductor 2501, armature 1 and back contact of the AL relay 1700, the CK1 lead 1701, thence through the two-out-of-five check circuits of the F, E, D, C and B digit reading relays (Figs. 38, 37 and 36), the conductor 3603, back contact and armature 8 of the AS relay 3400, conductor 4509, the back contact and armature 3 of the C relay 4400, conductor 4401, back contact and armature 4 of the LK2 relay 3300, to the conductor 3301. If the A digit is 1 this circuit is extended over the back contact and armature 8 of the A2 relay 3602, the front contact and armature 7 of the A1 relay 3601 and the back contact and armature 7 of the A0 relay 3600, to the AD1 conductor, which may be traced over the armature 5 and front contact of either the OBS relay 4300 or the DET relay 4301 to the BC conductor. If the A digit is 3 then the conductor 3301 may be traced through the front contact and armature 9 of the A2 reading relay 3602, the front contact and armature 9 of the A1 reading relay 3601 and the front contact and armature 9 of the A0 reading relay 3600 to the AD3 conductor, which may be further traced through the front contact and, armature 6 of the OBS relay 4300, the armature 5 and front contact of this same relay, to the BC conductor. If the entries are to be sorted by office, the perforator connector relays (Fig. 61) are operated directly by the leads from the B reading relays (Fig. 36), through the contacts of the OFS relay 4802 and the SC relay 4801, so that the number of the perforator selected corresponds to the number recorded for the B digit in the input tape. By way of example, if the B digit on the input tape is 5 then the ground on the BC conductor will be extended over the armature 8 and front contact of the B1 reading relay 3614, the front contact and armature 9 of the B4 reading relay 3608, the DB5 conductor, the armature 6 and front contact of the OFS relay 4802, the front contact and armature 6 of the SC relay 4801, to the P5 conductor leading to the winding of the PA5 perforator connector relay (not shown in Fig. 61). In the case of the BD8 conductor the circuit is routed through armature 2 and front contact of the OBS or DET relay of Fig. 43 in order to hold this particular lead open during the transmission of tape identity items (2891XX to 2899XX). If the entries are to be sorted by thousands, hundreds, tens or units, the BX relay 4803 will be operated by the ground used to operate the corresponding sorting relay, as for example, by the ground used for the operation of the US relay 4800, through the front contact and armature 1 thereof, to the winding of the BX relay 4803. The BX relay 4803 ties all of the ten BD leads together so that regardless of what value may be expressed by the B digits a ground will be extended to the C conductor, reached through an armature and front contact of the BX relay 4803. This ground will be further extended by the thousands relay to the CC conductor, the hundreds relay to the DC conductor, the tens relay to the EC conductor and the units relay to the FC conductor for supplying the activating ground which will then be returned over one of the other armatures of each of these relays to operate a particular perforator connector relay. The perforator thus selected corresponds to the thousands, hundreds, tens or units digit recorded on the input tape. The perforator connector relays (Fig. 61) connect the twenty-eight perforating magnets (Fig. 62) in series with checking relays shown in Figs. 49, 55 and 61, through their corresponding reading relays, to a group of reader make contacts, so that those magnets corresponding to the operated reading relays operate perforating the line read on the input tape onto one of the output tapes. The perforator register relays (Fig. 54) operate from the HM3 conductor, over a circuit closed by the operated perforator connector relay (Fig. 61) and lock in a circuit from ground, armature 4 and back contact of the LLA relay 3304, the front contact and armature 4 of the LN5 relay 3305, to the HM3 conductor, which is extended through the resistance 5403 to the armature 6 and front contact (by way of example) of the PD9 relay 5401. The PD relay (Fig. 54), therefore, remains operated throughout the entry to cause the supplementary lines of the entry, which do not contain sorting digits, to be perforated on the same tape as the initial line. The PAM perforator advance magnet (Fig. 62) operates in series with its PK checking relay (Fig. 62) from the J make reader contacts (Fig. 13). If the perforated line checks, that is, if either one or all three A magnets (Fig. 62) are energized and two and only two magnets (Fig. 62) in each other digit are energized, the reader step relays (Fig. 21) operate to step the reader. The perforating check lead starts at ground, back contact and armature 2 of the PHK relay 6200, conductor 6209, thence through the left-hand armature network of the KA0 to KA2 relays (Fig. 49), and in turn through the checking network of the B digit, the C digit, the D digit, the E digit and the F digit checking relays (Figs. 49, 55 and 61), to conductor 6101, thence through a checking circuit controlled by the PK relays (Fig. 62), such as the PK0 relay 6210, to the conductor 6211 (providing one and one only of these relays is operated), through a similar path checking that one and one only of the PD relays of Fig. 54 is operated, and thence to the RSE or RSO lead (in accordance with the even or odd numbering of the PD relay operated), through the back contacts of armature 4 or 1, respectively, of the APB–C relay 5800 to conductor 5809 or 5808, respectively, to operate the RS2–4 reader step relay 2105 or the RS1–3 reader step relay 2106. The RS1–3 relay 2106 is used for odd-numbered perforators and the RS2–4 relay 2105 is used for even-numbered perforators. Perforator 9 operates the RS1–3 relay 2106 through the front contact and armature 3 of the PD9 relay 5401, conductor 5402, the armature 8 and back contact of the WS1A relay 4701 to the RSO conductor 5808. The reader step relays lock to reader back contact H3 (Fig. 13) so that they remain locked up until the end of the reader open period, and through their operation they step the reader. At the end of the closed period, the reading relays (Figs. 36, 37 and 38), perforator connector relays (Fig. 61), the perforating magnets (Fig. 62) and series K relays (Fig. 62) all release. Shortly after the start of the open period when the reader J contacts open, the PAM magnet (Fig. 62) and the PK– relay (Fig. 62) release, since the operation of the RS2–3 or RS2–4 reader step relay 2106 or 2105 operates the PH0 relay 6212 or the PHE relay 6206 to open the perforator advance magnet locking circuit. Whenever the reader step relays fail to operate, the PAM magnet (Fig. 62) is prevented from releasing and from stepping the perforator, so that the line just perforated is not repeated on the output tape. The LK2 relay 3300 is operated during the open period following the first line from ground at a reader back contact H8, the HB2 conductor, front contact and armature 9 of the RCD relay 2500, the HB2A conductor, and thence either through armature 9 and front contact of the RS2-4 relay 2105 or the armature 13 and front contact of the RS1-3 relay 2106, a chain circuit passing through the armatures 2 and back contacts of the L2A relay 3306, the L3A relay 3307 and the L4A relay 3308, the LK2B conductor, the armature 10 and back contact of the 28B relay 3901, the LK2A conductor, the back contact and armature 5 of the LLA relay 3304, the armature 4 and front contact of the LK1 relay 3302, to the winding of the LK2 relay 3300. The LK2 relay 3300 operates and locks to ground at the front contact and armature 8 of the LK1 relay 3302, through the armature 1 and back contact of the LLA relay 3304, to the front contact and armature 3 of the LK2 relay 3300. The LK2 relay 3300, in operating, opens the connection between the reading check lead and the reading relays (Figs. 36, 37 and 38) through which the perforator connector relays (Fig. 61) were operated on the first line of the entry and releases the SC relay 4801 to separate the perforator connector relays (Fig. 61) from the reading relays (Figs. 36, 37 and 38).

*14.22 Second line*

At the start of the reader closed period for the second line the reading relays again operate. Before the circuit can proceed it must check that the A digit is 0 and that all other digits meet the two-out-of-five test. The reading check lead 3603 may, therefore, be traced through the armature 3 and back contact of the AS relay 3400, conductor 4509, back contact and armature 3 of the C relay 4400, the CKB2 lead 4401, armature 2 and back contact of the A2 reading relay 3602, the armature 2 and back contact of the A1 reading relay 3601, the front contact and armature 3 of the A0 reading relay 3600, the AD0 conductor, to armature 2 and front contact of the LK2 relay 3300, the A0 conductor leading to the PD- relays (Fig. 54) and connected to armatures 1 and 2 of the PD3 relay 5401, so that in accordance with the particular one of these PD relays which is operated, the circuit will then be extended to the selected conductor leading to the connector relay (Fig. 61) for the selected perforator. Ground is extended from reader contact H2, over the HM2 conductor, through the front contact and armature 1 of the A0 reading relay 3600, the LCA conductor, armature 6 and front contact of the LK2 relay 3300, and thence in a chain circuit starting with armature 2 and back contact of the L2B relay 3309 and extending to armature 2 of the LN5 relay 3305, thence through the front contact thereof to the winding of the L3A relay 3308, resulting in the operation of this latter relay to indicate that this is the fourth from the last line of the entry. When the perforator connector relays (Fig. 61) operate, the perforating magnets (Fig. 62) perforate the second line. The PAM magnet (Fig. 62) operates and the perforating check lead operates the reader step relays (Fig. 21) as before, stepping the reader to the third line. During the open period following the second line, the L4B relay 3310 operates in a circuit from ground, the H8 reader contact, the HB2 conductor, the front contact and armature 9 of the RCD relay 2500, the HB2A conductor, and thence through either armature 9 and front contact of the RS2-4 relay 2105 or armature 13 and front contact of the RS1-3 relay 2106, armature 2 and back contact of the L2A relay 3306, armature 2 and back contact of the L3A relay 3307, armature 2 and front contact of the L4A relay 3308, to the winding of the L4B relay 3310, so that this relay becomes operated during the open period when the H8 reader is closed.

*14.23 Third line*

The third line is perforated in the same manner. The L3A relay 3307 operates during the closed period and during the following open period the L3B relay (Fig. 33) operates. The L3A relay 3307 releases the L4A relay 3308 and the L3B relay (Fig. 33) releases the L4B relay 3310.

*14.24 Fourth line*

The fourth line is perforated in the same manner. The L2A relay 3306 operates during the closed period, releasing the L3A relay 3307, and the L2B relay 3309 operates during the open period (which follows), thus releasing the L3B relay (Fig. 33).

*14.25 Fifth line*

The fifth line is perforated in the same manner. The LLA relay 3304 operates during the closed period, since its circuit has been closed in the previous closed period through the front contact and armature 1 of the L2B relay 3309. The operation of the LLA relay 3304 unlocks the PD- relay of Fig. 54, the L2A relay 3306, the LK1 relay 3302 and the LK2 relay 3300. The PD relay (Fig. 54) releases at the end of the line, if the reader step relay (Fig. 21) operates correctly. The L2A relay 3306 releases immediately upon the operation of the LLA relay 3304. The LK1 relay 3302, however, is locked into a reader make contact over the HM4 conductor, so that it releases at the end of the closed period, providing also that one of the reader step relays (Fig. 21) operates. The LK2 relay 3300 is similarly locked and it releases at the same time as the LK1 relay 3302. The 3302 release of the LK1 relay releases the LN5 relay 3305, the LLA relay 3304 and the L2B relay 3309. The release of the LK2 relay 3300 reoperates (at its armature 1 and front contact) the SC relay 4801. The operation of the reader step relay (Fig. 21) steps the reader to the first line of the next entry and the circuit is prepared for the new entry.

*14.4 Two-line entry*

All two-line entries have 20 as their A and B digits on the first line. They occur on both message unit and summary tapes. The LK1 relay 3302 is operated on the first line from ground, reader contact H6 (Fig. 13), the HM4 conductor, the front contact and armature 5 of the RCD relay 2500, the HM4 conductor, armature 10 and back contact of the A0 relay 3600, armature 10 and front contact of the A2 relay 3602, the back contact and armature 10 of the A1 reading relay 3601, the LK1 conductor 3604, the armature 3 and back contact of the PCA relay 3902, the LK1 conductor 3904, to the winding of the LK1 relay 3302. For operating the perforator connector relays (Fig. 61), ground from the reading check lead is extended over CKB2 conductor 4401, the back contact and armature 4 of the LK2 relay 3300, the CK2 conductor 3301, the front contact and armature 9 of the A2 reading relay 3602, the back contact and armature 8 of the A1 reading relay 3601, the back contact and armature 8 of the A0 reading relay 3600, the AD2 conductor, and thence through armature 4 and front contact of the MU relay 4302 or the armature 5 and front contact of the MUAS relay 4303 or the armature 6 and front contact of the MUS relay 4304, to the BC conductor leading to the B digit reading relays (Fig. 36) and thence through armature 6 and front contact of the B7 reading relay 3605, the front contact and armature 7 of the B4 reading relay 3608 (the operation of the B7 and B4 relays expresses the value 0), the BD0 conductor, through the armature 1 and front contact of the BX relay 4803 (the BX relay is operated since some one relay of Fig. 48 other than the OFS relay 4802 is operated), then through a front contact and armature of one of the THS, HS, TS, or US relays (Fig. 48) to the CC, the DC, the EC or the FC conductor, respectively, through the circuit network provided by the operated C, D, E or F digit reading relays (Figs. 37 and 38) to the corresponding output conductor, and through the relays of Fig. 48, to the selected perforator connector relay of Fig. 61 (by way of example, if the TS relay 4804 is operated through the EC conductor, to the ED6 conductor providing the E relays express the value 6, through the armature 9 and front contact of the TS relay 4804, the front contact and armature 7 of the SC relay 4801, the P6 conductor, to the PA6 perforator connector relay, which is not shown in Fig. 61). This entry is processed in the same manner as the five-line entry except that the LN2 relay 3311 is operated instead of the LN5 relay 3305. The LLA relay 3304, therefore, operates on the second line. The LN2 relay 3311 is operated by ground, armature 7 and front contact of the LK1 relay 3302, the armature 5 and back contact of the LK2 relay 3300, the LNG conductor, the back contact and armature 6 of the 28B relay 3901, the LN conductor, the front contact and armature 13 of the A2 reading relay 3602, the LN(7) conductor, to armature 3 and back contact of the TE relay 4601, conductor 4608, the back contact and armature 9 of the OBS relay 4300, the LN conductor 4306, the armature 10 and back contact of the B1 reading relay 3614, the LN2 conductor, to the winding of the LN2 relay 3311.

*14.5 One-line entry*

All one-line entries have 1 as their A digit and are found only on message unit tapes. The LK1 and LK2 relays 3302 and 3300 do not operate on one-line entries. No one of the LN2 and LN5 relays 3311 and 3305 is operated and, therefore, the line counting relays L-A, L-B (Fig. 33) and the LLA relay 3304 are not operated as a means for operating the perforator connector relays. Ground from the reading check lead over conductor 4401 is extended through the back contact and armature 4 of the LK2 relay 3300, the CK2 conductor 3301, the back contact and armature 8 of the A2 reading relay 3602, the front contact and armature 7 of the A1 reading relay 3601, the back contact and armature 7 of the A0 reading relay 3600, the AD1 conductor, and thence through either the armature 6 and front contact of the MU relay 4302 or the armature 7 and front contact of the MUAS relay 4303 to the C conductor leading to the front contact and armature 2 of each of the THS, HS, TS and US relays (Fig. 48), thence over the CC, DC, EC or FC conductor, through the C, D, E or F digit reading relays (Figs. 37 and 38), out over the conductor made effective by the value represented by the selected set of reading relays through such specific conductor, and an armature and front contact of the sort relay such as the TS relay 4804, to the front contact and armature of the SC relay 4801 to the selected perforator connector relay (Fig. 61). Since no line count relay, such as the LN2 or LN5 relay 3311 or 3305 is operated, the perforator register relay, such as the PD9 relay 5401, does not lock up on one-line entries. Perforation, perforator advance and reader stepping are accomplished in the same manner as for other entries.

*15 End of one input tape and start of next input tape*

*15.01 Checking tape identity at trailing end of tape*

Tape identity at the trailing end of an input tape follows immediately after the last call entry. The circuit reads 2891XX and the 28A relay 3900 operates in a circuit from the reading check path hereinbefore described, extending over conductor 3603, the back contact and armature 8 of the AS relay 3400, conductor 4509, the back contact and armature 3 of the C relay 4400, conductor 4401, the back contact and armature 4 of the LK2 relay 3300, conductor 3301, the front contact and armature 9 of the A2 reading relay 3602, the back contact and armature 8 of the A1 reading relay 3601, the back contact and armature 8 of the A0 reading relay 3600, the AD2 conductor, and thence to the tape index connector relays of Fig. 43 where it is switched in various manners, as by way of example, through armature 3 and front contact of the OBS relay 4300 to the conductor 4305 through the armature 2 and back contact of the ME relay 5300, the 28X conductor, the back contact and armature 2 of the 28C relay 3903, to the winding of the 28A relay 3900. Thereupon a circuit is established from ground, front contact and armature 4 of the 28A relay 3900, over the TICA conductor, through the armature 1 and front contact of the TIC relay 4101, to the winding of the TICA relay 4100. This relay locks to ground, armature 9 and front contact of the ST3A relay 2004, the ON2 conductor, armature 1 and back contact of the ESK relay 3201, the SKWS conductor, and thence over armature 2 and front contact of the TICA relay 4100. The 28A relay 3900 directly grounds the winding of the 28B relay 3901 and extends the KB2 conductor through its armature 2 and front contact to the winding of the 28C relay 3903 which, therefore, operates during the next reader open period. Upon the operation of the 28C relay 3903, the PCA relay 3902 is operated from the ground on the ON1 conductor. The circuit then checks the nine tape identity entries as described in sections 12.04 to 12.09 and 12.11 to 12.13. The operation of the CL1 relay 4107 during the checking of tape index releases the TIC relay 4101, which thereupon releases that one of the relays in Fig. 48 which has been operated, thus preventing the circuit from handling any call entries until tape identity has been fully checked at the leading end of the next tape section. This is to prevent the operator from skipping manually past tape identity in the event that it fails to check. Only one cycle is required for checking tape index since the tape index register relays of Figs. 29 and 30, if required, are already operated from the tape index entry at the beginning of the tape. With the TIEA relay 3100 operated, the FT1 relay 2200 does not operate and the tape section register selector is not stepped. During the check of month the LLA relay 3304 is operated from ground, armature 3 and front contact of the TIEA relay 3100, the armature 2 and front contact of the L9 relay 4206, the LL conductor, to the winding of the LLA relay 3304. This releases the LK1 relay 3302 at the end of the line in which month is checked and also releases the 28B and 28C relays in Fig. 39. Satisfactory checking of month is used to operate the RS1–3 reader step relay 2106 now that the TIEA relay 3100 is operated, instead of to operate the TIS relay 3101 as was done at the start of the first tape.

15.02 Skipping skip splice entry and splice pattern

When the reader steps off the month tape identity line it reads the skip splice entry 2860XX. (XX is the number of the machine which produced the tape.) During the reader closed period the ground transmitted over the KM3 conductor is extended over armature 10 and back contact of the 28C relay 3903, the armature 4 and front contact of the PCA relay 3902, to the winding of the PCB relay 3905, so that this relay now becomes operated and locked through its own armature 2 and front contact to the front contact and armature 2 of the PCA relay 3902. The locking circuit of the PCA relay 3902, heretofore controlled over the steadily applied ground on the ON1 conductor, is now transferred to the KM4 conductor, so that at the end of the closed period the PCA relay 3902 will be released and this will be followed by the release of the PCB relay 3905. Also during this reader closed period the reading relays (Figs. 36, 37 and 38) will operate, and ground from the reading check path operates the 28A relay 3900 and this immediately operates the 28B relay 3901. In the open period the PCA and PCB relays 3902 and 3905 release, as above described, and the 28C relay 3903 operates. The 28A relay 3900 locks to the HB3 conductor until the end of the open period and then releases. When the reading relays operate in the next closed period, the LK1 relay 3302 operates in a circuit from the H6 reader contact (Fig. 13), the HM4 conductor, the front contact and armature 5 of the RCD relay 2500, the HM4 conductor, armature 10 and back contact of the A0 reading relay 3600, armature 10 and front contact of the A2 reading relay 3602, the back contact and armature 10 of the A1 reading relay 3601, the LK1 conductor 3604, the front contact and armature 7 of the 28C relay 3903, or alternatively through the armature 3 and back contact of the PCA relay 3902, to the LK1 conductor 3904 leading directly to the winding of the LK1 relay 3302 so that this relay becomes operated.

A circuit is now established from the reading check lead 3603, the back contact and armature 8 of the AS relay 3400, conductor 4509, back contact and armature 3 of the C relay 4400, conductor 4401, the back contact and armature 4 of the LK2 relay 3303, conductor 3301, the front contact and armature 9 of the A2 relay 3602, the back contact and armature 8 of the A1 reading relay 3601, the back contact and armature 8 of the A0 reading relay 3600, the AD2 conductor, and thence through one of the paths provided by the tape index connector relays of Fig. 43, to the conductor 4305, as by way of example, through the armature 3 and front contact of the OBS relay 4300, conductor 4305, through the armature 2 and back contact of the ME relay 5300, the 28X conductor, the front contact and armature 1 of the 28C relay 3903, the front contact and armature 1 of the 28B relay 3901, the CC conductor, thence to the network provided by the C digit reading relays (Fig. 37), and since these are now expressing the value 6, out over the CD6 conductor, thence through the armature 2 and front contact of the 28B relay 3901, the 286 conductor, to the winding of the SKP relay 3205 to cause the operation of this last named relay. A circuit for the SK1 relay 3204 is now established from the ground, armature 9 and front contact of the LK1 relay 3302, the armature 2 and front contact of the SKP relay 3205, to the winding of the SK1 relay 3204. This relay becomes operated and locked through its front contact and armature 2 to the ground supplied by the armature 9 of the LK1 relay 3302. Thereupon a circuit is closed from ground, back contact and armature 6 of the SK2 relay 3202, the front contact and armature 3 of the SK1 relay 3204, the front contact and armature 3 of the SKP relay 3205, to the RSE conductor 5809 leading through the armature 3 and back contact of the 286R relay 4403, to the RS2 conductor 4405 to cause the operation of the RS2–4 relay 2105. The SKP relay 3205 remains operated until the end of the reader closed period. The SK1 relay 3204 locks to the LK1 relay 3302 as described and opens the ground by which the reader step relays recycle the short timer (Fig. 17) each time they operate. The next line read is 081010 which operates the A0 reading relay 3600. The A0 relay 3600, through its operation, extends a ground from its front contact and armature 12, to the ADG conductor, now extended through the armature 6 and front contact of the SK1 relay 3204, to the winding of the SK2 relay 3202, so that the operation of the A0 relay 3600 results in the operation of the SK2 relay 3202. The SK2 relay locks to the ON2 ground through the armature 1 and back contact of the ESK relay 3201. Other locking paths for the SK2 relay 3202 are over the SKWS conductor, armature 3 and back contact of the T1C relay 4101, to the SW2L conductor, and in parallel therewith through the back contact and armature 1 of the SKW relay 3203, to the SW2L conductor, thence in a chain circuit through the back contacts and armatures 7 of the L1T relay 4102, the L1UA relay 4103 and the L1 relay 4104 to the ON2 conductor. The SK2 relay 3202, by its operation, prevents the RS2–4 relay 2105 from shunting down the RSR relay 1703, operates the LLA relay 3304 through its armature 7 and front contact from the JM5 conductor when a J reader contact closes, provides another locking ground from its armature 10 for the 28C relay 3903 and connects the RS2–4 relay 2105 to the J7 reader contact in a circuit over the JM5 conductor, the normal contacts of armature 4 of the ESK relay 3201, the SK conductor, the back contact and armature 9 of the AL relay 1700, conductor 1707, thence through a chain circuit including back contacts and armatures 1 of the L1T relay 4102, the L1UA relay 4103, the L1 relay 4104, conductor 4105, the armature 4 and back contact of the SKW relay 3203, the armature 5 and front contact of the SK2 relay 3202, to the RSE conductor 5809 leading, as before described, to the winding of the RS2–4 reader step relay 2105.

15.03 End of input tape

The circuit continues to skip the splice pattern codes 081010 until the end of the tape permits the additional reading relays to operate, providing the sections of tape are not spliced together, or until the A2 reading relay 3602 operates on the first tape identity line at the start of the next section of tape, if the sections are spliced together. If the tapes are not spliced and the tape runs out of the reader the circuit brings in the alarm as described in section 22.

15.04 Starting new tape

If the tapes are not spliced together and the circuit has blocked, it is released by the operation of the machine release key as described in section 22. The motor is then started and the new tape is fed in. The circuit proceeds as described in sections 12.01, 12.02 and 12.03 to skip the splice at the beginning of the new input tape, stopping when it reaches the code 2891XX. If the tapes are spliced together the circuit skips without stopping from the skip splice entry near the end of the previous tape to the 2891XX line on the new tape.

15.05 Checking tape index

15.051 General

If the machine is processing message unit tapes alone, summary tapes alone, toll tapes, message unit detail tapes or observing tapes, the tape index of the new tape will be the same as the tape index of the previous tape. Under the conditions described in 12.041 a circuit will operate exactly as described there. Under the conditions as described in section 12.043, where the X1A and X1B relays 2904 and 2901 operated previously, the X1B relay 2901 will still be locked up and the check will be completed in one cycle of the reader instead of the two originally required. Under the conditions described in section 12.042, where message unit and summary tapes are being processed together, there are several possible conditions.

15.052 New tape index same as previous tape index

If the new tape has the same index as the previous tape, the tape index is checked in one reader cycle because the 11B, 12B, 13B, 17B or 18B and 18C tape index register relays 3000, 2900, 3005, 2902 or 3004 and 3008 will still be operated depending upon the tape index of the previous section of tape.

15.053 Tape index 17 follows tape index 11

If the previous tape index was 11, then the 11B relay 3000 will be operated. On the first reader cycle the 17A relay 2905 operates from ground, armature 4 and front contact of the L1UA relay 4103, the FC conductor, the front contact and armature 8 of the 28B relay 3901, the FC conductor leading to the network of the F digit reading relays (Fig. 38), and then out over the FD7 lead (the F digit reading relays express the value 7), the front contact and armature 8 of the L1UA relay 4103, the FD7A conductor, the front contact and armature 8 of the 11B relay 3000, thence through armature 10 and back contact of the 17B relay 2902, to the winding of the 17A relay 2905, which thereupon operates. In operating the 17A relay 2905 places ground, through its armature 4 and front contact, on the TDS lead extending directly to the winding of the TDS relay 2206. This relay in turn becomes operated and locks through its armature 1 and front contact, to the TDSL lead leading through armature 5 and back contact of the CL8 relay 4200, to the ground on the MON1 conductor from the front contact and armature 10 of the MON relay 2002. In the reader open period the 17B relay 2902 operates, releasing the 17A relay 2905 and the 11B relay 3000. In the second closed period the tape index check is completed through the 17B relay 2902.

15.054 Tap index 17 follows tape index 12

If the previous tape was 12 then the 12B relay will be operated. If the LTD relay 2202 is also operated, indicating that all the twelve tapes have been received, then the 17A relay 2905 operates on the first reader cycle in a circuit similar to that heretofore described, excepting that the circuit extends from the FD7A conductor, over the front contact and armature 5 of the 12B relay 2900, the 17AA conductor, the armature 1 and front contact of the LTD relay 2202, the 17A conductor, the armature 10 and back contact of the 17B relay 2902, to the winding of the 17A relay 2905. The 17A relay 2905 operates as before and at the same time operates the TDS relay 2206 through the armature 5 and back contact of the CL8 relay 4200. The operation of this relay closes a circuit from ground, armature 7 and front contact of the 12B relay 2900, armature 1 and front contact of the 17A relay 2905, over the RTD conductor directly to the winding of the RTD relay 2204. In the reader open period the 17B relay 2902 operates, releasing the 17A relay 2905 and 12B relay 2900. In the second closed period the tape index check is completed through the 17B relay 2902. During its previous operation the RTD relay 2204 extends a ground from the off-normal contact 3510, over the SON conductor, if this selector is off-normal, front contact and armature 4 of the RTD relay 2204, the TOR conductor, to the release magnet 3500 thereof, to insure that this switch has been returned to normal.

15.055 Tape index 18 follows tape index 13

If the previous tape index was 13, then the 13A relay 3002 will be operated. On the first reader cycle when the F digit reading relays (Fig. 38) express the value 8, ground on the FD8 conductor will be extended over the front contact and armature 3 of the L1T relay 4102, the FD8A conductor, the front contact and armature 7 of the 13B relay 3005, armature 10 and back contact of the 18B relay 3004, to the winding of the 18A relay 3007, so that the 18A relay 3007 now becomes operated. In the reader open period the 18B relay 3004 operates and through its front contact and armature 8 closes a circuit from the MON6 ground directly to the winding of the 18C relay 3008, which then operates and locks over the 18CL conductor also deriving ground from the MON6 lead through armature 2 and back contact of the TK relay 2207. In the second closed period the tape index check is completed through the 18B relay 3004.

15.056 Tape index 13 follows tape index 18

If the previous tape was 18 then the 18B and 18C relays 3004 and 3008 will be operated. In the first reader cycle with the F digit reading relays (Fig. 38) expressing the value 3, a circuit will be established from the FD3 lead over the front contact and armature 9 of the L1T relay 4102, the 13AA conductor, the front contact and armature 11 of the 18B relay 3004, the 13A conductor, the armature 8 and back contact of the 13B relay 3005, to the winding of the 13A relay 3002. In the reader open period the 13B relay 3005 operates, releasing the 13A relay 3002 and the 18B relay 3004, but leaving the 18C relay 3008 operated and locked. In the second closed period the tape index check is completed through the 13B relay 3005.

15.06 Checking marker group, first and last recorder office and thousands range The circuit reads and checks tape identity lines 2892XX, 2893XX, 2894XX, 2895XX and 2896XX as described in sections 12.05 to 12.08 inclusive.

15.07 Resetting tape section selector

15.071 General

On units sort of message unit and summary tapes combined, it is necessary to move the tape section selector (Fig. 35) following the check of first and last thousands. If tapes 11 and 17 are being processed together, the selector remains normal during the processing of tape 11 and must be set to an initial position corresponding to the thousand first switch following thousands check of the first tape 17. If tapes 12 and 17 are being processed together the selector is used to count the 12-type tapes, then following thousands check on the first 17-type tape it must first be restored to normal and then advanced to an initial position corresponding to the thousand first switch.

15.072 Tape index 17 follows tape index 11

During the tape index check of the first tape 17 the TDS relay 2206 was operated as described in section 15.053. When the CL6 relay 4204 operates following the check of the first and last thousands, the FT1 relay 2200 is operated in the open period of the reader to advance the selector to its initial position. A circuit may be traced from the K8 reader contact (Fig. 13) over the KB2 conductor, the armature 1 and front contact of the CL6 relay 4204, the FT1E conductor, over the armature 5 and back contact of the T1EA relay 3100 to the FT1D conductor, or alternatively over the armature 2 and front contact of the TDS relay 2206 to the FT1D conductor, the armature 1 and front contact of the UA relay 3402, the FT1C conductor, the armature 6 and front contact of the MUAS relay 4303, the FT1A conductor, the back contact and armature 3 of the 11B relay 3000, the FT1 conductor, armature 3 and back contact of the FT2 relay 2201, to the winding of the FT1 relay 2200. The FT1 relay 2200 operates and locks over its armature 1 and front contact, the back contact and armature 2 of the FT2 relay 2201, and thence over the FT1L conductor, to ground supplied at the front contact and armature 7 of the CL6 relay 4204. In the following reader closed period the ROT rotary magnet 3501 of the selector (Fig. 35) is operated in a circuit from the K5 reader contact (Fig. 13), over the KM3 conductor, armature 5 and front contact of the FT1 relay 2200, the back contact and armature 5 of the FT2 relay 2201, the back contact and armature 5 of the LTD relay 2202, the TDS conductor, the armature 1 and back contact of the ALA relay 1708, the ROT conductor leading directly to the winding of the ROT rotary magnet 3501. The selector steps from its normal position to the position corresponding to tape digit 0. At the end of the closed period the ROT rotary magnet 3501 releases. During the next closed period the selector takes another step, unless the FT2 relay 2201 has operated. It continues to take one step for each reader cycle until stopped by the operation of the FT2 relay 2201. This relay is operated by ground from reader contact K3, the KB0 conductor, the front contact and armature 4 of the FT1 relay 2200, the back contact and armature 3 of the STD relay 2203, the TDG conductor, thence through an armature 1 and front contact of one of the S relays of Fig. 35 (which is at present operated), through the corresponding conductor leading to the contacts of the thousands first switch (Fig. 51), through the thousands first switch arm 5107 resting thereon, the FTD conductor, the front contact and armature 3 of the UA relay 3402, the FTD conductor, to armature 2 and front contact of the FT1 relay 2200, to the winding of the FT2 relay 2201. The FT2 relay 2201 releases the FT1 relay 2200 and locks through its armature 4 and front contact, over the back contact and armature 3 of the RTD relay 2204, to the ground supplied over the MON3 conductor. The FT2 relay 2201 connects the winding of the EC relay 3504 through armature 6 and front contact of the FT2 relay 2201, over the back contact and armature 1 of the TDA relay 2205 and over the EC conductor in parallel with the winding of the L8 relay 4205. The release of the FT1 relay 2200 prevents further stepping of the selector at this time.

15.073 Tape index 17 follows tape index 12

During the tape index check of the first tape 17 the TDS and RTD relays 2206 and 2204 were operated as described in section 15.054. The RTD relay 2204 locks in a circuit from ground, armature 1 and front contact of the RTD relay 2204, over the RTDG conductor, through armature 1 and front contact of the 17A relay 2905, the RTD conductor, to the winding of the RTD relay 2204. In operating, the RTD relay 2204 releases the LTD relay 2205 and the FT2 relay 2201. It also operates the RLS release magnet 3500 of the tape section selector, thus restoring the selector to normal. The circuit for the RLS release magnet 3500 may be traced from the lower set of selector off-normal contacts 3510, the SON conductor, the front contact and armature 4 of the RTD relay 2205, over the TDR conductor, to the winding of the RLS release magnet 3500. As this switch returns to normal, the off-normal contacts are moved into the position shown and the circuit for the RLS release magnet 3500 is open. When the CL6 relay 4204 operates, at the completion of first and last thousands check, the selector is normal and the FT1 relay 2200 operates. The selector is stepped as described in section 15.072.

15.08 Skipping days of round

The 2897XX line is skipped as described in section 12.11.

15.09 Checking tape section and round

15.091 General

At the start of the first input tape of a run the tape section must check with the selector which has stepped either to 0 or to a position corresponding to the thousands first switch (Fig. 51). On subsequent tapes the tape section may agree with the selector or it may be one greater than the selector setting. In the latter case the selector is advanced one step and on the following reader cycle the tape section check is completed.

15.092 Tape section agrees with selector

The tape section check, where the tape section and selector agree, is described in section 12.12. For those tapes where the tape section is not checked the selector is normal and the check is omitted. Round is checked in all cases.

15.093 Tape section is one greater than selector

If the tape section of the input tape does not agree with the setting of the TD selector (Fig. 35) the path for operating the RS1-3 reader step relay 2106 is open. If it exceeds the setting of the selector by 1, a path is closed to operate the STD relay 2203 as follows: ground, armature 3 and front contact of the L8 relay 4205, the EC conductor 3906, the armature 7 and front contact of the 28B relay 3901, the EC conductor into the network of the E digit reading relays (Fig. 38), and then, by way of example, over the ED5 conductor, the front contact and armature 2 of the S4 relay 3511 (assuming the TD selector (Fig. 35) to be one step behind the tape section value read by the reading relays), over the back contact and armature 3 of the TDS relay 2206, the SA conductor, the armature 10 and front contact of the TIE relay 3102, the front contact and armature 1 of the L8 relay 4205, the STD conductor, the armature 6 and back contact of the 18B relay 3004, the front contact and armature 2 of the 18C relay 3008, over the STD conductor directly to the winding of the STD relay 2203. The front contact and armature 10 of the TIE relay 3102 in this path prevents the stepping of the selector when reading the first input tape which must agree with the initial setting of the selector. The back contact and armature 3 of the TDS relay 2206 prevents the stepping of the selector when the first tape 17 is being read. This 17-type tape must always agree with the initial setting of the selector. The contacts and armatures 6 and 2 of the 18B and 18C relays 3004 and 3008 are provided so that the selector will not step on tape 18 during a combined sort of tapes 13 and 18 and will step on tape 13 only if a tape 18 has already been processed. This is made necessary by the method in which tapes 13 and 18 are processed on tens sort. The lowest numbered tape 13 is sorted first, followed by the correspondingly numbered tape 18, then the next tape of section 13 is processed, followed by the corresponding tape 18, etc. The STD relay 2203 locks to the ground on the armature 2 of the CL8 relay 4200 and opens the tape section checking lead. It also connects the TK relay 2207 to the KB2 conductor, which derives ground from the reader back contact K8 (Fig. 13). The STD relay 2203 establishes a connection from ground, over its armature 5 and front contact, over the back contact and armature 5 of the LTD relay, to the TDS conductor connected at the back contact and armature 1 of the ALA relay 1708 to the winding of the ROT rotary magnet 3501, to operate this magnet to step the selector forward one position. During the reader open period the TK relay 2207 responds and locks to the CLL conductor, connected through the armature 3 and back contact of the PX relay 1800, to the CLL conductor deriving ground from the armature 8 and front contact of the 28C relay 3903. The operation of the TK relay 2207 releases the 18C relay 3008 and closes the lead to the RS1-3 reader step relay 2106 by extending the TDG conductor through its front contact and armature 3, and the armature 4 and front contact of the STD relay 2203, to the TD conductor over the front contact of armature 3 of the FT1 relay 2200. If the tape section and the selector now agree, and if the round agrees with the round switch, the RS1-3 reader step relay 2106 operates, followed by the operation of the CL8 relay 4200, which in turn releases the STD relay 2203. The RS1-3 reader step relay 2106 steps the reader to the next line.

15.094 Last tape section

During the check of month the LTD relay 2202 is connected to the selector and if the selector is in the position corresponding to the last tape section expected on the run, then the LTD relay 2202 operates. The path is from ground, back contact and armature 8 of the CL6 relay 4204, the TDG conductor, armature 1 and front contact of the S9 relay 3509, the No. 9 conductor, and thence either through (1) the thousands last switch arm 5108, the LTD conductor 5109, the front contact and armature 4 of the UA relay 3402 or (2) the front contact and armature 4 of the TA relay 3401 or (3) the front contact and armature 4 of the HATHA relay 3405, to the LTD conductor 3407, thence through the front contact and armature 7 of the L9 relay 4206, the LTD conductor 4207, the front contact and armature 1 of the FT2 relay 2201, to the winding of the LTD relay 2202. On tens, hundreds and second thousands sorts, the LTD relay 2202 operates when the selector is in the position corresponding to tape section 9 and the S9 relay 3509 is operated. On units sort the LTD relay 2202 operates when the position of the selector corresponds to the setting of the thousands last switch. The LTD relay 2202 locks through its front contact and armature 4 and the back contact and armature 2 of the RTD relay 2204, to ground on the MON2 conductor. The LTD relay 2202 opens the circuit for the ROT rotary magnet 3501, opens one of the paths for operating the 17A relay 2905 and makes the end-of-tape key 4008 effective under certain conditions. The LTD relay 2202 lights the last section lamp (Fig. 28) from ground, armature 8 and back contact of the MUAS relay 4303, the LP conductor, the front contact and armature 3 of the LTD relay 2202, the LS conductor leading to the last section lamp in Fig. 28, for all sorts except those involving combined message unit and summary tapes. In these cases the MUAS relay 4303 is operated and the last section lamp is lighted when the 17B or 18B relay 2902 or 3004 operates, the LP conductor being grounded at armature 2 and front contact of the 17B relay or alternatively, at the front contact and armature 2 of the 18B relay. Instead of lighting as soon as the LTD relay 2202 operates while a message unit tape is in process, therefore, the last section lamp waits until the summary tape has been handled. If tapes 12 and 17 are being processed together on units sort, the LTD relay 2202 must be operated before a type 17 tape can be accepted (see section 15.054). When tape 17 is read it operates the RTD relay 2204, which releases the LTD relay 2202 (see section 15.073).

15.10 Checking month

Month is checked as described in section 12.13 except that with the TIEA relay 3100 operated, the RS1-3 reader step relay 2106 operates upon satisfactory completion of the check. The operation of the reader step relay, with the L9 and TIE relays 4206 and 3102 operated, reoperates the TIC relay 4101 through the TICA relay 4100, indicating that the tape identity has been checked and that calls may now be processed.

16. End of last input tape

16.1 Checking tape identity

Tape identity appearing at the trailing end of the last input tape is checked in the usual manner as described in sections 12.04 to 12.09, 12.11, 12.12 and 12.13. At the start of the last tape, the tape section selector steps to the position corresponding to the tape section of the last tape expected and the LTD relay 2202 operates as described in section 15.094. The TIC relay 4101 releases at the start of tape identity. After the month check the circuit advances to the skip splice entry 2860XX.

16.2 Tape runs out

The reader skips the skip splice entry and all of the splice pattern which follows, until the input tape runs out of the reader. The circuit then blocks and the alarm is brought in. The lighted last section lamp (Fig. 28) indicates that the last tape has been received (see sections 15.02 and 15.03).

16.3 Perforating tape identity at trailing end of output tapes

After all the input tapes for a run have been processed and the circuit has been released, the end-of-tape key 4008 is operated to perforate tape identity, skip splice entry and splice pattern on the end of all output tapes. This key is effective only after the proper tapes have been processed:

*a. Office and first thousands sorts*

The end-of-tape key 4008 operates the PTI relay in a circuit from ground, armature 2 and back contact of the WSA relay 5301, armature 2 and back contact of the WSB relay 5302, the WSN conductor, armature 10 and back contact of the ST3A relay 2004, conductor 2010, and thence through either the front contact and armature 2 of the OFBA relay 3403 or the front contact and armature 2 of the FTHA relay 3404, conductor 3408, armature 9 and front contact of the TIE relay 3102, conductor 3106, armature 5 and back contact of the TIC relay 4101, the PTI conductor 4010, the inner righthand contacts of the end-of-tape key 4008, the PTI conductor, to the winding of the PTI relay 4605.

*b. Units sort.—Tapes 11, 21, 31 or 41 alone*

The end-of-tape key 4008 operates the PTI relay 4605 in a circuit similar to that just described, except that the connection between the conductors 2010 and 3408 (previously made through the contacts of the OFBA or FTHA relay 3403 or 3404) is now made over the front contact and armature 2 of the X1B relay 2901.

*c. Units sort.—Tapes 11 and 17 together*

The end-of-tape key 4008 is not effective until the LTD relay 2202 has operated and the 12B relay 2900 has released. This insures that tape 11 and all tapes 17 have been processed. The PTI relay 4605 is now operated over a circuit similar to the last, except that the connection between conductors 2010 and 3408 may be traced through the back contact and armature 1 of the 12B relay 2900, the back contact and armature 2 of the 11B relay 3000, the back contact and armature 1 of the 13B relay 3005, the PTIB conductor, front contact, and armature 2 of the LTD relay 2202, to conductor 3408.

*d. Units sort.—Tapes 12 and 17 together*

The end-of-tape key 4008 is not effective until the LTD relay 2202 has operated and the 12B relay 2900 has released. This insures that all tapes 12 and 17 have been processed. The PTI relay 4605 operates over the path described in (c) above.

*e. Units sort.—Other tapes*

The end-of-tape key 4008 is effective as soon as the LTD relay 2202 operates. The PTI relay 4605 operates over the path described in (c) above.

*f. Tens sort.—Tapes 13 and 18 together*

The end-of-tape key 4008 is not effective until the LTD relay 2202 has operated and the 13B relay 3005 has released. This insures that all tapes 13 and 18 have been processed. The PTI relay 4605 operates over the path described in (c) above.

*g. Tens, hundreds and second thousands sorts*

The end-of-tape key 4008 is effective as soon as the LTD relay 2202 operates. The PTI relay 4605 operates over the path described in (c) above.

The PTI relay 4605 locks in a circuit from ground, armature 2 and front contact of the MON relay 2002, the MON9 conductor, the machine release key 4006, the RLML conductor 4007, the back contact and armature 4 of the WSP relay 1906, the PTIL conductor, the LKI conductor, the back contact and armature 13 of the AS relay 3400, the LK conductor, the armature 4 and front contact, to the winding of the PTI relay 4605. Through its front contact and armature 3 the PTI relay 4605 operates the TE relay 4601 and this in turn, through its armature 4 and front contact, grounds the TIS conductor to operate the TIS relay 3101. Through its armature 2 and front contact the TE relay 4601 connects the SON conductor (deriving ground from the off-normal contacts 3510) to the TDR conductor leading to the winding of the RLS release magnet 3500, thereby to restore the tape section selector (Fig. 35) to normal if it happens to be off-normal. The off-normal contact 3510 of the selector then opens the circuit of the RLS release magnet 3500 when the selector becomes fully restored. The TIS relay, over its front contact and armature 11, 3101 operates the ME relay 5300, which opens the operating circuit for the RCA relay 2400. In the first open period of the reader following the operation of the ME relay 5300, the ST1 relay 2001 operates from ground, the H8 reader contact (Fig. 13), the HB2 conductor 1300, the armature 7 and back contact of the RS2-4 relay 2105, the armature 10 and back contact of the RS1-3 relay 2106, the ST conductor, the back contact and armature 1 of the LK1 relay 3302, conductor 3303, the armature 1 and front contact of the ME relay 5300, conductor 5303, front contact and armature 7 of the TE relay 4601, the STA conductor 4602, armature 3 and back contact of the ST2 relay 2005, the armature 2 and back contact of the RLS relay 2006, the armature 2 and front contact of the RLM relay 1903, to the winding of the ST1 relay 2001. The ST1 relay 2001 operates the RCD relay 2500. Upon the establishment of the original circuit for the ST1 relay 2001, the ST2 relay 2005 is short-circuited, but at the end of the open period this relay becomes operated through the removal of the ground by the H3 reader contact (Fig. 13). Thereupon, the ST3 relay 2003 becomes operated and in turn the ST3A relay 2004 responds. When the TIS relay 3101 operates it shunts down, through its front contact and armature 7, the battery at the TI relay 2800 and through its armatures 9 and 10, operates the B1 and B7 reading relays (Fig. 36). The TIS relay 3101 also operates the PX relay 1800 during the reader open period from ground at the contact K3 (Fig. 13), the KB0 conductor, front contact and armature 8 of the RCD relay 2500, the KB0 conductor, the front contact and armature 4 of the TIS relay 3101, the PX conductor, the back contact and armature 1 of the W2A relay 1801, the P0 conductor, the armature 2 and back contact of the WSP relay 1906, and thence in an obvious chain circuit to armature 1 and back contact of the W1 relay 1803, to the winding of the PX relay 1800. The PX relay 1800, upon operating, prepares a path for the W1 relay 1803 so that this relay operates on the following reader closed period from ground at the K5 conductor (Fig. 13), the KM3 conductor, the armature 6 and back contact of the PS2 relay 1908, and thence through an obvious chain circuit to armature 1 and front contact of the PX relay 1800, and thence to the winding of the W1 relay 1803. During this same reader closed period the A2 reading relay 3602 is also operated from ground at the reader contact K1, the KM1 conductor, the front contact and armature 7 of the RCD relay 2500, the KM1 conductor, the armature 4 and back contact of the ESP relay 5304, the front contact and armature 5 of the ME relay 5300, the A2 conductor, the front contact and armature 10 of the ST3 relay 2003, the A2 conductor 2011, the armature 10 and back contact of the APB-C relay 5800, conductor 5801, to the winding of the A2 reading relay 3602. The A2 reading relay 3602 operates the LK1 relay 3302 from ground, the H6 reader contact (Fig. 13), the HM4 conductor, the front contact and armature 5 of the RCD relay 2500, the HM4 conductor, the armature 10 and back contact of the A0 reading relay 3600, the armature 10 and front contact of the A2 reading relay 3602, the back contact and armature 10 of the A1 reading relay 3601, the LK1 conductor 3604, and thence over either armature 3 and back contact of the PCA relay 3902 or the front contact and armature 7 of the 20C relay 3903, the LK1 conductor 3904, to the winding of the LK1 relay 3302. The LK1 relay locks to ground at the front contact and armature 3 of the ST3A relay 2004, over the back contact and armature 6 of the LLA relay 3304 and over the armature 5 and front contact of the LK1 relay 3302. During the reader open period following the operation of the W1 relay 1803, the PL1 relay 1805 is operated over the following path: from ground at the reader contact K3, the KB0 conductor, the front contact and armature 8 of the RCD relay 2500, the KB0 conductor, the front contact and armature 4 of the TIS relay 3103, the PX conductor, the back contact and armature 1 of the W2A relay 1802, the P0 conductor, and thence in a chain circuit starting with armature 2 and back contact of the WSP relay 1906 and ending with the armature 1 and front contact of the W1 relay 1803, conductor 1806, armature 1 and back contact of the PSP relay 4600, the PL1 conductor, armature 1 and back contact of the LET relay 4411, the PL1 conductor leading directly to the winding of the PL1 relay 1805. The PL1 relay 1805 locks in the circuit heretofore provided for the locking of the PX relay 1800 and thereby releases the PX relay 1800. The PL1 relay 1805 operates the C, D, E and F digit reading relays (Figs. 37 and 38) as described in section 13.02. The circuit now perforates nine lines of tape identity on each of the ten output tapes as described in sections 13.02 to 13.10. The EP relay 1907 operates when the last line (month) has been perforated as described in section 13.10.

16.4 Perforating skip splice entry and splice pattern at trailing end of output tapes During the reader open period the PS1 relay 1910 is operated from ground at reader contact K3 (Fig. 13), the KB0 conductor, the front contact and armature 8 of the RCD relay, the KB0 conductor, to the front contact and armature 4 of the TIS relay 3101, the PX conductor, the armature 1 and front contact of the RS1-3 relay 2106, the P0 conductor, the armature 2 and back contact of the WSP relay 1906, the armature 2 and front contact of the EP relay 1907, the TIE conductor, the armature 2 and front contact of the PTI relay 4605, the PS1 conductor, to the winding of the PS1 relay 1910. This relay operates and locks in a circuit from ground, front contact and armature 2 of the ST3A relay 2004, the back contact and armature 6 of the RS1-3 relay 2106, the PLL conductor, the front contact and armature 2 of the TIS relay 3101, and thence in a chain circuit through the armature 8 and back contact of each of the PS2 relays 1908, the PS3 relay 1909 and the armature 7 and front contact of the PS1 relay 1910. The PS1 relay 1910, through its armature 5 and front contact, operates the PHK relay 6200 and it also operates the C2, C4, D4 and D7 reading relays (Fig. 37) and two of the E and two of the F reading relays (Fig. 38). Each sorter is wired to operate a particular set of E and F relays representing the machine number assigned to it. With the PS1 relay 1910 operated, the 2860XX code is prepared on all the output tapes (XX is the machine number). The perforator hold check described in section 11.6 is made while this line is being perforated. After the code 2860XX is perforated, a series of 081010 splice code lines is perforated on all tapes as described in sections 11.7 and 11.8. In order to perforate the 2860XX code, the A2 perforator magnet (Fig. 62) is connected through the operated PA0 connector relay 6100 and the operated KA2 series check relay 4903, in a circuit from the PA2 reader contact (Fig. 13), the PA2 conductor, the armature 3 and front contact of the A2S relay 5806, the PA conductor, the armature 1 and back contact of the WS1D relay 4702, the armature 1 and back contact of the WS2 relay 4700, the P2 conductor through the winding of the KA2 series check relay 4903 and the PA0 connector relay 6100, to the A2 perforator magnet (Fig. 62). During the break period after the operation of the WSP relay 1906, the WS2 relay 4700 is operated by ground from reader break contact K3, the KB0 conductor, the front contact and armature 8 of the RCD relay 2500, the KB0 conductor, the front contact and armature 4 of the TIS relay 3101, the PX conductor, to armature 1 and front contact of the RS1-3 relay 2106, the P0 conductor, the armature 2 and front contact of the WSP relay 1906, the front contact and armature 2 of the W2A relay 1801, the PS2 conductor, the front contact and armature 4 of the PHK relay 6200, the back contact and armature 6 of the PSP relay 4600, to the winding of the WS2 relay 4700. This opens the circuit to the A2 perforator magnet (Fig. 62) and connects the AO perforator magnet to the reader contact PA2 at the armature 2 and front contact of the WS2 relay 4700, from the circuit heretofore described.

16.5 Restoring circuit

When sufficient splice pattern has been perforated on the output tapes the operator releases the end-of-tape key 4008. The release of the key 4008 opens the operating path of the PTI relay 4605 but the PTI relay 4605 stays locked until the WSP relay 1906 operates, so that the circuit will complete nine lines of tape identity and will perforate the skip splice entry. At the start of spreading the ship splice code 2860XX, the WSP relay 1906 is operated, thus releasing the PTI relay 4605, if the end-of-tape key 4008 has been restored. The PTI relay 4605, in releasing opens the operating circuit for the TE relay 4601, leaving it locked to ground on armature 9 of the ST3A relay 2004. Perforation continues until a line has been spread across all perforators. The RS1–3 reader step relay 2106 operates at the end of this process. The ground from reader back contact H8 (Fig. 13) is extended over the HB2 conductor, the front contact and armature 9 of the RCD relay 2500, the HB2A conductor, the armature 12 and front contact of the RS1–3 relay 2106, the HB2C conductor, the armature 5 and front contact of the PS2 relay 1908, the RL conductor, armature 10 and front contact of the TE relay 4601, armature 5 and back contact of the PSP relay 4600, armature 5 and back contact of the PTI relay 4605, the MRL conductor, armature 2 and front contact of the TIE relay 3102, to the winding of the MRL relay 1900, causing the operation of this last named relay. This ground, after it leaves armature 5 and back contact of the PTI relay 4605, is also extended through the front contact and armature 7 of the TE relay 4601 to the RLS conductor leading directly to the winding of the RLS relay 2006, so that this release relay also becomes operated and in so doing releases the ST1, the ST2, the ST3 and the ST3A relays 2001, 2005, 2000 and 2004. With the release of these starting relays all the relays in the circuit are released except those associated with the master off-normal MON relay 2002, the RSR relay 1703 and the motor 1204.

16.6 Stopping motor

When the MRL relay 1900 operates it locks to ground, armature 7 and front contact of the MON relay 2002, the MON 10 conductor, and thence through the armature 3 and front contact of the MRL relay 1900, to the winding thereof. At its armature 1 and back contact, the MRL relay 1900 opens the circuit for the MST relay 1902 releasing same, and at its armature 2 and back contact opens the locking circuit of the MON relay 2002 releasing same. The release of the MST relay 1902 releases the motor relay (such as the motor relay 1209) in the alternating-current power distributing circuit, removes battery from the step magnet 1207 and releases the master off-normal relay 2002. The release of the MON relay 2002 releases all other relays.

16.7 Automatic sorting

16.71 General

The tape to be processed is spliced between the end of the tape issuing from perforator 0 and the tape entering into the No. 9 reader and the sort switch (Fig. 50) is set on its No. 8 or AMS automatic machine sort position. The motor start key 4000 may now be operated and the processing will be initiated by the operation of this motor start key. This operates the MON relay 2002, as above described which in turn establishes a connection from ground, armature 13 and front contact of the MON relay 2002, the MON 5 conductor, the sort switch arm 5001 on its AMS automatic sorting position, to the winding of the AMS relay 4500. This relay becomes operated and (1) places a ground on the automatic sort switch arm 4504, (2) transfers a master off-normal ground from the conductor 4501 to contacts of the units, tens, hundreds and thousands sort relays of Fig. 34, (3) grounds the SPA lead to operate the SPA relay 2008, and (4) partly establishes a circuit for the ROT rotary magnet 4505 to move the switch arm 4504 from its normal to its first position. This latter circuit will be closed during the starting operations. The operation of the SPA relay 2008 renders it unnecessary for the attendant to operate the tape feed key (such as key 1205) since this function will be taken care of automatically in the processing as described later. When the machine start key 4004 has been operated, then the ST1 relay 2001 is operated as before described and during the period before the ST2 relay 2005 becomes operated a circuit is established from ground, armature 6 and back contact of the TIE relay 3102, armature 8 and front contact of the ST1 relay 2001, armature 1 and back contact of the ST2 relay 2005, the ROT conductor, armature 4 and front contact of the AMS relay 4500, to the winding of the rotary magnet 4505, so that the switch arm 4504 is advanced to its first position where it will establish a circuit to operate the UA units sort relay 3402. If at this time the TDRL relay 4406 and the SRL relay 4409 are operated and locked to the off-normal contact 4506, then the movement of this off-normal contact, as the sort switch arm 4505 moves to its first position, releases these two relays and they return to normal. Thus, the machine is set to make a unit sort.

With the UA relay 3402 operated a circuit is established from ground, armature 12 and front contact of the MON relay 2002, the MON conductor 2003, armature 2 and front contact of the AMS relay 4500, the armature 16 and front contact of the UA relay 3402, conductor 4501, to the winding of the R0 relay 1201, whereby the No. 0 reader is effectively connected to the circuit network of the sorter. The operation of the R0 relay 1201 operates the motor relay 1209 so as to start the motor of this No. 0 reader. The sorter now proceeds to skip over initial splice pattern in the usual manner and reads and checks the tape identity at the leading end of the input tape. When the 2899XX line is reached the machine automatically spreads leading tape identity for the next sort on all of the ten perforators. Leading tape identity is normally as follows in the order of perforation—lines of splice pattern 081010, 2891XX, 2892XX, etc. to and including 2899XX. In the automatic operation of the sorter it is unnecessary to perforate the normal splice pattern so the leading tape identity includes only 2891XX, 2892XX, etc. to and including 2899XX. With the UA relay 3402 operated the units digit of the tape index, which is put on the 2891 entry of the tape identity on all these tapes, is of the value 3 indicating that the units sort has been made and that the next sort to be made will be a tens sort. As hereinbefore described the tape type recorded in the output tapes is controlled by the grounds placed on armatures 9 to 12, inclusive, of the PL1 relay 1805. The armatures 9 and 10 ground the PTT1 and PTT2 leads, grounding the tape type switch arms 5603 and 5601, respectively, to operate the E0 and E1 reading relays (Fig. 38), respectively. (This tape type switch of Figs. 50 and 56 is on its No. 4, or message unit position.) The grounds placed on the PTT3 and PTT4 leads through armatures 12 and 11 of the PL1 relay 1805 are extended as follows in the one case, over the PTT3 conductor, armature 12 and front contact of the UA relay 3402, the UA4 conductor, the tape type switch arm 5602, to operate the F2 reading relay; and in the other case, over the conductor PTT4, the armature 11 and front contact of the UA relay 3402, to the F1 digit reading relay (Fig. 38). Thus the E digit reading relays express the value 1 and the F digit reading relays express the value 3.

16.72 Units sort

Upon completion of spreading tape identity the No. 0 reader proceeds to read the original input tape and to sort the entries in the normal manner. Each tape section of this input tape is checked as before, the S0 to S9 relays (Fig. 35) being operated successively and correspondingly to close the required check paths. The operation of the UA reply 3402 establishes a circuit from its armature 17 and front contact directly to the winding of the LTS relay 4410, which operates and prepares to return the tape section switch (Fig. 35) to normal when processing of the original input tape is completed. After reading the trailing tape identity (this, in the order of perforation or reading, is 2891XX, 2892XX, etc. to and including 2899XX, skip splice code 2860XX, and a series of splice codes 081010) of the last section of the tape which was originally inserted between the 0 reader and the 0 perforator and after skipping the splice pattern on the trailing end, the 0 reader comes up on the 289113 code of the newly perforated tape identity on the leading end of the material which has been unit sorted to the 0 perforator. The F digit value 3 does not permit this line of tape identity to be checked while the UA relay 3402 is operated. However, a path is now established over the reading check path, from the armature 4 and front contact of the L1 relay 4104, the FC conductor, through the armature 8 and front contact of the 28B relay 3901, the FC conductor leading to the F digit reading relays (Fig. 38), thence out over the FD3 conductor, through armature 15 and front contact of the UA relay 3402, the 286 lead, to the winding of the 286 relay 4408, so that this relay now becomes operated. The 286 relay, in operating, operates the 286R relay 4403 and, through the armature 3 and front contact of the TDRL relay 4406, causes the operation of the TDRL relay 4406. The operation of this TDRL relay 4406 extends a connection from ground, the front contact and armature 2 thereof, over the RLS lead to operate the RLS release magnet 3500 of the tape section selector switch (Fig. 35), thus returning it to normal. The TDRL relay 4406, through its front contact and armature 1, locks to the ground supplied over the off-normal contacts 3507. Through its armature 5 and front contact, the TDRL relay 4406 operates the ROT rotary magnet 4505 to advance the selector switch arm 4504 to its next contact, whereupon the UA relay 3402 is released and the TA relay 3401 is operated. This prepares the circuit to make its tens digit sort. Through its armature 4 and back contact, the TDRL relay 4406 removes ground from conductor 4407 to thereby release the TIE relay 3102, so that the circuit is now in position to again spread leading tape identity (again without splice pattern) when it finishes checking tape identity at the leading end of the tape. The FT2 relay 2201 is also released so that the TD tape section selector switch (Fig. 35) may be stepped to position 1 when reading the 2896XX tape identity line on the leading end of tape section 0. With the TA relay 3401 operated, the F digit value 3 on the 2891 line will be checked as a valid entry and the machine will read and check the succeeding lines of this tape identity group. With the TIE relay 3102 normal, the reader, upon reading and checking the 2899XX line, will cause the machine to spread the leading tape identity (without splice) for the tens sort on all of the ten perforators. With the TA relay 3401 operated, the units digit associated with the tape index to be placed on all of these tapes is of value 4. Through armatures 11 and 12 of the TA relay 3401, the PTT4 lead is extended to the F0 reading relay (Fig. 38) and the PTT3 lead is extended to the F4 reading relay (Fig. 38).

16.73 Tens sort

The 0 reader now proceeds to read the material, which was previously units sorted, into the 0 perforator and these entries are now sorted by the tens digit. Upon reading through the last call entry in this 0 tape section of the units sort, the 0 reader encounters the 2891 line with a 4 in the units digit of the tape index, indicating the beginning of the material on the 0 perforator for the tens sort. Since the TA relay 3401 is operated, this 4 in the F digit will not check out but will operate the 286 relay 4408 from the FD4 lead through the armature 15 and front contact of the TA relay 3401. The 286 relay 4408, in operating as before, operates the 286R relay 4403 to extend its period of operation. The 286R relay 4403 locks through its armature 4 and front contact to the E conductor which is connected to the reader back contact E (Fig. 13) which is closed during the open period. Thus, the effective operation of the 286 relay 4408 is extended over the following open interval. The main path closed by these two relays is through the armature 3 and back contact of the LTS relay 4410 (this relay released upon the release of the AS relay 3402) and thence to the winding of the ROT magnet 3501, whereby the tape section selector is advanced to its next (second) position in which the S1 relay 3503 becomes operated.

With the AMS relay 4500 and the TA relay 3401 operated, a circuit is established from the MON ground on conductor 2003, armature 2 and front contact of the AMS relay 4500, armature 16 and front contact of the TA relay 3401, conductor 4507, and thence in a chain circuit through armatures and back contacts of the S relays of Fig. 35, to armature 3 and front contact of the S1 relay 3508, and thence over the R1 conductor leading to the R1 relay associated with the No. 1 reader (Fig. 14) and which corresponds to the R0 relay 1201 of the No. 0 reader. The No. 0 reader is, therefore, disconnected from the circuit network of the sorter and the No. 1 reader is rendered effective in place thereof. The internal arrangement of the No. 1 reader is exactly the same as that of the No. 0 reader, as it has been described hereinbefore, and this reader will cause the same operations and will respond in the same way as described. The same multiple connections are made through the R1 connector relay to the No. 1 reader as through the R0 connector relay 1201 to the No. 0 reader.

It is assumed that the reader from the last automatic sorting of the tape has been standing on the 2860XX line. The machine, therefore, starts to read this line and skip the splice pattern which occurs between the No. 1 reader and the No. 1 perforator prior to reading the information which has been sorted in accordance with the units digit on tape section 1 and which is introduced by the tape identity tape index 289113. On reading this tape identity index at the leading end of the tape section 1 of the units sorted tape, the machine proceeds to sort the call entries in this section by the tens digit. When the leading end of the tens sorted material of section 1 is reached the tape index 4 again prevents the 2891 line from being checked and the tape digit switch (Fig. 35) is operated as described before. The tape digit advances between each section and the readers are successively stopped and started so that the succeeding tape sections are read.

Finally the ninth tape section is read by reader 9 and the sorting by tens digit proceeds for this section until the 2891X4 entry is reached at the beginning of the tape section 9 of the tens sorted material. Upon the operation of the S9 relay 3509, a connection is established from ground, over armature 2 thereof to again cause the operation of the LTS relay 4410, so that upon the later energization of the 286 relay 4408 the TDRL relay 4406 will be subject to operation. Therefore, upon reading a 4 in the tape index at the end of the use of the No. 9 reader, the 286 relay 4408 will operate and will cause the operation of the TDRL relay 4406. This relay, in operating as before, advances the sort switch arm 4504 and returns the tape section switch (Fig. 35) to normal. The TDRL relay 4406, in operating as before, releases the FT2 relay 2201 and the TIE relay 3102. As a result, the No. 9 reader is stopped and the No. 0 reader is again brought into play. With the sort switch (Fig. 45) advancing to its next position, the TA relay 3401 is released and the HATHA relay 3405 is operated. The circuit is now ready to make a hundreds sort and is also prepared to start the reading of the leading tape identity on the first tape section before this sort.

16.74 Hundreds sort

After reading and checking the tape identity at the leading end of the first tape section for the tens sort with the TIE relay 3102 normal, leading tape identity (without splice) is spread on all output tapes with a 5 as the units digit of the tape index. The PTT3 lead is extended through armature 10 and front contact of the HATHA relay 3405 to the F4 conductor and the PTT4 lead conductor is extended through the armature 6 and back contact of the STHA relay 3406 and armature 9 and front contact of the HATHA relay 3405 to the F1 conductor, so that with the F1 and F4 reading relays (Fig. 38) operated the value 5 will be expressed thereby.

After the tape identity has been spread, the reading of tape section 0 of the tens sorted tape is started and these call entries are now sorted in accordance with the hundreds digit. After the last call entry has been reached in this section, the tape identity of the leading end of the corresponding tape section for the hundreds sorted tape is reached. The first line of this tape identity 2891 cannot be checked. As a result, the 5 in the F digit of this line causes ground to be extended from the FD5 conductor, over the armature 9 and back contact of the STHA relay 3406, the armature 13 and front contact of the HATHA relay 3405 and to the winding of the 286 relay 4408, where the operations previously described will be started. The tape digit switch (Fig. 35) advances into its next position and, in so doing, releases the S0 relay 3502 and causes the operation of the S1 relay 3508, whereby the No. 0 reader is disconnected and the No. 1 reader is connected in its place to the circuit network of the sorter. Tape section 1 may now be read.

The remaining sections for the hundreds sort are read as described in connection with the tens sort. Each section requires the dropping of the previous reader and the starting of the next reader associated with the next tape section. When tape section 9 has been completed, the ninth reader is again dropped and the No. 0 reader is again started as a result of the release of the TD switch (Fig. 35). With the sort switch (Fig. 45) now in the next position, the STHA relay 3406 is operated and the HATHA relay 3405 is maintained operated from ground over armature 5 and front contact of the STHA relay 3406. The tape digit switch will step when the 2896 line of this leading tape identity on tape section 0 of the hundreds sorted tape is read, in turn advancing and again operating the S0 relay 3502. With the STHA relay 3406 and the HATHA relay 3405 and the S0 relay 3502 operated, a circuit is established from ground, the armature 11 and front contact of the STHA relay 3406, the armature 16 and front contact of the HATHA relay 3405, the armature 3 and front contact of the S0 relay 3502, to the winding of the LET relay 4411. After reading and checking the 2899XX line of tape identity with the LET relay 4411 operated, the spreading of leading tape identity (without splice) preparatory for the thousands sort is delayed by the operation of the PS2 relay 1908 and the WS2 relay 4700 in place of the operation of the PL1 relay 1805 (as would normally be required to spread the first line of tape identity). Ordinarily the circuit for the PL1 relay 1805 extends from the back contact and armature 1 of the PSP relay 4600, over the PL1 conductor, through the armature 1 and back contact of the LET relay 4411, to the PL1 conductor connected directly to the winding of the PL1 relay 1805. However, upon the operation of the LET relay 4411, this PL1 conductor is now switched through the armature 1 and front contact of the LET relay 4411, the armature 1 and back contact of the TC0 relay 4413, over the PS2 conductor, to the winding of the PS2 relay 1908 to cause the operation of this latter relay at this time. Also a circuit is established from ground, armature 3 and front contact of the LET relay 4411, the armature 3 and back contact of the TC0 relay 4413, to the winding of the WS2 relay 4700. Therefore, during the operation of the LET relay 4411 and before the operation of the TC0 relay 4413, the PS2 relay 1908 and the WS2 relay 4700 will become operated. As a result, lines of splice pattern 081010 are spread on all tapes for a timed interval as determined by the timing circuit associated with the tube 4416. The operation of this tube 4416 is started through a circuit from ground, armature 2 and front contact of the LET relay 4411, the armature 2 and back contact of the TC0 relay 4413, to the SST relay 4414 for causing the operation of this latter relay. This relay establishes a connection from ground through the winding of the EST relay 4415 to the cathode of the tube 4416 and, by removing the resistance 4417 shunted about the condenser 4418, allows condenser 4418 to start its charging. The values of the resistances 4419 and 4422 are such that the interval of time measured before the EST relay 4415 may be operated is such that sufficient splice pattern will be automatically perforated in each of the tapes to reach from the perforator to its associated reader. At the end of the timed interval, the EST relay 4415 operates and, during a break interval of the reader, a circuit is established from the A reader back contact (Fig. 13), over the A conductor, through the armature and front contact of the EST relay 4415, to the winding of the TC0 relay 4413, which thereupon operates and locks over its front contact and armature 2 to the ground supplied by armature 2 and front contact of the LET relay 4411. With the TC0 relay 4413 operated, the tube timer is returned to normal and the PS2 and the WS2 relays 1908 and 4700, which have caused the registration of the 081010 splice pattern code in the reading relays, are released. The PL1 lead connected to armature 1 of the LET relay 4411 is now again switched by armature 1 of the TC0 relay 4413 to its front contact, and thence over the normal PL1 connection to the winding of the PL1 relay 1805 so that this relay may now operate to provide the first line of leading tape identity (without splice) for the thousands sorted tape. Such tapes contain a tape index with the units digit value 6. The operation of the TC0 relay 4413 establishes a connection from ground, back contact and armature 6 of the AS relay 3400, front contact and armature 6 of the TC0 relay 4413, the A conductor 4421, the winding of the TCT0 tape cutter relay 6300 for perforator 0, the B conductor 6301, the armature 5 and front contact of the TC0 relay 4413, to battery, whereby the condenser 6302, normally under charge from the source of alternating current 6303 rectified by the rectifier 6304, is fed into the cut magnet 6213 so that the tape issuing from the No. 0 perforator is severed and, as being issued, has on it only a limited number of splice pattern codes. This operation takes place just prior to putting the tape identity on the leading end of the first section of thousands sorted tape. This is the first operation required in preparing to obtain the results of the multistage automatic sort out of the machine after this last sort is completed.

16.75 Thousands sort

With the spreading of the leading tape identity (without splice) for the thousands sort completed the first tape section is read by reader 0 and sorted by the thousands digit. When the end of call entries on this tape section have been reached the reader reads the 081010 splice pattern line, without having encountered the usual introductory 2860XX skip splice entry. A new path is, therefore, completed to operate the 286 relay 4408 to advance the tape digit switch. This circuit may be traced from the reading relay check circuit, over conductor 3603, through armature 10 and front contact of the STHA relay 3406, the armature 15 and front contact of the HATHA relay 3405, conductor 4508, back contact and armature 2 of the LK1 relay 3302, the CKBA conductor 3313, armature 4 and front contact of the A0 reading relay 3600, the CKBA conductor, to armature 2 and front contact of the B1 reading relay 3614, the armature 2 and front contact of the B7 reading relay 3605, the armature 1 and front contact of the C0 reading relay (Fig. 37), the armature 1 and front contact of the C1 reading relay (Fig. 37), the armature 1 and front contact of the D4 reading relay (Fig. 37), the armature 1 and front contact of the D7 reading relay (Fig. 37), whereby the code 0810 is expressed over the 286 conductor leading to the winding of the 286 relay 4408. The LK1 relay 3302 can only be normal with the A0 relay 3600 operated if a 0 line is read which has not been indicated as a supplementary line of an entry. The advance of the tape digit switch to the next position, through the operation of the 286 relay 4408, causes the circuit to start the reading of the next tape section by the next reader. This process continues as before except that the end of a tape section is now indicated by the reading of a line beginning with a 0 which is not properly introduced by a line beginning with a 1, a 2 or a 3. The LET relay 4411 and the TC0 relay 4413 are released upon the release of the S0 relay 3502 after the reading of the 0 tape section.

16.76 Assembly sort

Upon reading the 018010 line at the end of the tape section 9, the TDRL relay 4406 is operated in the usual manner. The advance of the sort switch arm 4504 to its next contact causes the operation of the AS relay 3400 and the release of the STHA relay 3406 and the HATHA relay 3405. Upon the operation of the AS relay 3400, a connection is established from ground, front contact and armature 4 of the AS relay 3400, armature 4 and back contact of the TC0 relay 4413, the PTI conductor, to the winding of the PTI relay 4605 so that this relay now becomes operated. In addition, another circuit is established from ground, front contact and armature 7 of the AS relay 3400, through the armature 2 and back contact of the TC0 relay 4413, to operate the SST relay 4414 to start the timing by use of the tube 4416.

With the PTI relay 4605 operated, the usual trailing tape identity and splice pattern is placed on all ten tapes. Trailing tape identity is as follows in the order of perforation: 2891XX, 2892XX, etc. to and including 2899XX, then skip splice code 2860XX, and followed by lines of splice 081010. With the AS relay 3400 operated, the units digit of tape index is 6. The PTT4 lead is connected through the armature 1 and front contact of the AS relay (Fig. 38) 3400 to the F2 lead to operate the F2 digit reading relay and the PTT3 lead is connected through armature 2 and front contact of the AS relay 3400 to the F4 digit reading relay (Fig. 38), whereby the value 6 is expressed. The operation of the AS relay 3400 prevents the PTI and TE relays 4605 and 4601 from locking in this process of spreading trailing tape identity and trailing splice pattern on these tapes. At the end of the timed interval the EST relay 4415 operates, in turn operating the TC0 relay 4413 during an open reading interval. The PTI and TE relays 4605 and 4601 release and the C relay 4400 operates in a circuit from ground, front contact and armature 4 of the AS relay 3400, armature 4 and front contact of the TC0 relay 4413, to the winding of the C relay 4400. The TC0 relay 4413 locks to the ground on armature 7 of the AS relay 3400. The SST and EST relays 4414 and 4415 release.

With the C relay 4400 operated, the reading upcheck path through the F to B digits is now extended over conductor 3603, the front contact and armature 1 of the C relay 4400, the CKB conductor 4402, the armature 6 and back contact of the A0 reading relay 3600, the armature 6 and back contact of the A1 reading relay 3601, the armature 7 and front contact of the A2 reading relay 3602, the PA0 conductor, to armature 1 and back contact of the PC0 relay 4412, the armature 2 and front contact of the C relay 4400, the PA0 conductor, the P0 conductor, to the PA0 perforator cut-in relay 6100, whereby the No. 0 perforator is enabled. As a result each line of tape to be read will be perforated on the 0 perforator and no sorting will take place. This is the gathering or assembly sort which is useful in bringing the material together from the ten tapes onto one tape so that no splicing will be required of the output of the thousands sort. With the AS relay 3400 operated, the tape digit switch arm 3506 is effective to operate the S relays of Fig. 35. As a result, with the tape digit switch arm 3506 in position 1, the S1 relay 3508 will operate, thus bring the No. 1 reader into play immediately. Therefore, the machine automatically skips from tape section 9 to reading the tape section 1. After the end of the thousands sort, the machine no longer uses the entry index of the various lines being read for control purposes. The machine may start on the 081010 line of section 2 of the tape and this line, together with all succeeding lines, will be copied onto the end of tape section 0 as it now comes from perforator 0. Since the last line perforated in the automatic processing of perforator 0 was an 081010 line, the 2860XX line introducing this splice pattern having been perforated during the spreading of the trailing end of the tape identity, the copied 081010 lines from tape section 1 will not interfere with the processing in the next stage.

The circuit is now prepared to look for only one line of tape and that is the 2860XX line. When this line occurs while reading any tape, it is perforated onto output tape 0 but is also used to operate the 286 relay 4408. The circuit may be traced from the reading check lead 3603, through the front contact and armature 1 of the C relay 4400, the CKB lead 4402, armature 6 and back contact of the A0 reading relay 3600, armature 6 and back contact of the A1 reading relay 3601, armature 7 and front contact of the A2 reading relay 3602, and thence also through armature 3 and front contact of the A2 reading relay 3602, the armature 1 and front contact of the B1 reading relay 3614, the armature 1 and front contact of the B7 reading relay 3605, the armature 1 and front contact of the C2 reading relay 3701, the armature 1 and front contact of the C4 reading relay 3705, the 286 lead 3704, to the winding of the 286 relay 4408. During the open interval after the reading of this 286 line, the PC0 relay 4412 operates in the circuit heretofore described. The 286R relay 4403, in having operated, prevents the reader from stepping off the 2860XX line so that as the tape section switch is advanced and as one reader is disconnected from the circuit network and as the next reader is enabled, the reader which has read the 2860XX line is left in that position. The 286 and 286R relays 4408 and 4403, in operating, advance the tape digit switch and thereby start the process which will release one R relay (such as the R0 relay 1201) and will operate another such relay to stop the reading from one reader and to start the reading from another reader. As a result of the operation of the PC0 relay 4412, each reader is thus stopped on a 286 line and this is the condition which is found when the automatic sorting operation is started. That is, reader 0 is stopped on 081010 and readers 1 to 9, inclusive, are stopped on 2860XX.

The advance from the reading of one tape section to the next for the purpose of assembling the information on perforator 0 continues as described above with the end of each tape section being indicated by the 2860XX line. When reading the last tape section, the S9 relay 3509 is operated again, operating the LTS relay 4410. However, with the AS relay 3400 operated, a circuit is now established from ground, front contact and armature 1 of the LTS relay 4410, the front contact and armature 11 of the AS relay 3400, to the winding of the ELTR relay 4420 which operates and locks to the ground supplied over the ELTRL conductor by armature 14 and front contact of the MON relay 2002. When the 286 relay 4408 operates at the end of the last tape section, the TDRL relay 4406 operates, thus advancing the sort switch 4504 after releasing the tape digit switch (Fig. 35). With the sort switch in its next position, the AS relay 3400 is released but no other relay will operate. Hence the machine will time out and bring in an alarm since no reading relays will be operated. The occurrence of an alarm, with the operation of the AL alarm relay 1700, will operate, from ground on its armature 11, the SRL relay 4409 which locks to the off-normal contact of the sort switch. The sort switch returns to normal, at the same time operating the TDRL relay 4406 to insure that the tape digits switch has returned to normal.

The assembling stage is now completed and the operator may now restore the machine to normal by the use of the master release key 4005. The operator may now cause the 0 perforator to perforate an additional number of splice pattern codes on the output tape and, by operating the 0 perforator tape cutter key 6305, may cut this one tape thus leaving the combination of the ten perforators and readers in the condition found at the beginning of this operation.

17. Window splice in input tape

17.1 Skipping skip window entry

The input tape may have a window splice in it at any point except that no call entry or series of tape identity entries will be interrupted by window splice. The window splice is perforated by the preceding machine to cover a splice in the tape. It consists of a series of 081010 lines covering the actual splice and is both preceded by and followed by a 287020 line. An exception is made in that if the splice occurred while splice pattern was being perforated at the end or beginning of a tape, then the 287020 lines are omitted. In this latter case the window splice is merely a prolongation of the regular splice pattern and is passed by unnoticed. When the sorter reads the skip window entry 287020, the A2 reading relay 3602 operates the LK1 relay 3302, which locks through the LLA relay 3304, as before described. The reading check lead 3301 is extended through the A digit reading relays (Fig. 36) to the AD2 conductor, and then through or around the B digit reading relays (depending upon the type of tape being processed), to operate the 28A relay 3900. The 28A relay 3900 operates the 28B relay 3901 and connects the 28C relay 3903 to a reader back contact (K8), so that the 28C relay 3903 operates in the reader open period. The 28C relay 3903 locks itself and the 28B relay 3901 to the LK1 relay 3302 through the APD and LLA relays 5804 and 3304 both normal, and in turn operates the PCA relay 3902. In the next reader closed period, when the reading relays operate, the reading check path is connected over the CK2 lead 3301, the front contact and armature 9 of the A2 reading relay 3602, the back contact and armature 8 of the A1 reading relay 3601, the back contact and armature 8 of the A0 reading relay 3600, the AD2 conductor, and, assuming that a detailed tape is being processed, then through the armature 3 and front contact of the DET relay 4301, conductor 4305, armature 2 and back contact of the ME relay 5300, the 28X conductor, the front contact and armature 1 of the 28C relay 3903, the front contact and armature 1 of the 28B relay 3901, the CC conductor, to the network controlled by the C digit reading relays (Fig. 37), and, since these relays now express the value 7, out over the CD7 lead, the armature 3 and front contact of the 28B relay 3901, the 287 lead, the armature 8 and front contact of the TTC relay 4101, the SKW conductor, to the winding of the SKW relay 3203 so that this relay now becomes operated. The SKW relay 3203, in turn, extends a connection from ground, armature 9 and front contact of the LK1 relay 3302, the armature 2 and front contact of the SKW relay 3203, to the winding of the SK1 relay 3204. This relay operates and locks through its armature 2 and front contact to its operating ground. Upon the operation of the SK1 relay 3204, a circuit is established from ground, the back contact and armature 6 of the SK2 relay 3202, the front contact and armature 3 of the SK1 relay 3204, the front contact and armature 3 of the SKW relay 3203, to the RSE conductor 5809, through the armature 3 and back contact of the 286R relay 4403, to the RS2 conductor 4405, and thence to the winding of the RS2-4 relay 2105. At the end of the closed period, the SKW relay 3203 releases when the reading relays release and the reader steps to the next line.

17.2 Skipping splice pattern

The next line on the input tape is 081010 which operates the A0 reading relay 3600. This operates the SK2 relay 3202 through the armature 6 and front contact of the SK1 relay 3204. The SK2 relay 3202 locks through its armature 4 and front contact, to the ON2 ground, through the armature 1 and back contact of the ESK relay 3201. The SK2 relay 3202 prevents the RS2-4 relay 2105 from shunting down the RSR relay 1703, holds the 28B and 28C relays 3901 and 3903 and operates the LLA relay 3304 in a circuit from the J7 reader contact (Fig. 13), over the JM5 lead, front contact and armature 7 of the SK2 relay 3202, front contact and armature 4 of the SK1 relay 3204 and over the LL conductor leading directly to the winding of the LLA relay 3304. The SK2 relay 3202 also opens the path over which the RS2-4 relay 2105 was previously operated and connects it in a circuit which may be traced through the front contact and armature 5 of the SK2 relay 3202, the back contact and armature 4 of the SKW relay 3203, conductor 4105, the armature 1 and back contact of the L1 relay 4104, the armature 1 and back contact of the L1UA relay 4103, the armature 1 and back contact of the L1T relay 4105, conductor 1707, the armature 8 and back contact of the AL alarm relay 1700, the SK conductor, through the normal contacts of armature 4 of the ESK relay 3201, to the JM5 conductor, so that this RS2-4 relay 2105 is now connected to respond periodically in each closed period of the reader over the late J7 contact (Fig. 13). With the RS2-4 and the LLA relays 2105 and 3304 both operated, the LK1 relay 3302 releases at the end of the reader closed period, thereby releasing the SK1 relay 3204.

17.3 Skipping second window entry

Window splice pattern is followed by a second skip window entry 287020. Therefore, the appearance of a 2 in the A digit is a signal to stop skipping. The A2 reading relay 3602, through its front contact and armature 14, grounds the ESK conductor 3606 so that a circuit is extended through the front contact and armature 11 of the SK2 relay 3202 to the winding of the ESK relay 3201. This ESK relay 3201 operates and locks through its front contact and armature 2 directly to the ESK conductor and locks through its front contact and armature 3 to the ground supplied at the front contact and armature 12 of the SK2 relay 3202. The reading of the line 287020 operates the SKW relay 3203 as before. The ESK relay 3201 and the SKW relay 3203 both open the operating path for the RS2-4 relay 2105 and the circuit stops skipping. The ESK relay 3201 is also operated by the E2 reading relay (Fig. 38), which operates when these E digit reading relays express the value 2. This provides two normal paths for operating the ESK relay 3201.

In the event of a tape irregularity which prevents the A2 or the E2 relay from operating, the ESK relay 3201 is operated from the E4, E7, F0, F1 or F2 relays (Fig. 38), each of which will ground the ESK lead 3606 so that the appearance of an E digit other than 1 or of an F digit other than 0 operates the ESK relay 3201. The appearance of an A digit of one or of any B digit other than 8 operates the AL relay 1700 to sound the alarm (see section 22). This also opens the operating path for the RS2-4 relay 2105 so that the circuit stops skipping. As a further safeguard against skipping too far, the TM short timer relay 1705 (see section 21.1) is recycled each time the 0 is read by the A digit reading relays (Fig. 36). If the timer is not recycled the alarm relay will be operated in approximately 0.25 second. This covers the time required to skip a splice between tapes where the reading pins may not penetrate the tape. The circuit for recycling the timer is from ground, the front contact and armature 12 of the A0 relay 3600, the ADG conductor, the armature 5 and back contact of the SK1 relay 3204, the armature 8 and front contact of the SK2 relay 3202, the armature 4 and front contact of the RS2-4 relay 2105, the TM conductor, to the timing condenser 1706. The LK1 relay 3302 operates when the code 287020 is read and this operates the SK1 relay 3204 through the front contact and armature 2 of the SKW relay 3203. The SKW relay 3203 releases the SK2 relay 3202 and operates the LLA relay 3304 from ground on the JM5 conductor, the front contact and armature 4 of the ESK relay 3201, the front contact and armature 5 of the SKW relay 3203, the LL conductor, to the winding of the LLA relay 3304. The SK1 relay 3204 locks to the LK1 relay 3302 and reoperates the RS2-4 relay 2105. At the end of this closed period the reading relays, the SKW relay 3203 and the LK1 relay 3302 release and the reader steps to the first line of the next entry.

18. Window splice in output tape

18.1 General

When the supply of paper to a perforator is nearly exhausted, a new length of paper is spliced onto the end of the old section. A window consisting of a rectangular hole straddling the actual physical splice is cut in the tape to provide an indication to the sorter that a splice is approaching. The sorter stops its regular processing and perforates a series of splice pattern lines on the spliced tape and then proceeds. This is done because the perforator cannot perforate through the extra thickness of a splice and the call entries might be lost. A finger on the paper chute leading into the perforator, and here shown schematically as the contact 6214, detects the window and closes a contact to stop the sorter and light to an indicating lamp pointing to the perforator which caused the stoppage. The operator releases the circuit, starts the motor and operates a window splice key, such as key 4911, associated with the perforator. This causes the sorter to perforate a skip window entry 287020 followed by approximately forty lines of splice pattern 081010 followed by a second skip window entry 287020. The machine stops again and the operator restores the window splice key, starts the motor and operates the machine start key. The circuit does not stop upon the receipt of a window signal from the perforator until it has finished a call entry or finished perforating tape identity. If the sorter is perforating splice pattern when the window signal comes in, the two skip window entries 287020 will not be perforated, the affected tape merely having its splice pattern extended by about forty lines to cover the splice. If the machine stops for a window while it is perforating splice at the beginning of the output tapes, the operator may find after the window has been perforated that the other tapes do not have sufficient splice pattern on them. She may then reoperate the end-of-tape key to perforate more splice. At the end of the output tapes, if the window signal occurs during the perforation of tape identity or skip splice entry, the machine waits until these have been perforated before stopping for the window. When the operator operates the machine release key to release the circuit before operating the window splice key, the circuit releases in the same way as when the end-of-tape key is released at this time. If, after the window splice has been perforated, the operator finds no splice pattern or insufficient splice pattern on the output tapes she operates the motor start and end-of-tape key since the circuit has already released as though the run where completed. This causes the circuit to perforate splice pattern without tape identity and the output tapes can be provided with sufficient splice pattern.

18.2 Skip window entries

The WSID relay 4702 determines whether or not the skip window signals 287020 are to be perforated. If the sorter is perforating splice at the beginning of the output tapes when the window signal is received, the TIE relay 3102 is normal. When the WSIB relay 4704 operates it completes a circuit from ground, its armature 1 and front contact, the WSID conductor, the back contact and armature 3 of the TIE relay 3102, conductor WSIDA, to the winding of the WSID relay 4702. The operation of this relay prevents the perforation of the code 287020. If the sorter is perforating tape identity, the skip splice entry, or splice pattern at the end of the output tapes when the window signal is received, the circuit is completely released when the machine release key is operated. In this case the WSID relay 4702 is also operated when the WSIB relay 4704 operates and the 287020 lines are omitted. At other times the WSID relay 4702 will not be operated since the TIE relay 3102 is operated and the code 287020 will be perforated before and after the forty lines of splice pattern.

18.3 Stopping the circuit for window splice

Closure of the window contact such as the contact 6214, establishes a connection from ground, thence over the WS0 lead through the 0 signal lamp 2801 and over, the WSA lead directly to the winding of the WSA relay 5301. The lamp 2801 does not operate with the resistance of the winding of the WSA relay 5301 in series with it and a resistor 2802 placed in parallel with the lamp prevents overlooking a window signal if the lamp is burned out. The operation of the WSA relay 5301 releases the RLM relay 1903 by breaking the continuity of the RLML conductor 5306 at armature 1 and back contact of the WSA relay 5301. The RLM relay 1903, in releasing, opens that part of the locking circuit of the MST relay 1902 extended through the armature 3 and front contact of the RLM relay 1903 to the MON9 ground, leaving the MST relay 1902, locked through the front contact and armature 4 of the ST3A relay 2004 to the same MON9 ground at armature 2 and front contact of the MON relay 2002. At its armature 2 and front contact, the RLM relay 1903 opens the circuit for the ST1 relay 2001 and the ST2 relay 2005, allowing these relays to release. The ST2 relay 2005 opens the operating path and one of the locking paths for the ST3 relay 2000, leaving it locked now only through its front contact and armature 6, armature 1 and back contact of the RLS relay 2006, to the HM5 conductor deriving ground from the reader K1 contact and in parallel with the HM5 conductor through the front contact and armature 4 of the LK1 relay 3302, to the MON7 ground at the front contact and armature 1 of the MON relay 2002. The circuit continues until it has completed an entry, at which time the release of the LK1 relay 3302 releases the ST3 relay 2000 and this in turn releases ST3A relay 2004. The ST3A relay 2004 releases the MST relay 1902 and stops the motor due to the release of the ST3 relay 2000. A ground is now extended over the back contact and armature 8 of the ST3 relay 2000, the N1 conductor, the armature 3 and front contact of the WSA relay 5301, to the AL conductor leading directly to the winding of the AL alarm relay 1700, so that this relay becomes operated and in turn operates the ALA relay 1708. The alarm is sounded and the WSB relay 5302 operates in a circuit from ground, armature 6 and back contact of the ST3 relay 2000, the N1 conductor, the armature 4 and front contact of the WSA relay 5301, the WSBA conductor through the armature 9 and front contact of the AL relay 1700, the WSB, to the winding of the WSB relay 5302. This relay locks through its front contact and armature 4 directly to the ground on the N1 conductor. Through its front contact and armature 3, the WSB relay 5302 shunts down the winding of the WSA relay 5301 and causes the 0 signal lamp 2801 to light. (For a description of the action of the alarm relays see section 22.) The operator now releases the circuit by operating the machine release key 4006 (see section 22). The operation of the WSB relay 5302 renders the machine start key ineffective.

18.4 Starting the circuit

After the motor has been started, the window splice key (locking) 4011 corresponding to the perforator which has encountered the window is operated. This operates the WS relay 5307, which extends a ground from armature 12 and back contact of the ST3A relay 2004, over the N2 conductor, through the armature 2 and front contact of the WS relay 5307, to the windings of the WSIA relay 4701 and the WSIB relay 4704 in parallel. The WSIB relay 4704, through its front contact and armature 13, causes the operation of the ME relay 5300. Through its armatures 2 to 9, inclusive, the WSIB relay 4704 operates the B1, B7, C0, D4, D7, E0, F4 and F7 reading relays (Figs. 36, 37 and 38). If the WSID relay 4702 is normal, then the grounds extended from armatures 10 and 11 of the WSIB relay 4704 will cause the operation of the E2 and C7 reading relays (Figs. 38 and 37) to express the values 87020 in the B to F digits. However, if the WSID relay 4702 is operated, then these grounds will be extended over the armatures 2 and 3 of the WSID relay 4702 to the E1 and C1 reading relays (Figs. 38 and 37), respectively, so that the values 81010 are expressed in the B to F digit reading relays, respectively. When the ME relay 5300, the WSIA relay 4701 and the WSIB relay 4704 have all operated, ground through the H8 reader back contact (Fig. 13), the HB2 conductor 1300, the armature 7 and back contact of the RS2–4 relay 2105, the armature 10 and back contact of the RS1–3 relay 2106, the ST conductor, the back contact and armature 1 of the LK1 relay 3302, conductor 3303, armature 1 and front contact of the ME relay 5300, conductor 5303, armature 11 and front contact of the WSIA relay 4701, the STA conductor 4602, armature 3 and back contact of the ST2 relay 2005, armature 2 and back contact of the RLS relay 2006, armature 2 and front contact of the RLM relay 1903, is extended to the ST1 relay 2001 during an open period of the reader. In the next closed period, when the reader contact H8 opens, the ST2 relay 2005 operates in series with the ST1 relay 2001, followed in turn by the operation of the ST3 and ST3A relays 2000 and 2004 in the following open period. The ST3 relay 2000 removes the ground from the N1 conductor and, therefore, opens the original circuit for the WSB relay 5302. This relay, however, remains locked in a circuit from ground, armature 10 and front contact of the WSIA relay 4701, the armature 1 and front contact of the WS relay 5307, to the winding of the WSB relay 5302. In the reader closed period, following the operation of the ST3 and ST3A relays 2000 and 2004, the A2 reading relay 3602 operates from ground at reader contact K1, the KM1 conductor, the front contact and armature 7 of the RCD relay 2500, the KM1 conductor, armature 4 and back contact of the ESP relay 5304, the front contact and armature 5 of the ME relay 5300, the A2 conductor, the front contact and armature 10 of the ST3 relay 2000, conductor 2011, the armature 10 and back contact of the APB–C relay 5800, conductor 5801, to the winding of the A2 reading relay 3602, and this relay in turn operates the LK1 relay 3302. The reading check path is now closed through the A digit reading relay (Fig. 36), through or around the B digit (Fig. 36) reading relays (depending upon the type of tape), through the armature 2 and front contact of the ME relay 5300, the APA conductor, through the armature 5 and back contact of the APD relay 5804, to the winding of the APA relay 5803. The APA relay 5803 operates and in turn operates the S0B relay 5900, whose circuit for operating the perforator connector relays is open between the CK3A and the CK3 conductors at the back contact and armature 4 of the WSIA relay 4701. The APA relay 5803 connects the APB–C relay 5800 through its armature 5 and front contact to the HB2A conductor, deriving ground from the H8 reader back contact, so that the APB–C relay 5800 operates in the next open period of the reader. The APB–C relay 5800 locks itself over the G11A conductor, the back contact and armature 1 of the LLA relay 3304, to the ground supplied over the front contact and armature 8 of the LK1 relay 3302. The APB–C relay 5800, over its front contact and armature 9, switches the lead which operated the A2 reading relay 3602 so that in the next closed period it operates the A2S relay 5806 instead. The APB–C relay 5800 disconnects the reader step relays (Fig. 21) from the perforator connector relays (Fig. 61) and extends a connection to the SS relay 5802. The operation of the APB–C relay 5800 operates the APD relay 5804 from ground supplied over the front contact and armature 3 of the S0B relay 5900 and the front contact and armature 6 of the APB–C relay 5800. When the APD relay 5804 operates, it releases the APA relay 5803, locks to the ground on the armature 5 and front contact of the APB–C relay 5800 and connects the RSE and RSO leads in parallel over its front contact and armature 2 to the winding of the SS relay 5802.

18.5 Perforating first line of window

At the beginning of the next closed period of the reader, the A2S relay 5806 operates over the above-described path previously used to operate the A2 reading relay 3602. The A2S relay 5806 connects the A2 perforator magnet (Fig. 62) to a reader make contact when the WS2 relay 4700 is not operated and when the WSID relay 4702 is not operated, but connects instead the A0 perforator magnet (Fig. 62) to a reader make contact if the WSID relay 4702 is operated. This circuit is from the PA2 reader contact (Fig. 13), the PA2 conductor, through the armature 3 and front contact of the A2S relay 5806, and thence over the PA conductor, to armature 1 of the WSID relay 4702. With the WS2 relay 4700 not operated, the back contact of armature 1 of the WSID relay 4702 leads to the P2 conductor; whereas, with the WS2 relay 4700 operated, the front contact leads to the P0 conductor. The A2S relay 5806 causes the operation of the FL relay 4705 in a circuit from ground, the front contact and armature 3 of the WS1A relay 4701, the WSG conductor, the armature 4 and front contact of the A2S relay 5806, the WSGA conductor, armature 3 and back contact of the CP1 relay 4706, to the winding of the FL relay 4705. Ground is extended from the reading check lead 4401, over the armature 4 and back contact of the LK2 relay 3300, the conductor 3301, the armature 2 and front contact of the A2S relay 5806, the CK3 conductor, the armature 4 and front contact of the WS1A relay 4701, the C conductor, the right-hand operated contact of the window splice key 4011, and over the P0 conductor to the PA0 perforator connector relay 6100 of the perforator which has displayed the window signal and for which the particular window splice key 4011 was operated. The FL relay 4705 locks to the ground over the front contact and armature 12 of the WS1B relay 4704, the back contact and armature 1 of the CP1 relay 4706, the resistance 4707, the armature 1 and front contact of the FL relay 4705, to the winding thereof. When the PA0 perforator connector relay 6100 operates, eleven magnets on the perforator operate to perforate the line 287020 if the WS1D relay 4702 is normal or the line 081010 if this relay is operated. The corresponding K series relays (Figs. 49, 55 and 61), such as the KA2 relay 4903, operate and the PD0 perforator register relay 5400 also operates. When the J1 (or J5) contact on the reader (Fig. 13) closes, the PAM magnet 6204 is operated through its PK0 series relay 6205. The perforating check lead is closed from ground at a back contact and armature 2 of the PHK relay 6200, conductor 6209, over the left-hand contact networks of the KA2 to KF0 checking relays (Figs. 49, 55 and 61), to the conductor 6101, thence through the one and one only network of the PK relays (Fig. 62), to the conductor 6211, over the chain circuit provided by the contacts of the PD relays of Fig. 54, to either the RSE or RSO conductor (in the case of the PD0 relay through its front contact and armature 2 to the RSE conductor), through the armature 3 and front contact (or armature 2 and front contact) of the APB-C relay 5809, the armature 2 and front contact of the APD relay 5804, to the winding of the SS relay 5802. The SS relay 5802 operates and locks through its armature 4 and front contact to the HBO conductor deriving ground from the H3 reader back contact (Fig. 13). The SS relay 5802, through its armatures 1 and 2, operates the PHE relay 6206 and the PH0 relay 6212. At the end of the reader closed period, the A2S relay 5806, the PA0 perforator connector relay 6100, the perforating magnets (Fig. 62) and their series K relays (Figs. 49, 55 and 61) all release. Since the PHE and PH0 relays 6206 and 6212 are operated, the PAM magnet 6204 and the PK0 relay 6205 release shortly thereafter when the reader contacts open and the perforator steps.

18.6 Perforating subsequent lines of window

In the open period, ground is extended from the reader contact K3 (Fig. 13), over the KB0 conductor, the front contact and armature 8 of the RCD relay 2500, the KB0 conductor, to the front contact and armature 7 of the SS relay 5802, the KB9C conductor, the armature 4 and back contact of the CP1 relay 4706, the armature 2 and front contact of the FL relay 4705, to the winding of the WS2 relay 4709, causing the operation of this latter relay, which locks through its front contact and armature 3 to the ground connection supplied through the resistance 4707. If the WS1D relay 4702 is normal, then the WS2 relay 4709 connects the back contact of armature 1 of the WS1D relay 4702 to the P0 conductor in place of the P2 conductor, causes the operation of the C1 and E1 reading relays and releases the C7 and E2 reading relays (Figs. 37 and 38). If the WS1D relay 4702 is operated, then the operation of the WS2 relay 4709 has no effect. In any case, the WS2 relay operates 4709 the TTM relay 2300 in a circuit from ground at its front contact and armature 8, over the armature 1 and front contact of the WS1A relay 4701, to the TTM conductor to start the long timer. The circuit now perforates a series of splice pattern entries for a long enough time to extend them over the spliced portion of the tape. The operation of the TTM relay 2300 connects ground to the cathode of the tube 2302 through the winding of the CTT relay 2303. At the same time the TTM relay 2300 removes the resistance 2304 from in shunt of the timing condenser 2305. The condenser 2305, connected to the control anode, starts to charge through the resistances 2306, 2307 and 2308 in series. In approximately 2.75 seconds the tube 2302 fires, causing the operation of the CTT relay 2303. This operates the CP1 relay 4706 by closing a circuit from the K2 reader contact (Fig. 13), the KM2 conductor, armature 1 and front contact of the CTT relay 2303, the CP conductor, the front contact and armature 6 of the WS1A relay 4701, to the winding of the CP1 relay 4706. The CP1 relay 4706 unlocks the WS2 relay 4709 and the FL relay 4705 at its armature 1 and back contact, leaving them held now only over the HM2 conductor. The CP1 relay 4706 locks through its front contact and armature 2 to the WSG ground at armature 3 and front contact of the WS1A relay 4701. At the completion of a line of 081010 the WS2 and FL relays 4702 and 4705 release. The WS2 relay 4702 releases the TTM relay 2300, extinguishing the tube 3202. If the WS1D relay 4702 is normal, the WS2 relay 4709 switches back from perforator magnet 0 to perforator magnet 2 (Fig. 62) and from reading relays C1 and E1 to reading relays C7 and E2 (Figs. 37 and 38), preparing the circuit to perforate the line 287020. If the WS1D relay 4702 is operated, a circuit is still arranged to perforate the splice code 081010.

18.7 Perforating last line of window

In the next reader closed period a circuit is established from ground, the front contact and armature 3 of the WS1A relay 4701, the WSG conductor, the armature 4 and front contact of the A2S relay 5806, the WSGA conductor, the armature 3 and front contact of the CP1 relay 4706, the back contact and armature 3 of the FL relay 4705, to the winding of the CP2 relay 5308. This relay operates and locks through its armature 1 and front contact to the ground supplied over the front contact and armature 12 of the WS1B relay 4704. The circuit perforates either a second line of the code 287020 or another line of the code 081010 depending upon whether the WS1D relay 4702 is normal or operated. When the SS relay 5802 operates it closes a circuit from the KB0 conductor, through the front contact and armature 7 of the SS relay 5802, the KB9C conductor, through the front contact and armature 2 of the CP2 relay 5308, to the winding of the ESP conductor 5304, which thereupon operates and locks over its armature 2 and front contact to the ground on the ON2 conductor. The ESP relay 5304, in operating, opens the path for the A2S relay 5806 and, through its armature 1 and front contact, grounds the conductor b leading to the perforation complete lamp shown in Fig. 28. With the A2S relay 5806 prevented from operating the circuit cannot continue, whereupon it times out and brings in the alarm.

18.8 Release of circuit after window splice

The operator now releases the window splice key 4011, thus releasing the WS relay 5307, whereupon a circuit is established from ground, armature 3 and front contact of the ESP relay 5304, through armature 3 and back contact of the WS relay 5307, to the RLS conductor leading to the winding of the RLS relay 2006, which operates and locks through its front contact and armature 3 to the RLSL conductor which is grounded through the front contact and armature 3 of the RCD relay 2500. Upon the operation of the RLS relay 2006, the start relays, including the ST1, ST2, ST3 and ST3A relays (Fig. 20), are released. The release of the ST1 and ST3 relays 2001 and 2000 opens the circuit for the RCD relay 2500, the WS1A relay 4701, the WS1B relay 4704 and the WSB relay 5302. The WS1B relay 4704 releases the ME relay 5300. The ST3A relay 2004, in releasing, releases the ESP and LK1 relays 5304 and 3302. The CP1 relay 4706 is released by the WS1A relay 4701 and the CP2 relay 5308 is released by the WS1B relay 4704. The RLS relay 2006 is released when the RCD relay 2500 returns to normal. The circuit is now ready to continue with its regular processing as soon as the motor start and machine start keys 400 and 4004 are operated.

19. Regular release
19.1 Registering release signal

The machine release key 4006 (non-locking) may be operated at any time if it is desired to stop the circuit during a run. The key 4006 releases the RLM relay 1903, which in turn releases the ST1 and ST2 relays 2001 and 2005. The release of the ST2 relay 2005 removes one locking path for the ST3 relay 2000, leaving this relay locked to a reader make contact, a front contact of the LK1 relay 3302 or a front contact of the ME relay 5300, if either of these relays is operated.

19.2 Awaiting stopping point

The circuit continues until a proper stopping point is reached:

a. If skipping regular splice on input tape, the ST3 relay 2000 releases at the end of the first reader closed period following the release of the ST2 relay 2005.

b. If checking tape identity at the start of the first input tape in a run, the ST3 relay 2000 will not release until all the tape identity entries have been checked and all the tape identity entries have been perforated on the output tapes. The ST3 relay 2000 is held first by the LK1 relay 3302 and then by the ME relay 5300 in this case.

c. If checking any other tape identity, the ST3 relay 2000 will not release until all these entries have been checked, after which the LK1 relay 3302 releases.

d. If perforating splice either at the beginning or end of output tapes or perforating window splice, the ST3 relay 2000 will not release until this perforating has been finished and the ME relay 5300 has been released.

e. If perforating tape identity, the ST3 relay 2000 will not release until all such entries have been perforated on the output tapes, at which time the ME relay 5300 releases.

f. If perforating regular entries, the ST3 relay 2000 will not release until the end of an entry when the LK1 relay 3302 releases.

g. If skipping window splice, the ST3 relay 2000 is held through the TIC relay 4101 and the SK2 relay 3202, both operated, and does not release until the complete splice pattern and the window entry following it have been skipped, at which time the release of the SK2 relay 3202 allows the ST3 relay 2000 to release.

19.3 Stopping the circuit and releasing

The release of the ST3 relay 2000 opens the circuit of the A digit reading relays (Fig. 36), preventing further reading of the input tapes. The ST3 and ST3A relays 2000 and 2004 release all relays in the circuit except those held by the MON master off-normal relay 2002. The ST3A relay 2004 releases the MST motor start relay 1902, which releases the MOT motor relay 1209 in the alternating current power and distributing circuit. The release of this MOT relay 1209 stops the reader motor. The release of the MST relay 1902 removes battery from the STEP step magnet 1207 and opens the operating circuit for the MON relay 2002. The following relays remain operated:

MON–2002
RSR–1703
MUS, MUAS, MU, DET or OBS (Fig. 43)
OFBA, FTHA, UA, TA, HATHA or STHA (HATHA remains up if STHA is up) (Fig. 34)

Some of the following relays may also remain operated:

TIE and TIEA, if tape identity has been perforated at start (Fig. 31)
TIC, if prepared to handle call entries (Fig. 41)
SPA, if splice was perforated initially (Fig. 20)
I1B–3000
I2B–2900
I3B–3005
I7B–2902
I8B and I8C (Fig. 30)
XI1B–2901
FT2–2201
LTD–2202

20. Starting after regular release
20.1 Starting motor

In order to start the circuit after a regular release, the MST motor start relay 1902 must be operated. It operates the RLM relay 1903, which locks to a circuit from ground, armature 2 and front contact of the MON relay 2002, the MON9 conductor, the right-hand contacts of the machine release key 4006, conductor 4007, the back contact and armature 1 of the WSA relay 5301, the conductor 5306, and over the armature 1 and front contact of the RLM relay 1903 to the winding thereof. The motor start key 4000 also places a ground on the MSTA conductor 4001 which is extended over armature 1 and back contact of the MRL relay 1900, the EM conductor 1901, the contacts of the emergency motor stop key 4002, the MSTA conductor 4003, the back contact and armature 2 of the AL relay 1703, and over the MST conductor 1702 directly to the winding of the MST relay 1902. The MST relay 1902 operates and locks in a circuit from ground, over armature 2 and front contact of the MON relay 2002, the MON9 conductor, through the front contact and armature 3 of the RLM relay 1903, the front contact and armature 4 of the MST relay 1902, the armature 1 of the MRL relay 1900 and thence over that portion of the operating circuit for the MST relay 1902 just previously described. The MST relay 1902 connects battery to the step magnet 1207 and operates the MOT motor relay 1209, in the alternating current power and distributing circuit, to start the motor 1204.

20.2 Starting circuit

The machine start key 4004 is next operated and this will establish a circuit from ground over the H8 reader contact (Fig. 13), an armature and contact of the RO connector relay 1201, the HB2 conductor 1300, the armature 7 and back contact of the RS2-4 relay 2105, the armature 10 and back contact of the RS1-3 relay 2106, the ST conductor, the armature 1 and back contact of the LK1 relay 3302, the ST conductor 3303, the machine start key 4004, the STD conductor 4012, the armature 1 and back contact of the WSB relay 5302, the STC conductor 5305, the armature 1 and front contact of the SPA relay 2008, STA conductor 4602, the armature 3 and back contact of the ST2 relay 2005, the armature 2 and back contact of the RLS relay 2006, and over the armature 2 and front contact of the RLM relay 1903 to the winding of the ST1 relay 2001. This causes the operation of the ST1 relay 2001 and when the reader back contact opens, then the ST2 relay 2005 will operate in series therewith and hold both of these relays operated. The machine start key 4004 is effective only under the following conditions:

a. The RS2-4 and RS1-3 reader step relays 2105 and 2106 are normal.
  b. The LK1 relay 3302 is normal.
  c. The WSB relay 3302 is normal.
  d. The SPA relay 2008 is operated, indicating that splice has been perforated at the start of all output tapes.
  e. The RLS relay 2006 is normal. (This contact is used for releasing the start relays, not to indicate a circuit condition where the key should be ineffective.)
  f. The RLM relay 1903 is operated, indicating that the motor has been started.

During the first reader open period after the operation of the ST2 relay 2005, the ST3 relay 2000 operates in turn operating the ST3A relay 2004. The circuit then proceeds as described hereinbefore. If the circuit stopped while skipping splice, then the STT relay 3200 operates and the circuit starts as it does at the beginning of a run.

20.3 Stopping motor when circuit is not running

If the motor has been started but the machine start key 4004 has not been operated, the operation of the machine release key 4006 stops the motor. The key 4006 releases the RLM relay 1903, which in turn releases the MST relay 1902. The release of the MST relay 1902 releases the MOT motor relay 1209 in the alternating-current power and distributing circuit. The circuit is released as described in section 16.6, except for the MON relay 2002 and those relays under its control.

21. Timing circuits

21.1 Short timer

The short timer consists of a polarized relay, the TM relay 1705, which has two windings. The primary winding tends to operate the relay and is energized when either the ST3A or the ALCO relay 2004 or 1709 is operated. By way of example, when the ALCO relay 1709 is operated a circuit from battery through the front contact and armature 3 thereof is extended to ground through the lower or primary winding of the TM relay 1705. The secondary or upper winding, when energized, overpowers the primary winding and keeps the relay from operating. Its battery is also supplied from the ST3A or the ALCO relay 2004 or 1709 and its ground is supplied from a number of points in the circuit. When this ground is removed, current continues to flow in the secondary winding to charge the condenser 1706 connected to it. After approximately 0.25 second, this current decreases to such a point that the primary winding is stronger than the secondary winding and the TM relay 1705 operates, thereby connecting ground from the MON4 conductor, through the front contact and armature of the TM relay 1705, to the winding of the AL relay 1709, so that the alarm relay becomes operated. As long as the circuit is operating properly the TM relay 1705 timing circuit is recycled sufficiently often, by grounding the TM conductor, to prevent the operation of the TM relay 1705. Recycling occurs under the following conditions:

a. Whenever the perforate line key 4012 is operated to perforate a mutilated line. This releases the alarm and the ground from the ALCO relay 1709 recycles the timer.
  b. When the circuit is released after it has stopped at the completion of perforating a window splice. Ground from the ALCO relay 1709 recycles the timer.
  c. When the circuit releases after perforating splice on the output tapes at the beginning of a run. Ground through the ALCO relay 1709 recycles the timer.
  d. When the circuit releases after perforating tape identity and splice pattern at the end of a run. Ground through the ALCO relay 1709 recycles the timer.
  e. After perforating each line, except on perforator 9 (see (f) below), when spreading splice or tape identity on the output tapes. Ground from the SS relay 5802 (front contact and armature 3 thereof) recycles the timer.
  f. After perforating each line on perforator 9 when spreading splice or tape identity on output tape No. 9. Ground from the RS1-3 relay 2106 (armature 7 and front contact thereof) recycles the timer.
  g. After perforating each line of window splice. Ground from the SS relay 5802 recycles the timer.
  h. Each time the reader steps. Ground from either of the RS1-3 or RS2-4 reader step relays 2106 or 2105 recycles the timer.
  i. Following the check of first and last thousands. At this time the TD selector, Fig. 35, may be stepped and several extra reader cycles may be required. Ground from the CL6 relay 4204 prevents the timer from operating.
  j. When the circuit releases, the release of the ST3 relay 2000 grounds the TM conductor and thus grounds the timing condenser 1706. The release of both the ST3A relay 2004 and the ALCO relay 1709 disconnects battery from the TM relay 1705. The battery supplied through the ALCO relay 1709 is used to release the TM relay 1705 whenever the ALCO relay 1709 operates, since the TM relay 1705 is not equipped with a biasing spring.

21.2 Long timer

The long timer consists of a cold cathode tube 2302 and an associated resistance condenser network. It is started by the operation of the TTM relay 2300, which connects ground to the cathode through the winding of the CTT relay 2303 and removes a shunt (resistance 2304) from about the timing condenser 2305. With the control anode connected to the positive voltage supply and the shunt removed, the condenser 2305 starts to charge through the resistances 2306, 2307 and 2308. Arrangements are provided for short-circuiting one or more of these resistances to change the timing period. When the potential of the control anode reaches the firing voltage the tube fires, operating the CTT relay 2303. The long timer is used under the following conditions:

*a.* While perforating window splice. Ground from the front contact and armature 8 of the WS2 relay 4700, through armature 1 and front contact of the WSIA relay 4701 grounds the TTM conductor and thereby operates the TTM relay 2300. Through armature 7 and front contact of the WSIA relay 4701, the R1 and R2 conductors are connected together so that the resistance 2308 is short-circuited. The condenser charges through the two remaining resistances 2306 and 2307 and the tube fires after 2.8 seconds (nominal).

*b.* Following the check of first and last thousands. Ground from the CL6 relay 4204 operates the TTM relay 2300. The condenser 2305 charges through all three resistances and the tube 2302 fires after 9.2 seconds (nominal). The short timer is prevented from operating at this time (see section 21.11).

*c.* While spreading nine lines of tape identity at the beginning or the end of a run. Ground is extended over armature 10 and back contact of the WSIA relay 4701, through armature 6 and front contact of the ME relay 5300, and over the armature 6 and front contact of the APD relay 5804 to the TTM conductor 5807 to operate the TTM relay 2300. The TTM relay 2300 locks through its front contact and armature 2, over the TTML conductor, the back contact and armature 3 of the WSP relay 1906, the WL conductor, to ground at armature 3 and front contact of the TIS relay 3101. The condenser 2305 charges through the three resistances 2306, 2307 and 2308 and the tube 2302 fires after 9.2 seconds (nominal).

*d.* While spreading the code 081010 under control of the tape end key 4008 or while spreading the code 2360XX at the end of a run. Ground from the WSIA relay 4701 through the ME and APD relays 5300 and 5804 operates the TTM relay 2300. A make contact on the armature 5 of the WSP relay 1906 connects the conductors R2 and R3 together, whereby the two resistances 2307 and 2308 are short-circuited so that the condenser charges through the resistance 2306 alone. The tube fires after 2.1 seconds (nominal).

When the CTT relay 2303 operates, ground from the reader contact K2 (Fig. 13), over the KM2 conductor, armature 1 and front contact of the CTT relay 2303, the CP conductor, armature 9 and back contact of the WSIA relay 4701 extends to the AL conductor to operate the AL alarm relay 1700. When the CTT relay 2303 operates during the perforation of window splice, the WSIA relay 4701 is operated and the previously traced path to the AL alarm relay 1700 is open. However, the CP conductor is then extended over the front contact and armature 6 of the WSIA relay 4701 to the winding of the CP1 relay 4706, so that this relay is operated instead as described in section 18.6.

21.3 Automatic operation timer

A timer shown in Fig. 44, and hereinbefore described, is employed for the purpose of perforating a sufficient number of splice pattern codes on each of the tapes in the perforator reader combinations. When the SST relay 4414 is operated, the EST relay 4415 is connected to the cathode of the tube 4416, with the control anode thereof connected to the positive voltage supply. Normally, the charging condenser 4418 is shunted by a resistance 4417; but, upon the operation of the SST relay 4414, this condenser is placed in a circuit to charge through the resistance 4422 and, therefore, during this charging to lower the potential on the control anode of the tube. When the condenser 4418 becomes charged, then the potential on the anode becomes sufficiently high to allow the tube 4416 to fire. Thereupon, the EST relay 4415 will operate.

22. Alarm

22.1 Operation of alarm relays

The AL alarm relay 1700, which operates the ALA auxiliary alarm relay 1708, is operated under the following conditions:

*a.* When the TM relay 1705 of the short timer circuit operates while the MON master off-normal relay 2202 is operated.

*b.* When a fuse blows resulting in the operation of the FAL fuse alarm relay 1710.

*c.* When the RSH relay 1711 operates. This is the reader step relay release check described hereinafter in section 26.

*d.* When the WSA relay 5301 operates and the ST3 relay 2000 releases. This is the condition when the circuit stops because a perforator has received a window signal (see section 18.3).

*e.* When the RSF relay 1712 operates while the MON relay 2002 is operated and the ALCO relay 1709 is normal. This is the reader step check circuit described hereinafter in section 25.

*f.* When the CTT relay 2303 operates with the WSIA relay 4701 normal. This is the long timer alarm (see section 21.2).

22.2 Functions of alarm relays

The alarm relays perform the following functions:

*a.* Light alarm pilot lamp, Fig. 28.

*b.* Light the machine pilot lamp, Fig. 28.

*c.* Light the general alarm lamp, Fig. 28, if the RSF relay 1712 and the FAL relay 1710 are normal, i. e., if the alarm is caused by something other than blown fuse or reader step failure.

*d.* Ground a lead to the external alarm circuit 1713.

*e.* Provide a ground to hold the EAC relay 1714.

*f.* Release the MST relay 1902 to stop the motor.

*g.* Permit the operation of the DS relay 2802 and permit the PLA-D relay 1600 under control of the maintenance key 4013 for lighting the maintenance lamps.

*h.* Permit the effective operation of the perforate line key 4012 for perforating a mutilated line.

*i.* Open the reading check lead to prevent further circuit progress. Operation of the PLA-D relay 1600 when the maintenance lamps are lit recloses this lead.

j. Operate the WSB relay 5302 if the WSA relay 5301 is operated (see section 18.3).

k. Operate the TDA relay 2205 if the reader lamps key 4014 is operated to supply ground for the tape section lamps, Fig. 16.

l. Connect the RLS relay 2006 to the machine release key 4006 for releasing the circuit after alarm.

m. Release the RS2-4 relay 2105 if the circuit is skipping splice to prevent a reader step failure and to prevent the reader step hold lamps, Fig. 28, from lighting under this condition.

The AL relay 1700 locks over the back contact and armature 2 of the ALCO relay 1709 to the MON4 conductor. When a window signal is received from a perforator while the end of tape key 4008 is operated, the WSB relay 5302 operates, in turn operating the ALCO relay 1709. In order to prevent this from releasing the AL alarm relay 1700, an auxiliary locking path for the AL relay 1709 is provided from the back contact and armature 8 of the ST3 relay 2000, the N1 conductor, the armature 5 and front contact of the WSB relay 5302, the WSB0 conductor, through the outer left-hand contacts of the end-of-tape key 4008, and thence over the ALG conductor to the front contact and armature 4 of the alarm relay 1700.

22.3 Alarm cut-off

The operator may silence the external alarm by operating the alarm cut-off key 4015. This places a ground on the EAC conductor leading directly to the winding of the EAC alarm cut-off relay 1714. This relay, in operating, locks through its armature 1 and front contact to the ground supplied by the AL alarm relay 1700 or by the fuse alarm relay 1710. At its armature 2 and back contact it cuts off the external alarm 1713 and at its armature 3 and back contact opens the circuit of the machine pilot lamp, Fig. 28. When the sorter circuit is released, the EAC relay 1714 releases, reclosing the lead to the external alarm 1713 for subsequent use.

22.4 Releasing after alarm

After the completion of perforating window splice when the alarm comes in, the release of the window splice key 4011 restores the circuit and releases the AL alarm relay 1700 and it is not necessary to operate the machine release key 4006. After all other alarms, the circuit must be restored by operating this key 4006, the operation of which is described in section 18. With the AL alarm relay 1700 operated however, the RLS relay 2006 operates, releasing the ST3 relay 2000 and the ST3A relay 2004 immediately regardless of the position of the circuit. The RLS release relay 2006 also operates the ALCO relay 1709 through armature 4 and front contact of the RLS relay 2006, and the ALCO relay 1709 in turn releases the AL alarm relay 1700 and operates the polarized TM relay 1705 to its normal or off position. The rest of the circuit releases as described in section 18.3, except that in this case the MST relay 1902 has already been released by the AL relay 1700.

22.5 Alarm relay fuse blows

The circuit is provided with a number of fuses of a conventional nature wherein the fuse 1717 is attached to a spring 1715 so that when the fuse 1717 blows this spring will move into contact with the bus bar 1716, which will thereupon connect battery to the FAL fuse alarm relay 1710. Through its armature 2 and front contact, this FAL relay 1710 directly grounds the AL alarm relay 1700 and, through its armature 4 and front contact, extends a ground over the armature 3 and back contact of the EAC relay 1714 and over the MP conductor to the machine pilot lamp in Fig. 28.

23. Master release

The master release key 4005 is provided for releasing the entire circuit including all memory relays. In order to prevent accidental operation of this key from interfering with circuit operation both the machine release and master release keys 4006 and 4005 must be operated simultaneously. When this is done, the RLM relay 1903 and the MON relay 2002 are both released. The MST relay 1902 releases and stops the motor 1204. All relays in the circuit now release and only the tape section selector, Fig. 35, is left off normal.

24. Tape section reset and release

The tape section reset key 4017 is provided to permit advancing the tape section selector (Fig. 35) in case one or more tapes in a series is not processed. It is effective only with the reader lamps key 4014 operated and either the ALA relay 1708 operated or the MON relay 2002 operated. With the ST2 relay 2005 normal, the reader lamps key 4014 operates the RLA, B, C, TDD relay 1602 to indicate the position of the selector by means of the tape section lamps and this operates the TDA relay 2205 to supply ground for the lamps. If under this condition the tape section reset key 4017 is operated, then a ground from armature 4 and front contact of the TDA relay 2205 is extended over the TDA conductor, through the contacts of the tape section reset key 4017, to the ROT conductor leading to the winding of the ROT rotary magnet 3501 of the selector, Fig. 35, stepping it one position for each operation of the key. The key also extends this ground to the FT2 conductor leading directly to the winding of the FT2 relay 2201 to cause the operation of this relay if it is not already operated. Under the same conditions described above, the tape section release key 4016 may be used to restore the selector to normal. It grounds the RLS magnet 3500 (as long as the off-normal springs 3510 are closed) to place a ground on the SON conductor. The ALA relay 1708 opens the path to the ROT rotary magnet 3501 so that it cannot prevent the release of the selector.

25. Reader step check

25.1 Alternate line contacts

The reader is equipped with two contacts G1 and G2 (Fig. 12) which operate in phase with the reading contacts. Each of these contacts is equipped with a reading pin for engaging holes in the reader drum. The holes are arranged so that the G1 contact is closed on every second line of the drum and the G2 contact is closed on the alternate lines. By means of these contacts the circuit checks that the reader steps one line whenever it is supposed to and does not step at any other time.

25.2 G1 contact is closed initially

Assume that the G1 contact is closed at the start of circuit operation. Ground is supplied to the CK reading check lead 2102 from contact G1, over conductor 1202 and through the armature and back contact of the RKA relay 2100. When the first reader step occurs, ground is extended from the reader back contact K3 (Fig. 13), over the KB0 conductor, the front contact and armature 3 of the RCD relay 2500, the KB0 conductor, armature 1 and back contact of the MTIA relay 3107, the armature 1 and back contact of the TIS relay 3101, the KB0B conductor, the back contact and armature 1 of the PTI relay 4605, conductor 4610, and thence through either armature 2 and front contact of the RS2-4 relay 2105 or armature 4 and front contact of the RS1-3 relay 2106, the armature and back contact of the RZ2 relay 2108, to the winding of the RW relay 2109, whereupon this RW relay 2109 operates. The RW relay 2109, in operating, extends ground from the front contact and armature 5 of the ST1 relay 2001, or alternatively the front contact and armature 5 of the ST3 relay 2000 over the STG conductor, through the armature 1 and back contact of the RZ3 relay 2110, the armature and front contact of the RW relay 2109, to the windings of the RKA relay 2100 and the RKB relay 2101 in parallel to operate these two relays. These relays switch the normal connection between conductor 1202 and the CK lead 2102 to a connection between the conductor 2103 and the CK lead 2102, whereby the CK lead 2102 is disconnected from the G1 contact and is connected instead to the G2 contact. At the end of the open period during which the reader steps, the RZ1 relay 2111 operates in series with the RW relay 2109, maintaining this latter relay operated. The RZ1 relay 2111 operates the RZ2 relay 2108. For the next reader step the ground from reader contact K3 which is extended to the armature of the RZ2 relay 2108 causes the operation of the RZ3 relay 2110. The RZ3 relay 2110 releases the RKA relay 2100 and the RKB relay 2101, the RZ1 relay 2111 and the RW relay 2109. At the end of the open period the RZ3 relay 2110 releases and this in turn switches the STG ground away from the winding of the RZ2 relay 2108 and this releases. The CK reading check lead 2102 is now connected to the contact G1 again and the circuit is ready for another cycle of operations.

25.3 G2 contact is closed initially

If the G2 contact is closed when the circuit is started, ground from this contact, through the armature 3 and back contact of the ST3 relay 2000, armature 2 and front contact of the ST1 relay 2001, the RA conductor, the armature and back contact of the RZ2 relay 2108, to the winding of the RW relay 2109 operates this relay while the circuit is starting. When the ST3 relay 2000 operates this lead is broken and the RZ1 relay 2111 operates in series with the RW relay 2109. The RW relay 2109 operates the RKA relay 2100, the RKB relay 2101 and the RZ1 relay 2111, which in turn operates the RZ2 relay 2108. The CK reading check lead 2102 is then thus connected to the G2 contact and the circuit can proceed as described above.

25.4 Reader step failure

If the reader steps falsely or fails to step, the RKA and RKB relays 2100 and 2101 get out of synchronism with the G1 and G2 contacts. The CK reading check lead 2102 is not closed and the circuit blocks. The ground from G1 or G2 is connected through the front contact of the RKA relay 2100 or the back contact of the RKB relay 2101, over the armature 1 and back contact of the CRK relay 2104, the RSF lead, the armature 11 and front contact of the ST3A relay 2004, the RSF conductor, to the armature 1 and back contact of the RSH relay 1711, to the winding of the RSF relay 1712. The RSF relay 1712 causes the operation of the AL relay 1700 and locks through its front contact and armature 3 and the back contact and armature 2 of the ALCO relay 1709 to the ground on the MON4 conductor. Through its armature 1 and front contact it lights the reader step failure lamp, in Fig. 28, at its armature 5 it opens the lead to the general alarm lamp (Fig. 28) and at its armature 4 it opens the circuit to the STEP step magnet 1207 of the reader to prevent any further stepping. When the circuit is released, the operation of the ALCO relay 1709, in addition to releasing the AL alarm relay 1700, also releases the RSF relay 1712.

25.5 Prevention of RSF alarm when end-of-tape key is operated

It is often convenient to use the tape feed key 1205 on the reader to insert a tape in the reader while the circuit is perforating splice at the start of a run and to use it to remove a tape from the reader while the circuit is perforating tape identity and splice at the end of a run. Since the RS1-3 and RS2-4 reader step relays 2106 and 2105 do not operate from the tape feed key 1205, the CRK relay 2104 is provided to prevent the reader step check circuit from opening the reader check path and bringing in an alarm. The CRK relay 2104 operates from ground over the armature 1 and front contact of the TE relay 4601 when perforating splice at the start of a run and tape identity and splice at the end. The operation of the CRK relay 2104 ties the G1 and G2 reader contacts together to keep the reading check path closed and opens the operating circuit to the RSF relay 1712 to prevent bringing in the alarm.

26. The reader step relay release check

Since the short timer (the TM relay 1705) is recycled by the operation of the reader step relays, it cannot be used to detect a circuit blocking condition in which these relays remain operated. If these relays do remain operated the input tape is passed through the reader and entries are lost. A check circuit is, therefore, provided to guard against this condition. The RSR relay 1703 is operated from a ground on armature 7 and front contact of the MON relay 2002 so long as the circuit is off normal. The RSR relay 1703 is shunted by the operation of either of the RS1-3 or RS2-4 reader step relays 2106 or 2105, that is, by ground from the ON4 off-normal lead, through armature 4 and back contact of the PM1 relay 2301, over the PM1N conductor, and thence either through armature 3 and front contact of the RS1-3 relay 2106 to the RSR conductor or through armature 1 and front contact of the RS2-4 relay 2105 and the armature 3 and back contact of the SK2 relay 3202 to the RSR conductor, to the battery side of the RSR relay 1703. Since the RSR relay is slow to release it does not release when shunted by either of these reader step relays unless they remain operated longer than the time necessary for one reader step. If the RSR relay 1703 releases, then ground over the ON5 conductor is connected to the RSH relay 1711, which operates and locks through its front contact and armature 2 to the PM1N lead connected through the back contact and armature 4 of the PM1 relay 2301 to the ON4 conductor. The RSH relay 1711 operates the AL alarm relay 1700 bringing in an alarm and blocking the circuit. A back contact and armature 1 of the RSH relay 1711 prevents the operation of the RSF relay 1712 and ground on armature 3 and front contact of the RSH relay 1711 lights the reader step hold lamp in Fig. 28. The ground from the RS2-4 reader step relay 2105 is opened by the SK2 relay 3202 to prevent the RSR relay 1703 from being shunted down while the circuit is skipping splice on the input tape. The ground from the RS2-4 relay 2105 is opened by the PM1 relay 2301 to prevent the RSR relay 1703 from being shunted down when the perforate line key is operated. Since the motor 1204 is started at this time, the RS1-3 and RS2-4 reader step relays 2106 and 2105 may be operated longer than normal because of the slow speed of the reader.

*27. Manual reader step*

The reader step key 4020 is provided for stepping the reader one line at a time. It is effective only if the ST1 relay 2001 is not operated, to prevent interference with the circuit operation. The reader lamps key 4014 must also be operated. When the reader step 4020 is operated, ground from reader make contact K2, over the KM2 conductor, the armature 1 and back contact of the ST1 relay 2001 and over the SR conductor is extended by the inner right armature of the RLA, B, C, TDD relay 1602, the left-hand contacts of the reader step key 4020, the SR2 conductor, back contact and armature 2 of the SR relay 2112, conductor 5808, the armature 2 and back contact of the 286R relay 4403 and the RS1 conductor 4404 to the winding of the RS1-3 relay 2106, which operates and steps the reader. In the reader open period the RS1-3 relay 2106 remains locked and ground is extended from the reader back contact H8 (Fig. 13), over the HB2 conductor, back contact and armature 3 of the ST1 relay 2001, front contact and armature 2 of the RS1-3 relay 2106, the SR1 conductor, through the right-hand contacts of the reader step key 4010 and over the SR0 conductor to the winding of the SR relay 2112. The SR relay 2112 operates and locks to the operated reader step key 4020 through its armature 1 and front contact and opens the operating path for the RS1-3 relay 2106, which releases at the end of the open period. The SR relay 2112 remains operated until the reader step key 4020 is released. Thus, the reader takes only one step for each key operation regardless of the length of time the key is held operated.

*28. Perforating mutilated line*

If the circuit blocks because of a mutilated line on the input tape which does not pass the two-out-of-five check, the operator determines by the lamps whether it is an initial line or a call entry or a supplementary line. If it is an initial line, nothing of the entry will have been perforated and the operator discards the entries by operating the machine release key 4006, starting the motor 1204 with the motor start key 4009 and then stepping the circuit ahead with the reader step key 4020 until it is on the initial line of the next entry. If it is a supplementary line, however, part of the entry is already perforated and the operator causes the circuit to perforate the remainder of the entry as read by operating the perforate line key 4012. It is not necessary to operate the machine release key 4006 or any other key. The perforate line key 4012 is effective only if the circuit has blocked on a supplementary line with the ALA relay 1708 and the LK2 relay 3300 operated. Then, operation of the perforate line key 4012 connects ground from the reader make contact K2, over the KM2 conductor, the front contact and armature 3 of the ALA relay 1708, the KM2A conductor, the armature 8 and front contact of the LK2 relay 3300, the PML conductor, the left-hand contacts of the perforate line key 4012, the Y conductor and through the armature 1 and back contact of the PM2 relay 2309 to the winding of the PM1 relay 2301. The PM1 relay 2301 operates and locks through its front contact and armature 3 to the KM2 conductor, deriving ground from the K2 reader contact. The PM1 relay 2301, through its front contact and armature 6, places ground on the MSTA conductor to operate the MST relay 1902, to start the motor 1204. The PM1 relay 2301 also operates the ALCO relay 1709 to release the AL alarm relay 1700, closes the reading check path around the reading relays so that the failure of the two-out-of-five check no longer prevents progress, opens the ground to the RSR relay 1703 so that it will not be shunted down, opens the locking path for the RSH relay 1711 so as to release this relay and operates the PM2 relay 2309. The PM2 relay 2309 locks through its front contact and armature 2 over the X conductor and through the right-hand contact of the perforate line key 4012 to the ground supplied thereat. The PM2 relay 2309 also opens the operating circuit for the PM1 relay 2301 and applies ground over its armature 3 and front contact, to the perforating check lead 6101 to permit progress despite failure of the two-out-of-five check of the perforator circuits. The PM1 relay 2301 releases at the end of the closed period and opens the reading and perforating check leads. The PM2 relay 2309 remains held to the perforate line key 2301 and prevents the PM1 relay from reoperating. If the next line of the input tape passes the two-out-of-five check, the circuit proceeds.

*29. Mutilated tape identity*

*29.1 Mutilated tape identity at start of first tape*

If any of the tape identity information at the start of the first input tape of a run is mutilated, the circuit blocks. The operator releases the circuit, starts the motor and then steps the reader forward one line at a time with the reader step key 4020, recording the information on each line as read on the lamps and stopping when the lamps indicate that the reader is on the first line following tape identity. The tape identity key 4018 is then operated, operating the MT1 relay 3104 and the 28C relay 3903. Ground at the back contact and armature 8 of the ST3 relay 2000 is extended over the front contact and armature 3 of the SPA relay 2008, the MT1 conductor, the left-hand contacts of the tape identity key 4018, the TIEA conductor, and over the armature 1 and back contact of the TIEA relay 3100 to the winding of the MT1 relay 3104. This ground is also extended from the back contact of armature 1 of the TIEA relay 3100, over the MT1a conductor and over the right-hand contacts of the tape identity key 4018 to the winding of the 28C relay 3903. The MT1 relay 3104, through its front contact and armature 5, places a ground on the TDS conductor to operate the TDS relay 2209 and, through its armature 4 and front contact, connects the ground on the armature 12 and back contact of the ST3A relay 2004 over the N2 conductor to operate the TIS relay 3101. At its armature 1 and back contact, the MTI relay 3104 opens the circuit of the 28B relay 3901. The 28C relay 3903, in operating, extends the ground on the ON1 conductor over its front contact and armature 4 to the winding of the PAC relay 3902, which thereupon becomes operated. When the TIS relay 3101 operates, it operates the ME relay 5300, shunts the battery at the TI relay 2800 to keep it from operating, operates the B1 and B7 reading relays (Fig. 36) and locks the 28C relay 3903 and the MTI relay 3104 in parallel. The operator then operates the machine start key 4004 which starts the circuit. When the ST3A relay 2004 operates, it operates the MTIA relay 3107 by placing ground from its armature 6 and front contact on the ON1 conductor, which is then extended through armature 2 and front contact of the MTI relay 3104 to the winding of the MTIA relay 3107. At its armature 3 and back contact, the MTIA relay 3107 opens the lead to the STEP step magnet 1207 of the reader and, at its armature 1 and back contact, opens the lead from the reader contact K3 which is used to advance the reader step check circuit to prevent this circuit from getting out of synchronism with the reader when the reader step relays (Fig. 21) operate. The circuit proceeds to perforate the nine tape identity entries on all the output tapes in the usual manner. The TDS relay 2206 enables the operation of the tape section selector, Fig. 35, if required. The tape identity information at the end of this tape will then set up the selector, if necessary. The TIE relay 3102, the TIEA relay 3100 and the TIC relay 4101 are operated at the completion of tape identity perforation and the MTI relay 3104 releases when the 28C relay 3903 releases. When the reader step relay (Fig. 21) operates after the last tape identity entry has been perforated on perforator 9, ground from the reader step relay locks the MTIA relay 3107 over the RSG conductor from the armature 15 and front contact of the RS1-3 relay 2106, holding it after the MTI relay 3104 has released. This prevents stepping the reader at this time since the operator has already stepped it to the first line following tape identity. When the reader step relay (Fig. 21) releases, the MTIA relay 3107 releases, enabling the STEP step magnet 1207 and reconnecting the lead to advance the reader step check.

29.2 Mutilated tape identity during run

If any of the tape identity information is mutilated at any point other than the start of the first tape, the TIE and TIEA relays 3102 and 3100 will be operated at that time. When the circuit blocks the operator releases it, starts the motor 1204 and then steps the reader one line at a time with the reader step key 4020 checking the information by using the lamps until the reader is on the first line following tape identity. The tape identity key 4013 is then operated and this results in the operation of the TIC relay 4101 from ground, over the back contact and armature 8 of the ST3 relay 2000, front contact and armature 3 of the SPA relay 2008, the MTI conductor, through the left-hand contacts of the tape identity key 4018, the TIEA conductor, the armature 1 and front contact of the TIEA relay 3100, the TIC conductor and over the armature 1 and back contact of the TICA relay 4100 to the winding of the TIC relay 4101. This prepares the circuit for processing call entries and the operator now operates the machine start key 4004 and the circuit proceeds.

30. Emergency reset

If a power failure occurs during a run the various memory relays in the circuit will be released. After such an occurrence the motor 1207 is started and then the emergency reset key 4019 is operated to extend a ground from the N1 conductor, through its right-hand contacts, to the ER conductor leading to the winding of the ER relay 2012. Through its armature 1 and front contact, the ER relay 2012 operates the TIE relay 3102. Through its front contact and armature 2, the ER relay 2012 extends a ground to the TIC conductor to cause the operation of the TIC relay 4101. Through its front contact and armature 5, the ER relay 2012 causes the operation of the SPA relay 2008. The TIE relay 3102 operates the TIEA relay 3100. If the tape section selector (Fig. 35) is off-normal, the FT2 relay 2201 is operated over the SON ground from the off-normal contact 3505, the front contact and armature 6 of the ER relay 2012, to the FT2 conductor leading directly to the winding of the FT2 relay 2201. If the circuit is sorting message unit and summary tapes together on tens sort, then a ground is extended from the MON5 conductor, over the sort switch arm 5001 set for tens sort, over the T conductor, the armature 2 and front contact of the MUAS relay 4303, to the front contacts and armatures 3 and 4 of the ER relay 2012, and thence to the 13B and 18C relays 3005 and 3008, respectively, to operate these last relays. This provides paths for operating the 18A relay 3007 or for checking a tape type 13 when the next tape identity entries are read. On units sort and summary tapes together, the emergency reset key 4019 operates the ERA relay 2013 from ground on the MON5 conductor, over the sort switch arm 5001 set for units sort, over the UA conductor, the armature 1 and front contact of the MUAS relay 4303, the ERa conductor, the left-hand contacts of the emergency reset key 4019, and over the ERA conductor to the winding of the ERA relay 2013. The ERA relay 2013 locks through its armature 1 and front contact to the ERAL conductor from ground on the MON6 lead, through the resistance 3003, the armature 6 and back contact of the 17B relay 2902, the back contact and armature 3 of the 12A relay 2903, and over the back contact and armature 3 of the 11A relay 3001 to the ERAL conductor. This provides a path to operate the 17A relay 2905 when a tape 17 is encountered.

31. Lamps

31.1 Lamps under control of reader lamps key

31.11 General

The reader lamps key 4014 is used for reading the line of input tape which is in the reader or for holding the position of the tape section selector (Fig. 35) and for lighting various circuit progress lamps. The reader lamp key 4014 operates the RLA, B, C, TDD relay 1602 and if the AL alarm relay 1700 is operated it also operates the DS relay 2802.

31.12 Reading lamps

The RLA, B, C, TDD relay 1602 connects twenty-eight reader or perforator lamps designated A0, A1, A2, B0, and so forth (Fig. 16) to the corresponding reading contacts of the reader (Fig. 12). In addition, the reading position lamp (marked JM in Fig. 16) is connected to the J6 out-of-phase reader contact (Fig. 13) over the JM4 conductor to show the position of the reader shaft. If the motor 1207 is stopped and the reader lamps do not light when the reader lamps key 4014 is operated, the motor shaft may be turned by hand to the closed position. A lamp lights for each hole in the line of input tape being read.

31.13 Tape section lamps

The RLA, B, C, TDD relay 1602 connects the ten tape section lamps designated 0 to 9 (Fig. 16) to the tape section selector, Fig. 35. Ground for the lamps is supplied at the back contact and armature 8 of the CL6 relay 4204 and over the TDG conductor, or over the front contact and armature 3 of the TDA relay 2205, if this relay is operated due to the operation of the AL alarm relay 1700. The TDG conductor is connected in parallel to the armatures of the S0 to S9 relays, Fig. 35, and will be extended by the particular one of these relays operated to the correspondingly numbered leads 0 to 9 leading to the tape section lamps (Fig. 16).

31.14 Type of entry lamps

The DS relay 2802 connects the type of entry lamps (Fig. 28) designated two-line and five-line to the corresponding LN2 and LN5 relays, Fig. 33, to indicate the number of lines in the entry being processed.

31.15 Line of entry lamps

The DS relay 2802 connects the line of entry lamps 1 to 5 (Fig. 28) to the L-A and L-B relays, Fig. 33, to indicate which line of entry is being read. The one lamp is lighted by ground from the front contact and left outermost armature of the RCA relay 2400, over the SCA conductor, the armature 1 and back contact of the LK2 relay 3300, the SC conductor and thence over the armature 4 and front contact of the DS relay 2802 to the No. 1 lamp. It is thus lit when the circuit has not progressed to the second line of an entry or beyond. The next or No. 2 lamp is lit on the second line from ground, front contact and armature 8 of the LK1 relay 3302, armature 7 and front contact of the LK2 relay 3300 and thence in a chain circuit through the armature 4 and back contact of the L2B relay 3309, the L3B relay, and the L4B relay 3310 to the L2 conductor leading through the armature 5 and front contact of the DS relay 2802. The No. 3 lamp is lit on a third line of a five-line entry by the ground supplied for the operation of the L4B relay 3310, the No. 4 lamp is lit on the fourth line of a five-line entry by the ground supplied for the operation of the L3B relay, and the No. 5 lamp is lit on the fifth line of a five-line entry by ground supplied for the operation of the L2B relay 3309.

31.16 Tape identity lamp

The tape identity lamp, Fig. 28, is lit as soon as the tape index entry has been checked. The CL1 relay 4107 operates the TI relay 2800, which supplies ground over its front contact and armature 1 and through the armature 10 and front contact of the DS relay 2802 to light the tape identity lamp. The TI relay 2800 releases when the 28C relay 3903 releases or is shunted down by the operation of the TIS relay 3101 when the circuit starts to perforate tape identity.

31.17 Skip splice lamp

The skip splice lamp (Fig. 28) is lit whenever the circuit is skipping by ground from armature 1 of the SK1 relay 3204 or from armature 12 of the SK2 relay 3202 applied to the SKLP conductor.

31.2 Lamps under control of maintenance key
31.21 General

The maintenance key 4013 is provided for controlling the perforator lamps (Fig. 16). It is effective only if the AL alarm relay 1700 is operated, in which case it operates the PLA-D relay 1600.

31.22 Perforator lamps

The PLA-D relay 1600 connects the twenty-eight reader or perforator lamps (Fig. 16) described in section 31.12 to make contacts on the correspondingly designated K-series relays (Figs. 49, 55 and 61) which are in series with the perforating magnets and thereby indicate which perforating magnets are operated.

31.23 Perforator-in-use lamps

The PLA-D relay 1600 connects the ten perforator-in-use lamps designated 0 to 9 (Fig. 16) to the corresponding PD-relays, Fig. 54, to indicate which of the perforators is connected to the circuit.

31.13 Lamps not under key control
31.301 Machine pilot lamp

The machine pilot lamp, Fig. 28, lights from the AL alarm relay 1700 over the MP conductor on all alarms. Operation of the alarm cut-off key 4015 operates the EAC relay 1714 and extinguishes this lamp. This machine pilot lamp is also lighted by the FAL relay 1710 if a fuse blows.

31.302 Alarm lamp

The alarm lamp, a bull's-eye on the face of the sorter, lights on all alarms.

31.303 Fuse alarm lamp

The fuse alarm lamp, Fig. 28, lights when a fuse blows. The fuse as hereinbefore explained applies battery to the alarm bus 1716 operating the FAL relay 1710 and lighting the lamp.

31.304 General alarm lamp

The general alarm lamp lights on all alarms other than reader step failure and blown fuse.

31.305 Last section lamp

The last section lamp, Fig. 28, is described in section 16.104.

31.306 Master off-normal lamp

The master off-normal lamp (Fig. 28) lights whenever the circuit is started. It remains lit throughout a run until tape identity and splice have been applied at the end. It remains lit after regular release to indicate that the circuit is not entirely normal. It is extinguished by a master release operation.

31.307 Off-normal lamp

The off-normal lamp, Fig. 28, is lit during any operation of the sorter. It goes out following a regular release.

31.308 Perforate tape identity lamp

The perforate tape identity lamp, Fig. 28, lights when the circuit blocks while perforating tape identity automatically at the start of a run. Ground is extended over armature 9 and front contact of the ST3A relay 2004, the ON2 conductor, the armature 9 and back contact of the TE relay 4601, the TEN conductor, the armature 7 and front contact of the TIS relay 3101, the PTI conductor, the front contact and armature 6 of the ALA relay 1708 and over the PTI conductor leading directly to Fig. 28 to operate the perforate tape identity lamp thereat. The use of the armature and back contact of the TE relay 4601 in this circuit prevents the lighting of the lamp while perforating tape identity or splice under control of the end-of-tape key.

31.309 Reader step failure lamp

The reader step failure lamp, Fig. 28, lights when the circuit blocks because of a false reader step or failure of the reader to step.

31.310 The reader step hold lamp

The reader step hold lamp, Fig. 28, lights whenever the circuit blocks because the reader step relays were operated for more than 0.25 second.

31.311 Perforation completed lamp

Perforation completed lamp, Fig. 28, lights at the completion of window splice perforation as described in section 18.7.

31.312 Window splice lamps

The window splice lamps, Fig. 28, indicate that the circuit blocked because of a window in a perforator tape. The number of the lamp indicates which perforator encountered the window. The lamp goes out while splice is being applied unless there is no paper in the perforator. In this case, a new splice of paper is inserted and window splice is applied again at which time the window splice lamp goes out.

Relay index

| Relay | Fig. | Function |
|---|---|---|
| 11A, 11B | 30 | Register, tape index 11. |
| 12A, 12B | 29 | Register, tape index 12. |
| 13A, 13B | 30 | Register, tape index 13. |
| 17A, 17B | 29 | Register, tape index 17. |
| 18A, 18B, 18C | 30 | Register, tape index 18. |
| 28A, 28B, 28C | 39 | Reading translator (line starting "28"). |
| 286 | 44 | Detects end of sorted tape. |
| 286R | 44 | Registers end of sorted tape. |
| A0, A1, A2 | 36 | A digit reading relays. |
| A2S | 58 | A2 reading relay for spreading. |
| AL, ALA | 17 | Alarm. |
| ALCO | 17 | Alarm cut-off. |
| AMS | 45 | Automatic Multiple Sorting. |
| APA, APC, APD | 58 | All perforators (spreading). |
| AS | 34 | Assembly of tape resulting from thousands sort. |
| B0, B1, B2, B4, B7 | 36 | B digit reading relays. |
| BX | 48 | Except B (sorting by other digits than B). |
| C | 44 | Perforate cut-off. |
| C0, C1, C2, C4, C7 | 37 | C digit reading relays. |
| CKA, CKB | 62 | Check (perforator hold check). |
| CL1 | 41 | Tape identity line 1 checked. |
| CL2 | 41 | Tape identity line 2 checked. |
| CL5 | 42 | Tape identity line 5 checked. |
| CL6 | 42 | Tape identity line 6 checked. |
| CL8 | 42 | Tape identity line 8 checked. |
| CP1 | 47 | Change pattern (window perforating). |
| CP2 | 53 | Do. |
| CRK | 21 | Cancel reader check. |
| CTT | 23 | Cold tube timer. |
| D0, D1, D2, D4, D7 | 37 | D digit reading relays. |
| DET | 43 | Toll and MU detail tapes. |
| DS | 28 | Display. |
| E0, E1, E2, E4, E7 | 38 | E digit reading relays. |
| EAC | 17 | External alarm cut-off. |
| EC | 35 | E digit connector. |
| ELTR | 44 | End of last tape register. |
| EP | 19 | End of perforating (tape identity). |
| ER, ERA | 20 | Emergency reset. |
| ESK | 32 | End of skipping. |
| ESP | 53 | End of (window) splice perforating. |
| EST | 44 | End spreading timing. |
| F0, F1, F2, F4, F7 | 38 | F digit reading relays. |
| FAL | 17 | Fuse alarm. |
| FL | 47 | First line (window splice perforating). |
| FT1, FT2 | 22 | First tape digit. |
| FTHA | 34 | First thousands sort. |
| HATHA | 34 | Hundreds and thousands sorts. |
| HS | 48 | Hundreds sort connector. |
| KA0, KA1, KA2 | 49 | Check of A digit perforating. |
| KB0 to KB7 | 49 | Check of B digit perforating. |
| KC0 to KC7 | 55 | Check of C digit perforating. |
| KD0 to KD7 | 55 | Check of D digit perforating. |
| KE0 to KE7 | 61 | Check of E digit perforating. |
| KF0 to KF7 | 61 | Check of F digit perforating. |
| LET | 44 | Leading end of final output automatically sorted tape. |
| L1 | 41 | Checking TI, line 1. |
| L1T | 41 | Checking TI, line 1, tens. |
| L1UA | 41 | Checking TI, line 1, units. |
| L2 | 41 | Checking TI, line 2. |
| L2A, L2B | 33 | Counting next to last line of entry. |
| L3A, L3B | 33 | Counting 3rd from last line of entry. |
| L4A, L4B | 33 | Counting 4th from last line of entry. |
| L5 | 42 | Checking TI, line 5. |
| L6 | 42 | Checking TI, line 6. |
| L8 | 42 | Checking TI, line 8. |
| L9 | 42 | Checking TI, line 9. |
| LET | 44 | Leading end of final output tape-cutter. |
| LK1 | 33 | Lock (first line of multiline entry). |
| LK2 | 33 | Lock (after first line of multiline entry). |
| LLA | 33 | Counting last line of entry. |
| LN2 | 33 | 2-line entry. |
| LN5 | 33 | 5-line entry. |
| LTD | 22 | Last tape digit. |
| LTS | 44 | Last tape section. |
| ME | 53 | Manufactured entry. |
| MOC | 30 | Month check. |
| MON | 20 | Master off-normal. |
| MOT | 12, 14 | Motor power circuit. |
| MRL | 19 | Master release. |
| MST | 19 | Motor start. |
| MTI, MTIA | 31 | Mutilated tape identity. |
| MU | 43 | Message unit tape. |
| MUAS | 43 | Message unit and summary tapes. |
| MUS | 43 | Summary tape. |
| OBS | 43 | Observing tape. |
| OFBA | 34 | Office sort. |
| OFS | 48 | Do. |
| PA0 to PA9 | 61 | Perforator connector. |
| PCA, PCB | 39 | Pulse count (extra cycle after 28 entries). |
| PC0 | 44 | Perforate cut-off. |
| PD0 to PD9 | 54 | Perforator registers. |
| PHE | 62 | Perforator hold, even. |
| PHK | 62 | Perforator hold, check. |
| PH0 | 62 | Perforator hold, odd. |
| PK0 to PK9 | 62 | Perforator hold, check (advance magnet). |
| PL1 to PL9 | 18 | Perforate tape identity lines. |
| PLA | 16 | Perforator lamp connectors. |
| PM1, PM2 | 23 | Perforate mutilated line. |
| PS1 | 19 | Perforate skip splice signal (286). |
| PS2 | 19 | Perforate splice. |
| PS3 | 19 | Perforate splice (perforator hold check). |
| PSP | 46 | Perforate splice (start of tapes). |
| PTI | 46 | Perforate TI (end of tapes). |
| PX | 18 | Extra cycle before perforating TI. |
| RCA | 24 | Reader connector for reading relays. |
| RCD | 25 | Reader connector for control leads. |
| RKA, RKB | 21 | Reader check. |
| RLA | 16 | Reader lamp connector. |
| RLM | 19 | Release motor. |
| RLS | 20 | Release. |
| R0 | 12, 14 | Reader pin connector. |
| RS1–RS3 | 21 | Reader step. |
| RS2–RS4 | 21 | Do. |
| RSF | 17 | Reader step failure. |
| RSH, RSR | 17 | RS relay release check. |
| RTD | 22 | Restore TD selector. |
| RW | 21 | Reader step check W. |
| RZ1, RZ2, RZ3 | 21 | Reader step check Z. |
| S0 to S9 | 35 | Tape section selectors. |
| S0B to S4B | 59 | Select perforator 0–4. |
| S5B to S9B | 60 | Select perforator 5–9. |
| S1A to S4A | 59 | Perforator select advance 1–4. |
| S5A to S9A | 60 | Perforator select advance 5–9. |
| SC | 48 | Sort connector. |
| SK1, SK2 | 32 | Skip splice. |
| SKP | 32 | Do. |

| Relay | Fig. | Function |
|---|---|---|
| SKW | 32 | Skip window. |
| SPA | 20 | Splice pattern applied (at start). |
| SR | 21 | Step reader (manually). |
| SRL | 44 | Sort switch release. |
| SS | 58 | Skip (reader) step. |
| SST | 44 | Start spreading timing. |
| ST1, ST2, ST3 | 20 | Start. |
| ST3A | 20 | Do. |
| STD | 22 | Step TD selector. |
| STHA | 34 | Second thousands sort. |
| STT | 32 | Start tape. |
| TA | 34 | Tens sort. |
| TCO | 44 | Timer cut-off. |
| TCT0, TCT1, TCT2-3, TCT4-5, TCT6-7, TCT8-9 | 63 | Tape cutter relays. |
| TDA | 22 | Tape digit alarm. |
| TDD | 16 | Tape digit display. |
| TDRL | 44 | Tape section switch release. |
| TDS | 22 | Tape digit start (during recycle). |
| TE | 46 | Tape end. |
| TF | 12, 14 | Tape feed. |
| THS | 48 | Thousands sort. |
| TI | 28 | Tape identity (lamp control). |
| TIC, TICA | 41 | Tape identity checked. |
| TIE, TIEA | 31 | Tape identity end (of perforating). |
| TIS | 31 | Tape identity start (perforating). |
| TK | 22 | Tape digit check (after selector step). |
| TM | 17 | Short timer. |
| TS | 48 | Tens sort. |
| TTM | 23 | Tube timer. |
| UA | 34 | Units sort. |
| US | 48 | Do. |
| W1 to W9 | 18 | TI perforate walking, 1 to 9. |
| W2A | 18 | Auxiliary to W2. |
| WS | 53 | Window splice. |
| WS1A, WS1B | 47 | Do. |
| WS1D | 47 | Do. |
| WS2 | 47 | Do. |
| WSA, WSB | 53 | Do. |
| WSP | 19 | Splice perforate walking. |
| X1A, X1B | 29 | Tape indices 11, 21, 31 and 41. |

What is claimed is:

1. In a sorting device for sorting an original record containing items of information to be sorted where each item includes a plurality of sorting indicia and where each index includes a plurality of denominational orders, a plurality of readers, a plurality of recorders, means whereby a particular one of said readers is made effective to read said original record and to cause each item therein to be recorded by one of said recorders in accordance with the denominational order of a first sorting index contained in each item, means automatically effective at the end of each index sort whereby readers individual to denominational orders are made effective one at a time in succession to read records produced by corresponding recorders during the next preceding index sort, and means to cause each item read as last stated to be recorded by one of said recorders in accordance with the denominational order of another sorting index contained in each item.

2. In a sorting device for sorting an original record containing items of information to be sorted where each item includes a plural digit code and where each digit includes a plurality of denominational orders, a plurality of readers, a plurality of recorders, means whereby a particular one of said readers is made effective to read said original record and to cause each item therein to be recorded by one of said recorders in accordance with the denominational order of a first digit contained in each item, means automatically effective at the end of each digit sort whereby readers individual to denominational orders are made effective one at a time in succession to read records produced by corresponding recorders during the next preceding digit sort, and means to cause each item read as last stated to be recorded by one of said recorders in accordance with the denominational order of another digit contained in each item.

3. In a sorting device for sorting an original record containing items of information to be sorted where each item includes a four-digit code and where each digit includes a plurality of denominational orders, a plurality of readers, a plurality of recorders, means whereby a particular one of said readers is made effective to read said original record and to cause each item therein to be recorded by one of said recorders in accordance with the denominational order of a first digit contained in each item, means automatically effective at the end of each digit sort whereby readers individual to denominational orders are made effective one at a time in succession to read records produced by corresponding recorders during the next preceding digit sort, and means to cause each item read as last stated to be recorded by one of said recorders in accordance with the denominational order of another digit contained in each item.

4. In a sorting device for sorting an original record containing items of information to be sorted where each item includes a four decimal-digit code, a plurality of readers, a plurality of recorders, means whereby a particular one of said readers is made effective to read said original record and to cause each item therein to be recorded by one of said recorders in accordance with the decimal value of a first digit contained in each item, means automatically effective at the end of each digit sort whereby readers individual to decimal values are made effective one at a time in succession to read records produced by corresponding recorders during the next preceding digit sort, and means to cause each item read as last stated to be re-recorded by one of said recorders in accordance with the decimal value of another digit contained in each item.

5. In a sorting device for sorting an original record containing items of information to be sorted where each item includes a four decimal-digit code, ten readers particular to respective decimal values zero to nine, ten recorders particular to respective decimal values zero to nine, means whereby the zero reader is made effective to read said original record and to cause each item therein to be recorded by one of said ten recorders in accordance with the decimal value of a first digit contained in each item, means automatically effective at the end of each digit sort whereby said ten readers are made effective one at a time in succession of zero to nine to read records produced by corresponding recorders during the next preceding digit sort, and means to cause each item read as last stated to be re-recorded by one of said ten recorders in accordance with the decimal value of another digit contained in each item.

6. In a sorting device for sorting an original record containing items of information to be sorted where each item includes a plurality of sorting indicia and where each index includes a plurality of denominational orders, a plurality of readers, a plurality of recorders, means whereby a particular one of said readers is made effective to read said original record and to cause each item therein to be recorded by one of said recorders in accordance with the denominational order of a first sorting index contained in each item, means automatically effective at the start of each index sort for causing recorders individual to denominational orders to record a different record identification for different index sorts at the start of respective records produced by recorders for said different index sorts, means automatically effective at the end of each index sort as indicated by the presence in recorder produced records of a certain record identification whereby readers individual to denominational orders are made effective one at a time in succession to read records produced by corresponding recorders during the next preceding index sort, and means to cause each item read as last stated to be re-recorded by one of said recorders in accordance with the denominational order of another sorting index contained in each item.

7. In a sorting device for sorting an original record containing items of information to be sorted where each item includes a plural digit code and where each digit includes a plurality of denominational orders, a plurality of readers, a plurality of recorders, means whereby a particular one of said readers is made effective to read said original record and to cause each item therein to be recorded by one of said recorders in accordance with the denominational order of a first digit contained in each item, means automatically effective at the start of each digit sort for causing recorders individual to denominational orders to record a different record identification for different digit sorts at the start of respective records produced by recorders for said different digit sorts, means automatically effective at the end of each digit sort as indicated by the presence in recorder produced records of a certain record identification whereby readers individual to denominational orders are made effective one at a time in succession to read records produced by corresponding recorders during the next preceding digit sort, and means to cause each item read as last stated to be re-recorded by one of said recorders in accordance with the denominational order of another digit contained in each item.

8. In a sorting device for sorting an original record containing items of information to be sorted where each item includes a four-digit code and where each digit includes a plurality of denominational orders, a plurality of readers, a plurality of recorders, means whereby a particular one of said readers is made effective to read said original record and to cause each item therein to be recorded by one of said recorders in accordance with the denominational order of a first digit contained in each item, means automatically effective at the start of each digit sort for causing recorders individual to denominational orders to record a different record identification for different digit sorts at the start of respective records produced by recorders for said different digit sorts, means automatically effective at the end of each digit sort as indicated by the presence in recorder produced records of a certain record identification whereby readers individual to denominational orders are made effective one at a time in succession to read records produced by corresponding recorders during the next preceding digit sort, and means to cause each item read as last stated to be re-recorded by one of said recorders in accordance with the denominational order of another digit contained in each item.

9. In a sorting device for sorting an original record containing items of information to be sorted where each item includes a four decimal-digit code, a plurality of readers, a plurality of recorders, means whereby a particular one of said readers is made effective to read said original record and to cause each item therein to be recorded by one of said recorders in accordance with the decimal value of a first digit contained in each item, means automatically effective at the start of each digit sort for causing recorders individual to decimal values to record a different record identification for different digit sorts at the start of respective records produced by recorders for said different digit sorts, means automatically effective at the end of each digit sort as indicated by the presence in recorder produced records of a certain record identification whereby readers individual to decimal values are made effective one at a time in succession to read records produced by corresponding recorders during the next preceding digit sort, and means to cause each item read as last stated to be re-recorded by one of said recorders in accordance with the decimal value of another digit contained in each item.

10. In a sorting device for sorting an original record containing items of information to be sorted where each item includes a four decimal-digit code, ten readers particular to respective decimal values zero to nine, ten recorders particular to respective decimal values zero to nine, means whereby the zero reader is made effective to read said original record and to cause each item therein to be recorded by one of said ten recorders in accordance with the decimal value of a first digit contained in each item, means automatically effective at the start of each digit sort for causing said ten recorders to record a different record identification for different digit sorts at the start of respective records produced by said ten recorders for said different digit sorts, means automatically effective at the end of each digit sort as indicated by the presence in recorder produced records of a certain record identification whereby said ten readers are made effective one at a time in succession of zero to nine to read records produced by corresponding recorders during the next preceding digit sort, and means to cause each item read as last stated to be re-recorded by one of said ten recorders in accordance with the decimal value of another digit contained in each item.

11. In a sorting device for sorting an original record containing items of information to be sorted where each item includes a plurality of sorting indicia and where each index includes a plurality of denominational orders, a plurality of readers, a plurality of recorders, means whereby a particular one of said readers is made effective to read said original record and to cause each item therein to be recorded by one of said recorders in accordance wtih the denominational order of a first sorting index contained in each item, means automatically effective at the end of each index sort whereby readers individual to denominational orders are made effective one at a time in succession to read records produced by corresponding recorders during the next preceding index sort, means to cause each item read as last stated to be re-recorded by one of said records in accordance with the denominational order of another sorting index contained in each item, means automatically effective at the end of the last index sort whereby readers individual to denominational orders are made effective one at a time in succession to read records produced by corresponding recorders during the last index sort and means to cause each item read as last stated to be re-recorded by the same particular one of said recorders, whereby a single recorder produced record containing a copy of said original record excepting that the items therein are completely sorted by denominational orders of all sorting indicia is produced.

12. In a sorting device for sorting an original record containing items of information to be sorted where each item includes a plural digit code and where each digit includes a plurality of denominational orders, a plurality of readers, a plurality of recorders, means whereby a particular one of said readers is made effective to read said original record and to cause each item therein to be recorded by one of said recorders in accordance with the denominational order of a first digit contained in each item, means automatically effective at the end of each digit sort whereby readers individual to denominational orders are made effective one at a time in succession to read records produced by corresponding recorders during the next preceding digit sort, means to cause each item read as last stated to be re-recorded by one of said recorders in accordance with the denominational order of another digit contained in each item, means automatically effective at the end of the last digit sort whereby readers individual to denominational orders are made effective one at a time in succession to read records produced by corresponding recorders during the last digit sort, and means to cause each item read as last stated to be re-recorded by the same particular one of said recorders, whereby a single recorder produced record containing a copy of said original record excepting that the items therein are completely sorted by denominational orders of all digits is produced.

13. In a sorting device for sorting an original record containing items of information to be sorted where each item includes a four-digit code and where each digit includes a plurality of denominational orders, a plurality of readers, a plurality of recorders, means whereby a particular one of said readers is made effective to read said original record and to cause each item therein to be recorded by one of said recorders in accordance with the denominational order of a first digit contained in each item, means automatically effective at the end of each digit sort whereby readers individual to denominational orders are made effective one at a time in succession to read records produced by corresponding recorders during the next preceding digit sort, means to cause each item read as last stated to be re-recorded by one of said recorders in accordance with the denominational order of another digit contained in each item, means automatically effective at the end of the fourth digit sort whereby readers individual to denominational orders are made effective one at a time in succession to read records produced by corresponding recorders during the fourth digit sort, and means to cause each item read as last stated to be re-recorded by the same particular one of said recorders, whereby a single recorder produced record containing a copy of said original record excepting that the items therein are completely sorted by denominational orders of all four digits is produced.

14. In a sorting device for sorting an original record containing items of information to be sorted where each item includes a four decimal-digit code, a plurality of readers, a plurality of recorders, means whereby a particular one of said recorders is made effective to read said original record and to cause each item therein to be recorded by one of said recorders in accordance with the decimal value of a first digit contained in each item, means automatically effective at the end of each digit sort whereby readers individual to decimal values are made effective one at a time in succession to read records produced by corresponding recorders during the next preceding digit sort, means to cause each item read as last stated to be re-recorded by one of said recorders in accordance with the decimal value of another digit contained in each item, means automatically effective at the end of the fourth digit sort whereby readers individual to decimal values are made effective one at a time in succession to read records produced by corresponding recorders during the fourth digit sort, and means to cause each item read as last stated to be re-recorded by the same particular one of said recorders, whereby a single recorder produced record containing a copy of said original record excepting that the items therein are completely sorted by decimal values of all digits is produced.

15. In a sorting device for sorting an original record containing items of information to be sorted where each item includes a four decimal-digit code, ten readers particular to respective decimal values zero to nine, ten recorders particular to respective decimal values zero to nine, means whereby the zero reader is made effective to read said original record and to cause each item therein to be recorded by one of said ten recorders in accordance with the decimal value of a first digit contained in each item, means automatically effective at the end of each digit sort whereby said ten readers are made effective one at a time in succession of zero to nine to read records produced by corresponding recorders during the next preceding digit sort, means to cause each item read as last stated to be re-recorded by one of said ten recorders in accordance with the decimal value of another digit contained in each item, means automatically effective at the end of the fourth digit sort whereby said readers individual to decimal values one to nine are made effective one at a time in that order to read records produced by corresponding recorders during the fourth digit sort, and means to cause each item read as last stated to be re-recorded by the zero recorder, whereby a single recorder produced record containing a copy of said original record excepting that the items therein are completely sorted by decimal values of all digits is produced by the zero recorder.

16. In a sorting device for sorting an original record containing items of information to be sorted where each item includes a plurality of sorting indicia and where each index includes a plurality of denominational orders, a plurality of readers, a plurality of recorders, means whereby a particular one of said readers is made effective to read said original record and to cause each item therein to be recorded by one of said recorders in accordance with the denominational order of a first sorting index contained in each item, means automatically effective at the start of each index sort for causing recorders individual to denominational orders to record a different record identification for different index sorts at the start of respective records produced by recorders for said different index sorts, means automatically effective at the end of each index sort as indicated by the presence in recorder produced records of a certain record identification whereby readers individual to denominational orders are made effective one at a time in succession to read records produced by corresponding recorders during the next preceding index sort, means to cause each item read as last stated to be re-recorded by one of said recorders in accordance with the denominational order of another sorting index contained in each item, means automatically effective at the end of the last index sort as indicated by the presence in recorder produced records of a certain record identification whereby readers individual to denominational orders are made effective one at a time in succession to read records produced by corresponding recorders during the last index sort, and means to cause each item read as last stated to be re-recorded by the same particular one of said recorders, whereby a single recorder produced record containing a copy of said original record excepting that the items therein are completely sorted by denominational orders of all sorting indicia is produced.

17. The invention defined in claim 16 wherein said original record is a perforated tape and said readers are perforated tape readers and said recorders are tape perforators, wherein said readers and perforators are coupled by having the output tape of each perforator physically fed back intact into the input of the corresponding reader, wherein said original tape is physically inserted into the said particular reader at the start of the sorting, wherein the means for causing the first index sort includes a manually operable start switch for starting the automatic operation of the sorter and a sort index selector for determining the index according to which the sort is to be made and a distributor circuit for distributing the items of information to appropriate perforators, wherein the means for causing the subsequent successive index sorts include a tape section switch and a tape identification circuit whereby successive tape sections from successive perforators are caused to be sorted by respective readers under the control of the tape section switch and the sort index selector and the identification circuit.

18. The invention defined in claim 17 wherein said tape section switch comprises an allotter whereby the order of rendering successive readers effective to read respective perforated tapes is rigidly predetermined, wherein said record identification is a tape index perforated at the start of each tape section indicating which index sort has been completed and which index sort is next in order for each tape section, and wherein said tape identification circuit comprises means and mechanism controlled by the nature of said tape indices and the setting of said sort index selector and effective when any reader reads a tape index to permit said any reader to read and to cause the items in its tape to be sorted if said any reader reads a proper tape index or to stop said any reader and to permit said allotter to render the next allotted reader effective to read its tape if said any reader reads an improper tape index.

19. In a sorting device for sorting an original record containing items of information to be sorted where each item includes a plural digit code and where each digit includes a plurality of denominational orders, a plurality of readers, a plurality of recorders, means whereby a particular one of said readers is made effective to read said original record and to cause each item therein to be recorded by one of said recorders in accordance with the denominational order of a first digit contained in each item, means automatically effective at the start of each digit sort for causing recorders individual to denominational orders to record a different record identification for different digit sorts at the start of respective records produced by recorders for said different digit sorts, means automatically effective at the end of each digit sort as indicated by the presence in recorder produced records of a certain record identification whereby readers individual to denominational orders are made effective one at a time in succession to read records produced by corresponding recorders during the next preceding digit sort, means to cause each item read as last stated to be re-recorded by one of said recorders in accordance with the denominational order of another digit contained in each item, means automatically effective at the end of the last digit sort as indicated by the presence in recorder produced records of certain record identification whereby readers individual to denominational orders are made effective one at a time in succession to read records produced by corresponding recorders during the last digit sort, and means to cause each item read as last stated to be re-recorded by the same particular one of said recorders, whereby a single recorder produced record containing a copy of said original record excepting that the items therein are completely sorted by denominational orders of all digits is produced.

20. The invention defined in claim 19 wherein said original record is a perforated tape and said readers are perforated tape readers and said recorders are tape perforators, wherein said readers and perforators are coupled by having the output tape of each perforator physically fed back intact into the input of the corresponding reader, wherein said original tape is physically inserted into the said particular reader at the start of the sorting, wherein the means for causing the first digit sort includes a manually operable start switch for starting the automatic operation of the sorter and a sort digit selector for determining the digit according to which the sort is to be made and a distributor circuit for distributing the items of information to appropriate perforators, wherein the means for causing the subsequent successive digit sorts include a tape section switch and a tape identification circuit whereby successive tape sections from successive perforators are caused to be sorted by respective readers under the control of the tape section switch and the sort digit selector and the identification circuit.

21. The invention defined in claim 20 wherein said tape section switch comprises an allotter whereby the order of rendering successive readers effective to read respective perforated tapes is rigidly predetermined, wherein said record identification is a tape index perforated at the start of each tape section indicating which digit sort has been completed and which digit sort is next in order for each tape section, and wherein said tape identification circuit comprises means and mechanism controlled by the nature of said tape indices and the setting of said sort digit selector and effective when any reader reads a tape index to permit said any reader to read and to cause the items in its tape to be sorted if said any reader reads a proper tape index or to stop said any reader and to permit said allotter to render the next allotted reader effective to read its tape if said any reader reads an improper tape index.

22. In a sorting device for sorting an original record containing items of information to be sorted where each item includes a four-digit code and where each digit includes a plurality of denominational orders, a plurality of readers, a plurality of recorders, means whereby a particular one of said readers is made effective to read said original record and to cause each item therein to be recorded by one of said recorders in accordance with the denominational order of a first digit contained in each item, means automatically effective at the start of each digit sort for causing recorders individual to denominational orders to record a different record identification for different digit sorts at the start of respective records produced by recorders for said different digit sorts, means automatically effective at the end of each digit sort as indicated by the presence in recorder produced records of a certain record identification whereby readers individual to denominational orders are made effective one at a time in succession to read records produced by corresponding recorders during the next preceding digit sort, means to cause each item read as last stated to be re-recorded by one of said recorders in accordance with the denominational order of another digit contained in each item, means automatically effective at the end of the fourth digit sort as indicated by the presence in recorder produced records of a certain record identification whereby readers individual to denominational orders are made effective one at a time in succession to read records produced by recorders during the fourth digit sort, and means to cause each item read as last stated to be re-recorded by the same particular one of said recorders, whereby a single recorder produced record containing a copy of said original record excepting that the items therein are completely sorted by denominational orders of all four digits is produced.

23. The invention defined in claim 22 wherein said original record is a perforated tape and said readers are perforated tape readers and said recorders are tape perforators, wherein said readers and perforators are coupled by having the output tape of each perforator physically fed back intact into the input of the corresponding reader, wherein said original tape is physically inserted into the said particular reader at the start of the sorting, wherein the means for causing the first digit sort includes a manually operable start switch for starting the automatic operation of the sorter and a sort digit selector for determining the digit according to which the sort is to be made and a distributor circuit for distributing the items of information to appropriate perforators, wherein the means for causing the subsequent successive digit sorts include a tape section switch and a tape identification circuit whereby successive tape sections from successive perforators are caused to be sorted by respective readers under the control of the tape section switch and the sort digit selector and the identification circuit.

24. The invention defined in claim 23 wherein said tape section switch comprises an allotter whereby the order of rendering successive readers effective to read respective perforated tapes is rigidly predetermined, wherein said record identification is a tape index perforated at the start of each tape section indicating which digit sort has been completed and which digit sort is next in order for each tape section, and wherein said tape identification circuit comprises means and mechanism controlled by the nature of said tape indices and the setting of said sort digit selector and effective when any reader reads a tape index to permit said any reader to read and to cause the items in its tape to be sorted if said any reader reads a proper tape index or to stop said any reader and to permit said allotter to render the next allotted reader effective to read its tape if said any reader reads an improper tape index.

25. In a sorting device for sorting an original record containing items of information to be sorted where each item includes a four decimal-digit code, a plurality of readers, a plurality of recorders, means whereby a particular one of said readers is made effective to read said original record and to cause each item therein to be recorded by one of said recorders in accordance with the decimal value of a first digit contained in each item, means automatically effective at the start of each digit sort for causing recorders individual to decimal value to record a different record identification for different digit sorts at the start of respective records produced by recorders for said different digit sorts, means automatically effective at the end of each digit sort as indicated by the presence in recorder produced records of a certain record identification whereby readers individual to decimal values are made effective one at a time in succession to read records produced by corresponding recorders during the next preceding digit sort, means to cause each item read as last stated to be re-recorded by one of said recorders in accordance with the decimal value of another digit contained in each item, means automatically effective at the end of the fourth digit sort as indicated by the presence in recorder produced records of a certain record identification whereby readers individual to decimal values are made effective one at a time in succession to read records produced by corresponding recorders during the fourth digit sort, and means to cause each item read as last stated to be re-recorded by the same particular one of said recorders, whereby a single recorder produced record containing a copy of said original record excepting that the items therein are completely sorted by decimal values of all digits is produced.

26. The invention defined in claim 25 wherein said original record is a perforated tape and said readers are perforated tape readers and said recorders are tape perforators, wherein said readers and perforators are coupled by having the output tape of each perforator physically fed back intact into the input of the corresponding reader, wherein said original tape is physically inserted into the said particular reader at the start of the sorting, wherein the means for causing the first digit sort includes a manually operable start switch for starting the automatic operation of the sorter and a sort digit selector for determining the digit according to which the sort is to be made and a distributor circuit for distributing the items of information to appropriate perforators, wherein the means for causing the subsequent successive digit sorts include a tape section switch and a tape identification circuit whereby successive tape sections from successive perforators are caused to be sorted by respective readers under the control of the tape section switch and the sort digit selector and the identification circuit.

27. The invention defined in claim 26 wherein said tape section switch comprises an allotter whereby the order of rendering successive readers effective to read respective perforated tapes is rigidly predetermined, wherein said record identification is a tape index perforated at the start of each tape section indicating which digit sort has been completed and which digit sort is next in order for each tape section, and wherein said tape identification circuit comprises means and mechanism controlled by the nature of said tape indices and the setting of said sort digit selector and effective when any reader reads a tape index to permit said any reader to read and to cause the items in its tape to be sorted if said any reader reads a proper tape index or to stop said any reader and to permit said allotter to render the next allotted reader effective to read its tape if said any reader reads an improper tape index.

28. In a sorting device for sorting an original record containing items of information to be sorted where each item includes a four decimal-digit code, ten readers particular to respective decimal values zero to nine, ten recorders particular to respective decimal values zero to nine, means whereby the zero reader is made effective to read said original record and to cause each item therein to be recorded by one of said ten recorders in accordance with the decimal value of a first digit contained in each item, means automatically effective at the start of each digit sort for causing said ten recorders to record a different record identification for different digit sorts at the start of respective records produced by said ten recorders for said different digit sorts, means automatically effective at the end of each digit sort as indicated by the presence in recorder produced records of a certain record identification whereby said ten readers are made effective one at a time in succession of zero to nine to read records produced by corresponding recorders during the next preceding digit sort, means to cause each item read as last stated to be re-recorded by one of said ten recorders in accordance with the decimal value of another digit contained in each item, means automatically effective at the end of the fourth digit sort as indicated by the presence in recorder produced records of a certain record identification whereby said readers individual to decimal value one to nine are made effective one at a time in that order to read records produced by corresponding recorders during the fourth digit sort, and means to cause each item read as last stated to be re-recorded by the zero recorder, whereby a single recorder produced record containing a copy of said original record excepting that the items therein are completely sorted by decimal values of all digits is produced by the zero recorder.

29. The invention defined in claim 28 wherein said original record is a perforated tape and said readers are perforated tape readers and said recorders are tape perforators, wherein said readers and perforators are coupled by having the output tape of each perforator physically fed back intact into the input of the corresponding reader, wherein said original tape is physically spliced at the start of the sorting into the tape between the zero perforator and the zero reader, wherein the means for causing the first digit sort includes a manually operable start switch for starting the automatic operation of the sorter and a sort digit selector for determining the digit according to which the sort is to be made and a distributor circuit for distributing the items of information to appropriate perforators, wherein the means for causing the subsequent successive digit sorts include a tape section switch and a tape identification circuit whereby successive tape sections from successive perforators are caused to be sorted by respective readers under the control of the tape section switch and the sort digit selector and the identification circuit, and wherein the means for causing the assembly operation include a tape cutter automatically operated at the start of the assembly operation to sever the tape then issuing from the zero perforator.

30. The invention defined in claim 29 wherein said tape section switch comprises an allotter whereby the order of rendering successive readers effective to read respective perforated tapes is rigidly predetermined, wherein said record identification is a tape index perforated at the start of each tape section indicating which digit sort has been completed and which digit sort is next in order for each tape section, and wherein said tape identification circuit comprises means and mechanism controlled by the nature of said tape indices and the setting of said sort digit selector and effective when any reader reads a tape index to permit said any reader to read and to cause the items in its tape to be sorted if said any reader reads a proper index or to stop said any reader and to permit said allotter to render the next allotted reader effective to read its tape if said any reader reads an improper tape index.

No references cited.